(12) United States Patent
Shimomoto

(10) Patent No.: US 11,045,735 B2
(45) Date of Patent: Jun. 29, 2021

(54) COMPUTER SYSTEM

(71) Applicant: BANDAI NAMCO Entertainment Inc., Tokyo (JP)

(72) Inventor: Manabu Shimomoto, Tsukubamirai (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 16/570,104

(22) Filed: Sep. 13, 2019

(65) Prior Publication Data
US 2020/0086216 A1 Mar. 19, 2020

(30) Foreign Application Priority Data

Sep. 14, 2018 (JP) .............................. JP2018-172153
Sep. 14, 2018 (JP) .............................. JP2018-172154
Sep. 14, 2018 (JP) .............................. JP2018-172155

(51) Int. Cl.
*A63F 13/58* (2014.01)

(52) U.S. Cl.
CPC .................................... *A63F 13/58* (2014.09)

(58) Field of Classification Search
None
See application file for complete search history.

(56) References Cited

U.S. PATENT DOCUMENTS

| | | | | |
|---|---|---|---|---|
| 6,354,940 B1* | 3/2002 | Itou | ......................... | A63F 13/10 463/8 |
| 6,482,092 B1* | 11/2002 | Tajiri | ..................... | A63F 13/34 463/43 |
| 6,488,582 B1* | 12/2002 | Suzuki | ..................... | A63F 13/10 463/31 |
| 9,076,292 B1* | 7/2015 | Berger | ..................... | A63F 13/55 |
| 2002/0119811 A1* | 8/2002 | Yabe | ....................... | A63F 13/10 463/8 |
| 2005/0181849 A1* | 8/2005 | Kobayashi | ............. | A63F 13/10 463/7 |
| 2005/0266921 A1* | 12/2005 | Hayashida | ............. | A63F 13/10 463/33 |
| 2007/0087801 A1* | 4/2007 | Kotani | ................... | A63F 13/10 463/8 |
| 2007/0213107 A1* | 9/2007 | Itou | ......................... | A63F 13/56 463/1 |
| 2012/0322522 A1* | 12/2012 | Ishikawa | ................ | A63F 13/56 463/2 |

(Continued)

FOREIGN PATENT DOCUMENTS

JP 2017176522 A 10/2017

OTHER PUBLICATIONS

Poke Ball. Published Sep. 13, 2018. <https://bulbapedia.bulbagarden.net/w/index.php?title=Poké_Ball&oldid=2848137>. Accessed Aug. 28, 2020. (Year: 2018).*

(Continued)

*Primary Examiner* — Seng H Lim
(74) *Attorney, Agent, or Firm* — Posz Law Group, PLC

(57) ABSTRACT

A storage object storing a non-playable character (NPC) is flown until a given flight end condition is satisfied based on a player's action operation. The stored NPC is caused to appear from the storage object satisfying the flight end condition. In addition, the NPC having appeared from the storage object is automatically controlled.

41 Claims, 73 Drawing Sheets

(56) References Cited

U.S. PATENT DOCUMENTS

| | | | | |
|---|---|---|---|---|
| 2013/0184040 A1* | 7/2013 | Nonaka | ................ | A63F 13/798 463/7 |
| 2013/0196728 A1* | 8/2013 | Yasue | .................... | A63F 13/69 463/8 |
| 2014/0011585 A1* | 1/2014 | Ando | ...................... | A63F 13/42 463/31 |
| 2014/0066210 A1* | 3/2014 | Watabe | .................. | A63F 13/12 463/42 |
| 2014/0128154 A1* | 5/2014 | Asano | .................. | A63F 13/795 463/29 |
| 2015/0151204 A1* | 6/2015 | Yamaguchi | ......... | A63F 13/2145 463/31 |
| 2016/0129345 A1* | 5/2016 | Seok | .................... | A63F 13/426 463/31 |
| 2017/0266557 A1* | 9/2017 | Fujiwara | ............... | A63F 13/825 |

OTHER PUBLICATIONS

Hailee Franco. "Catch Em' All With These Pokemon Go Tips and Tricks" Published Aug. 2, 2016 < https://www.tablet2cases.com/blogs/cases/catch-em-all-with-these-pokemon-go-tips-and-tricks> (Year: 2016).*

* cited by examiner

FIG.5
(1) 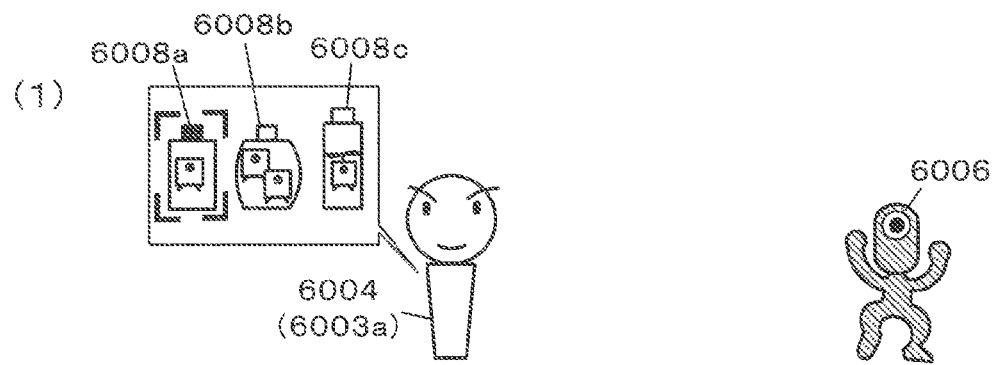
(2) 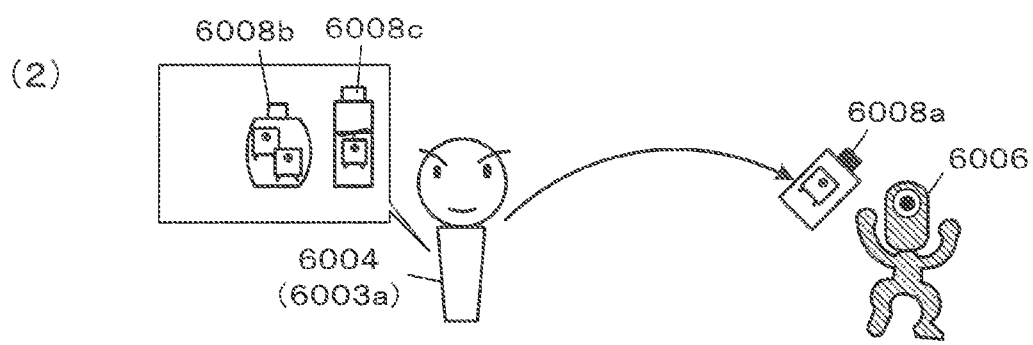
(3) 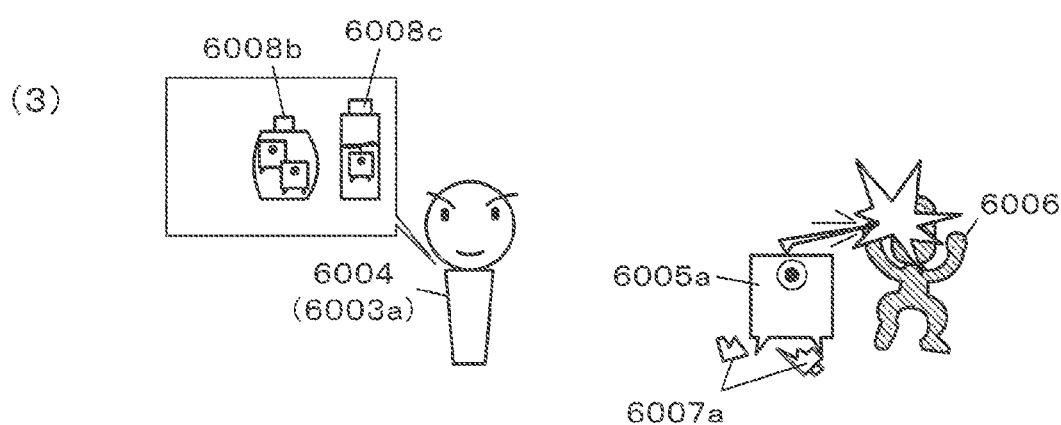

FIG.7
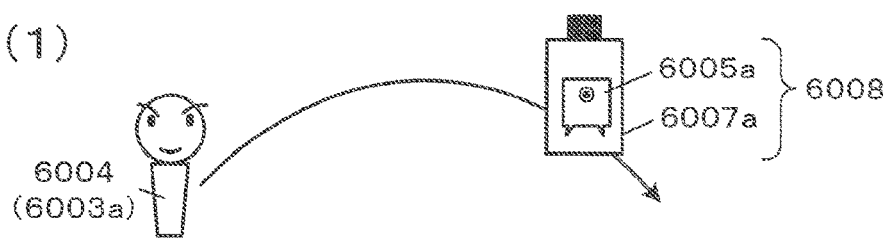
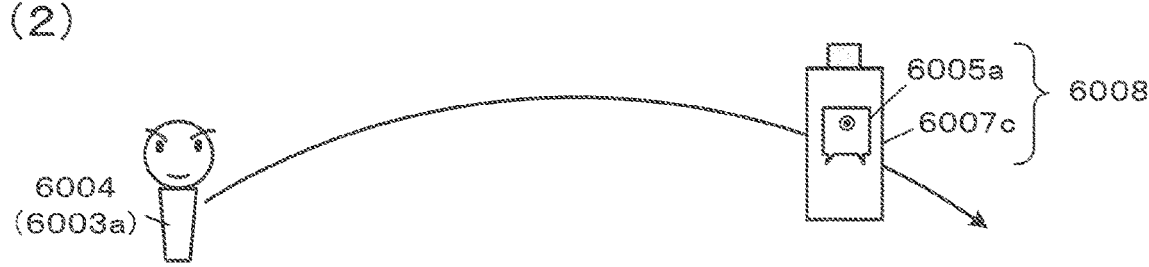
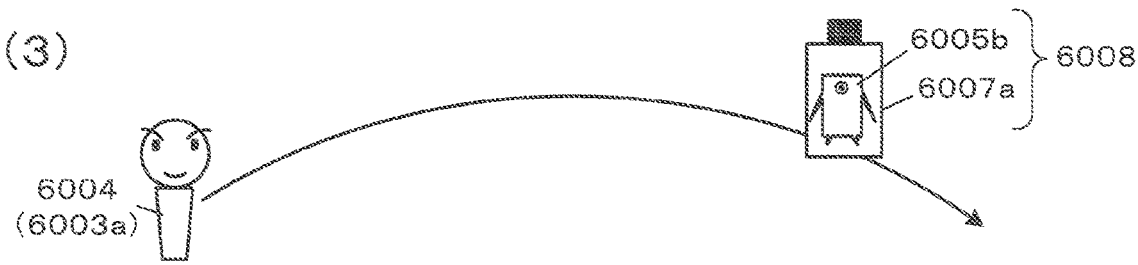
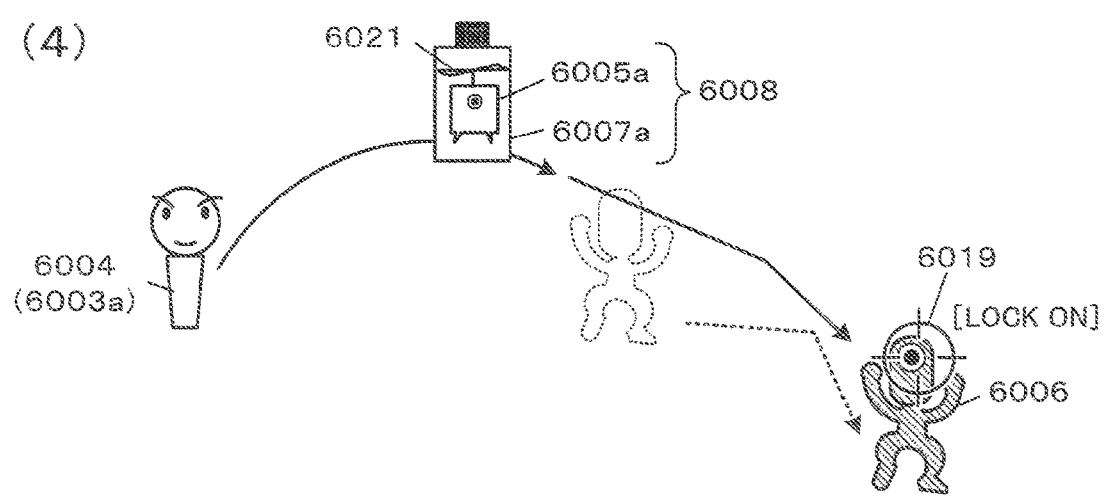

FIG.8
(1) 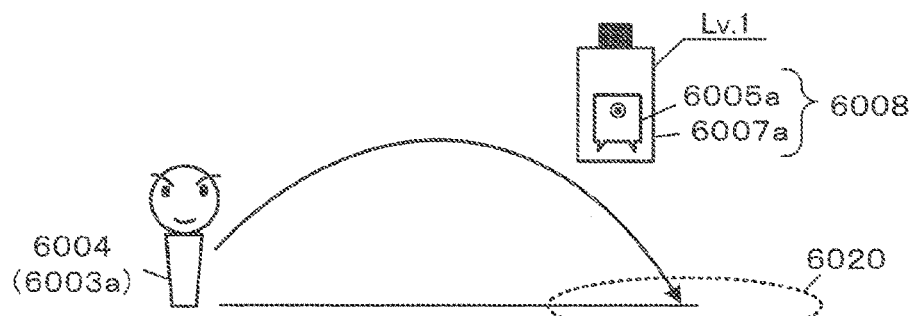
(2) 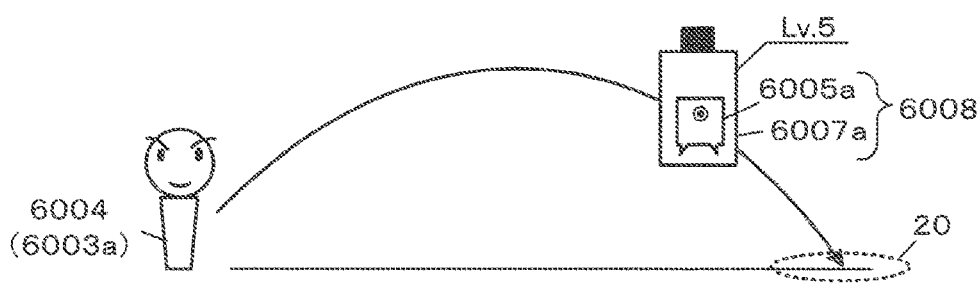
(3) 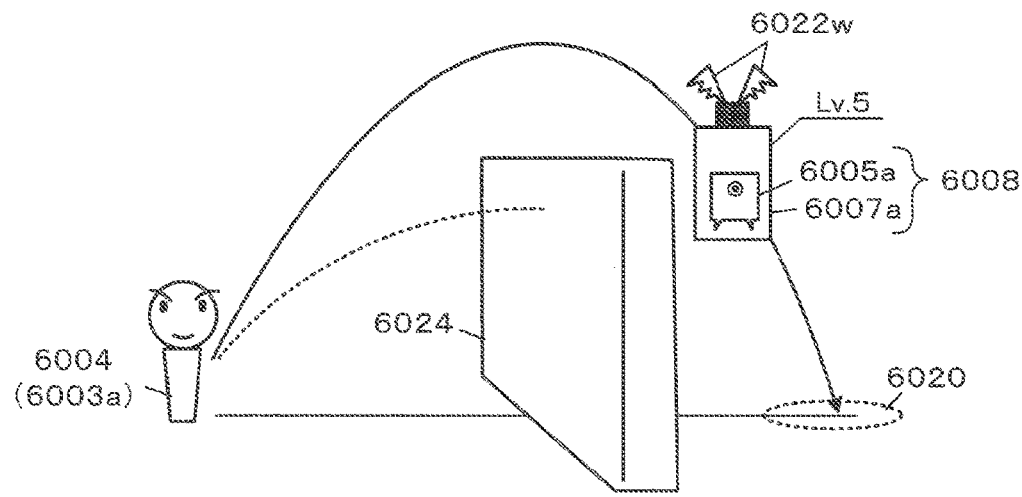
(4) 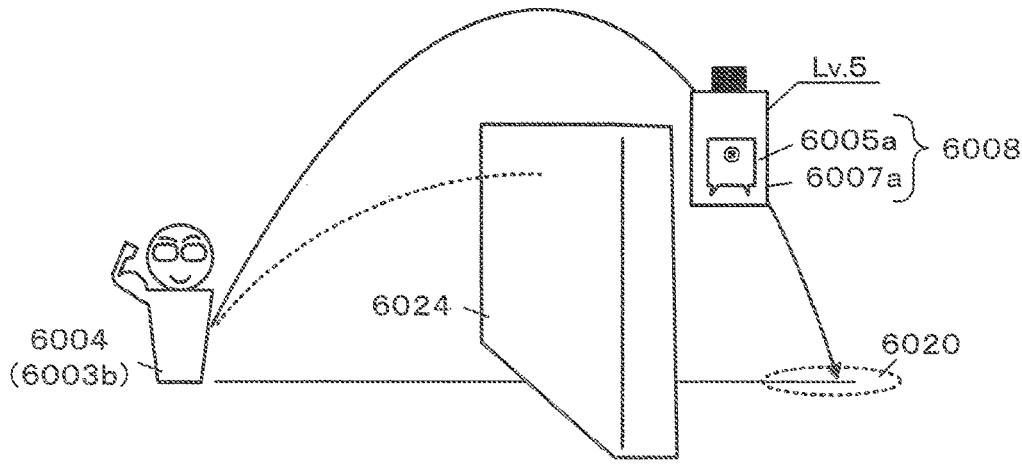

FIG.9
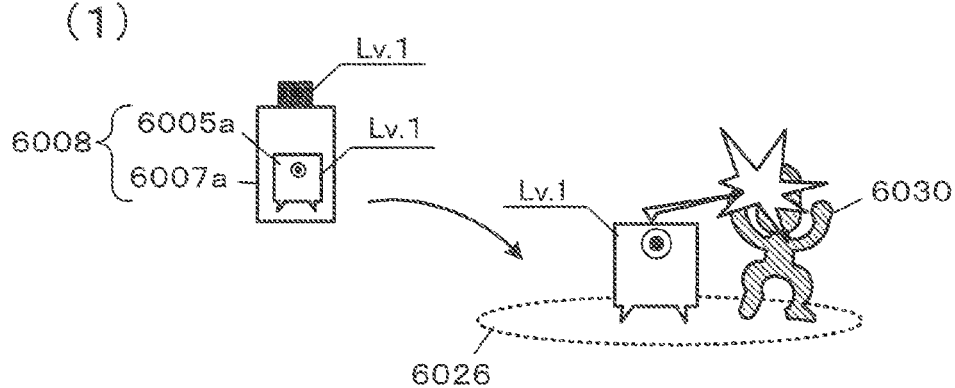
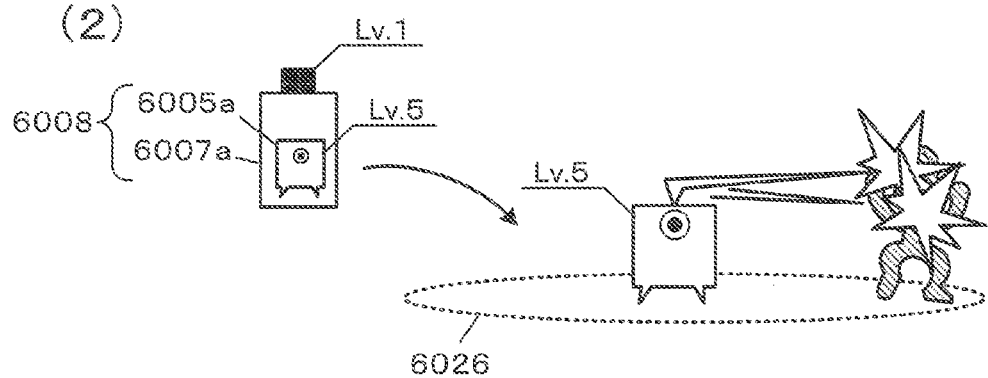
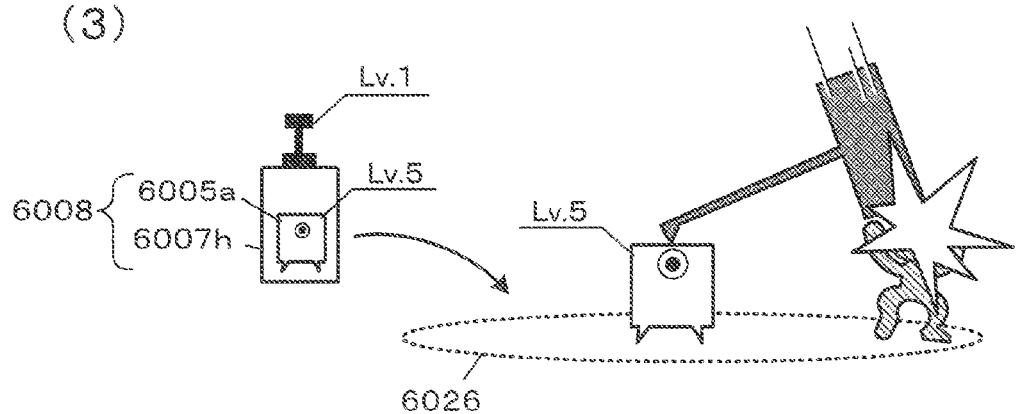

FIG.10
(1)
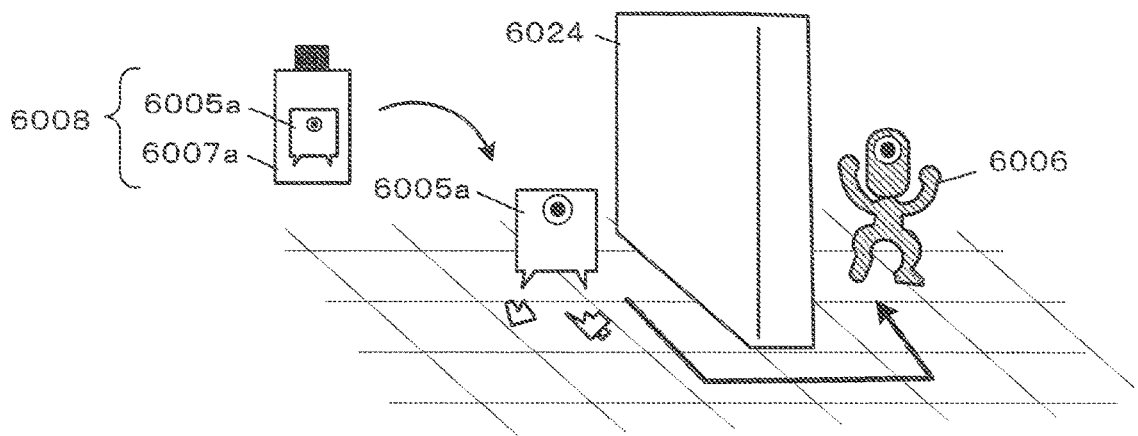
(2)
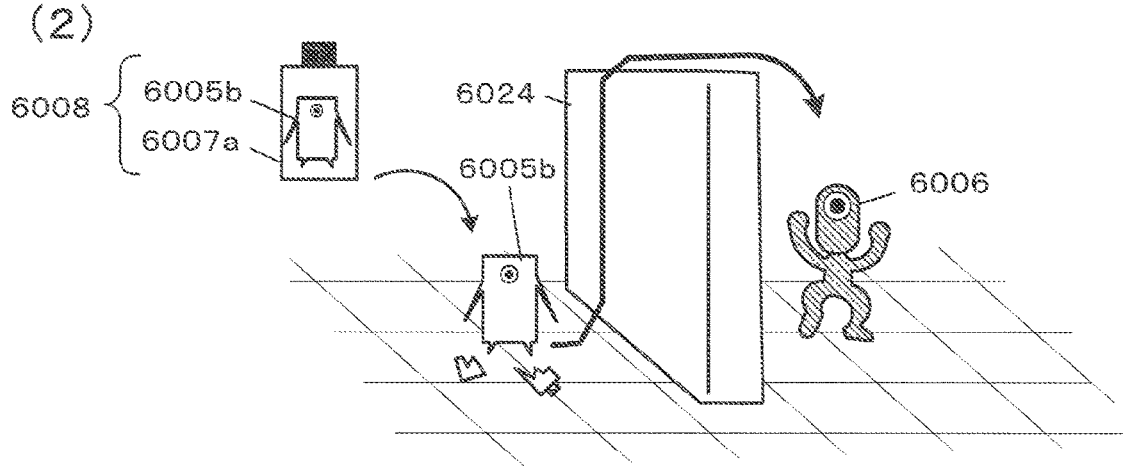
(3)
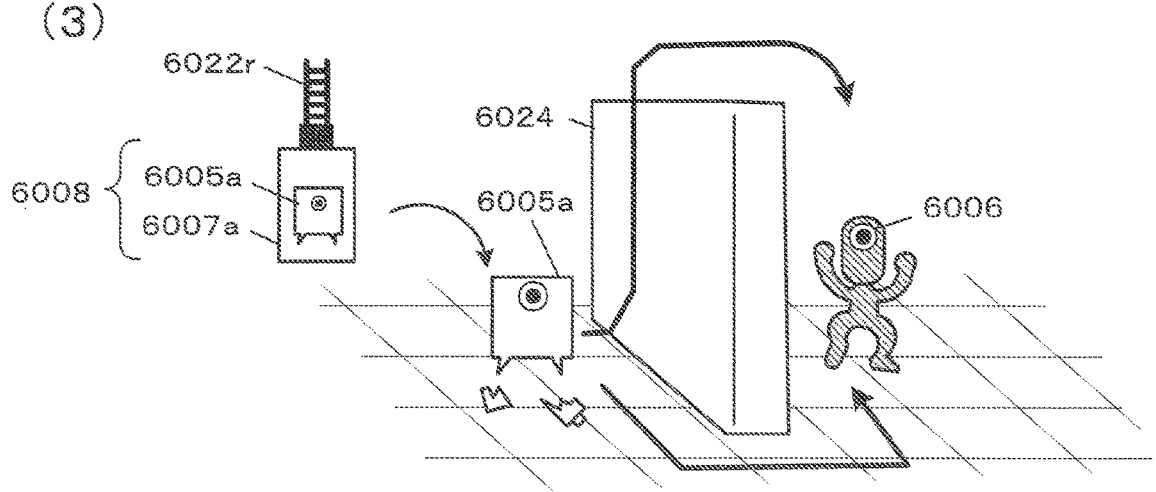

FIG.12
(1)
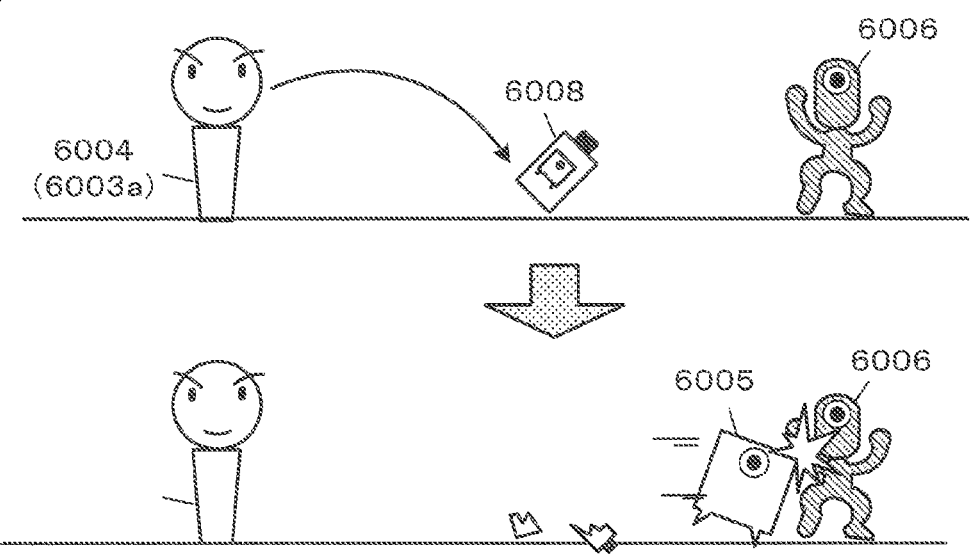
(2)
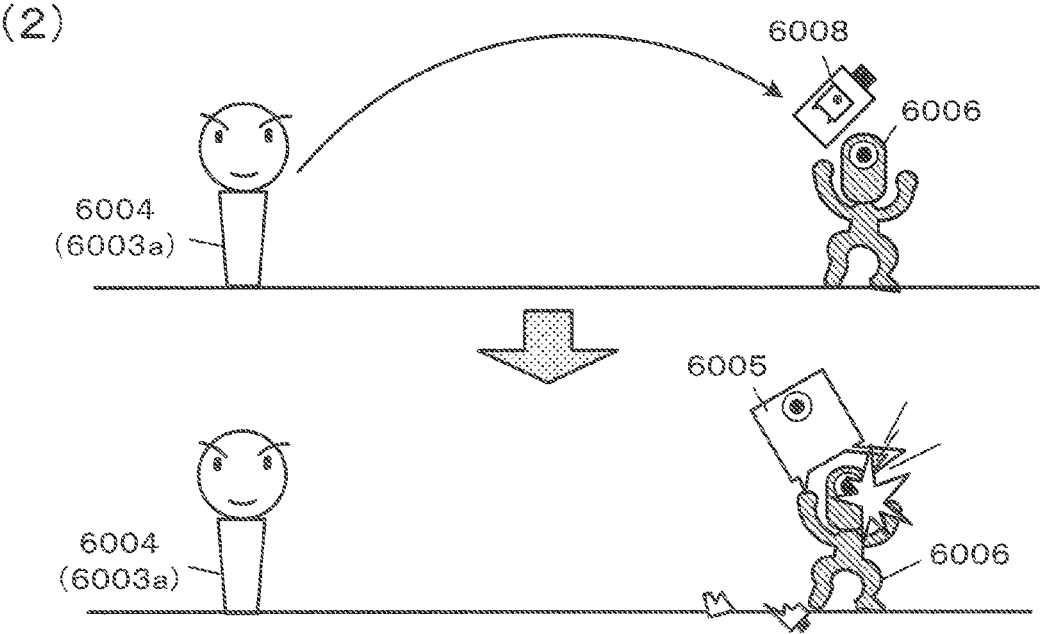

[EXAMPLE OF PREDICTION DISPLAY]

FIG.32
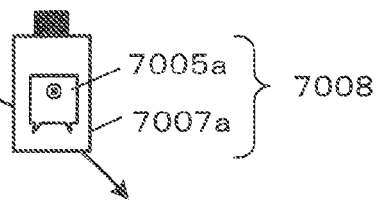
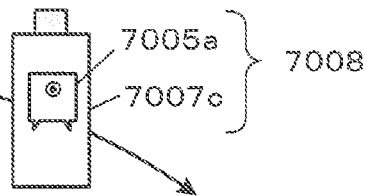
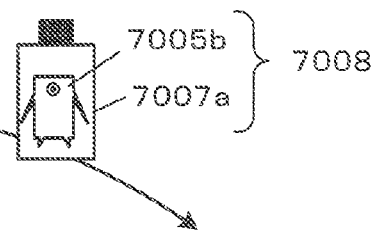
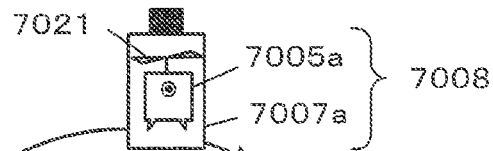
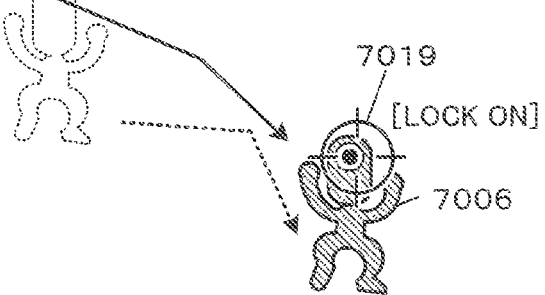

FIG.33
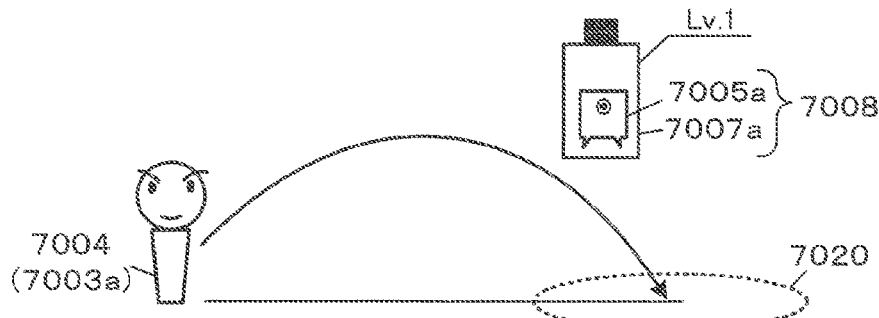
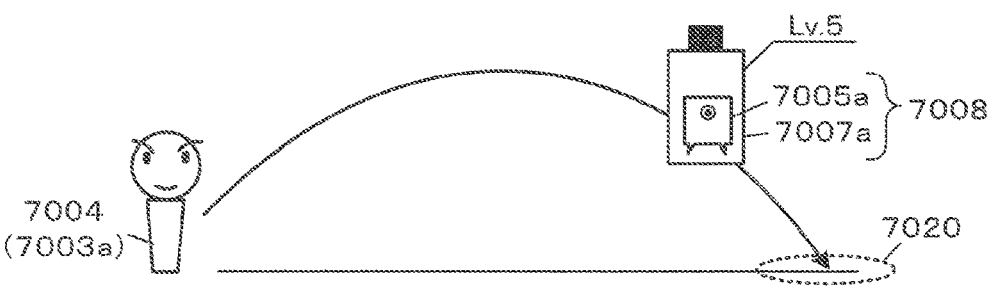
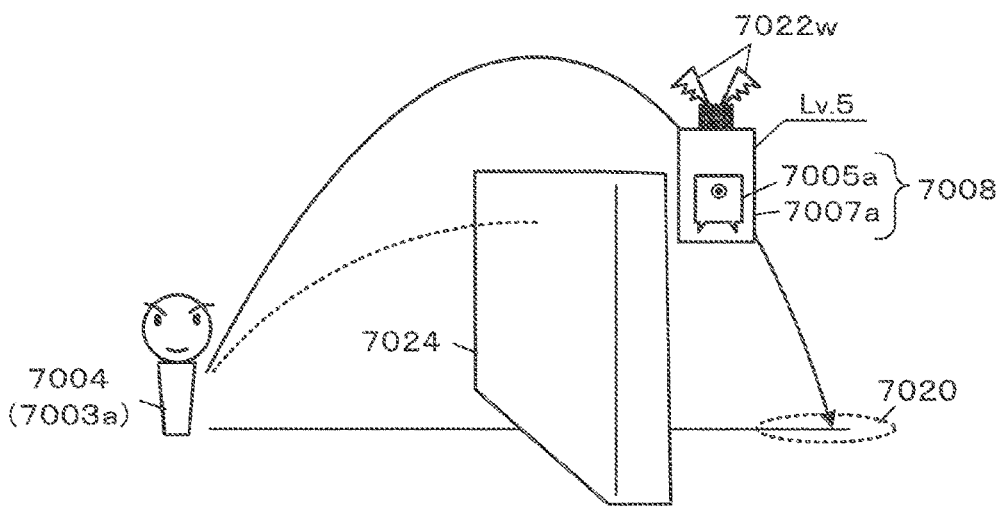
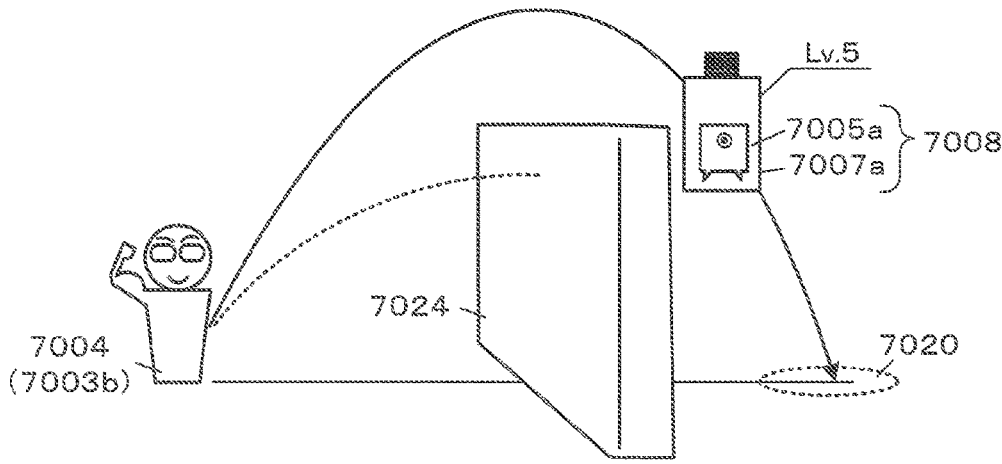

FIG.34
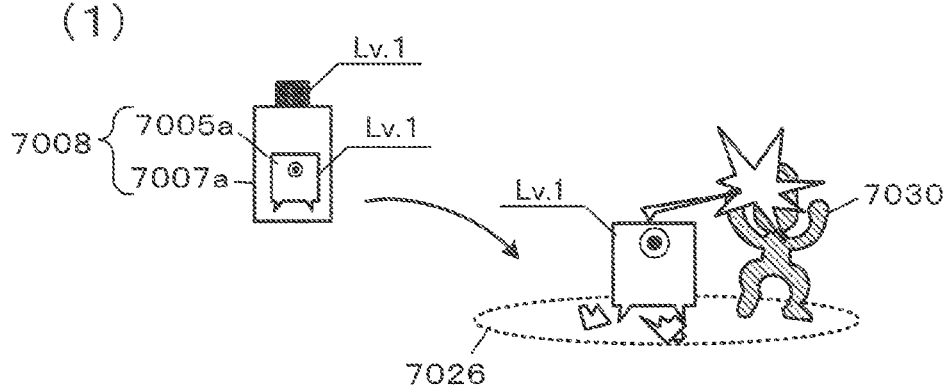
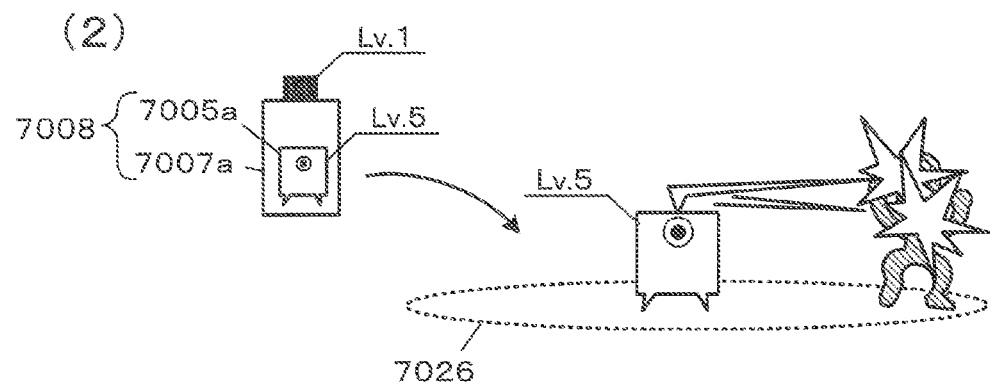
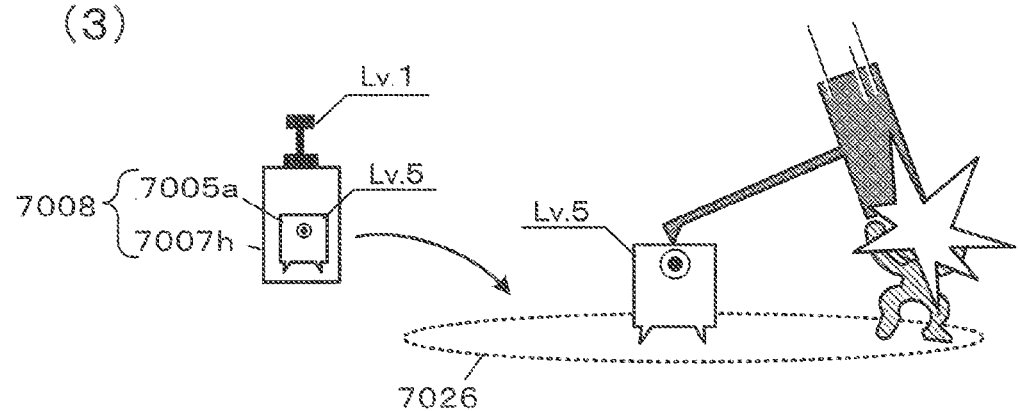

FIG.35
(1)
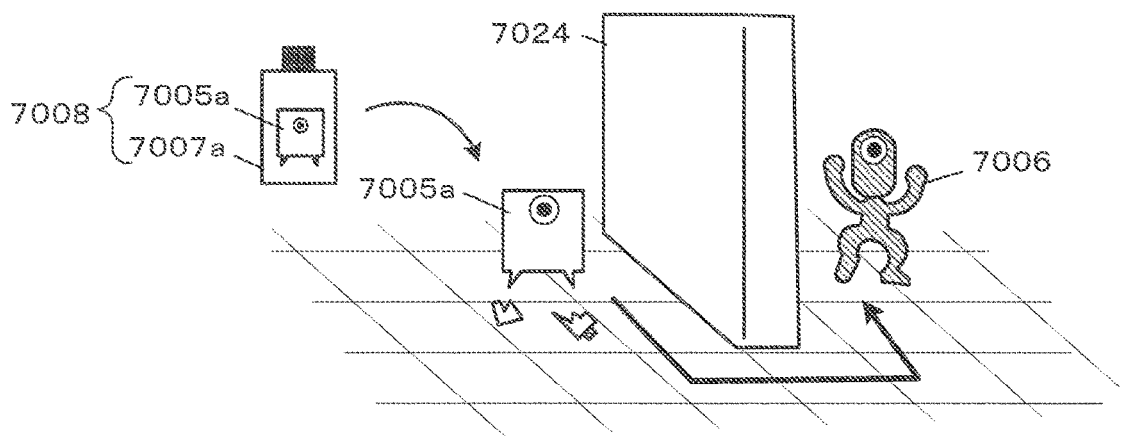
(2)
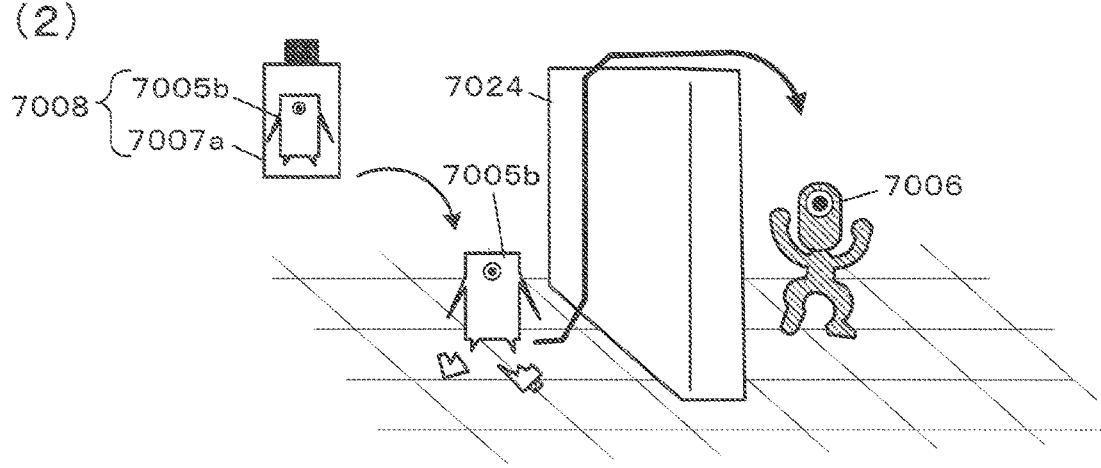
(3)
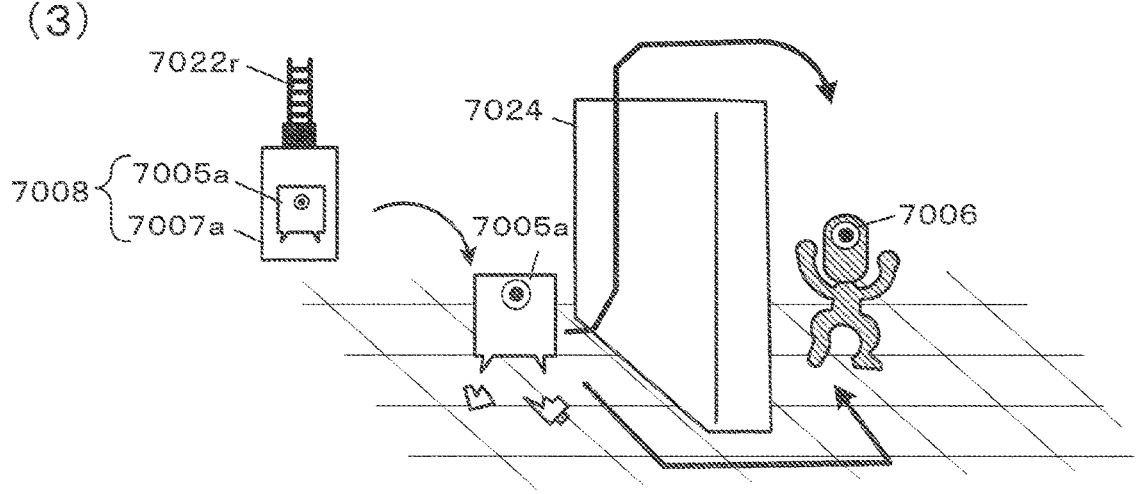

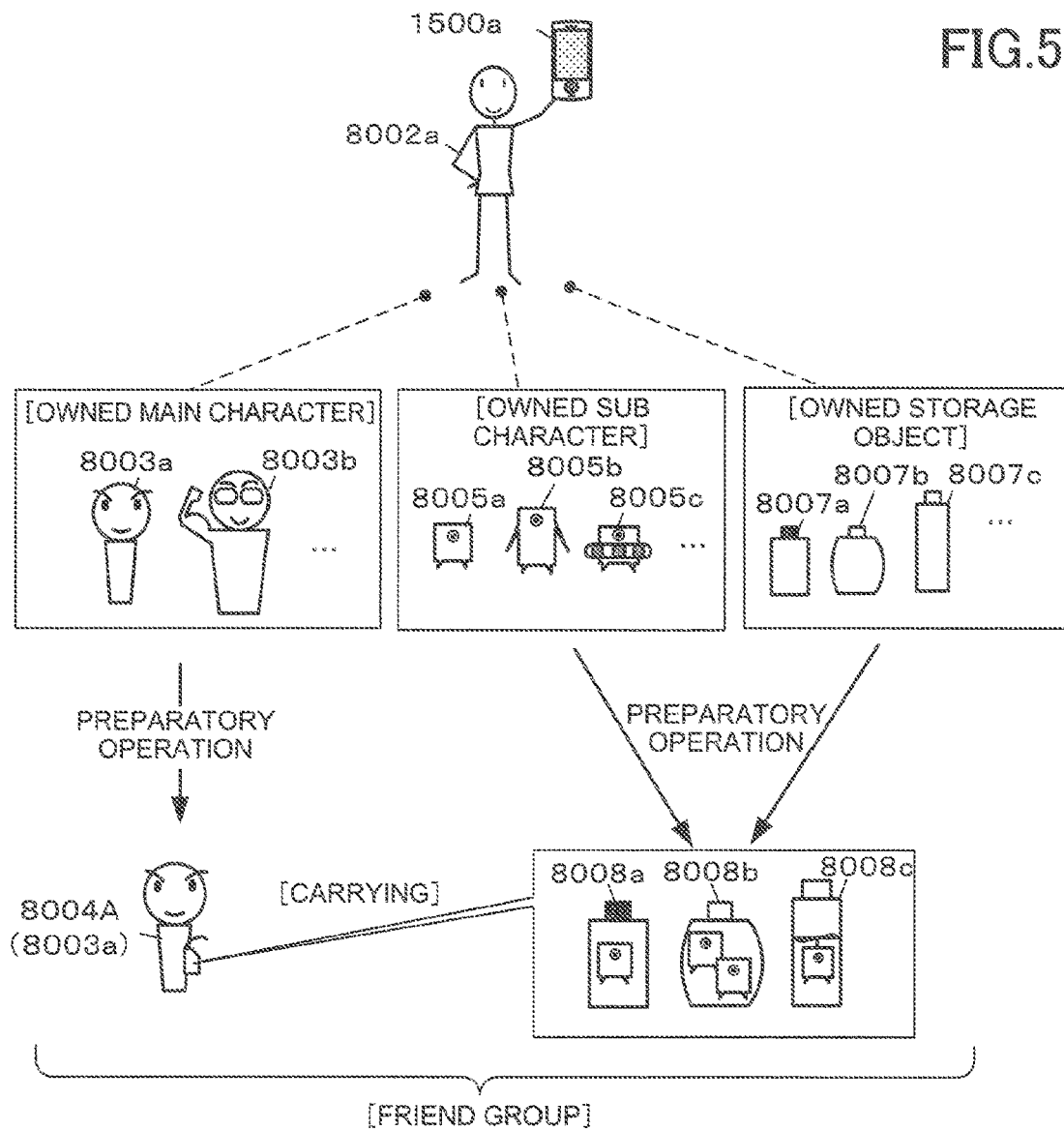
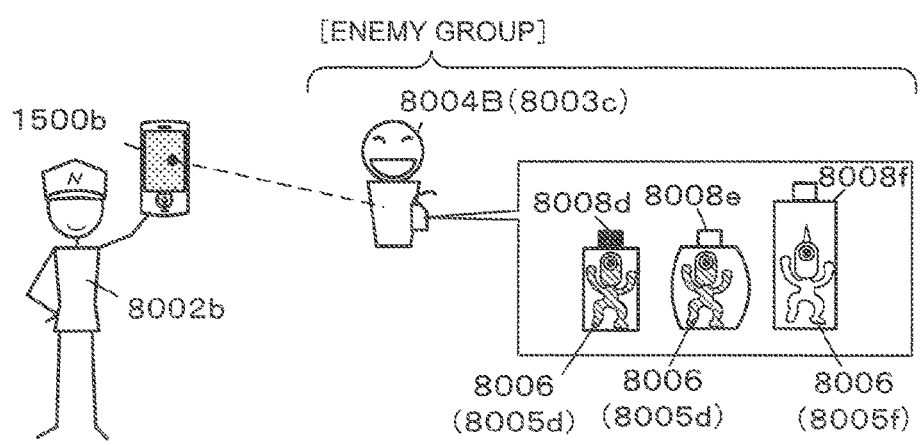
FIG.50

FIG.52
(1)
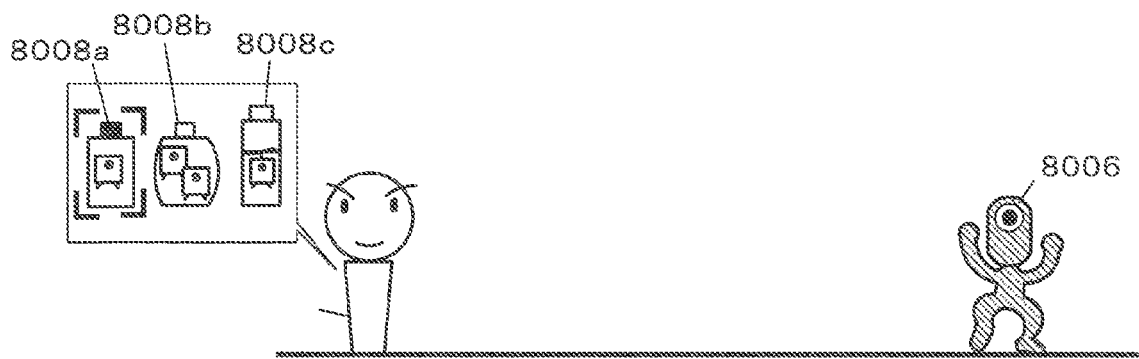
(2)
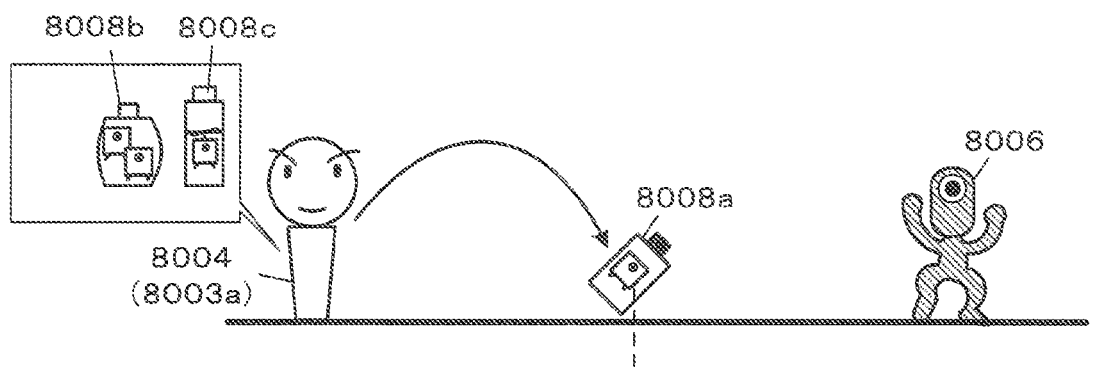
(3)
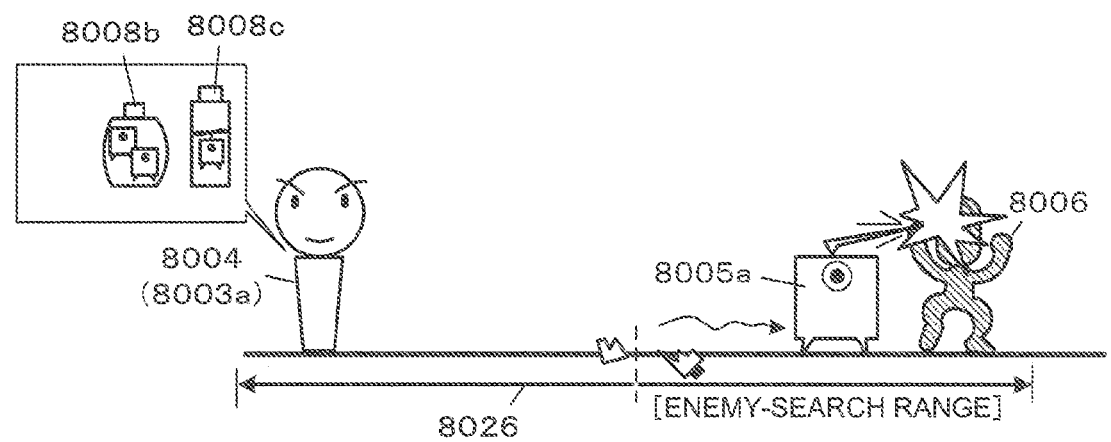

FIG.54
(1)
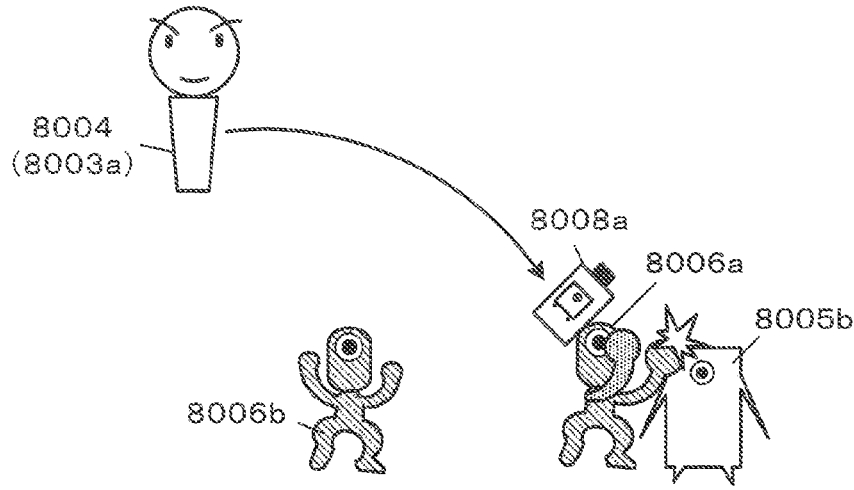
(2)
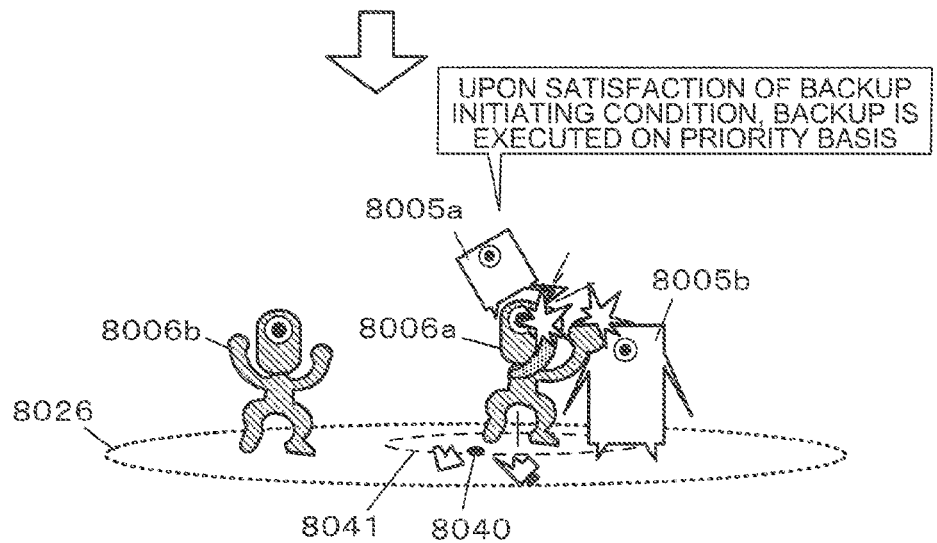
(3)
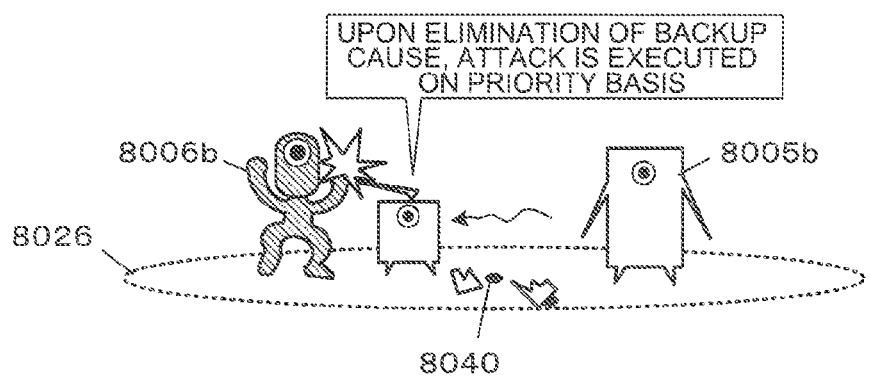

FIG.55
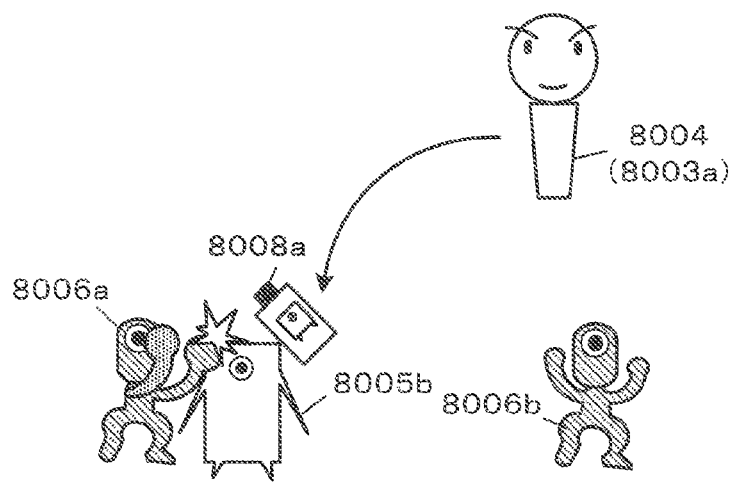
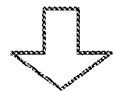
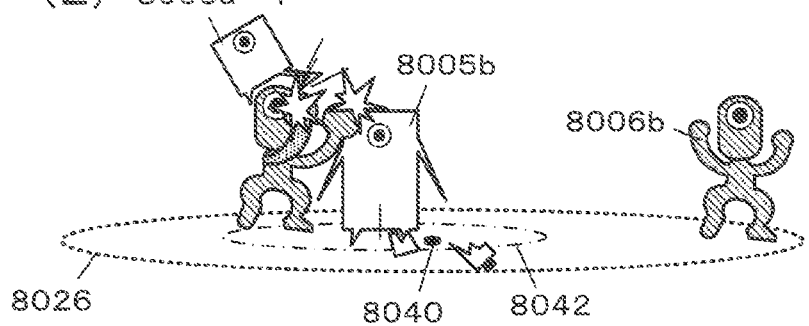

FIG.56
(1)
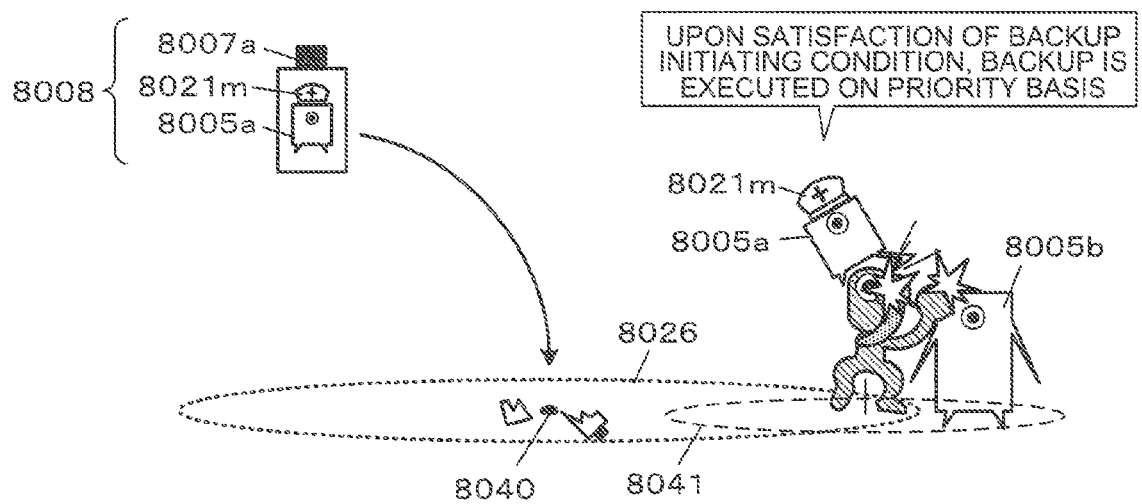
(2)
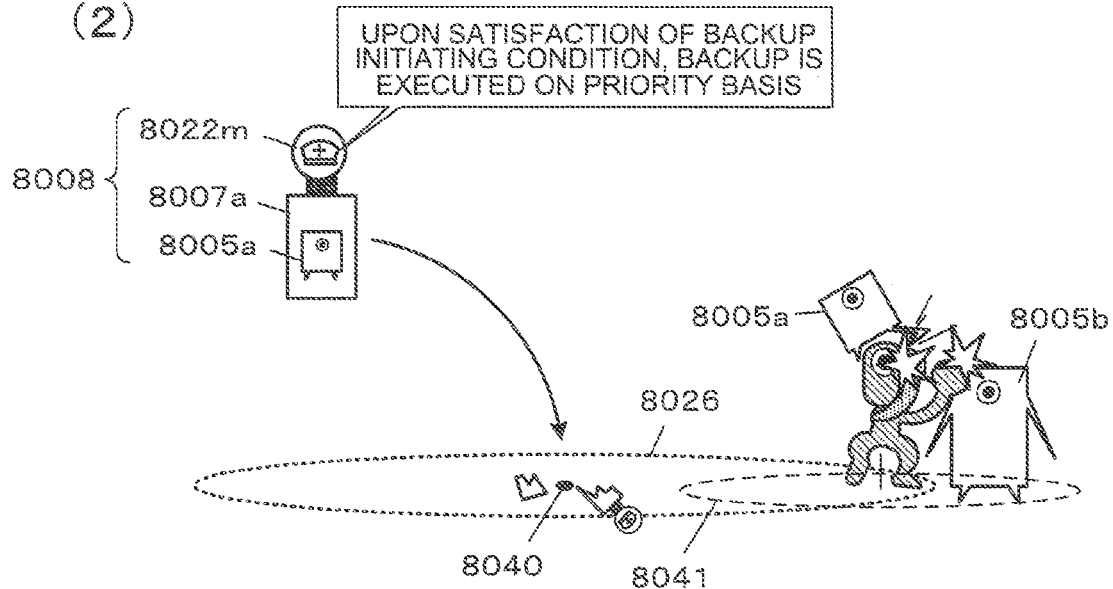

FIG.57
(1) 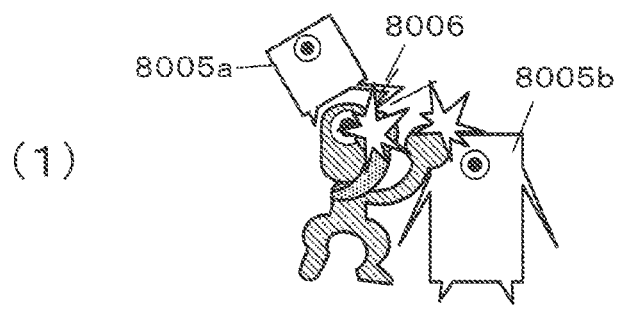
(2) 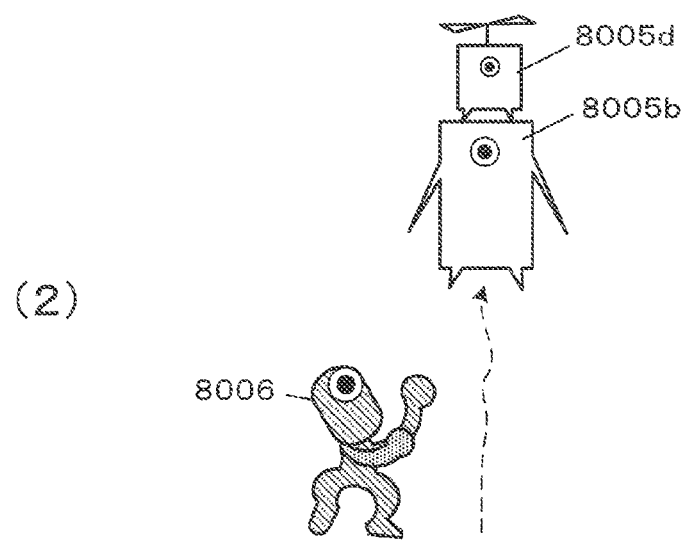
(3) 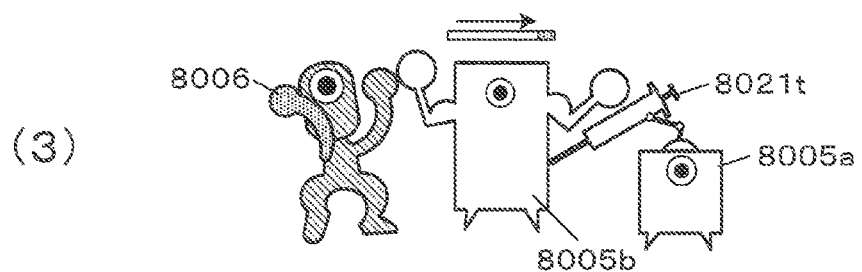

COMPUTER SYSTEM

Japanese Patent Application No. 2018-172153 filed on Sep. 14, 2018, Japanese Patent Application No. 2018-172154 filed on Sep. 14, 2018, and Japanese Patent Application No. 2018-172155 filed on Sep. 14, 2018, are incorporated herein by reference in its entirety.

BACKGROUND

As a form of game at which a player character and an enemy character fight a battle, there is a game played using non-playable characters (NPC) friendly to the player character.

For example, JP-A-2017-176522 describes a game in which friend NPCs are subjected to a growth control (one of controls for advancing a character's ability) to improve in ability according to game performance and a friend NPC owned by the player can be selected and set as a standard for a lottery. The game is controlled such that, as the degree of advancement of the friend NPC as the standard for a lottery is higher, the player can get a rarer reward by a lottery, thereby providing a new attraction.

However, the game still has room for improvement by presenting further attractions in how to cause a friend NPC to appear at the game and what friend NPC to appear at the game. In addition, users finally get tired in every game, and thus there are always required new attractions in the field of electronic game technology.

BRIEF DESCRIPTION OF THE DRAWINGS

FIG. 5 is an overview of an attack using a sub character according to the first embodiment.

FIG. 7 is a diagram illustrating an example of changes in flight control settings according to the first embodiment.

FIG. 8 is a diagram illustrating other examples of changes in flight control settings according to the first embodiment.

FIG. 9 is a diagram illustrating an example of changes in action control settings according to the first embodiment.

FIG. 10 is a diagram illustrating other examples of changes in action control settings according to the first embodiment.

FIG. 12 is a diagram illustrating comparative examples of changes in action control settings based on a relative positional relationship between appearance position of the sub character and an enemy character according to the first embodiment.

FIG. 32 is a diagram illustrating an example of changes in flight control parameter values according to the second embodiment.

FIG. 33 is a diagram illustrating other examples of changes in flight control parameter values according to the second embodiment.

FIG. 34 is a diagram illustrating an example of changes in action control parameter values according to the second embodiment.

FIG. 35 is a diagram illustrating other examples of changes in action control parameter values according to the second embodiment.

FIG. 50 is a diagram illustrating preparatory operations for playing a game according to a third embodiment.

FIG. 52 is an overview of an attack using a sub character according to the third embodiment.

FIG. 54 is a diagram illustrating an example of backup initiating condition and automatic control of a sub character after backup initiation according to the third embodiment.

FIG. 55 is a diagram illustrating another example of backup initiating conditions and automatic control of a sub character after backup initiation according to the third embodiment.

FIG. 56 is a diagram illustrating an example of the backup initiating conditions in combination with the use of an item according to the third embodiment.

FIG. 57 is a diagram illustrating types of automatic backup control according to the third embodiment.

DESCRIPTION OF EXEMPLARY EMBODIMENTS

Figure 1:
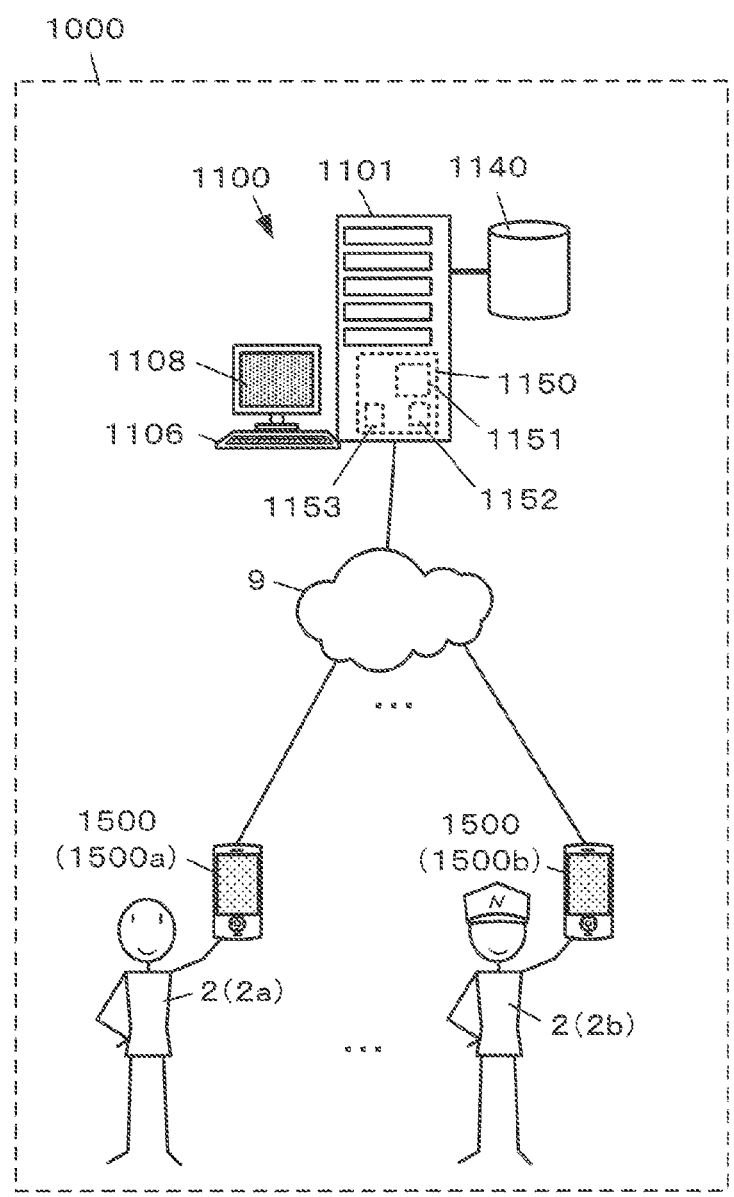
FIG. 1 is a diagram illustrating an example of a configuration of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system, a processor of the computer system being configured to perform:

a process of controlling progress of a game at which a player character and an enemy character fight a battle;

a movement control process of moving a storage object storing a non-playable character (NPC) until a given end condition is satisfied, based on the player's predetermined action operation of moving the storage object by throwing, striking, launching, or the player character's action similar to these actions;

an NPC appearance control process of performing a control to cause the NPC stored in the storage object to appear from the storage object satisfying the flight end condition; and an NPC automatic control process of automatically controlling the NPC having been caused to appear by the NPC appearance control process.

According to this, it is possible to move the storage object that is set to store the NPC in the game space. Then, it is possible to cause the NPC to appear from the storage object having completed in movement and to bring the same under automatic control.

According to one of some embodiments,
in the computer system,
the processor may further perform
a storage setting process of setting the storage object by storing an NPC selected from among a plurality of NPCs according to a selection operation by the player,
the NPC automatic control process including changing an action control setting related to the automatic control based on the NPC stored in the storage object.

According to this, it is possible to set a storage object by the player's own selection operation. Since the action of the NPC varies depending on the stored NPC, it is possible to enhance the attraction of the game as compared to the configuration in which the player cannot set a storage object by himself or herself.

According to one of some embodiments,
in the computer system,
the storage setting process includes selecting a plurality of NPCs to be stored, and
the NPC automatic control process includes changing the action control setting based on a combination of NPCs stored in the storage object.

According to this, it is possible to change the action control setting depending on which of the NPCs to be combined.

According to one of some embodiments,
in the computer system,
the processor may further perform
a storage setting process of setting the storage object by selecting an object to store a given NPC from among a plurality of objects based on the player's selection operation,
wherein the NPC automatic control process includes changing the action control setting related to the automatic control based on the object selected as the storage object.

According to this, the player can select the object to store the NPC and set the storage object. In addition, it is possible to change the action control setting of the NPC after appearance by the object having stored the NPC.

According to one of some embodiments,
in the computer system,
the processor may further perform
a storage setting process of setting the storage object by selecting an NPC to be stored and an object as a storage destination from among a plurality of NPCs and a plurality of objects based on the player's selection operation,
wherein the NPC automatic control process includes changing the action control setting related to the automatic control based on a combination of the object as the storage object and the NPC stored in the storage object.

According to this, it is possible to set the storage object by combining the NPC and the object to store the NPC based on the player's own selection operation. The NPC after appearance is changed in the action control setting based on the combination of the NPC and the object having stored the NPC, which produces an attraction to the player in considering how to set the storage object.

According to one of some embodiments,
in the computer system,
the processor may further perform
a player character setting process of selecting and setting a character as the player character from among a plurality of characters based on the player's operation,
wherein the NPC automatic control process includes changing the action control setting related to the automatic control based on the player character set by the player character setting.

According to this, the action of the same NPC after appearance will vary depending on the player character. This produces a new attraction for the player in enjoying strategic elements of thought about which character to set as the player character.

According to one of some embodiments,
in the computer system,
the processor may further perform
an item setting process of associating a given item with the storage object and/or the NPC stored in the storage object based on the player's operation input,
wherein the NPC automatic control process includes changing the action control setting related to the automatic control based on the item associated with the storage object and/or the NPC stored in the storage object.

According to this, when an item is associated with the storage object and the NPC, the action of the NPC after appearance changes in response to the association. This produces a new attraction for the player in enjoying strategic elements of thought about which item to be associated.

According to one of some embodiments,
in the computer system,
the NPC automatic control process includes determining whether to change the action control setting related to the automatic control or determining a degree of change of the action control setting related to the automatic control, based on whether the storage object having been moved by the movement control process has contacted the enemy character.

According to this, the action control setting of the NPC to appear from the storage object varies on whether the moving storage object has contacted an enemy character. This diversifies the progress of the game, thereby enhancing the attraction of the game. In particular, when the action operations include a setting operation of initial movement conditions (for example, the direction of the movement, the force for the movement, and the like), the game situation varies depending on whether the storage object to be moved can successfully hit an enemy character. This adds shooting game elements and further enhance the attraction of the game.

According to one of some embodiments,
in the computer system,
the NPC automatic control process includes changing the action control setting related to the automatic control based on a relative positional relationship between a position of the NPC having been caused to appear by the NPC appearance control process and a position of the enemy character.

According to this, the action control setting of the NPC varies based on the relative positional relationship between the NPC after appearance and the enemy character. This diversifies the action of the NPC, thereby further enhancing the attraction of the game. The relative positional relationship can be defined by, for example, whether the NPC and the enemy character are in contact with each other, whether they are in proximity to each other (that is, whether the enemy character exists in a distance range satisfying a predetermined condition of proximity to the NPC), whether the enemy character exists within or outside an striking range of the NPC, relative bearing, relative distance, relative height, and the like.

According to one of some embodiments, in the computer system, the NPC automatic control process includes changing the action control setting related to the automatic control based on any of a type of the enemy character contacted with the storage object having been moved by the movement control process, a contact part of the enemy character, and a terrain of a contact place.

According to this, it is possible to change the action control setting related to the automatic control based on the type of the enemy character the storage object has contacted, the contact part of the enemy character, the terrain of the contact place, and the like. This diversifies the action of the NPC after appearance, thereby enhancing the amusement of the game.

According to one of some embodiments, in the computer system, the action control setting includes a setting related to a content of an action.

According to this, the contents of the action of the NPC can be altered by changing the settings of the action control.

According to one of some embodiments, in the computer system, the setting related to the content of the action includes a setting related to a content of an attack on the enemy character.

According to this, it is possible to change the type of the attack by the NPC against the enemy character.

According to one of some embodiments, in the computer system, the action control setting includes a setting of a limited time period during which the NPC is capable of taking an action after having been caused to appear by the NPC appearance control process, and the NPC automatic control process includes automatically controlling the NPC having been caused to appear by the NPC appearance control process until a lapse of the limited time period.

According to this, it is possible to change the time during which the NPC can act after appearance.

According to one of some embodiments, in the computer system, the processor may further perform a process of displaying information of the action control setting.

According to this, it is possible to provide information of the action control setting to the player. For example, displaying the information of the action control setting in the process of setting the storage object by the storage setting process allows the player to learn what action the NPC can take according to the current setting of the storage object. Thus, the player can obtain an opportunity to set the NPC to take the action desired by the user. Note that this further enhances the attraction of the game and also improves usability.

According to one of some embodiments, in the computer system, the end condition includes at least a contact of the storage object having been moved by the movement control means with the enemy character, the NPC appearance control process includes causing the NPC to appear when the storage object having been moved by the movement control process contacts the enemy character, and the NPC automatic control process includes starting automatic control of the NPC from a position of appearance caused by the NPC appearance control process.

According to this, it is possible to cause the NPC to appear when the storage object has contacted the enemy character, and to start the automatic control of the NPC from the appearance position. That is, it is possible to add a new attraction with a mixture of shooting element and strategic element, such as, when the storage object is caused to hit a specific part of the enemy character, the NPC starts an attack from the hit position.

According to one of some embodiments, in the computer system, the processor may further perform a point-of-view switching process of, during the automatic control by the NPC automatic control process, allowing switching to a point-of-view based on the automatically controlled NPC according to the player's point-of-view switching operation for switching a point-of-view of a game screen.

According to this, it is possible to learn the state of the action of the NPC even in a situation in which the NPC exists outside a field of view with respect to the player character or on the far side of an obstacle.

According to one of some embodiments, in the computer system, the processor may further perform a preparatory setting process of setting the storage object and the NPC to be stored in the storage object based on the player's preparatory operation, wherein the movement control process includes performing a change control of the movement control based on a combination of the storage object and the NPC stored in the storage object.

According to this, it is possible to combine the NPC with the storage object and store the NPC in the storage object. Then, during the gameplay, the storage object is moved based on the action operation. When the movement end condition is satisfied, the stored NPC appears and is automatically controlled.

According to one of some embodiments, in the computer system, the preparatory setting process includes setting a player character to own the storage object from among a plurality of the player characters based on the player's preparatory operation, and the movement control process includes performing a movement control such that the player character owning the storage object moves the storage object and performing a change control of the movement control based on the player character.

According to this, it is possible to perform a control such that the player character moves the storage object. When the player character is a character of a human shape, the movement of the storage object can be expressed by throwing or shooting using a tool (or emission). Then, the movement control can be changed depending on which player character has moved the storage object. Accordingly, in the case of a player character of strong power, for example, the storage object can be controlled to move farther. In addition, in the case of a player character excellent in throwing, for example, the storage object can be controlled to move with a small deviation from the aim. Accordingly, the player character having moved the storage object is added to factors for changing the movement control, thereby producing varieties of movement control. This leads to improvement in the attraction of the game.

According to one of some embodiments, in the computer system, the movement control process includes performing a change control of the movement control based on a combination of the player character owning the storage object and the storage object and/or the NPC stored in the storage object.

According to this, it is possible to change the movement control according to a combination of storage object and NPC related to which storage object to store the NPC and which NPC to be stored in the storage object. This allows the player to enjoy strategic elements of thought about a combination of storage object and NPC, thereby enhancing the attraction of the game as compared to the conventional games.

According to one of some embodiments, in the computer system, the movement control process includes performing a change control of the movement control based on a game stage.

According to this, the movement control varies depending on the game stage at which the game is played.

According to one of some embodiments, in the computer system, the processor may further perform a storage object advancement control process of changing a parameter value of the storage object by an advancement control of the storage object such as ability improvement, reinforcement, and level increase; and an NPC advancement control process of changing a parameter value of the NPC by an advancement control of the NPC such as ability improvement, reinforcement, and level increase, wherein the movement control process includes performing a change control of the movement control based on a combination of the parameter value of the storage object and the parameter value of the NPC stored in the storage object.

According to this, the storage object and the NPC are capable of advancement, which adds enjoyment of changing the movement control by reinforcing or raising the levels of the storage object and the NPC.

According to one of some embodiments, in the computer system, the preparatory setting process includes a storage object item setting process of associating a given storage object item with the storage object based on the player's operation input, and the movement control process includes performing a change control of the movement control based on the storage object item associated with the storage object.

According to this, it is possible to add enjoyment of changing the movement control using an item for the storage object.

According to one of some embodiments, in the computer system, the preparatory setting process includes an NPC item setting process of associating a given NPC item with the NPC based on the player's operation input, and the movement control process includes performing a change control of the movement control based on the NPC item associated with the NPC stored in the storage object.

According to this, it is possible to add enjoyment of changing the movement control using an item for the sub character.

According to one of some embodiments, in the computer system, a weight-equivalent parameter value is set to the storage object and/or the NPC, and the movement control process includes performing a change control of the movement control based on the weight-equivalent parameter value set to the storage object to be moved and/or the NPC stored in the storage object.

The "weight-equivalent parameter value" here means that the parameter value may be literally a weight or may be a parameter value that has influence on the movement control like weight. For example, the weight-equivalent parameter value can be a parameter value that has influence on a movable distance, a movement height, a movement route, or the like.

According to this, it is possible to change the movement control by changing the weight-equivalent parameter values of the storage object and the NPC.

According to one of some embodiments, in the computer system, the movement control process includes, when a combination of the storage object and the NPC stored in the storage object satisfies a given reduction condition, reducing and adjusting the weight-equivalent parameter value and performing a change control of the movement control based on the value after the reduction and adjustment.

According to this, in the case of a specific combination of storage object and NPC, it is possible to perform the change control of the movement control such as decreasing the weight-equivalent parameter values to enable farther movement, for example.

According to one of some embodiments, in the computer system, the movement control process includes performing a change control of the movement control by variably controlling a flying range.

According to this, it is possible to change the range in which the storage object can move and reach.

According to one of some embodiments, in the computer system, the action operation includes the player's operation for specifying a movement target, and the movement control process includes performing a change control of the movement control by variably controlling a hit rate to the movement target.

According to this, it is possible to change the hit rate at which the storage object moves to the movement target specified by the operation of the player.

According to one of some embodiments, in the computer system, the processor may further perform a process of presenting prediction display indicating a predicted trajectory and/or a predicted movement destination in the movement control by the movement control process, wherein the action operation includes an operation for specifying a movement direction and/or a movement target based on the prediction display.

According to this, it is possible to improve usability because the player can learn the prediction on how and where the storage object about to move will reach, and can specify the movement direction and/or the movement target based on the prediction.

According to one of some embodiments, in the computer system, the preparatory setting process includes changing the upper limit number of storable NPCs according to a combination of the storage object and the NPC to be stored in the storage object.

According to this, it is possible to change the number of NPCs storable depending on a combination of NPCs with the same storage object, for example. This adds enjoyment of strategic thought about how to clear the game.

According to one of some embodiments, in the computer system, the game is a game at which a friend group including at least two characters of the player character and a friend character fights a battle with the enemy character, and the NPC automatic control process includes performing an automatic backup control to automatically control the NPC having been caused to appear by the NPC appearance control process to back up the friend character.

According to this, it is possible to move the storage object storing the NPC in the game space. Then, it is possible to cause the NPC to appear from the storage object having completed the movement and back up the friend character.

According to one of some embodiments, in the computer system, the NPC automatic control process includes determining whether to perform the automatic backup control or changing contents of the automatic backup control, based on whether the storage object having been moved by the movement control process has contacted the enemy character.

According to this, the player can move the storage object to hit the enemy character, thereby to cause the NPC in the storage object to perform automatic backup and to change the contents of the automatic backup.

According to one of some embodiments, in the computer system, the NPC automatic control process includes changing contents of the automatic backup control based on a relative positional relationship between a position of the NPC having been caused to appear by the NPC appearance control process and a position of the enemy character.

According to this, the player can move the storage object such that the relative positional relationship between the appearance position of the stored NPC and the position of the enemy character satisfies a condition, thereby changing the contents of the automatic backup control of the NPC to appear.

According to one of some embodiments, in the computer system, the NPC automatic control process includes determining whether to perform the automatic backup control or changing contents of the automatic backup control, based on whether the storage object having been moved by the movement control process has contacted the friend character.

According to this, the player can move the storage object to hit the friend character to back up, thereby to cause the NPC in the storage object to perform automatic backup and change the contents of the automatic backup.

According to one of some embodiments, in the computer system, the NPC automatic control process includes changing contents of the automatic backup control by changing an action of the NPC or changing a parameter value of the NPC, based on a contact part of the friend character having been contacted by the storage object having been moved by the movement control process.

According to this, it is possible to diversify the contents of the automatic backup control.

According to one of some embodiments, in the computer system, the NPC automatic control process includes changing contents of the automatic backup control based on a relative positional relationship between a position of the NPC having been caused to appear by the NPC appearance control process and a position of the friend character.

According to this, the player can change the contents of the automatic backup control of the NPC to appear, by moving the storage object such that the relative positional relationship between the position of the NPC to appear and the position of the friend character to be backed up satisfies a condition.

According to one of some embodiments, in the computer system, the processor may further perform an item setting process of associating a given item with the storage object and/or the NPC stored in the storage object based on the player's operation input, wherein the NPC automatic control process includes changing contents of the automatic backup control based on the item associated with the storage object and/or the NPC stored in the storage object.

According to this, the player can change the contents of the automatic backup control by making a setting to associate an item with the storage object and the NPC.

According to one of some embodiments, in the computer system, the NPC automatic control process includes performing the automatic backup control by an automatic control to, when the friend character is located in a striking range of the enemy character and the enemy character has the friend character as an attack target, cause the NPC to attack the enemy character.

According to this, it is possible to implement the automatic backup by the automatic control of the NPC to appear such that the NPC attacks the enemy character who is attacking the friend character.

According to one of some embodiments, in the computer system, the NPC automatic control process includes performing the automatic backup control by an automatic control to recover the friend character form damage, an automatic control to move the friend character to a given movement destination, or an automatic control to temporarily improve the ability value of the friend character.

According to this, it is possible to implement the automatic backup by the automatic control to restore the friend character form damage, the automatic control to move the friend character to a given movement destination, and the automatic control to temporarily improve the ability value of the friend character.

According to one of some embodiments, in the computer system, the NPC automatic control process includes, after completion of the automatic backup control, automatically controlling the NPC as a control target of the automatic backup control to attack the enemy group.

According to this, it is possible to cause the stored NPC having already appeared for the purpose of backing up the friend character to attack the enemy group after the attainment of that purpose.

According to one of some embodiments,
in the computer system,
the computer system is a server system in a game system in which a user terminal used by a player and the server system communicate with each other to implement the battle game.

According to one of some embodiments,
in the computer system,
the computer system is a game device.

Exemplary embodiments are described below. Note that the following exemplary embodiments do not in any way limit the scope of the content defined by the claims laid out herein. Note also that all of the elements described in the present embodiment should not necessarily be taken as essential elements First, the general-purpose components for communication and others are in common among the system configurations of the embodiments, and thus these components of the embodiments will be collectively described with common reference signs.

FIG. 1 is a diagram illustrating an example of a configuration of a game system. A game system 1000 is a computer system that includes a server system 1100 and a plurality of user terminals 1500 (1500*a*, 1500*b*, . . . ) that are capable of mutual data communication by connection to a network 9 and is a content providing system that provides game contents (also called game applications).

The network 9 is a communication channel that is capable of data communication. Specifically, the network 9 includes a communication network such as a local area network (LAN) using a private line (private cable) for direct connection, Ethernet (registered trademark), or the like, a telecommunication network, a cable network, or the Internet. The communication method may be a cable communication method or a wireless communication method.

The server system 1100 includes a main body device 1101, a keyboard 1106, a touch panel 1108, and a storage 1140. A control board 1150 is provided in the main body device 1101.

The control board 1150 contains a microprocessor of various types (e.g., a central processing unit (CPU) 1151, a graphics processing unit (GPU)), and a digital signal processor (DSP), an IC memory 1152 of various types (e.g., a video random access memory (VRAM), a random access memory (RAM), and a read only memory (ROM)), and a communication device 1153. The control board 1150 may partially or entirely be implemented with an application specific integrated circuit (ASIC), a field-programmable gate array (FPGA), or a system on a chip (SoC).

Through a calculation process performed by the control board 1150 based on a predetermined program and data, the server system 1100 implements 1) a user management function related to user registration and the like, 2) a game management function of providing data necessary for a player 2 (2*a*, 2*b*, . . . ) as a registered user to play the game with user terminals 1500 (1500*a*, 1500*b*, . . . ) to manage execution control on the game played with the user terminals 1500 (1500*a*, 1500*b*, . . . ), and 3) an online shopping function of selling various items, usable in the game, to users online. Thus, the game according to the present embodiment is implemented as one type of client-server online games.

The server system 1100 is illustrated/described as a single server. Alternatively, a plurality of blade servers, in charge of various functions, may be installed while being connected to each other via an internal bus to be capable of performing data communications with each other. Furthermore, a plurality of independent servers, disposed in locations distant from each other, may perform data communications with each other via the network 9 to function as the server system 1100 as a whole.

The user terminals 1500 (1500*a*, 1500*b*, . . . ) are computer systems individually used by the player 2 (2*a*, 2*b*, . . . ) for gameplay, and are electronic devices (electronic apparatuses) that can access the server system 1100 via the network 9 to implement an online game, which are functionally a game device. The user terminal 1500 is a device known as a smartphone. The user terminal 1500 may also be a portable game device, a game controller, a personal computer, a tablet computer, a wearable computer, a home-use game device, an arcade game apparatus, or the like.

Figure 2:
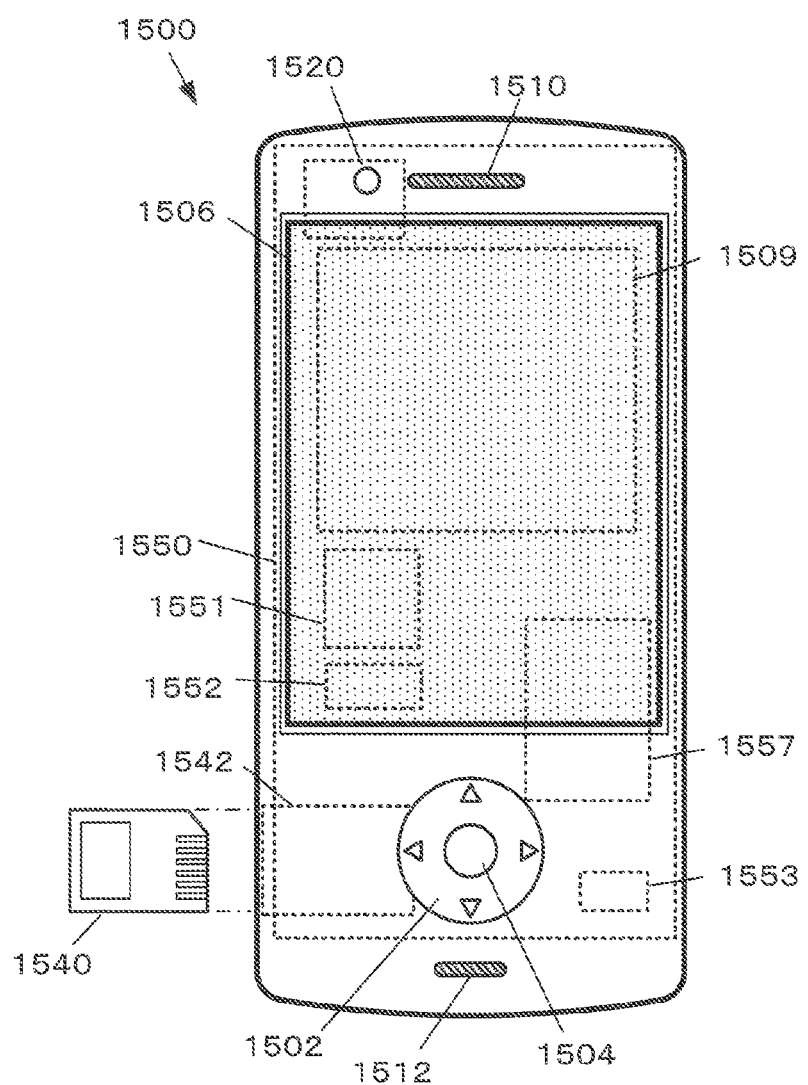
FIG. 2 is a front view of a user terminal, illustrating an example of a configuration thereof.

FIG. 2 is a front view of the user terminal 1500, illustrating an example of a configuration thereof.

The user terminal 1500 includes an arrow key 1502, a button switch 1504, a touch panel 1506 that functions as an image display device and a touch position input device, a speaker 1510, a built-in battery 1509, a microphone 1512, an image sensor unit 1520, a control board 1550, and a memory card reader 1542 that can write and read data to and from a memory card 1540 that is a computer-readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or a prepaid card usable for payment involved in playing the game.

The control board 1550 includes a microprocessor of various types (e.g., a CPU 1551, a GPU, and a DSP), an IC memory 1552 of various types (e.g., a VRAM, a RAM, and a ROM), a wireless communication module 1553 for performing wireless communications with a mobile phone base station, a wireless LAN base station, or the like connected to the network 9, an interface circuit 1557, and the like.

The interface circuit 1557 includes, for example, a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a circuit that inputs image data of an image captured by the image sensor unit 1520, and a signal input-output circuit that inputs and outputs a signal to and from the memory card reader 1542.

The elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores programs and various types of data for implementing the functions of the user terminal of the game according to the present embodiment, in the IC memory 1552.

A client program and various types of setting data are downloaded by the user terminal 1500 from the server system 1100 in the present embodiment. The program and the data may also be read from a storage medium such as the memory card 1540 additionally provided.

Next, some embodiments applied to the game system illustrated in FIG. 1 will be described.

First Embodiment

The game according to a first embodiment is an online battle game at which a player operates a player character as a main character (mainly operated playable character) while using a sub character as a friend NPC to fight a battle with an enemy character in a game space.

Figure 3:
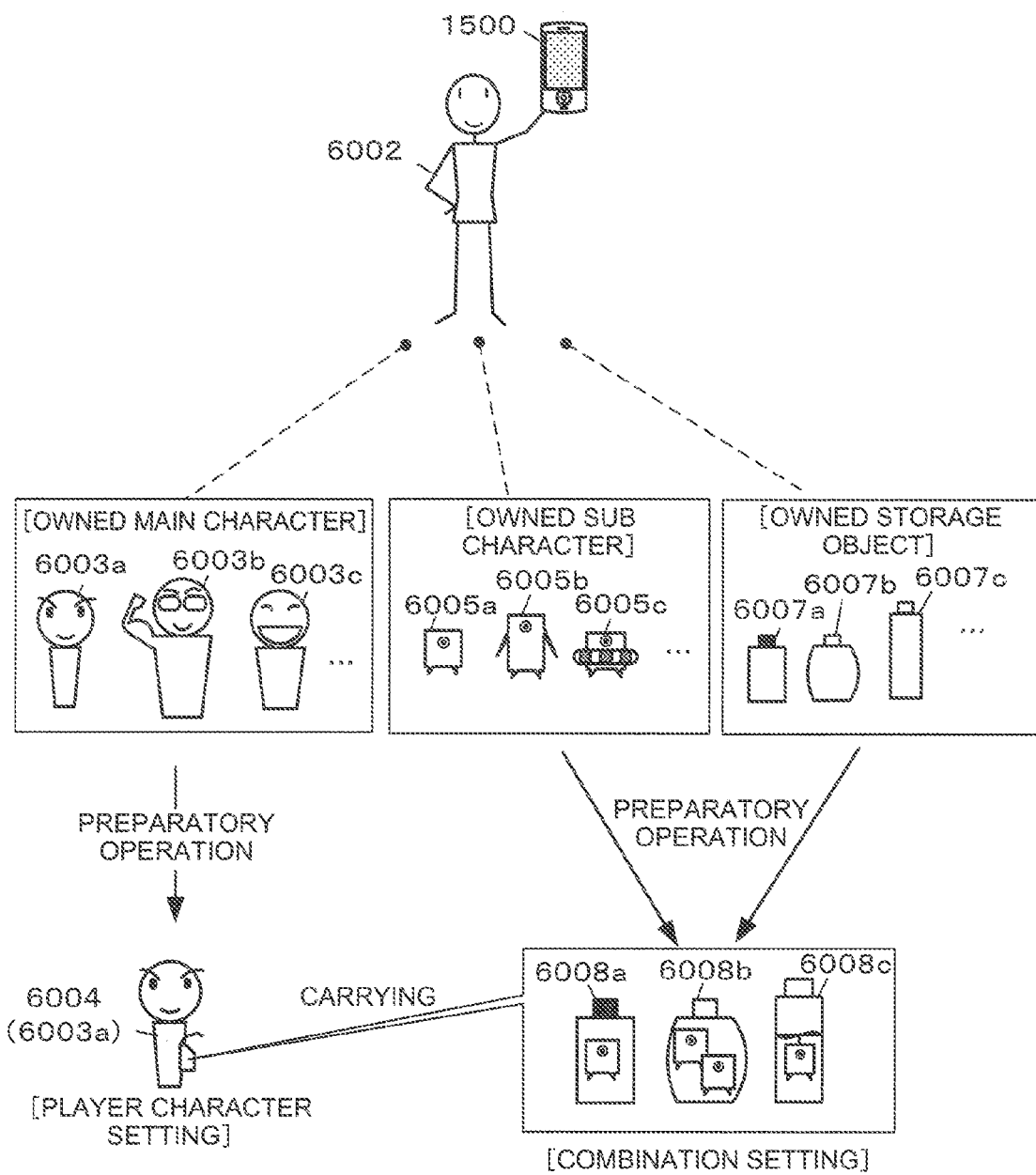
FIG. 3 is a diagram illustrating preparatory operations for playing a game according to a first embodiment.

FIG. 3 is a diagram illustrating preparatory operations for playing a game according to the first embodiment. First, as a premise of the game, a player 6002 can own a main character 6003 (6003a, 6003b, . . . ), a sub character 6005 (6005a, 6005b, . . . ), and a storage object 6007 (6007a, 6007b, . . . ) as game media. The ownership here means having the right to use the game media at the game.

The main character 6003 is a character that is a candidate for a player character existing in the game space as a representative of the player 6002. The main character can also be said to be a candidate for an avatar character.

The sub character 6005 is a non-playable character (NPC, a character automatically controlled by a computer) friendly to the player character.

The storage object 6007 is an object that can store the sub character 6005. The storage here means virtual storage at the game. In the first embodiment, at the game, the storage object 6007 is an object that can store the sub character 6005 in a virtually reduced size and can release again the stored sub character. The storage object 6007 is represented in a form of bottle, capsule, box, bag, or the like.

The main character 6003 (6003a, 6003b, . . . ), the sub character 6005 (6005a, 6005b, . . . ), and the storage object 6007 (6007a, 6007b, . . . ) are prepared in pluralities of types. The player 6002 obtains and owns one or more of them prior to the gameplay. These characters and objects are given in advance by initial setting and can also be bought from online shopping, for example. These characters and objects can also be acquired when the player runs into an acquisition situation in the progress of the game.

The player 6002 makes several preparatory operations for the gameplay.

The preparatory operations according to the first embodiment include an operation of selecting a game space to be played (identical to the game space) and an operation of selecting the player character 6004 from the main characters 6003 (6003a, 6003b, . . . ) owned by the player 6002. The preparatory operations also include an operation of setting a combination of the storage object 6007 to be used and the sub character 6005 to be stored in the storage object 6007.

When the storage object 6007 and the sub character 6005 are combined, the sub character 6005 is regarded as being stored in the storage object 6007. This is called a preset storage object 6008. The preset storage object 6008 is regarded as being owned and carried by the player character 6004 (in the example of FIG. 3, the main character 6003a). For example, the player character 6004 is regarded as carrying the object in a pocket or bag, for example. That is, the player 6002 can combine the storage object 6007 with the main character 6003 (6003a, 6003b, . . . ) owned by himself or herself.

When the storage object 6007 and the sub character 6005 are combined together, each of the storage object 6007 and the sub character 6005 is made incapable of another combination, so that duplicated combination is not allowed. However, depending on the type of the storage object 6007, a plurality of sub characters 6005 can be stored at the same time. In this case, the storage object 6007 is not made incapable of another combination until the upper limit of number of storable sub characters is reached.

Figure 4:
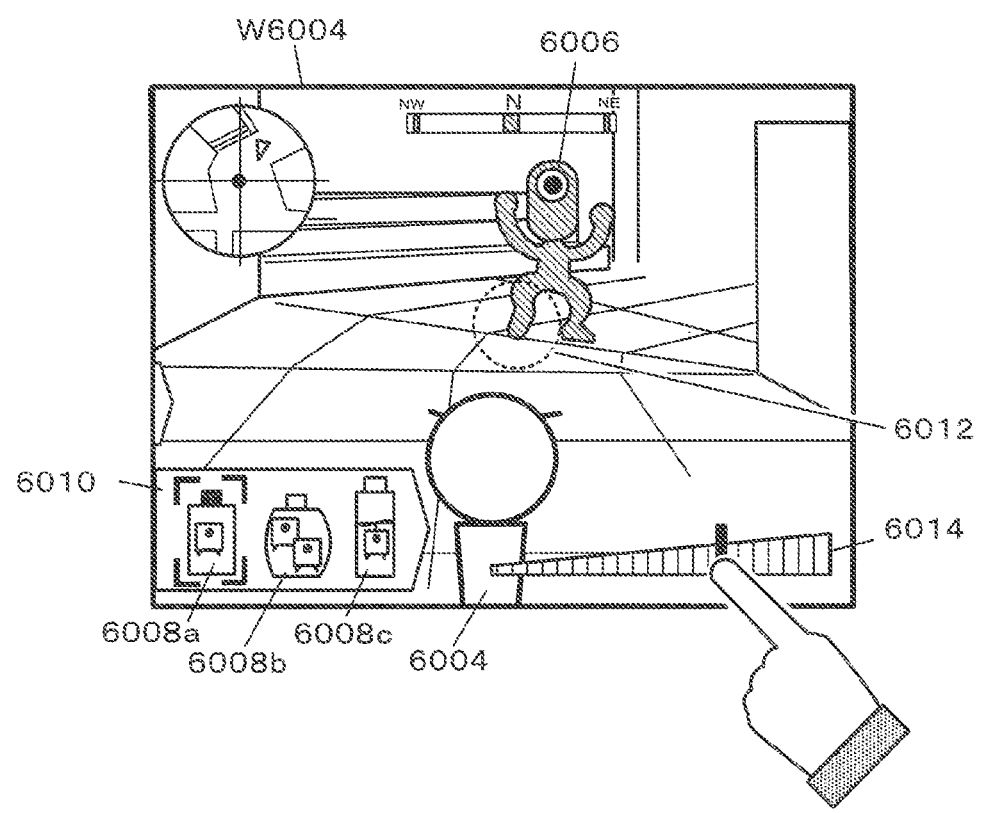
FIG. 4 is a diagram illustrating an example of display of a game screen according to the first embodiment.

When the gameplay is started, the user terminal 1500 displays a game screen W6004 as illustrated in FIG. 4. The game screen W6004 in the first embodiment is based on an image of a game space structured in a virtual three-dimensional space captured in the obliquely upward direction from behind the player character 6004 to be used (a third person point-of-view image). Note that the game screen may be based on an image of a first person point-of-view of the player character 6004 depending on the flavor of the game.

The player 6002 operates the player character 6004 to move in the game space. When encountering an enemy character 6006, the player character 6004 fights a battle with the enemy character 6006. In the first embodiment, the enemy character 6006 is an NPC. However, in the case of a battle game at which players fight a battle, the enemy character 6006 is the player character or the sub character of the opposition player.

The attack on the enemy character 6006 can be an attack by the player character 6004 or an attack using the sub character 6005.

FIG. 5 is an overview of an attack using the sub character 6005. The object appearing at the game can be moved such as being flown, rolled, run, slid, or the like by throwing, striking, launching, casting a spell, activating a skill, or the actions of the player character 6004 similar to these actions. In the following description, the movement of "flying" is taken as a representative. Note that any other movement is possible.

The attack using the sub character 6005 is implemented by a) throwing and flying the preset storage object 6008 by the player character 6004, b) hitting the enemy character 6006 or a background object in the game space with the preset storage object 6008, c) causing the stored sub character 6005 to appear, and d) the sub character 6005 having appeared performs an attack action.

Specifically, as illustrated in FIG. 5(1), the player 6002 first performs a predetermined pre-flight operation. In the pre-flight operation, a preset storage object list 6010 is displayed on the game screen W6004 (see FIG. 4) such that the preset storage objects 6008 are selectably listed. The player 6002 selects the preset storage object 6008 to be thrown from the list. In the example of FIG. 5(1), a preset storage object 6008a is selected.

When the player 6002 performs an action operation, the player character 6004 throws the selected preset storage object 6008 as illustrated in FIG. 5(2). In the first embodiment, the action used by the preset storage object 6008 is "throwing". However, in the case where the player character 6004 is a robot or the like, the action used may be "launch" (or "emission" or "release") of the preset storage object 6008 or the like.

The "action operation" here includes operations that are detectable by on/off state such as operating a predetermined button switch or touching a predetermined operation icon, and operations that relate to input operations and of which an input is detected and determined by the amount of detection such as a flick by one or more fingers and a slide on the touch panel, and shaking the user terminal 1500 or a game controller.

The direction of throwing is the front direction of the player character 6004. A throwing direction marker 6012 (a broken-line circle on the center of the screen in the example of FIG. 4) is displayed on the game screen W6004 (see FIG. 4). The player can adjust the position and posture of the player character 6004 such that the marker is oriented to the direction to be thrown (throwing direction). In addition, a throwing force input bar 6014 is displayed on the game screen W6004 so that the player touches the bar to input the throwing force.

The methods for inputting the throwing direction and the throwing force are not limited to the ones described above. For example, the input may be made by a swipe operation on the touch panel 1506. Specifically, the direction of the swipe may be regarded as the throwing direction, and the distance and speed of the swipe be regarded as an input of the throwing force. In a configuration in which an accelerometer is mounted in the user terminal 1500 or a game controller section separable from the user terminal 1500, the throwing force may be input by holding and shaking the user terminal 1500 or the game controller section by hand.

When the throwing direction and the throwing force are input, it is regarded that initial conditions related to throwing are determined. Then, the route in which the preset storage object 6008 to be thrown is to fly (flying route) and a flying destination to be reached are determined. The flying route and the flying destination can be determined by physical computing or quasi-physical computing, selection from a plurality of types of prepared flying routes.

Figure 6:
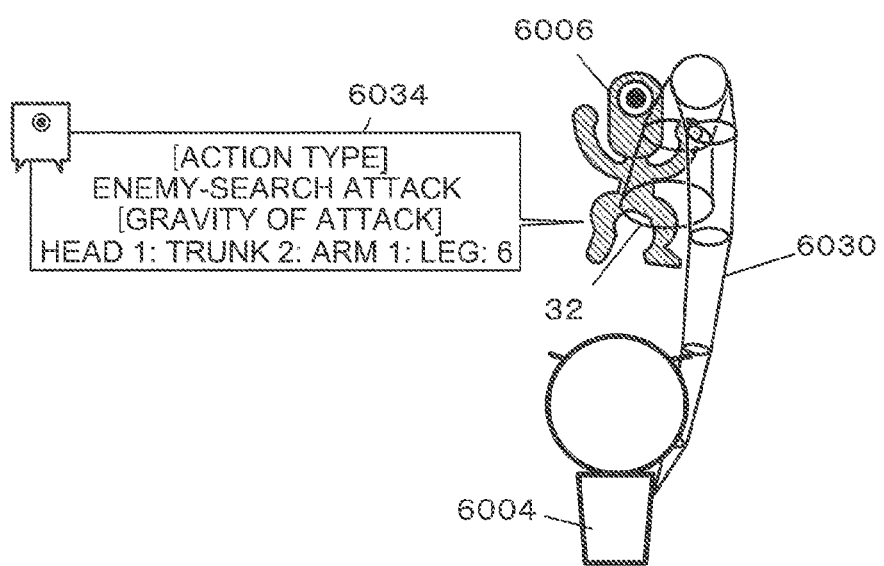
FIG. 6 is a diagram illustrating an example of a prediction display according to the first embodiment.

When the throwing force is input, the specifications of the direction and force of throwing are determined. Accordingly, as illustrated in FIG. 6, a predicted trajectory 6030 to be followed by the preset storage object 6008 to be thrown and a predicted flying destination 6032 are represented by prediction display objects in the game screen and are notified to the player. In the first embodiment, the sub character 6005 having appeared is automatically controlled to attack the closest enemy character 6006 among the enemy characters 6006 in the striking range. Accordingly, when the sub character 6005 stored in the preset storage object 6008 to be flown is controlled to appear, the predicted flying destination 6032 also substantially serves as the prediction display of the enemy character 6006 which is the target of attack.

The "predicted trajectory" here can include the flying route and the error range preset based on the specifications such as the initial conditions related to throwing at that point in time. Similarly, the "predicted flying destination" can include the flying destination and the error range preset based on the specifications at that point in time.

The player 6002 sees the prediction display to consider whether the object can fly in the intended course and to the intended place. The throwing direction and the throwing force can be adjusted by changing the front direction of the player character 6004 and touching again the throwing force input bar 6014.

When the predicted trajectory 6030 and the predicted flying destination 6032 are as desired, the player 6002 inputs a predetermined action operation to cause the player character 6004 to throw the selected preset storage object 6008.

The thrown preset storage object 6008 is released from the player character 6004, and is controlled in movement to fly along the flying route to the flying destination until a given flight end condition is satisfied.

The "flight end condition" is a condition to be satisfied to end the movement of the preset storage object 6008, which can be set as appropriate. In the first embodiment, the contact with the preset storage object 6008 or another object is set as flight end condition. Accordingly, a display effect is produced such that the thrown preset storage object 6008 finally hits the enemy character 6006, or hits a background object, or hits another object and stops flying, and then the storage object is arranged or is broken at a stop position.

For the preset storage object 6008, when a given release condition is satisfied, the sub character 6005 stored in the preset storage object is released and appears in the game space, and starts to act as the sub character 6005 as illustrated in FIG. 5(3).

The "release condition" is settable as appropriate. In the first embodiment, however, the release condition includes satisfying at least the flight end condition. In addition, the condition that the time elapsed from the start of flying has reached a predetermined time, the condition that the storage object has approached the enemy character 6006, and the condition that the storage object has received an attack from the enemy character 6006 can be appropriately set as AND condition and OR condition.

The sub character 6005 having been released and appeared from the preset storage object 6008 is an NPC and thus automatically controlled by a computer. FIG. 5 illustrates an example related to the attack on the enemy character 6006. However, automatic action controls other than the attack control such as a control to defend the friend character, a control to restore the body strength value of the friend character, a control to block the action of the enemy character 6006, and others may be enabled and may be selected and executed on a priority basis depending on the type of the sub character 6005. Otherwise, the player 6002 may be allowed to select and set any of a plurality of automatic actions.

The preset storage object 6008 having satisfied the release condition cannot be used again in the current gameplay but becomes usable again in the next gameplay. During the gameplay, the preset storage object 6008 may be allowed to become reusable again after a lapse of a predetermined time after the use.

In order to produce a new attraction in the battle game using the sub character 6005 or enhance the attraction of the game, in the first embodiment, at least one of control settings related to the flying of the preset storage object 6008 (hereinafter, called "flight control settings") and control settings related to the action of the stored sub character 6005 after appearance (hereinafter, called "action control settings") can be changed depending on a combination of the sub character 6005 and the storage object 6007.

The "flight control settings" are preset values of parameters related to the movement control of the preset storage object 6008 after throwing and launching. For example, the parameters can include weight-equivalent parameter value, flying route type, flyable distance (corresponding to flying range), flying height, flying speed, errors in the flying route and flying destination, the number of permissible bounds due to the contact with another object, the presence or absence of adhesion to another object having first contacted, and others. Note that parameters other than the foregoing ones can be appropriately set as control parameters related to flying. At the change of the flight control settings, at least one of the flight control settings is changed.

The flying route type can also be said to be a determined pattern of the flying route. For example, as the flying route type, a physical computed (or a quasi-physical computed) route, a linear-motion route, an automatic flying route following the locked-on enemy character 6006, and others can be set. Further, detailed types such as flying with a predetermined number of times an obstacle is to be avoided, flying with a permission of passing by an obstacle (virtual penetration), and others can be added to each of the flying route types described above.

The "action control settings" are preset values of parameters related to the action control of the sub character 6005. For example, the action control settings can include hit point (that is decreased with damage, and the action is disabled with a value of 0), fighting strength, defensive strength, traveling force, resilience, enemy-search range, action type, and limitations on movement (for example, the type of terrain in which movement is enabled, the type of terrain in which movement is disabled), and weight-equivalent parameter value, and others. Note that parameters other than the foregoing ones can be appropriately set as control parameters related to action. At the change of the flight control settings, at least of the action control settings is changed.

The "action type" here refers to a pattern in which the sub character 6005 after appearance takes an action. For the same action type, a plurality of types can be set depending on the contents. For example, even in the same category of attack action, the following types can be set: a) "enemy-search attack" in which to make an enemy-search action and attack against the found enemy character 6006; b) "defense" in which to make less movement from the arranged position and attack the enemy character having entered the striking range; c) "friend protection" in which to follow the friend character and attack the approaching enemy character 6006; and d) "backup" in which to attack the enemy character 6006 attacking the friend character on a priority basis. Note that any action types other than attack, for example, "saving" in which to restore the body strength value of the friend character and the like can be set as appropriate.

In the first embodiment, at least one of the degree of advancement of the storage object 6007 and the degree of advancement of the sub character 6005 can be included in the factors for changing the flight control settings and the action control settings.

The "degrees of advancement" here refer to the degrees of growth of the storage object 6007 and the sub character 6005. Depending on the game rules and the character settings of the sub character 6005 in the game world, the degree of advancement is synonymous to growth, reinforcement, evolution, improvement, modification, and others. In the first embodiment, the degree of advancement will be comprehensively called "growth".

Specifically, the game rule is set up such that, when used in the gameplay, the sub character 6005 and the storage object 6007 are given experience values according to performance in the gameplay, the experience values are accumulated, and the sub character 6005 and the storage object 6007 are grown and improved in ability according to the accumulated experience values. The degrees of growth are represented as storage object level and character level. When the combinations of the sub character 6005 and the storage object 6007 are the same in type but are different in character level and storage object level, the flight control settings and the action control settings are different.

Further, in the first embodiment, the flight control settings and the action control settings can be changed also based on the type of the player character 6004 used, the operations and effects of items used for the sub character 6005 (sub character items), and the operations and effects of items used for the storage object 6007 (storage object items).

Specific examples of changes of the flight control settings and the action control settings will be described.

FIG. 7 is a diagram illustrating an example of changes in the flight control settings.

FIG. 7(1) illustrates an example of flyable distance, flying height, and flying route of a preset storage object 8 in which the sub character 6005a and the storage object 6007a are combined.

FIG. 7(2) illustrates an example in which the storage object 6007a is replaced with the storage object 6007c in the combination illustrated in FIG. 7(1) to relatively extend the flyable distance (corresponding to flying range).

The storage object 6007c is set to be "lighter" (smaller in weight-equivalent parameter value) than the storage object 6007a on the game. To cause the sub character 6005a to appear farther, the player 6002 can combine the sub character 6005a with the storage object 6007c "lighter" than the storage object 6007a.

FIG. 7(3) illustrates an example in which the sub character 6005a is replaced with the sub character 6005b in the combination illustrated in FIG. 7(1) to relatively extend the flyable distance.

The sub character 6005b is set to be "lighter" than the sub character 6005a on the game. To cause some sub character to appear farther although the unused storage object owned by the player 2 is only the storage object 6007a, the player 2 can combine the storage object 6007a with the sub character 6005b "lighter" than the sub character 6005a.

FIG. 7(4) illustrates an example in which the combination illustrated in FIG. 7(1) remains unchanged but a sub character item 6021 to improve the flying ability is used to relatively extend the flyable distance, and a lock-on operation (an operation of specifying the flying target) is performed at the time of a throwing operation to change the type of the flying route and follow the locked-on enemy character 6006. There is no particular limitation on the method for lock-on operation. For example, the player may select one of the enemy characters 6006 existing in a predetermined peripheral range of a throwing direction marker 6012 of the player character 6004. The enemy character 6006 as a flying target is identifiably displayed with a lock-on marker 19 in the game screen.

The operation and effect of the sub character item 6021 that is set to the sub character 6005a (also said to be "associated" or "used") as illustrated in FIG. 7(4) is to be "weight reduction" or extension of the flyable distance" on the game. Even in the combination of the sub character 6005a and the storage object 6007a, the use of the item adjusts and reduces the weight-equivalent parameter value of at least one of the storage object 6007 and the sub character 6005 so that the change control of the flight control is performed based on the reduced value to extend the flyable distance.

FIG. 8 is a diagram illustrating other examples of changes in the flight control settings.

Referring to FIGS. 8(1) and 8(2), the combinations of the sub character 6005 and the storage object 6007 are the same in type but the former is higher in object level than the latter. In these examples, the flyable distance is extended and the flight control settings are changed such that an error 6020 related to flight is smaller in the latter combination.

In other words, the combination of the storage object 6007 and the sub character 6005 stored in the storage object 6007 illustrated in FIG. 8(2) satisfies a given weight-reduction condition (in this case, for example, the degree of advancement of the storage object 6007a has reached a predetermined standard value "Lv.5" or the like), and thus the weight-equivalent parameter value of at least one of the storage object 6007 and the sub character 6005 is adjusted and reduced, and the change control of the flight control is performed based on the reduced value to extend the flyable distance.

The "error" here corresponds to variations in the flyable distance and the flying destination. Specifically, random fluctuations are given to the flying route and the flying destination determined from the throwing direction and the throwing force in the range of the error 6020.

When the type of the flying route is set to "automatic flight following the locked-on enemy character 6006", the "error" here is synonymous to the "hit rate" to the flying target. Even if the lock-on operation is not performed, the throwing operation is performed toward the decided target at the flying destination, and thus the "error" can also be said to be the "hit rate" indicating whether the flying target is reached.

Favorably, a predetermined item having the effect of "improving the hit rate" is prepared so that the player 6002 can use the item to reduce the error (synonymous to improvement of the hit rate).

FIG. 8(3) illustrates an example in which a storage object item 6022w to increase the flying altitude (height) is set and used to the storage object 6007 in the combination illustrated in FIG. 8(2) to change the flight control settings.

In this example, the throwing height can be improved so that the preset storage object 6008 can be thrown to the far side of an obstacle 6024.

FIG. 8(4) illustrates an example in which the combination of the sub character 6005 and the storage object 6007 is the same as that illustrated in FIG. 8(1) but the main character 6003b higher in throwing ability than the main character 6003a is selected as the player character 6004 to improve the throwing height with the error 6020 unchanged.

FIG. 9 is a diagram illustrating an example of changes in the action control settings.

Comparing the example illustrated in FIG. 9(1) with the example illustrated in FIG. 9(2), the combinations of the sub character 6005 and the storage object 6007 as the preset storage object 6008 to be thrown are the same but are different in the degree of growth of the sub character 6005, and the action control settings are changed such that the latter has an enemy-search range 6026 wider than that of the former and the latter is more increased in fighting strength than the former.

Comparing the example illustrated in FIG. 9(2) with the example illustrated in FIG. 9(3), the degrees of growth of the sub character 6005 and the storage object 6007 are the same but the type of the combined storage object 6007 is different. The action control settings are changed such that a storage object 6007h illustrated in FIG. 9(3) is more increased in fighting strength than the storage object 6007a illustrated in FIG. 9(2).

FIG. 10 is a diagram illustrating other examples of changes in the action control settings.

One of the action control settings is a setting of limitations related to movement on whether movement beyond the obstacle 6024 is enabled. As illustrated in FIG. 10(1), the settings of limitations on the movement of the sub character 6005a (armless character) include the obstacle 6024. Therefore, to attack the enemy character 6006, the sub character 6005a needs to move bypassing the obstacle 6024.

On the other hand, as illustrated in FIG. 10(2), the settings of limitations on the movement of the sub character 6005b (arm-owned character) do not include the obstacle 6024. Therefore, to attack the enemy character 6006, the sub character 6005b can climb and overcome the obstacle 6024 and start attacking earlier than the sub character 6005a.

As illustrated in FIG. 10(3), even in the same combination of the sub character 6005 and the storage object 6007 as that illustrated in FIG. 10(1), the use of some item makes it possible to add the ability of the sub character 6005b to the sub character 6005a. For example, when a storage object item 6022r acting like a ladder is set to be used for the storage object 6007, the action control settings are changed such that the obstacle 6024 is not included in the settings of limitations on the movement of the sub character 6005a. Accordingly, the sub character 6005a can overcome the obstacle 6024 and start attacking in a short time like the sub character 6005b illustrated in FIG. 10(2).

The storage object items 6022 (6022w, 6022r) and others are favorably represented in the game as items to be attached to the storage object 6007. For example, the storage object items can be represented as strap, cover, holder, seal, replacement cap, cap cover, or the like, attached to the storage object 6007.

Figure 11:
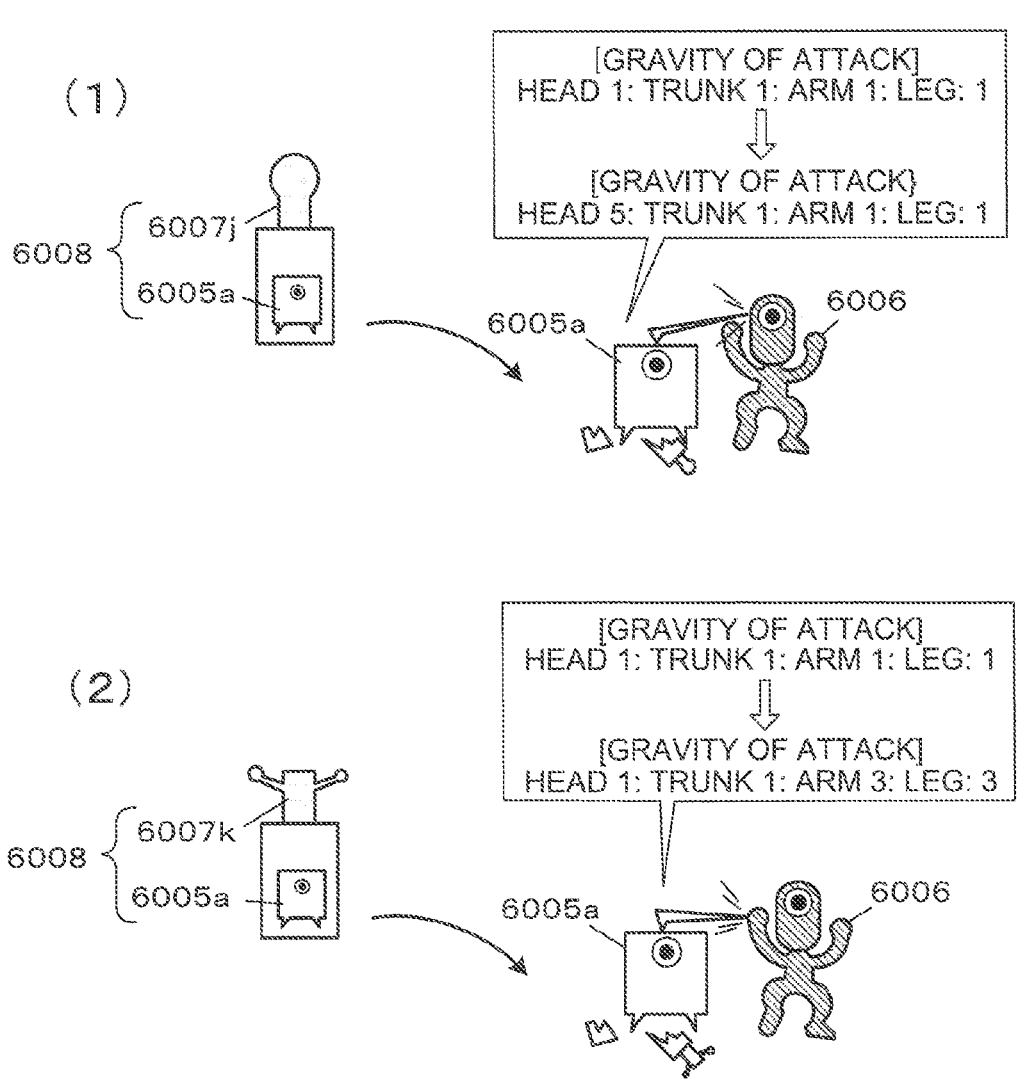
FIG. 11 is a diagram illustrating an example of changes in action control settings based on a combination of a sub character and a storage object according to the first embodiment.

FIG. 11 is a diagram illustrating an example of changes in the action control settings based on the combination of the sub character 6005 and the storage object 6007.

In general, when the sub character 6005 is to locally attack the enemy character 6006, the parts of the enemy character 6006 to be attacked are decided at random. As a result, the parts of the enemy character 6006 are evenly attacked.

However, the parts to be attacked can be prioritized based on the combination of the sub character 6005 and the storage object 6007 as illustrated in FIG. 11. In other words, the selection capabilities, gravities, and priorities of the parts to be attacked can be unbalanced. Specifically, in the example of FIG. 11(1), when the sub character 6005a and the storage object 6007j are combined, the gravities of attack on the parts of the enemy character 6006, generally "head: 1, trunk: 1, arm: 1, and leg: 1", are changed to place emphasis on the head. In the example of FIG. 11(2), the sub character 6005a is the same but, when combined with a storage object 6007k, is changed to attack the arms and the legs on a priority basis. The priorities of selection of the parts to be attacked and the tendencies of selection are not limited to the example of FIG. 11 but can be set as appropriate. In addition, the parts to be attacked are not limited to the example of FIG. 11 but can be set as appropriate according to the design of the enemy character 6006.

In the first embodiment, the action control settings of the sub character 6005 can be changed according to the relative positional relationship between the appearance position and the position of the enemy character 6006.

FIG. 12 is a diagram illustrating comparative examples of changes in the action control settings based on the relative positional relationship between the appearance position and the enemy character. FIG. 12(1) illustrates the case in which the relative positional relationship does not satisfy a predetermined distance condition. Specifically, the preset storage object 6008 flown by the player character 6004 contacts another object (in this case, a ground object) at a place distant from the enemy character 6006, thereby satisfying the flight end condition. The stored sub character 6005 appears at the place distant from the enemy character 6006. In this case, the sub character 6005 is automatically controlled to search an enemy, move toward the nearest enemy character 6006, and make a first type of attack action (ramming in the example of FIG. 12(1)) on a first specified part (the trunk in the example of FIG. 12(1)) of the enemy character 6006.

FIG. 12(2) illustrates the case in which the relative positional relationship satisfies a predetermined distance condition. Specifically, the preset storage object 6008 flown by the player character 6004 contacts the enemy character 6006, thereby satisfying the flight end condition. The preset storage object 6008 is represented in such a manner as to hit against the enemy character 6006, break and open. In this case, the stored sub character 6005 appears at a position where the preset storage object 6008 has hit. The sub character 6005 is represented in such a manner as to cling to the enemy character 6006. Then, the sub character 6005 is automatically controlled to make a second type of attack action (kicking in the example of FIG. 12(2)) on a second specified part of the enemy character 6006 (the part of contact with the preset storage object 6008: the head in the example of FIG. 12(2)). The action control settings are changed such that the fighting strength of the sub character 6005 is more improved than in the case of FIG. 12(1).

Changing the action control settings based on the relative positional relationship makes it possible to proceed with the game in a more advantageous way depending on whether the preset storage object 6008 has been successively hit against the enemy character 6006 than in the case where the hitting was failed. That is, shooting game-like elements are added to the game to further enhance the attraction of the game.

The elements defining the relative positional relationship are not limited to the relative distance and the presence or absence of contact between the two. The direction of the appearance position as seen from the enemy character 6006 can be used as a defining element.

In this manner, making mandatory the combination of the sub character 6005 with the storage object 6007 for the use of the sub character 6005 in the game and changing the flight control settings and the action control settings according to the combination provide much diversity to the game situation than in the configuration in which the sub character 6005 to be used in the game is simply picked up and a deck is selected such that the sub character 6005 is caused to appear in the game at a desired timing. This increases a strategic element of thought on the combination of the sub character 6005 and the storage object 6007 in hand, thereby producing a new attraction.

Further, the flight control settings and the action control settings can be changed also according to the selection of the main character 6003 as the player character 6004 and the use of the items, which makes it possible to implement the control of appearance of the sub character 6005 in the game space by throwing of the preset storage object 6008 and diversify the abilities and types of action of the sub character 6005 after appearance.

In the first embodiment, the preset storage object 6008 can be prepared even during the gameplay, which produces non-conventional amusement in the game because the player can play the game under flexible strategies according to the course of the battle of the moment without limitation on the deck formed before the gameplay.

Since the preset storage object 6008 is to be flown, the destination of the preset storage object 6008 may be at the far end of an obstacle that cannot be seen from the player character 6004. In that case, the state of the sub character 6005 having appeared at the flying destination cannot be known from the game image of the point-of-view based on the player character 6004 (a virtual camera arranged in the game space). Thus, in the first embodiment, at each appearance of the sub character 6005, a point-of-view is added based on the sub character so that the player can switch between the points-of-view in the game screen.

Figure 13:
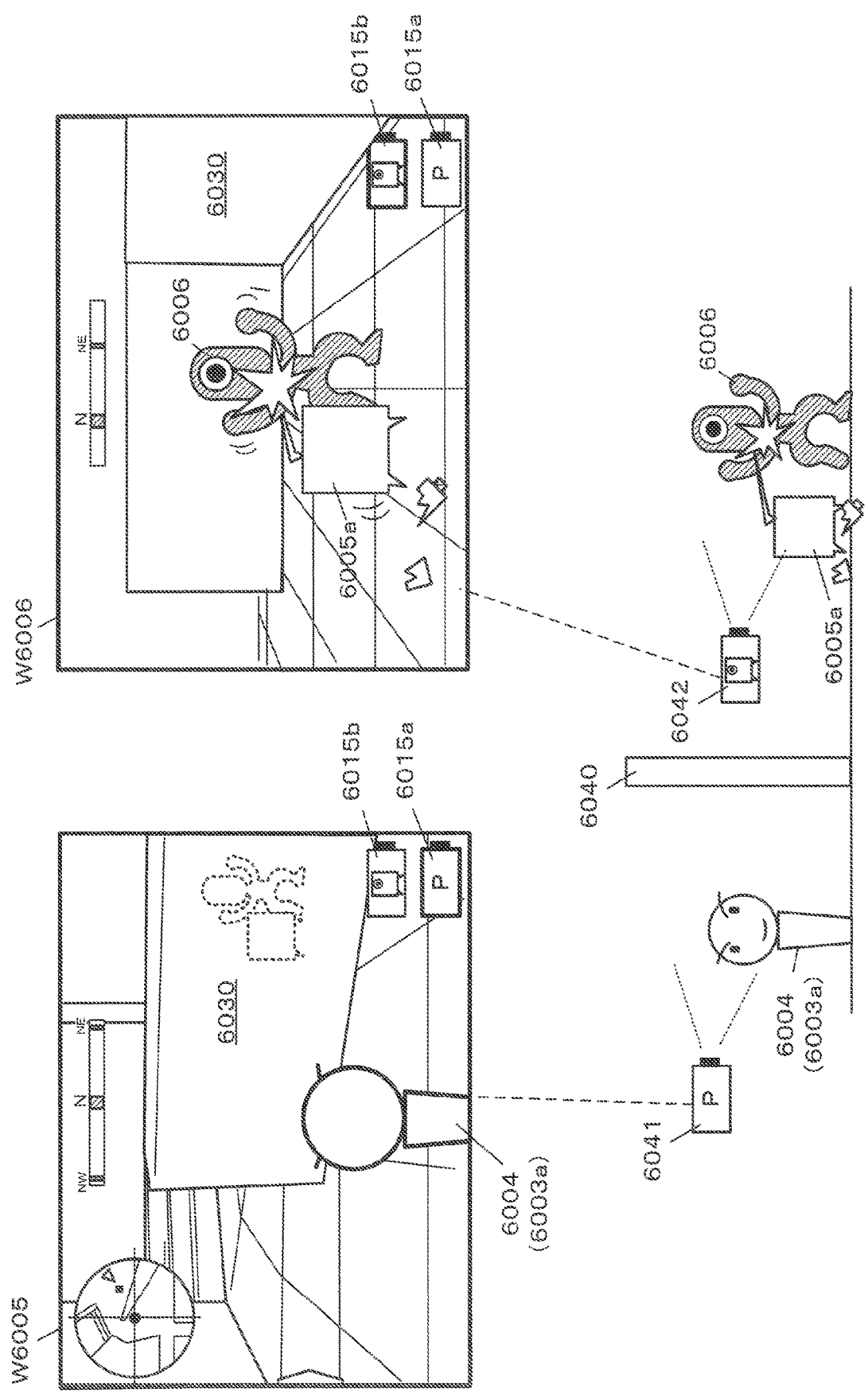
FIG. 13 is a diagram illustrating increase of points-of-view and switching between points-of-view in a game screen according to the first embodiment.

FIG. 13 is a diagram illustrating increase of points-of-view and switching between points-of-view in the game screen.

A player point-of-view virtual camera 6041 is always provided as a point-of-view based on the player character 6004. When the sub character 6005 appears, a sub character point-of-view virtual camera 6042 is newly set as a point-of-view based on the sub character. The sub character point-of-view virtual camera 6042 may have a third person point-of-view or a first person point-of-view (the point-of-view of the sub character 6005).

When the virtual camera is added, point-of-view switching operation icons 6015 (6015*a*, 6015*b*) are displayed to switch the point-of-view in the game screen to the virtual camera. In the example of FIG. 13, the first point-of-view switching operation icon 6015*a* corresponds to the player point-of-view virtual camera 6041, and the second point-of-view switching operation icon 6015*b* corresponds to the sub character point-of-view virtual camera 6042.

The point-of-view in a game screen W6005 is set to the player point-of-view virtual camera 6041 as a default. However, when the second point-of-view switching operation icon 6015*b* is operated during the gameplay, the point-of-view is switched to the sub character point-of-view virtual camera 6042 and the touch panel 1506 displays a game screen W6006 with the sub character point-of-view virtual camera 6042 as the point-of-view. When the player point-of-view virtual camera 6041 is operated, the point-of-view is switched again, and the touch panel 1506 displays the game screen W6005.

As above, by arbitrarily selecting the point-of-view associated with the sub character 6005 having appeared and switching the selected point-of-view to the point-of-view in the game screen, the player can learn the state of the sub character 6005 at a place unseen from the point-of-view of the player character 6004.

[Functional Configuration]

Figure 14:
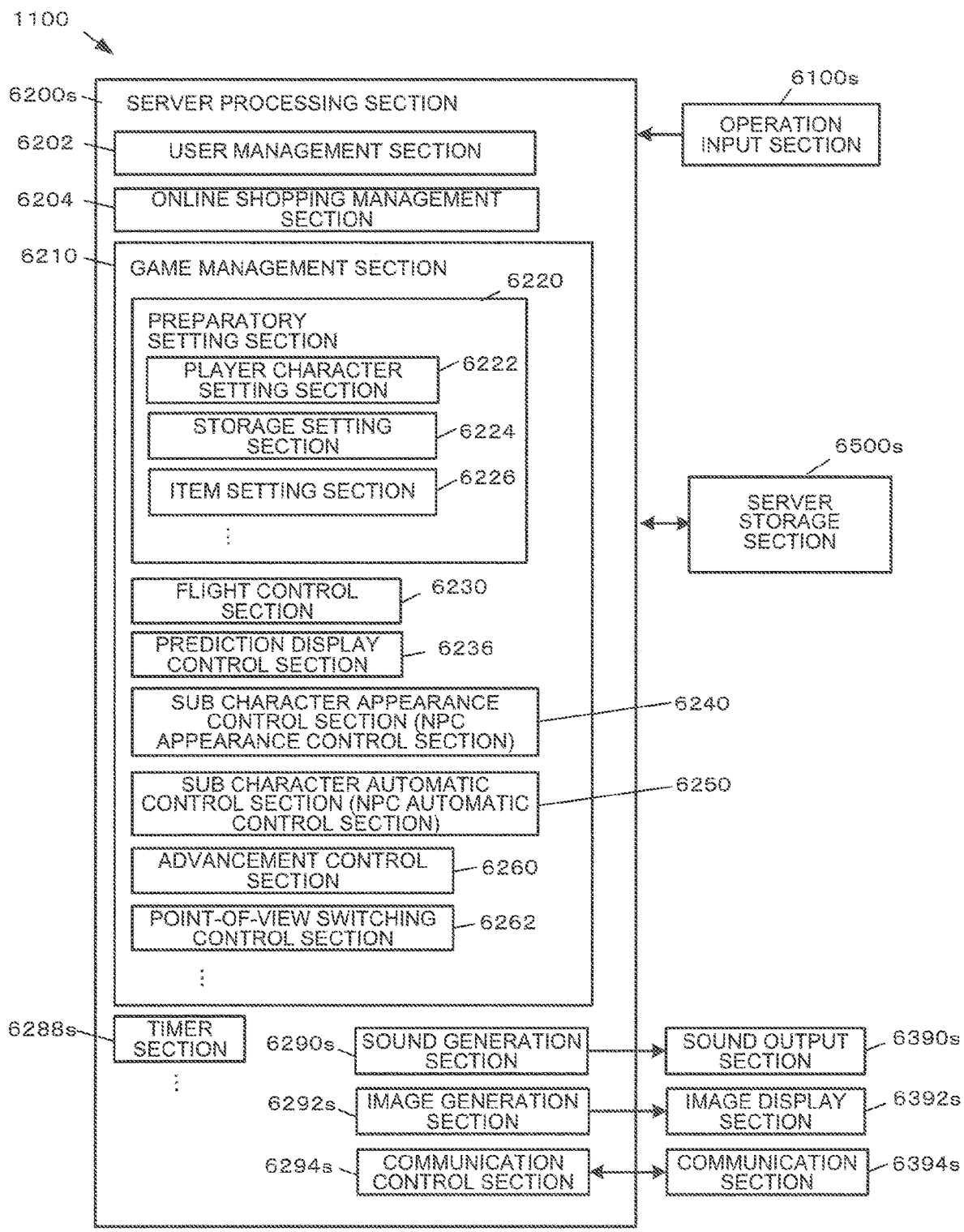
FIG. 14 is a functional block diagram illustrating an example of a functional configuration of a server system according to the first embodiment.

FIG. 14 is a functional block diagram illustrating an example of a functional configuration of the server system 1100 according to the first embodiment. The server system 1100 according to the first embodiment includes an operation input section 6100*s*, a server processing section 6200*s*, a sound output section 6390*s*, an image display section 6392*s*, a communication section 6394*s*, and a server storage section 6500*s*.

The operation input section 6100*s* is for inputting various operations for server management. The operation input section 6100*s* corresponds to the keyboard 1106 in FIG. 1.

The server processing section 6200*s* is implemented with electronic parts, such as a microprocessor (e.g., a CPU and a GPU), an ASIC, or an IC memory. The server processing section 6200*s* controls data exchanged between functional sections including the operation input section 6100*s* and the server storage section 6500*s*. In addition, the server processing section 6200*s* performs various calculation processes based on predetermined programs, data, the operation input signal from the operation input section 6100*s*, data revived from the user terminal 1500, and the like, thereby to entirely control the operation of the server system 1100.

The server processing section 6200*s* according to the first embodiment includes a user management section 6202, an online shopping management section 6204, a game management section 6210, a timer section 6288*s*, a sound generation section 6290*s*, an image generation section 6292*s*, and a communication control section 6294*s*. Note that functional sections other than these may be included as appropriate.

The user management section 6202 performs a process related to a user registration procedure and manages the data of each user associated with the user account. In the first embodiment, the user management section 6202 has various functions including: 1) issuing a unique user account to a registered user; 2) registration information management for registering and managing personal information for each user account; 3) book keeping management for an electronic payment medium consumed for paying for a charged element (online shopping and play cost in the first embodiment); 4) play history management for managing the history of login and logout in gameplay; and 5) management of game save data. Note that any other appropriate management function for other data associated with the account can be included.

The online shopping management section 6204 is in charge of control related to online shopping, which can be implemented with a known online shopping technique as appropriate. In the first embodiment, the player can purchase the main character 6003, the sub character 6005, the storage object 6007, and items in online shopping. Any other elements may be set as appropriate to be sold in the online shopping.

The game management section 6210 performs various processes related to game execution management. The game according to the first embodiment is a client-server online game, and thus the game management section 6210 according to the first embodiment communicates with the user terminal 1500 to perform a control for providing data required for the gameplay. The game management section 6210 in the first embodiment has a preparatory setting section 6220, a flight control section 6230, a prediction display control section 6236, a sub character appearance control section 6240, a sub character automatic control section 6250, an advancement control section 6260, and a point-of-view switching control section 6262. Note that functional sections other than these may be included as appropriate.

The preparatory setting section 6220 makes various settings related to preparation for gameplay based on the player's operation. Specifically, the preparatory setting section 6220 has a player character setting section 6222, a storage setting section 6224, and an item setting section 6226.

The player character setting section 6222 selects and sets the character as the player character 6004 from among the plurality of characters based on the player's operation.

The storage setting section 6224 sets the storage object by selecting the NPC to be stored and the object as a storage destination from among the plurality of NPCs and the plurality of objects based on the player's selection operation. When the storage object is capable of storing the plurality of sub characters 6005, the storage setting section 6224 can select a plurality of NPCs to be stored. More specifically, the storage setting section 6224 associates the sub character 6005 and the storage object 6007 to create the preset storage object 6008.

The item setting section 6226 associates a given item to the storage object and/or the NPC stored in the storage object based on the player's operation input. More specifically, the item setting section 6226 sets the use of the sub character item 6021 (see FIG. 7) to the sub character 5 and the use of the storage object item 6022 (se FIG. 8) to the storage object 6007.

Besides the functions described above, the preparatory setting section 6220 can set the game space to be used in gameplay from among a plurality of game spaces (also called game stages) based on the player's operation input.

The flight control section 6230 performs a control to fly the storage object storing the NPC until a given flight end condition is satisfied based on the player's action operation. More specifically, the flight control section 6230 makes changes to the flight control settings based on the combination of the storage object 6007 and the sub character 6005 combined as the preset storage object 6008 and performs the movement control of the preset storage object 6008 based on the changed flight control settings.

For example, the flight control section 6230 changes the flight control settings of the preset storage object 6008 to be thrown. Then, based on the changed flying settings, the flight control section 6230 determines the flying destination and the flying route to the destination according to the specifications related to throwing at that time (the throwing direction, the throwing force, and others in the first embodiment). These elements are for determining the predicted flying destination and the predicted trajectory. Then, the flight control section 6230 determines the flying destination and the flying route based on the specifications at the point in time when the action operation is performed, and controls the preset storage object 6008 to fly to the flying destination along the determined flying route.

The prediction display control section 6236 performs a control to provide a prediction display indicating the predicted trajectory 6030 and/or the predicted flying destination 6032 in the flight control. The display control of the predicted flying destination 6032 also serves as a prediction display of the enemy character 6006 to be attacked when the sub character 6005 appears.

The sub character appearance control section 6240 controls to cause the NPC to appear from the storage object satisfying the flight end condition. For example, the sub character appearance control section 6240 performs a release and appearance control of the sub character 6005.

The sub character automatic control section 6250 automatically controls the NPC having been caused to appear by the sub character appearance control section 6240 to take a given action toward the enemy character. However, the automatic control is limited until the lapse of the limited time period set to the NPC. For example, the sub character automatic control section 6250 performs an automatic action control of the sub character 6005.

Then, the sub character automatic control section 6250 changes the action control settings related to the automatic control based on the NPC and the storage object constituting the preset storage object. For example, the sub character automatic control section 6250 changes the action control settings based on the sub character 6005 and the storage object 6007 constituting the preset storage object 6008.

More specifically, the sub character automatic control section 6250 can change the action control settings based on at least any of a) the NPC stored in the storage object, b) when there are a plurality of NPCs stored, the combination of the NPCs, c) the object selected as the storage object, d) the combination of the object as the storage object and the NPC stored.

The sub character automatic control section 6250 can also change the action control settings based on e) the character as the player character and f) the item associated with the storage object and/or the NPC stored in the storage object.

The sub character automatic control section 6250 can also determine whether to change the action control settings related to the automatic control based on whether the flown storage object has contacted the enemy character or can determine the degree of the change.

The sub character automatic control section 6250 can change the action control settings based on the relative positional relationship between the position of the NPC having appeared and the position of the enemy character.

The advancement control section 6260 changes the parameter values of the storage object by the advancement control of the storage object such as ability improvement, reinforcement, level increase, and the like. The advancement control section 6260 can change the parameter values of the NPC by the advancement control of the NPC such as ability improvement, reinforcement, level increase, and the like.

The point-of-view switching control section 6262 can perform switching to the point-of-view based on the automatically controlled NPC according to the player's point-of-view switching operation for switching the point-of-view of the game screen during the automatic control by the sub character automatic control section 6250. For example, the point-of-view switching control section 6262 performs a display control of the point-of-view switching operation icons 6015 (see FIG. 13) and a switching control of point-of-view of the game screen according to the operation on the operation icon.

The timer section 6288s uses a system clock to obtain the current date and time, a limited time period, and the like.

The sound generation section 6290s is implemented with an integrated circuit (IC) or by executing software that generates sound data and performs decoding, and generates or decodes sound data on operation sound and background music (BGM) related to system management for the server system 1100 and the gameplay. The resultant sound signal related to the system management is output to the sound output section 6390s.

The sound output section 6390s receives the sound signal to emit the corresponding sound. The sound output section 6390s corresponds to a speaker (not illustrated) of the main body device 1101 or the touch panel 1108 in the example illustrated in FIG. 1.

The image generation section 6292s can generate an image related to the system management for the server system 1100, a game image (or data for displaying the game image on the user terminal 1500), and the like. The image related to the system management can be output to the image display section 6392s.

The image display section 6392s displays various images for system management based on the image signals input from the image generation section 6292s. The image display section 6392s can be implemented with an image display device such as a flat panel display, a cathode ray tube (CRT), a projector, or a head-mounted display. The image display section 6392s corresponds to the touch panel 1108 in the example illustrated in FIG. 1.

The communication control section 6294s performs a data process related to the data communication, and exchanges data with an external device through the communication section 6394s.

The communication section 6394s connects to the network 6009 to implement communications. The communication section 6394s is implemented with a transceiver, a modem, a terminal adapter (TA), a jack for a communication cable, a control circuit, and the like. The communication section 6394s corresponds to the communication device 1153 in the example illustrated in FIG. 1.

The server storage section 6500s stores programs and various types of data for implementing various functions of the server processing section 6200s for entirely controlling the server system 1100. The server storage section 6500s is used as a work area for the server processing section 6200s, and temporarily stores the results of calculations performed by the server processing section 6200s based on various programs. The functions of the server storage section 6500s are implemented with an IC memory (e.g., RAM and ROM), a magnetic disk (e.g., hard disk), an optical disk (e.g., CD-ROM and DVD), an online storage, or the like. The server storage section 6500s corresponds to a storage medium, such as the IC memory 1152 and hard disk mounted in the main body device 1101, and the storage 1140 in the example illustrated in FIG. 1.

Figure 15:
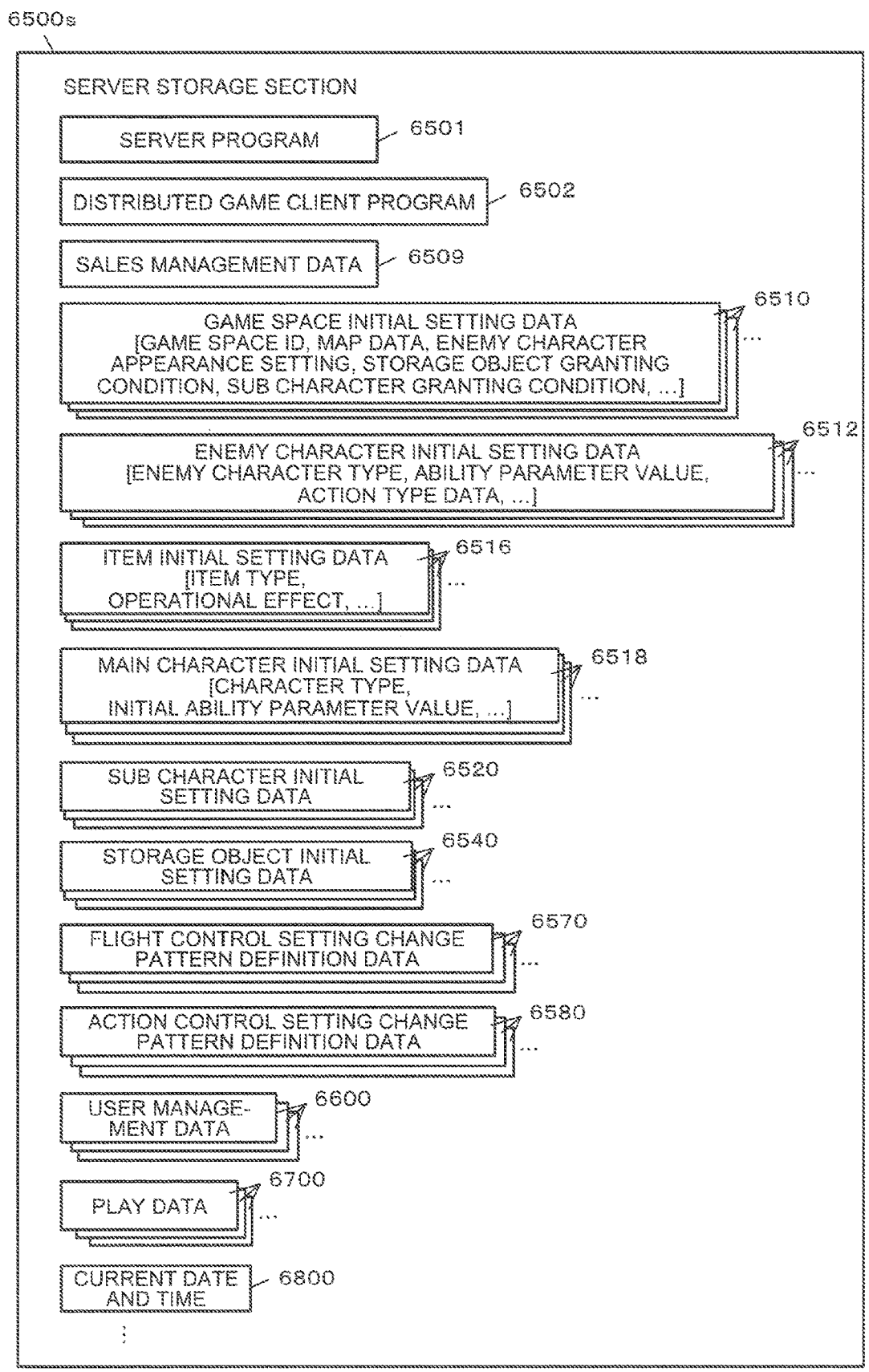
FIG. 15 is a diagram illustrating an example of programs and data stored in a server storage section according to the first embodiment.

FIG. 15 is a diagram illustrating an example of programs and data stored in the server storage section 6500s according to the first embodiment. The server storage section 6500s in the first embodiment stores a server program 6501, a distributed game client program 6502, sales management data 6509, game space initial setting data 6510, enemy character initial setting data 6512, item initial setting data 6516, main character initial setting data 6518, sub character initial setting data 6520, storage object initial setting data 6540, flight control setting change pattern definition data 6570, and action control setting change pattern definition data 6580.

The server storage section 6500s also stores user management data 6600, play data 6700, and current date and time 6800 as data related to the game and generated and managed in sequence. The server storage section 6500s can also store other programs and data (for example, a timer, a counter, various flags, and others) as appropriate.

The server program 6501 is a program read and executed by the server processing section 6200s to implement the functions of the user management section 6202, the online shopping management section 6204, and the game management section 6210 (see FIG. 14).

The distributed game client program 6502 is an original of a game client program provided to the user terminal 1500.

The sales management data 6509 includes data for defining and managing sales products in online shopping. For example, purchasable items, stock quantities, and charge prices (equivalent to debit amounts from payment media in the first embodiment) are stored in association with one another.

The game space initial setting data 6510 is prepared for each game space, which includes various types of initial setting data related to the game space. The one game space initial setting data 6510 includes a game space ID, map data, terrain type setting data in each position in a map, enemy character appearance settings, storage object granting conditions, sub character granting conditions, item granting conditions, and others.

The storage object granting conditions, the sub character granting conditions, and the item granting conditions define conditions to be satisfied to grant new storage objects, new sub characters, and new items to the player in the game space.

The enemy character initial setting data 6512 is prepared for each type of enemy character, which includes various types of initial setting data related to the enemy character. For example, the one enemy character initial setting data 6512 includes an enemy character type, ability parameter value, and action type data defining an action type. Note that data other than these can be included as appropriate.

The item initial setting data 6516 is prepared for each item, which includes various types of initial setting data related to the item. For example, the one item initial setting data 6516 includes an item type and operational effect definition data. The target of the operational effect is mainly the flight control settings when the item is the storage object item 6022 (see FIG. 8). The item initial setting data 6516 defines which parameter in the flight control settings to be the target of the operational effect and the degree of the change of the value by the operational effect. The item initial setting data 6516 can include not only the flight control settings but also the action control settings. Similarly, when the item is the sub character item 6021 (see FIG. 7), the item initial setting data 6516 mainly includes the action control settings but can also include the flight control settings.

The main character initial setting data 6518 is prepared for each type of the main character 6003 (see FIG. 3), which includes various types of initial setting data related to the main character. For example, the one main character initial setting data 6518 includes information such as a character type and an initial ability parameter value of the character. Note that the main character initial setting data 6518 also includes various types of data necessary for displaying the character on the game screen and causing the character to make an action (for example, model data, motion data, texture data, and others of the character).

Figure 16:
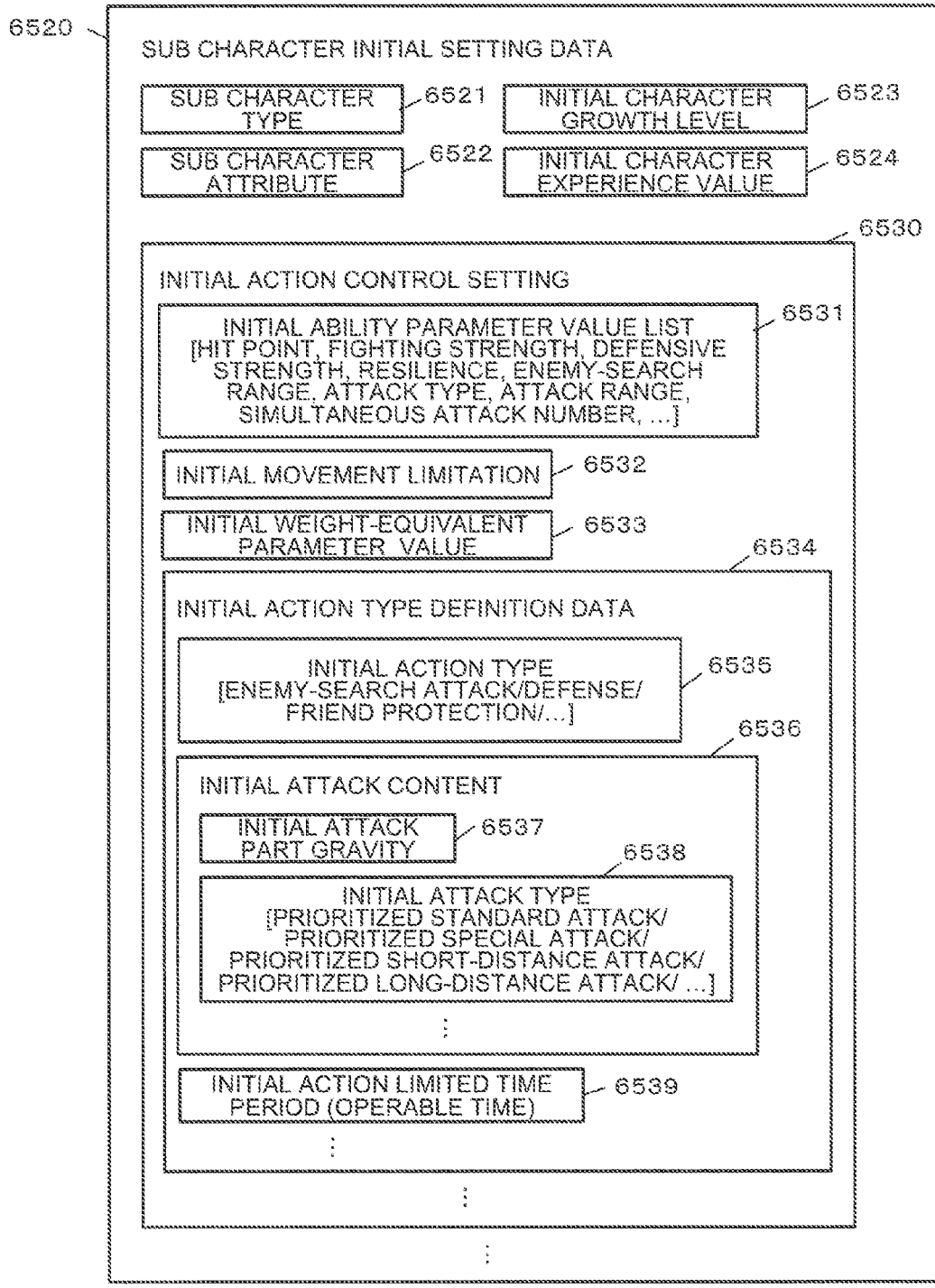
FIG. 16 is a diagram illustrating an example of a data structure of sub character initial setting data according to the first embodiment.

The sub character initial setting data 6520 is prepared for each type of the sub character 6005 (see FIG. 3), which includes various types of initial setting data related to the sub character. The one sub character initial setting data 6520 includes a sub character type 6521, a sub character attribute 6522, an initial character growth level 6523, an initial character experience value 6524, and an initial action control setting 6530, for example, as illustrated in FIG. 16. Note that the sub character initial setting data 6520 also includes various types of data necessary for displaying the character on the game screen and causing the character to make an action (for example, model data, motion data, texture data, and others of the character).

The initial action control setting 6530 includes, for example, initial ability parameter value list 6531, an initial movement limitation 6532, an initial weight-equivalent parameter value 6533, initial action type definition data 6534, and others. Note that data other than these can be included as appropriate.

The initial action type definition data 6534 is data related to initial settings of automatic control of the character, which includes an initial action type 6535, an initial attack content 6536, and an initial action limited time period 6539. Note that data other than these can be included as appropriate.

The initial action type 6535 indicates the type of an action or the pattern of an action that can be made by the sub character in the initial setting state. For example, as the initial action type 6535, enemy-search attack, defense, friend protection, or the like can be set. Then, the sub character is automatically controlled according to an algorithm according to the preset action type.

The initial attack content 6536 defines the contents of the attack included in the action indicated by the initial action type 6535. For example, the initial attack content 6536 includes an initial attack part gravity 6537 and an initial attack type 6538. Note that data other than these can be included as appropriate.

The initial attack part gravity 6537 defines the ratio, gravity, and weight of each part of the enemy character 6006 that is to be attacked on a priority basis. The sub character is automatically controlled to attack the part with a higher gravity on a higher-priority basis.

The initial attack type 6538 defines the contents of the method of attack. For example, possible settings of the initial attack type 6538 are: "prioritized standard attack" in which a standard method of attack for the sub character is mainly used; "prioritized special attack" in which more powerful special attack is prioritized although the number of usages and the usage conditions are stricter than those of the standard attack; "prioritized short-distance attack", "prioritized long-distance attack", and others.

The initial action limited time period 6539 defines the initial setting of the limited time period related to the automatic control of the sub character. In the first embodiment, the initial action limited time period 6539 is a time measured from the appearance of the sub character to the disabling of action of the sub character. Note that the initial action limited time period 6539 may be set to another limited time period. For example, the initial action limited time period 6539 can be an operable time per action (corresponding to per turn in a turn-based game where one character can make one action per turn, for example).

Figure 17:
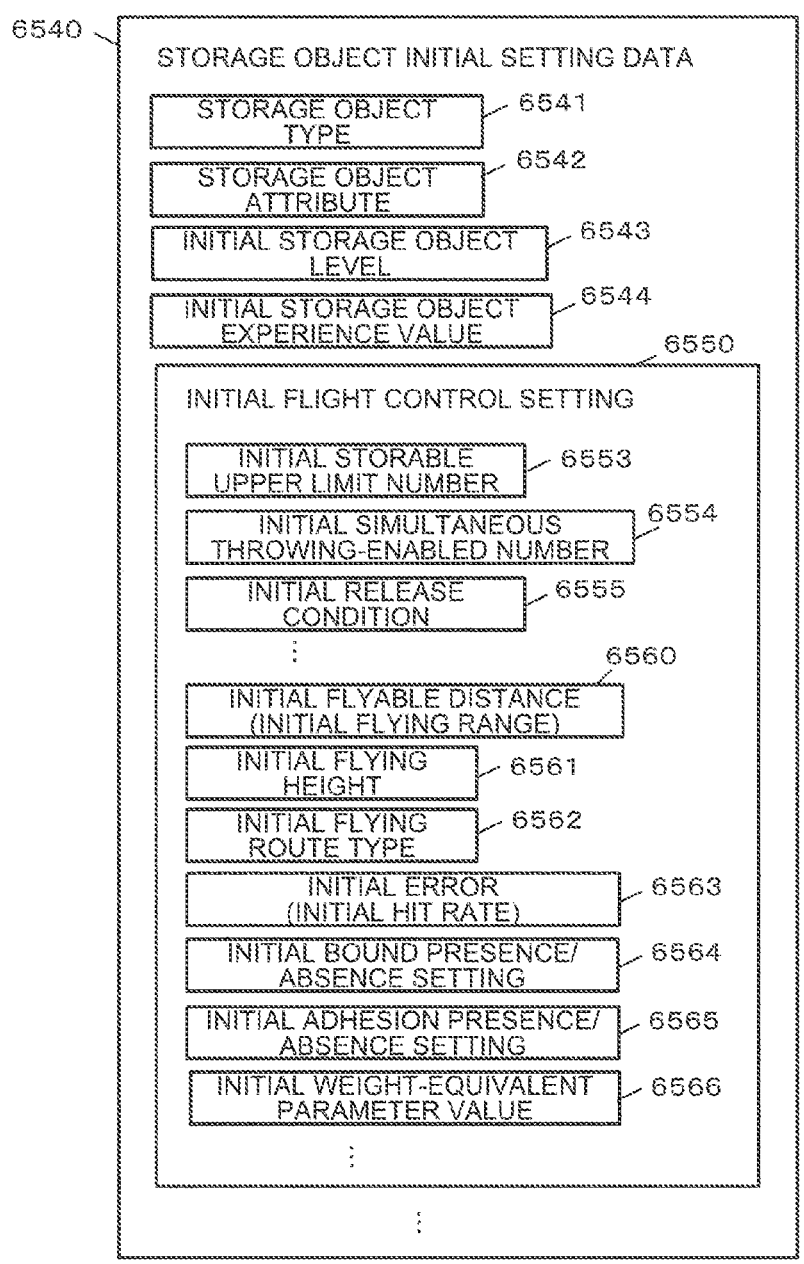
FIG. 17 is a diagram illustrating an example of a data structure of storage object initial setting data according to the first embodiment.

Referring back to FIG. 15, the storage object initial setting data 6540 is prepared for each type of storage object, which includes various types of initial setting data related to the storage object. The one storage object initial setting data 6540 includes a storage object type 6541, a storage object attribute 6542, an initial storage object level 6543, an initial storage object experience value 6544, and an initial flight control setting 6550, for example, as illustrated in FIG. 17. Note that data other than these can be included as appropriate.

The initial flight control setting 6550 includes an initial storable upper limit number 6553, an initial simultaneous throwing-enabled number 6554, an initial release condition 6555, an initial flyable distance 6560, an initial flying height 6561, an initial flying route type 6562, an initial error 6563, an initial bound presence/absence setting 6564, an initial adhesion presence/absence setting 6565, and an initial weight-equivalent parameter value 6566. Note that data other than these can be included as appropriate.

Figure 18:
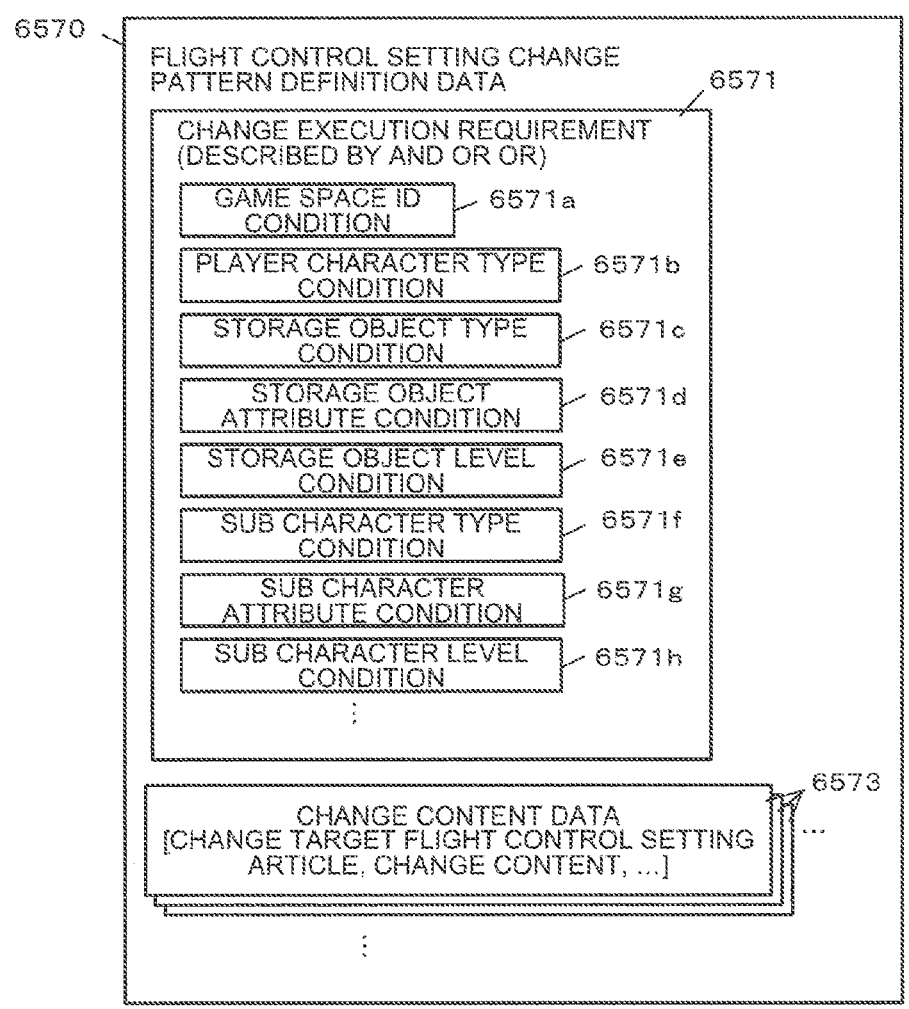
FIG. 18 is a diagram illustrating an example of a data structure of flight control setting change pattern definition data according to the first embodiment.

Referring back to FIG. 15, the flight control setting change pattern definition data 6570 is prepared for each change pattern of the flight control settings, which includes various types of definition data related to the change pattern. The one flight control setting change pattern definition data 6570 includes a change execution requirement 6571 and change content data 6573, for example, as illustrated in FIG. 18.

The change execution requirement 6571 defines the requirement for selecting and applying the change pattern definition data. In the first embodiment, the requirements are described by a plurality of conditions in AND or OR relationship. The type of the conditions used in the description can be set as appropriate. In the first embodiment, the change execution requirement 6571 is described by one of a game space ID condition 6571a, a player character type condition 6571b, a storage object type condition 6571c, a storage object attribute condition 6571d, a storage object level condition 6571e, a sub character type condition 6571f, a sub character attribute condition 6571g, and a sub character level condition 6571h, or by a combination of two or more of them. These conditions can be set to "none".

The change content data 6573 is prepared for each content to be changed when the change pattern definition data is applied, where a change target flight control setting article and its change content are associated with each other.

Figure 19:
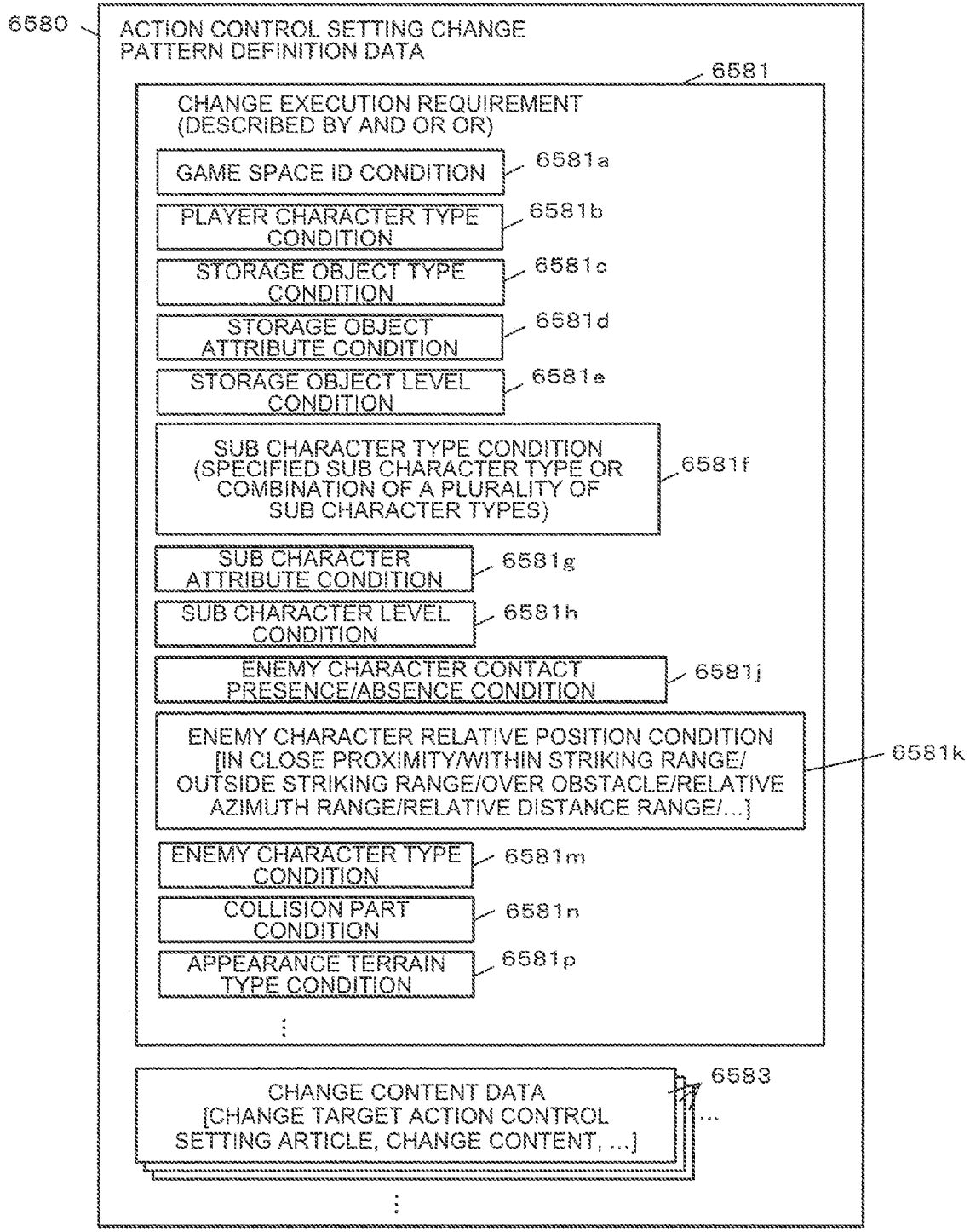
FIG. 19 is a diagram illustrating an example of a data structure of action control setting change pattern definition data according to the first embodiment.

Referring back to FIG. 15, the action control setting change pattern definition data 6580 is prepared for each change pattern of the action control settings, which includes various types of definition data related to the change pattern. The one action control setting change pattern definition data 6580 includes a change execution requirement 6581 and change content data 6583, for example, as illustrated in FIG. 19.

The change execution requirement 6581 defines the requirement for selecting and applying the change pattern definition data. In the first embodiment, the requirements are described by a plurality of conditions in AND or OR relationship. The type of the conditions used in the description can be set as appropriate. In the first embodiment, the change execution requirement 6581 is described by one of a game space ID condition 6581a, a player character type condition 6581b, a storage object type condition 6581c, a storage object attribute condition 6581d, a storage object level condition 6581e, a sub character type condition 6581f, a sub character attribute condition 6581g, a sub character level condition 6581h, an enemy character contact presence/absence condition 6581j, an enemy character relative position condition 6581k, an enemy character type condition 6581m, a collision part condition 6581n, and an appearance terrain type condition 6581p, or by a combination of two or more of them. These conditions can be set to "none".

The sub character type condition 6581f can set one or more types of the sub character 6005. Setting a single type is useful for the case where the change pattern is to be applied regardless of the number of the sub characters 6005 stored in the storage object 6007. Setting the plurality of types is useful for the case where the change pattern is to be applied when the combination of the sub characters 6005 stored in the storage object 6007 is applicable.

The enemy character contact presence/absence condition 6581j is a condition related to the presence or absence of the history of contact with the enemy character 6006 before the flown preset storage object 6008 satisfies the flight end condition.

The enemy character relative position condition 6581k defines a condition related to the relative positional relationship with the enemy character 6006. The relative positional relationship describing the condition can be set as appropriate, and the condition can be described by one or more relative positional relationships. For example, with reference to the sub character 6005 having appeared, the relative positional relationship can be described using contact with the enemy character 6006 or proximity to the enemy character 6006 as a close attack-enabled state, the enemy character 6006 being in the striking range, the enemy character 6006 being outside the striking range, the enemy character 6006 existing over an obstacle, relative azimuth range, relative distance range, and the like.

The enemy character type condition 6581m is a condition related to the type of the enemy character 6006 collided by the flying preset storage object 6008 (the storage object 6007 storing the sub character 6005).

The collision part condition 6581n is a condition related to the part of the enemy character 6006 collided by the flying preset storage object 6008.

The appearance terrain type condition 6581p is a condition related to the type of terrain of a place where the flying preset storage object 6008 has collided or the sub character 5 has appeared.

The change content data 6583 is prepared for each content to be changed when the change pattern definition data is applied, where a change target action control setting article and its change content are associated with each other.

Thus, appropriately setting the change execution requirement 6581 and the change content data 6583 makes it possible to change the action and ability of the sub character 6005 after appearance in various manners. For example, the same sub character 6005 can be made different in automatic action control pattern and offensive ability after appearance between the case where the sub character 6005 has appeared by collision of the preset storage object 6008 with the enemy character 6006 of A type and the case where the sub character 6005 has appeared by collision of the preset storage object 6008 with the enemy character 6006 of B type. In addition, even when the same enemy character 6006 is collided, the sub character 6005 can be made different in automatic action control pattern and offense ability after appearance depending on the part of the enemy character 6006 collided by the storage object 6007.

Describing the change execution requirement 6581 and the change content data 6583 in an appropriate combination makes it possible to change the action control settings in various manners on various conditions.

For example, the following action control settings can be made:

1) Including the enemy character contact presence/absence condition 6581j of "presence" in the change execution requirement 6581 makes it possible to apply the change pattern to the case where the preset storage object 6008 has hit the enemy character 6006, that is, makes it possible to set whether to change the action control settings related to the automatic control. In addition, the change content of the change content data 6583 makes it possible to set the degree of the change.

2) In the change content data 6583, setting an ability parameter value (corresponding to the initial ability parameter value list 6531 illustrated in FIG. 17) to the change target action control setting article makes it possible to change the specific ability of the sub character 6005 when the change execution requirement 6581 is satisfied.

3) In the change content data 6583, setting the movement limitation (corresponding to the initial movement limitation 6532 illustrated in FIG. 17) to the change target action control setting article makes it possible to cancel or increase the movement limitation when the change execution requirement 6581 is satisfied.

4) In the change content data 6583, the weight-equivalent parameter value (corresponding to the initial weight-equivalent parameter value 6533 illustrated in FIG. 17) to the change target action control setting article makes it possible to make the sub character 6005 lighter and extend the flyable distance of the preset storage object 6008 of the sub character when the change execution requirement 6581 is satisfied.

5) In the change content data 6583, setting the action type (corresponding to the initial action type definition data 6534 illustrated in FIG. 17) to the change target action control setting article makes it possible to change the content of the automatic action of the sub character 6005, in particular, the content of the attack action when the change execution requirement 6581 is satisfied.

Note that the condition included in the change execution requirement 6581 can be a single one. For example, setting only the storage object type condition 6581c makes it possible to surely apply a specific change content to the case where the specific storage object 6007 is used.

Figure 20:
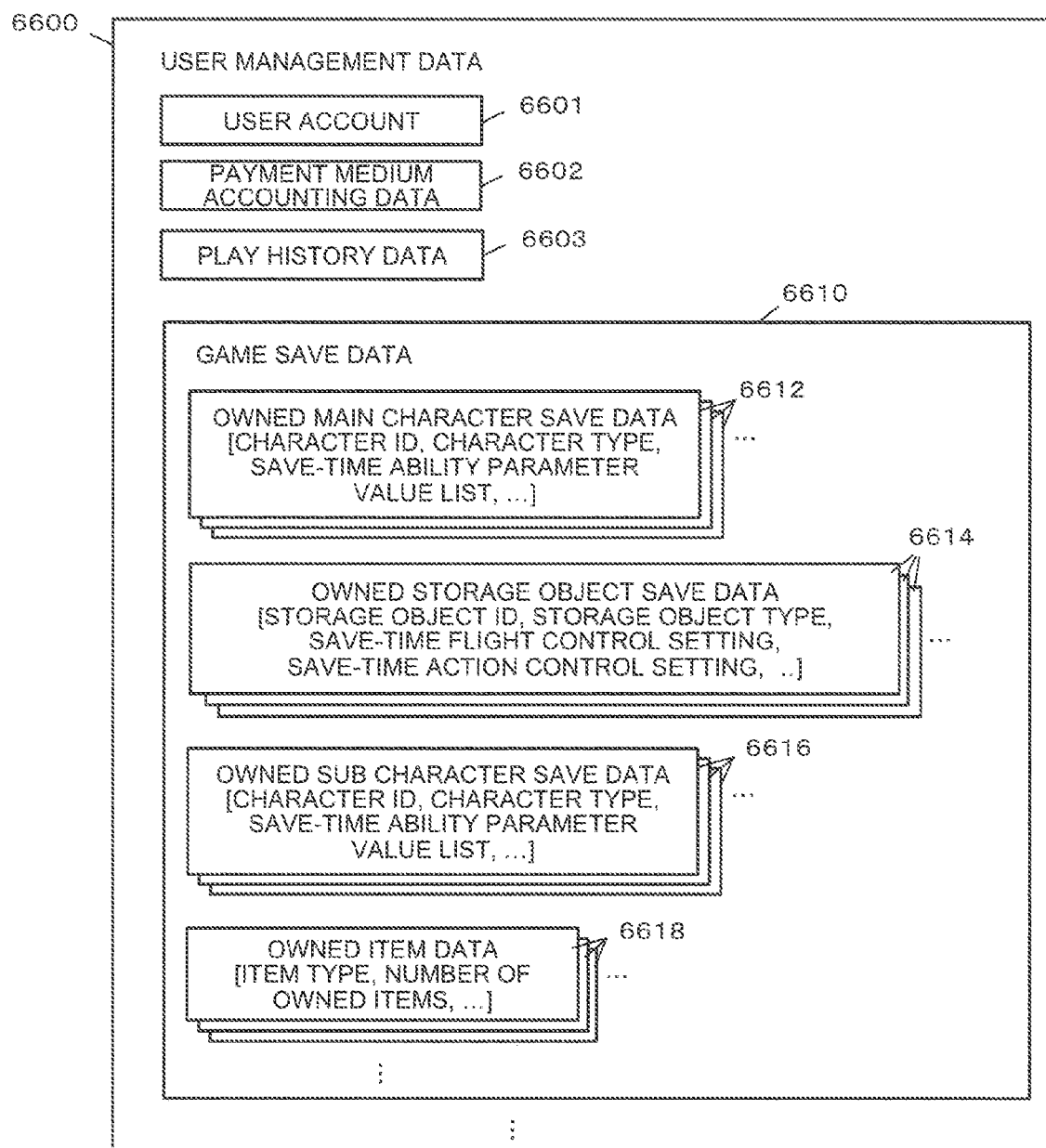
FIG. 20 is a diagram illustrating an example of a data structure of user management data according to the first embodiment.

Referring back to FIG. 15, the user management data 6600 is prepared for each registered user and includes various types of data associated with a unique identification information, namely, an account. In the first embodiment, as illustrated in FIG. 20, for example, the one user management data 6600 includes a unique user account 6601, payment medium accounting data 6602, play history data 6603, and game save data 6610. Note that data other than these can be included as appropriate.

The payment medium accounting data 6602 serves as what is known as an account book storing therein information on a charged/consumed amount (of specified parameter values, such as virtual currency, game currency, specified items, or vitality) of the payment medium for electronic payment associated with the user, information on a reason for the charging/consumption, and information on changed date and time in association with one another. The payment medium accounting data 6602 can also be referred to as charge history data or charge history information.

The play history data 6603 includes data describing the time of gameplay, the play performance, and others in time series, which is automatically updated at login/logout timings.

The game save data 6610 includes various types of data describing results of the previous and earlier gameplay and game progress states. For example, the game save data 6610 includes owned main character save data 6612, owned storage object save data 6614, owned sub character save data 6616, and owned item data 6618. Note that data other than these can be included as appropriate.

Figure 21:
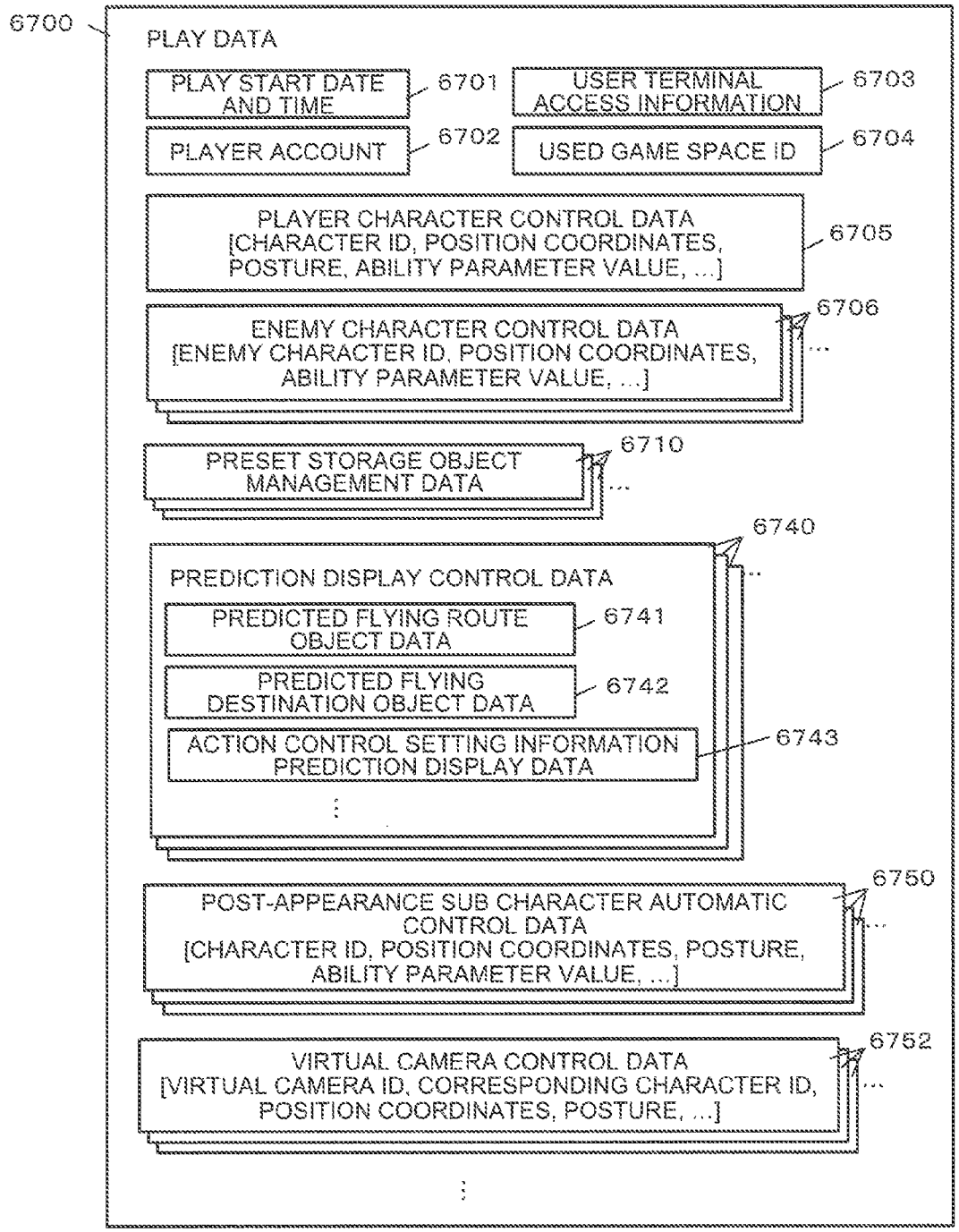
FIG. 21 is a diagram illustrating an example of a data structure of play data according to the first embodiment.

Referring back to FIG. 15, the play data 6700 is prepared for each gameplay that is executed on the user terminal 1500, which includes various types of data describing the game progress situations and various types of information related to display on the game screen such as control data of each character. The one play data 6700 includes play start date and time 6701, a player account 6702 as the account of the user as player, user terminal access information 6703 for accessing the user terminal 1500 of the player, a used game space ID 6704, player character control data 6705, enemy character control data 6706, preset storage object management data 6710, prediction display control data 6740, post-appearance sub character automatic control data 6750, and virtual camera control data 6752, for example, as illustrated in FIG. 21. Note that data other than these can be included as appropriate.

The player character control data 6705 and the enemy character control data 6706 are prepared for each player character 6004 and each enemy character 6006, which include various types of data describing the latest state of the character in the game space (for example, position coordinates, posture, ability parameter value, motion control data of character model, and others).

The preset storage object management data 6710 is created each time the player sets a combination of sub character and storage object, that is, is created for each preset storage object, which includes various types of data related to the preset storage object.

Figure 22:
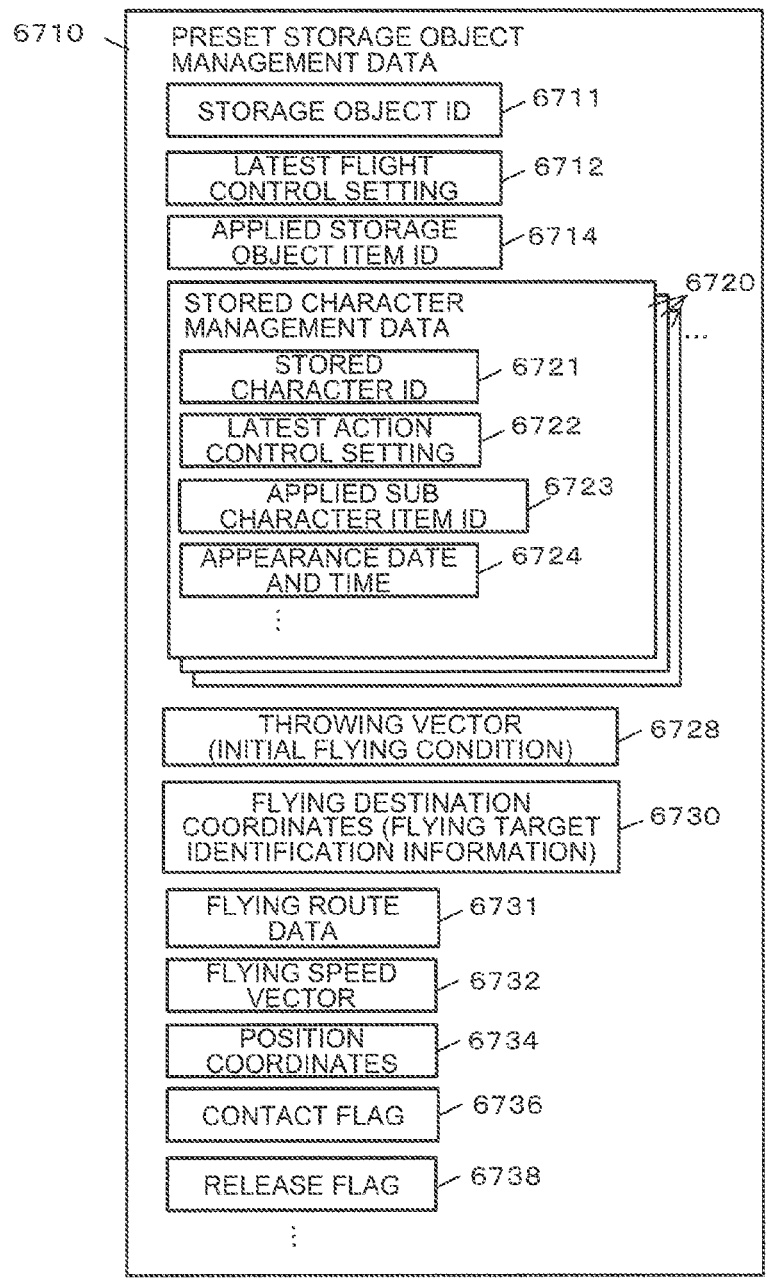
FIG. 22 is a diagram illustrating an example of a data structure of preset storage object management data according to the first embodiment.

The one preset storage object management data 6710 includes a unique storage object ID 6711, a latest flight control setting 6712, an applied storage object item ID 6714, stored character management data 6720, a throwing vector 6728, flying destination coordinates 6730, flying route data 6731, a flying speed vector 6732, position coordinates 6734, a contact flag 6736, and an release flag 6738, for example, as illustrated in FIG. 22. Note that data other than these can be included as appropriate.

The types of the data included in the latest flight control setting 6712 are the same as those in the initial flight control setting 6550 (see FIG. 13). At the initial setting, the latest flight control setting 6712 is a copy of the initial flight control setting 6550 of the storage object (see FIG. 17), but is changed according to a combination with the sub character 6005 or the like.

The applied storage object item ID 6714 is an item ID of the storage object item 6022 (for example, see FIG. 8) associated with the storage object.

The stored character management data 6720 is created for each sub character combined with the preset storage object, which includes various types of data related to the sub character. The one stored character management data 6720 includes a stored character ID 6721, a latest action control setting 6722, an applied sub character item ID 6723, and appearance date and time 6724, for example.

The types of the data included in the latest action control setting 6722 are the same as those in the initial action control setting 6530 (see FIG. 12). At the initial setting, the latest action control setting 6722 is a copy of the initial action control setting 6530 of the sub character (see FIG. 16), but is changed according to the combination with the storage object 6007.

The applied sub character item ID 6723 is an item ID of the sub character item 6021 associated with the sub character (for example, see FIG. 7).

The throwing vector 6728 includes initial conditions for throwing of the preset storage object 6008. In the first embodiment, the throwing vector 6728 is a vector based on the throwing direction and the throwing force. In the first embodiment, the throwing direction is sequentially updated to match the front direction of the player character 6004 (the direction of the throwing direction marker 6012, see FIG. 4). The throwing force is set to a predetermined initial value, but when a touch operation on the throwing force input bar 6014 (see FIG. 4), that is, an input operation of throwing force is detected, the current throwing force is updated to the throwing force according to the touch position.

The flying destination coordinates 6730 include position coordinates of the flying destination in the game space. However, when the flying route type of the preset storage object 6008 is set to the type of flying following the enemy character 6006 set (locked on) as a flying target, the flying destination coordinates 6730 include the position coordinates of the enemy character 6006 as the flying target or the pointer storing the position coordinates.

The flying route data 6731 is a coordinate value list of functions or pass points indicating a route in which the preset storage object 6008 is to fly. The flying route data 6731 is created along with the start of throwing of the preset storage object 6008, and the preset storage object 6008 is controlled in movement along the route in the data. The route may be determined by physical calculation or quasi-physical calculation or may be determined with application of a function of a preset quasi parabola.

The contact flag 6736 indicates whether the preset storage object 6008 in the management data has contacted the enemy character 6006. The initial value of the contact flag 6736 at the start of the flight control is "0 (no contact)", and is automatically changed to "1 (presence of contact)" at the time of contact with the enemy character 6006.

The value of the release flag 6738 is "1" in the state in which the sub character 6005 is stored in the preset storage object 6008, and is changed to "0" when the release condition included in the latest flight control setting 6712 (a copy of the initial release condition 6555 (see FIG. 17) with or without change) is satisfied and the stored sub character 6005 is released and appear in the game space.

The post-appearance sub character automatic control data 6750 is created when the sub character 6005 is released from the preset storage object 6008 and appears in the game space. The post-appearance sub character automatic control data 6750 includes various types of data describing the latest state of the sub character (for example, the position coordinates, posture, ability parameter value, motion control data of character model, remaining operable time (the remainder of the action limited time period), and others)).

The virtual camera control data 6752 is prepared for each virtual camera, which includes various types of parameter values describing the latest state of the virtual camera. The one virtual camera control data 6752 includes a unique virtual camera ID, a corresponding character ID indicating the point-of-view of the character as which the virtual camera is set, and data such as position coordinates, posture, and the angle of view in the game space. In the first embodiment, the virtual camera control data 6752 is created for the player point-of-view virtual camera 6041 (see FIG. 13) from the start of the game, and each time the sub character 6005 appears in the game space, the data of the sub character point-of-view virtual camera 6042 associated with the sub character is created.

Figure 23:
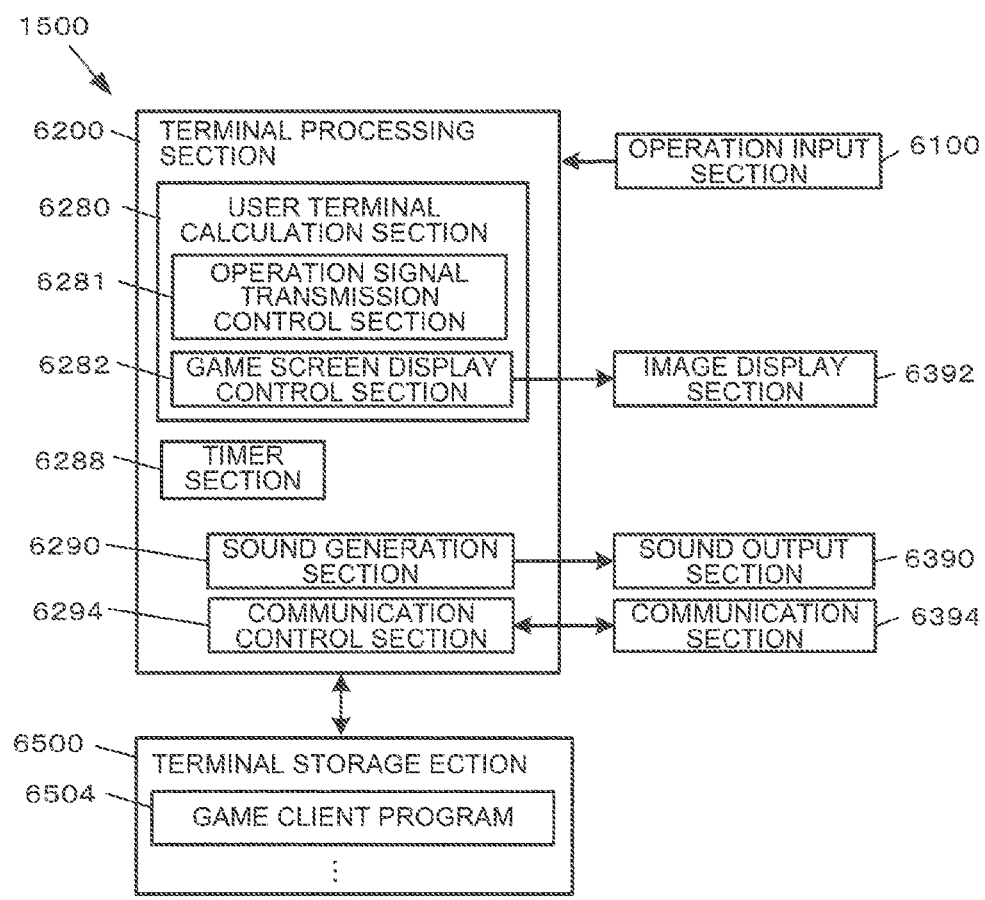
FIG. 23 is a functional block diagram illustrating an example of a functional configuration of a user terminal according to the first embodiment.

FIG. 23 is a functional block diagram illustrating an example of a functional configuration of the user terminal 1500 according to the first embodiment. The user terminal 1500 according to the first embodiment includes an operation input section 6100, a terminal processing section 6200, a sound output section 6390, an image display section 6392, a communication section 6394, and a terminal storage section 6500.

The operation input section 6100 outputs an operation input signal according to various operations input by the player to the terminal processing section 6200. For example, the operation input section 6100 can be implemented with a push switch, a joystick, a touch pad, a track ball, an accelerometer, a gyro, a CCD module, or the like. The operation input section 6100 corresponds to the arrow key 1502, the button switch 1504, and the touch panel 1506 illustrated in FIG. 2.

The terminal processing section 6200 is implemented with electronic parts, such as a microprocessor (e.g., CPU and GPU), and an IC memory. The terminal processing section 6200 performs input/output control to exchange data with each of the functional sections including the operation input section 6100 and the terminal storage section 6500. The terminal processing section 6200 executes various calculation processes based on predetermined programs or data, operation input signals from the operation input section 6100, and various types of data received from the server system 1100 to control the operation of the user terminal 1500. The terminal processing section 6200 corresponds to the control board 1550 in FIG. 2. The terminal processing section 6200 according to the first embodiment includes a user terminal calculation section 6280, a timer section 6288, a sound generation section 6290, and a communication control section 6294.

The user terminal calculation section 6280 includes an operation signal transmission control section 6281 and a game screen display control section 6282.

The operation signal transmission control section 6281 performs a process of transmitting various types of data and requests to the server system 1100 in accordance with an operation performed on the operation input section 6100.

The game screen display control section 6282 performs a control for displaying a game screen based on various types of data received from the server system 1100. In the first embodiment, the game screen display control section 6282 is configured to generate game space images (for example, 3DCG images and others) in the server system 1100, but can be configured to generate the game space images in the user terminal 1500. In this case, the game screen display control section 6282 is in charge of controlling an object disposed in a virtual three-dimensional space for generating a 3DCG, for example.

The sound generation section 6290 is implemented with a processor, such as a digital signal processor (DSP) or a sound synthesizing IC, an audio codec capable of reproducing a sound file, or the like. Based on a processing result by the game screen display control section 6282, the sound generation section 6290 generates a sound signal for sound effects, a BGM, various operation sounds, and the like related to the game, and outputs the sound signal thus generated to the sound output section 6390. The sound output section 6390 is implemented with a device that outputs sounds such as sound effects, BGM, or the like, based on the sound signal input from the sound generation section 6290. The sound output section 6390 corresponds to the speaker 1510 in FIG. 2.

The image display section 6392 displays various game images based on the image signals input from the game screen display control section 6282. The image display section 6392 can be implemented with an image display device such as a flat panel display, a cathode ray tube (CRT), a projector, or a head-mounted display. In the first embodiment, the image display section 6392 corresponds to the touch panel 1506 illustrated in FIG. 2.

The communication control section 6294 performs a data process related to the data communication, and exchanges data with an external device through the communication section 6394. The communication section 6394 connects to the network 9 to implement communications. For example, the communication section 6394 is implemented with a transceiver, a modem, a terminal adapter (TA), a jack for a communication cable, a control circuit, and the like, and corresponds to the wireless communication module 1553 in FIG. 2.

The terminal storage section 6500 stores therein programs for implementing various functions for the terminal processing section 6200 to entirely control the user terminal 1500, and various types of data. The terminal storage section 6500 is used as a work area for the terminal processing section 6200 to temporarily store results of calculations performed by the terminal processing section 6200 in accordance with various programs, input data received from the operation input section 6100, and the like. These functions are implemented with an IC memory (e.g., RAM and ROM), a magnetic disk (e.g., hard disk), an optical disk (e.g., CD-ROM and DVD), or the like. The terminal storage section 6500 corresponds to the IC memory 1552 and the memory card 1540 in the control board 1550 illustrated in FIG. 2.

The terminal storage section 6500 according to the first embodiment stores therein a game client program 6504. Note that other programs and data can be stored as appropriate.

The game client program 6504 is application software that implements the function of the user terminal calculation section 6280 when being read and executed by the terminal processing section 6200. In the first embodiment, the game client program 6504 is a copy of the distributed game client program 6502 (see FIG. 15) provided from the server system 1100.

The game client program 6504 may be an exclusive client program or include a web browser program and a plugin that implements an interactive image display, depending on a technique and a method for implementing an online game.

[Description of Operations]

Next, a flow of a process in the server system 1100 will be described. The flow of the process described herein is implemented with the server processing section 6200s executing the server program 6501.

Figure 24:
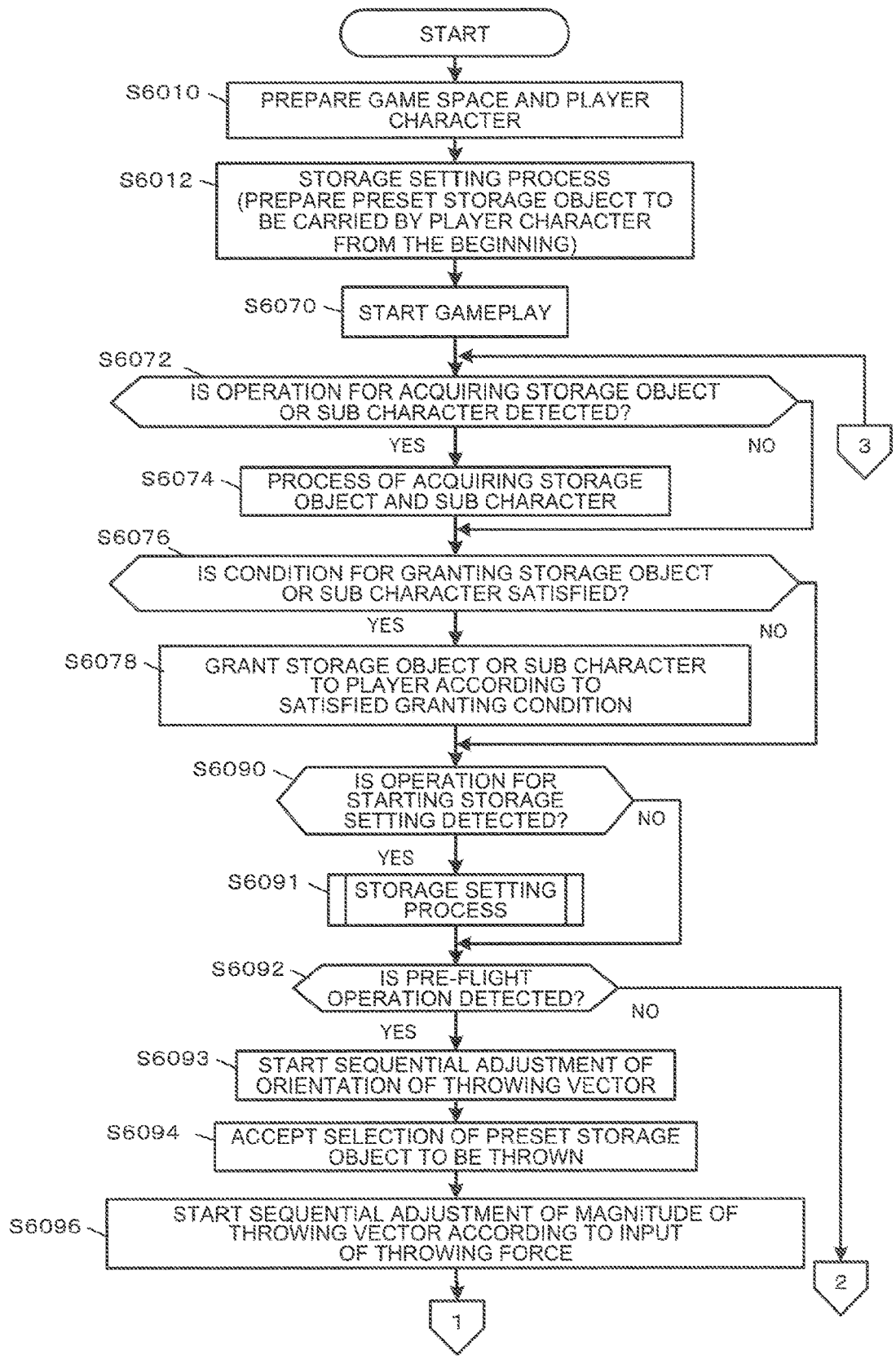
FIG. 24 is a flowchart illustrating a flow of a process in a server system according to the first embodiment.
Figure 25:
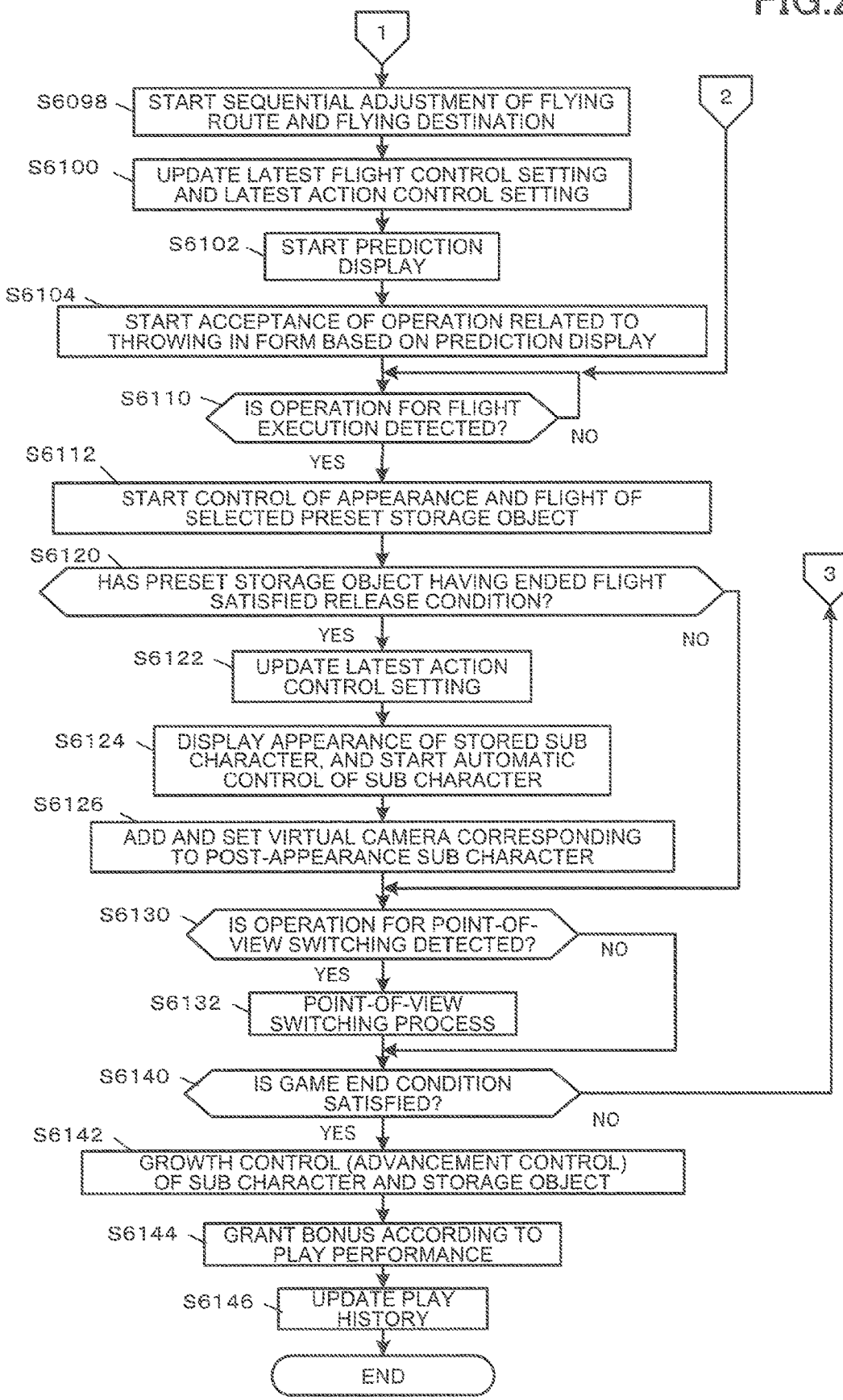
FIG. 25 is a flowchart continued from FIG. 24.

FIGS. 24 and 25 are flowcharts illustrating a flow of a process by the server system 1100 related to one gameplay.

The server system 1100 accepts a selection of a game space to be used and a selection of the main character 6003 as the player character 6004 (step S6010). For example, for the game space to be used, the game spaces defined by the game space initial setting data 6510 are selectably suggested on the user terminal 1500 and a selection operation of the game space is accepted. For the player character 6004, a list of the main characters 6003 owned by the player is selectably suggested and a selection operation is accepted.

Next, the server system 1100 sets the preset storage object 6008 to be carried by the player character 6004 from the start of the gameplay (step S6012).

Specifically, the server system 1100 enables the settings of a predetermined number of preset storage objects 6008, and executes a storage setting process for each of preset storage objects.

Figure 26:
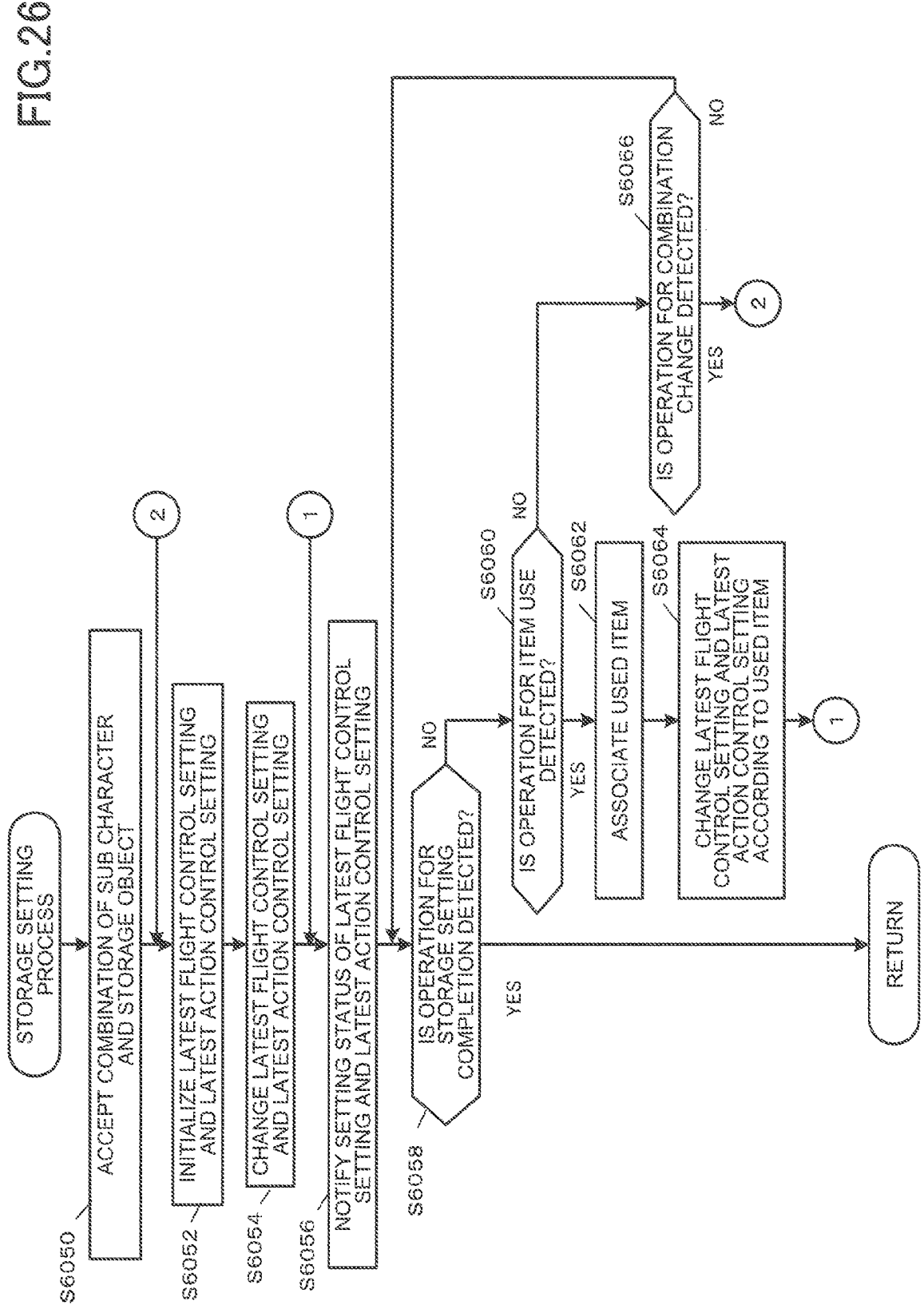
FIG. 26 is a flowchart illustrating a flow of a storage setting process according to the first embodiment.

FIG. 26 is a flowchart illustrating a flow of the storage setting process.

In the process, the server system 1100 first accepts a selection of the sub character 6005 and the storage object 6007 to be combined (step S6050). Specifically, the server system 1100 extracts unused sub characters and unused storage objects (of which there is no preset storage object management data 6710, see FIG. 22) from the sub characters 6005 and the storage objects 6007 owned by the player and suggests the same in a selectable manner on the user terminal 1500. In this case, when the initial storable upper limit number 6553 of the selected storage object 6007 indicates plural numbers (see FIG. 17), the server system 1100 can accept a selection of a plurality of sub characters 6005 to be combined within the upper limit. Accordingly, a primary setting of the preset storage object 6008 is completed and the new preset storage object management data 6710 is created in the play data 6700 (see FIG. 21).

Then, the server system 1100 initializes the latest flight control setting 6712 and the latest action control setting 6722 according to the combination of the sub character 6005 and the storage object 6007 (step S6052, see FIG. 22).

Specifically, the initial flight control setting 6550 of the selected storage object 6007 (see FIG. 17) is copied to the latest flight control setting 6712 for initialization, and the initial action control setting 6530 of the selected sub character 6005 (see FIG. 16) is copied to the latest action control setting 6722 for initialization.

Next, the server system 1100 changes the initialized latest flight control setting 6712 and latest action control setting 6722 based on the flight control setting change pattern definition data 6570 (see FIG. 18) and the action control setting change pattern definition data 6580 (see FIG. 19) (step S6054).

In the case where the storage setting process is executed in step S6012, the initial conditions related to the flight of the preset storage object 6008 to be set are unset. Accordingly, in the action control setting change pattern definition data 6580 (see FIG. 19), the change pattern including the enemy character contact presence/absence condition 6581*j* and the enemy character relative position condition 6581*k* is not applied in this stage.

Then, the server system 1100 causes the user terminal 1500 to provide a display notifying the player of the contents of the latest flight control setting 6712 and the latest action control setting 6722 (step S6056). The player can see the notification display to judge whether the current combination is appropriate.

When the combination is unsatisfactory from the notification display, the player can adjust the parameter values related to this combination using an item.

Specifically, when an operation for using an item with the operational effect of changing either the flight control settings or the action control settings (NO in step S6058, and YES in step S6060) is detected on the user terminal 1500, the server system 1100 associates the used item with the use destination (the storage object 6007 or the sub character 6005) (step S6062). Then, the server system 1100 changes the latest flight control setting 6712 and the latest action control setting 6722 based on the operational effect of the used item (step S6064), and returns to step S6056. When detecting an operation for changing the combination of the sub character 6005 and the storage object 6007 (YES in step S6066), the server system 1100 returns to step S6052.

Then, when detecting an input of a predetermined storage setting completion operation on the user terminal 1500 (YES in step S6058), the server system 1100 terminates the storage setting process.

Referring back to FIG. 24, next, the server system 1100 starts a progress control of gameplay (step S6070). Specifically, the server system 1100 arranges a background object in a virtual three-dimensional space to form a game space, and then arranges the player character 6004 and the enemy character 6006 in the game space. Then, the server system 1100 operates the player character 6004 according to the operation input of the player character 6004, and starts the automatic control of the enemy character 6006. Besides, the server system 1100 starts as appropriate a basic control necessary as a progress control of a battle game.

After the start of gameplay, when an acquisition operation of a predetermined sub character 6005 or storage object 6007 (for example, purchasing in online shopping or the like) is performed on the user terminal 1500 (YES in step S6072), the server system 1100 executes an acquisition process of the storage object 6007 (step S6074).

In addition, after the start of gameplay, when the game progress situation satisfies the storage object granting condition or the sub character granting condition (see the game space initial setting data 6510 illustrated in FIG. 15) in the game space indicated by the used game space ID 6704 (YES in step S6076), the server system 1100 grants the new sub character 6005 or storage object 6007 to the player (step S6078).

In this manner, according to the first embodiment, the player can obtain an opportunity of acquiring a material for using the sub character 6005 even during gameplay. In a conventional battle game in which sub characters are usable, only prepared sub characters can be used in gameplay. Accordingly, some of players cannot continue the game at the early stage of the game due to their irrelevant strategies and tactics and may easily discard gameplay or reset the game. In the first embodiment, however, there is a freedom of making a next move according to the situation of the battle, thereby producing a pleasure of turning the tide of the battle during gameplay.

When a predetermined storage setting start operation is input on the user terminal after the start of the gameplay (YES in step S6090), the server system 1100 executes the storage setting process (step S6091).

Then, when detecting an input of a predetermined preflight operation on the user terminal 1500 during the gameplay (YES in step S6092), the server system 1100 starts a control of adjusting and aligning the orientation of the throwing vector 6728 (see FIG. 22) with the front direction of the player character 6004 (step S6093).

Then, the server system 1100 causes the user terminal 1500 to display the preset storage object list 6010 (see FIG. 4) on the user terminal 1500, and accepts a selection operation of the preset storage object 6008 to be thrown (step S6094). In this case, when there are a plurality of simultaneous throwing-enabled numbers in the latest flight control setting 6712 of the selected preset storage object 6008 (the value copied from the initial simultaneous throwing-enabled number 6554 or the value changed later from the initial simultaneous throwing-enabled number 6554 illustrated in FIG. 17), the server system 1100 accepts a plurality of selections.

Then, the server system 1100 causes the user terminal 1500 to display the throwing force input bar 6014 (see FIG. 4), and starts a sequential adjustment of the magnitude of the throwing vector 6728 according to the touch operation on the bar (step S6096).

Then, referring to FIG. 25, the server system 1100 starts a sequential adjustment of the flying route and the flying destination according to the latest throwing specifications (step S6098). Specifically, the server system 1100 provisionally determines the flying destination coordinates 6730 and the flying route data 6731 based on the latest throwing vector 6728 and the flying route type in the latest action control setting 6722 (see the initial flying route type 6562 illustrated in FIG. 17) (see FIG. 22). Then, the server system 1100 repeats the foregoing process at each update of the throwing vector 6728 to update the flying destination coordinates 6730 and the flying route data 6731.

Then, the server system 1100 updates the latest flight control setting 6712 and the latest action control setting 6722 (see FIG. 22) (step S6100). Specifically, the server system 1100 performs again the step corresponding to step S6054 in the storage setting process, and applies a change pattern including the enemy character contact presence/absence condition 6581*j* and the enemy character relative position condition 6581*k* in the action control setting change pattern definition data 6580 (see FIG. 19).

Then, the server system 1100 starts various types of prediction display in the game screen, such as the predicted trajectory 6030, the predicted flying destination 6032, and action control setting information prediction display 6034 (step S6102, see FIG. 6).

The predicted flying destination 6032 represents a range corresponding to an initial error included in the latest flight control setting 6712 (a value copied or changed from the initial error 6563 illustrated in FIG. 17) by a predetermined object centered on the flying destination coordinates 6730.

The predicted trajectory 6030 is set and represented by setting an object connecting the flying destination coordinates 6730 from the player character 6004 in a route indicated by the flying route data 6731.

As the action control setting information prediction display 6034, the content of the latest action control setting 6722 is displayed (see FIG. 22). The latest action control setting 6722 may be displayed in text or by a predetermined icon. Automatic scroll is preferably provided as appropriate according to the amount of the display content.

These prediction displays are presented at each update of the flying destination coordinates 6730 and the flying route data 6731.

The server system 1100 starts to accept an operation input related to throwing in a form based on the prediction display (step S6104).

Specifically, as a guide display for correcting the throwing direction, the scales are displayed along the upward, downward, leftward, and rightward directions of the game screen centered on the displayed predicted flying destination 6032 and predicted trajectory 6030 (see FIG. 4), and upon detection of a predetermined direction change operation, the throwing direction is changed by one marking on the scale in the operation direction.

Similarly, the throwing force input bar 6014 (see FIG. 4) can be displayed with a marker indicating the present position of the throwing force for correction and scales in the stronger and weaker directions as guide displays for correction. Upon detection of a predetermined force change operation, the throwing force is changed by one marking in the operation direction.

As for the lock-on marker 6019 (see FIG. 7), another marker indicating that another candidate for flying target is selectable may be displayed around the current lock-on marker 6019. Then, upon detection of a predetermined target change operation, the setting of the flying target candidate may be switched to the nearest enemy character 6006 with the other marker in the operation direction.

When seeing the predicted flying destination 6032 and the predicted trajectory 6030 and finding that the aimed flying destination or flying route is not predicted, the player 6002 can adjust the throwing direction or the throwing force by changing the front direction of the player character 6004 or the like (NO in step S6110). When the prediction display is as aimed, the player 6002 inputs a predetermined action operation to cause the player character 6004 to throw the selected preset storage object 6008.

Upon detection of an input of the predetermined action operation on the user terminal 1500 (YES in step S6110), the server system 1100 causes the preset storage object 6008 of which the selection was accepted in step S6094 to appear in the game space, and starts the control of the flying display (step S6112). The flight control is continued until each satisfies the flight end condition. In the first embodiment, the flight end condition is that the flying preset storage object 6008 contacts the enemy character 6006 or another object. It is determined at any time whether the preset storage object 6008 under the flight control has contacted the enemy character 6006. When the contact is detected, the contact flag 6736 is changed to "1".

In steps S6092 to S6104, a predetermined flying cancel operation is acceptable as appropriate.

Next, when the preset storage object 6008 satisfies the flight end condition and the release condition (the same as the initial release condition 6555 illustrated in FIG. 17 or a changed condition from the initial release condition 6555) (YES in step S6120), the server system 1100 updates the latest action control setting 6722 of the sub character 6005 stored in the preset storage object 6008 (step S6122).

Then, the server system 1100 causes the sub character 6005 stored in the preset storage object 6008 to appear in the game space, and starts the automatic control of the sub character based on the latest action control setting 6722 of the sub character 6005 (step S6124).

Accordingly, along with the start of the automatic control, the server system 1100 creates the post-appearance sub character automatic control data 6750 in the play data 6700 (see FIG. 21), and stores various types of data describing the latest situation of the automatic control in the post-appearance sub character automatic control data 6750, and updates the same at any time.

The sub character 6005 of which the automatic control has been started is capable of making action under the automatic control until the action limited time period (operable time) is reached or the sub character 6005 having appeared suffers damage by the attack of the enemy character 6006 and the suffered damage reaches a hit point as one of ability parameter values. As for the determination on the action limited time period (operable time), the current date and time 6800 is copied to the appearance date and time 6724 in the stored character management data 6720 (see FIG. 22) along with the appearance of the sub character, and after that, the determination is made based on the elapsed time or time difference between the appearance date and time 6724 and the current date and time 6800.

In addition, along with the appearance of the new sub character 6005, the server system 1100 additionally sets the sub character point-of-view virtual camera 6042 (see FIG. 13) corresponding to the sub character, and displays the point-of-view switching operation icon 6015 in the game screen to enable acceptance of a point-of-view switching operation (step S6126).

Then, upon detection of an operation on the point-of-view switching operation icon 6015 (6015a, 6015b) during gameplay (YES in step S6130), the server system 1100 executes a point-of-view switching process (step S6132). That is, the server system 1100 performs a display switching such that the game screen has the image of the game space with the point-of-view of a virtual camera corresponding to the operated switching operation icon 6015.

The server system 1100 repeatedly executes steps S6072 to S6140 until the game end condition is satisfied (NO in step S6140).

When the game end condition is satisfied (YES in step S6140), the server system 1100 performs an advancement control of the sub character 6005 and the storage object 6007 (step S6142). Specifically, the server system 1100 grants experience values to the sub character 6005 and the storage object 6007 in the thrown preset storage object 8, and changes the sub character level and the storage object level according to the accumulated experience values. The advancement control may be performed only on either one of the sub character 6005 and the storage object 6007. The target of advancement may be limited to the thrown preset storage object 6008 that satisfies the release condition.

Next, the server system 1100 grants a bonus to the player according to the play performance (step S6144). For example, the server system 1100 may grant the main character 6003, the sub character 6005, the storage object 6007, or items. The server system 1100 can release a new game space where the player can play the game.

Then, the server system 1100 updates the play history (step S6146), and terminates the series of processes.

As above, according to the first embodiment, it is possible to provide a technique for adding a new attraction to a video battle game where the player uses a sub character as an NPC friendly to the main character operated by the player.

That is, the player performs an operation of storing the sub character 6005 in the storage object 6007 to set the preset storage object 6008, and performs an operation of instructing the player character 4 to throw the preset storage object 6008. Accordingly, it is possible to implement a new style of battle game in which the sub character 6005 is controlled to appear at the throwing destination, and after the appearance, the sub character 6005 fights a battle with the enemy character 6006.

The flight control settings related to the movement control of the thrown preset storage object 6008 and the action control settings related to the automatic control of the sub character 6005 having been released and appeared from the preset storage object 6008 are changed according to the combination of the sub character 6005 and the storage object 6007. This allows the player to obtain a pleasure of coming up with strategies about which sub character 6005 to be combined with which storage object 6007 and in what scene and in what manner the combination to be used.

In addition, the flight control settings and the action control settings are changed also depending on the main character 6003 as the player character 6004, the type of the game space where the game is played, the use of items, and others. As for the sub character 6005, in particular, the contents and abilities of the sub character 6005 in attacking the enemy character 6006 change in various manners, and thus the player's thought on strategies further deepens. Accordingly, the game becomes abundant in challenging elements without losing the player's interest.

Modification of First Embodiment

Next, a modification of the first embodiment will be described. The present modification of the first embodiment is implemented to be basically the same with the first embodiment, but is different from the first embodiment in that the user terminal 1500 performs the game management processing. Hereinafter, the differences from the first embodiment will be mainly described. Components that are the same as the counterparts in the first embodiment are denoted with the same reference numerals, and the description thereof will be omitted.

In the present modification, the game management section 6210 is omitted from the functional configuration of the server system 1100 in the first embodiment.

Figure 27:
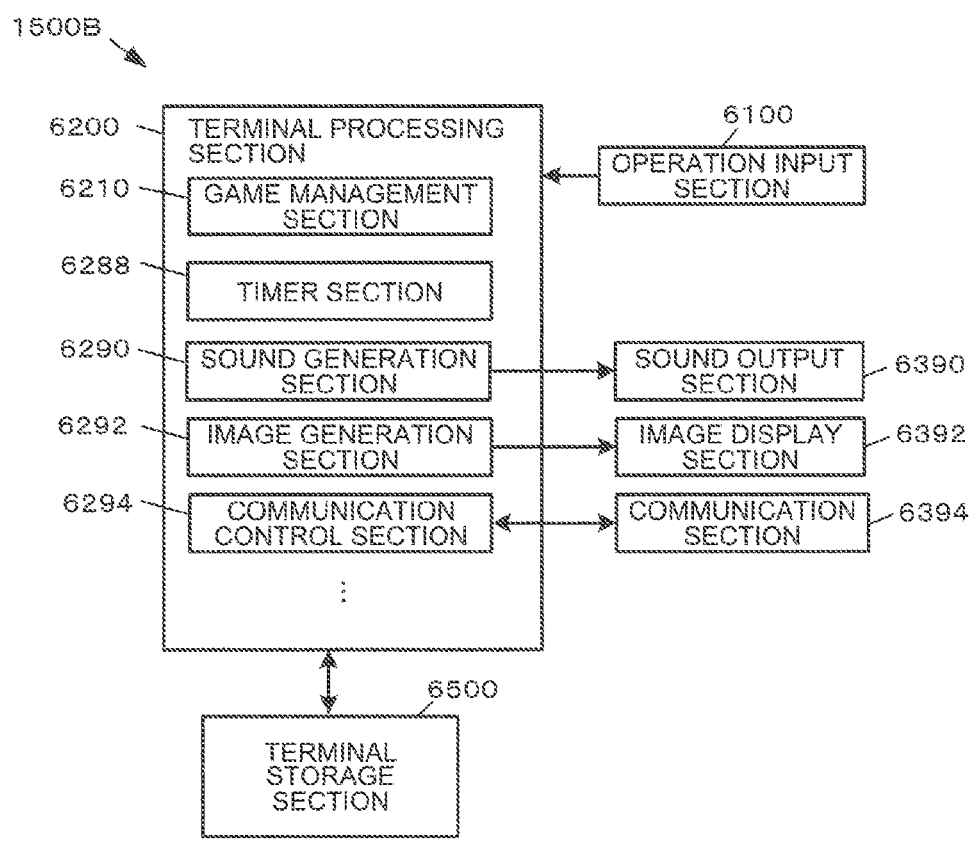
FIG. 27 is a functional block diagram illustrating an example of a functional configuration of a user terminal according to a modification of the first embodiment.

FIG. 27 is a functional block diagram illustrating a functional configuration example of a user terminal 1500B according to the present modification. The user terminal 1500B according to the present modification does not have the user terminal calculation section 6280 but has the game management section 6210 and an image generation section 6292 instead. The user terminal 1500B is a device that can be said to be a game device.

The image generation section 6292 generates data for displaying a game screen on the image display section 6392 and outputs an image signal to the image display section 6392.

That is, in the present modification, the user terminal 1500B executes calculation processes related to the game management by itself to control the progress of the game, generate game screen images, and control sound reproduction. However, the use of online shopping, the login/logout of a registered user, and the management of the play history, and the like are performed in the same manner as in the first embodiment. However, the foregoing matter is not applied when the user terminal 1500B functions as a standalone game machine, that is, the battle game is implemented as a non-online game.

Figure 28:
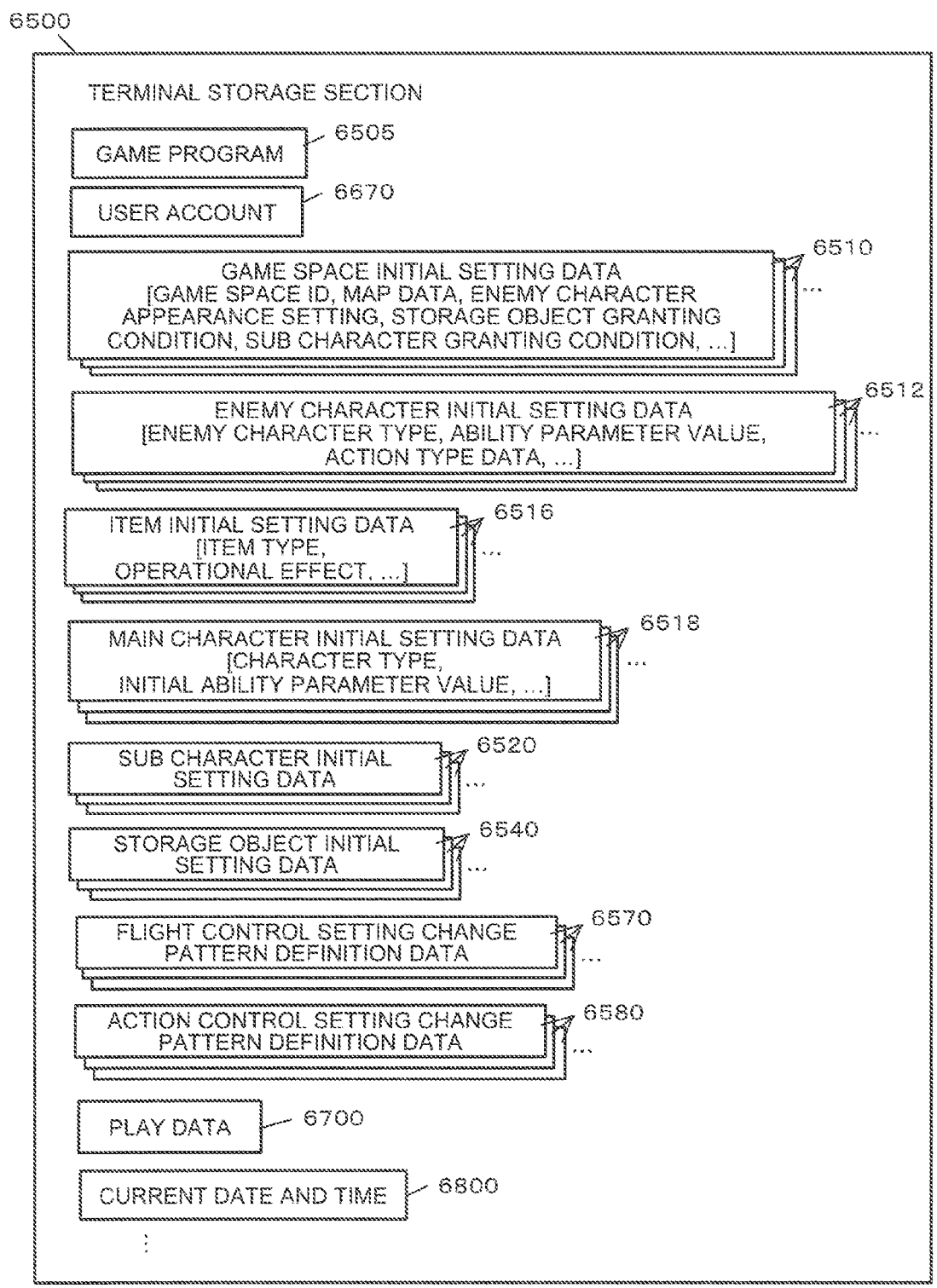
FIG. 28 is a diagram illustrating an example of programs and data stored in a server storage section according to the modification of the first embodiment.

FIG. 28 is a diagram illustrating an example of programs and data stored in a terminal storage section 6500 of the user terminal 1500B according to the present modification. The terminal storage section 6500 in the present modification stores a game program 6505. The game program 6505 is a program for causing a terminal processing section 6200 to implement the functions of the game management section 6210. The original of the program may be stored as distributed game program in the server system 1100 and downloaded as appropriate.

The terminal storage section 6500 according to the present modification stores game space initial setting data 6510, enemy character initial setting data 6512, item initial setting data 6516, main character initial setting data 6518, sub character initial setting data 6520, storage object initial setting data 6540, flight control setting change pattern definition data 6570, and action control setting change pattern definition data 6580 when the game management section 6210 is processed on the user terminal 1500B. The originals of these data may be stored in the server system 1100 according to the present modification and downloaded as appropriate. In addition, as data to be sequentially created and updated, play data 6700 is stored.

The flow of the process executed on the user terminal 1500B in the present modification is basically the same as that executed on the server system 1100 in the first embodiment (see FIGS. 24 and 25). Accordingly, when the game management section 6210 is implemented by the user terminal 1500B, it can be interpreted as appropriate that the steps are executed by the user terminal 1500B.

In the case of executing a process in which the user management data 6600 needs to be referred to or changed on the user terminal 1500B, a request for the provision, collation, or the like of necessary data is made as appropriate to the server system 1100. Otherwise, a request for the process itself is made to the server system 1100.

If the user terminal 1500B functions as a standalone game machine, that is, if a battle game is implemented as a non-online game, the user management data 6600 can be stored in the terminal storage section 6500 in the configuration in which the user management data 6600 is managed in the user terminal 1500B.

According to the present modification, it is possible to obtain the same advantageous effects as those in the first embodiment.

[Other Modifications]

[First Modification] For example, in the first embodiment, an online game is implemented in a client-server computer system. Alternatively, an online game may be implemented in a computer system in which a plurality of user terminals 1500 (or user terminals 1500B) that can also be said to be game devices are connected in a peer-to-peer fashion. In this case, some of the user terminals 1500 may be made to implement the functions as the server system 1100 in the first embodiment. Alternatively, the plurality of user terminals 1500 may cooperate to implement the functions of the game management section 6210.

[Second Modification]

The game genre is battle game in the first embodiment. However, the game genre may be any other game as far as the sub character 6005 is used.

[Third Modification]

The flight control settings and the action control settings may be changed not only in contents advantageous to the player as described above but also in contents disadvantageous to the player.

[Fourth Modification]

In the first embodiment, the change of the action patterns of the sub character 6005 is made by changing the initial parameter value related to the action control based on the action control setting change pattern definition data 6580 (see FIG. 19), for example. However, the change is not limited to this. For example, a plurality of patterns for the initial action type definition data 6534 (see FIG. 16) may be prepared so that the change can be made by specifying any of the patterns in the action control setting change pattern definition data 6580.

Second Embodiment

The game according to a second embodiment is an online battle game at which the player operates a player character as a main character while using a sub character as a friend NPC to fight a game with an enemy character on a game stage.

Figure 29:
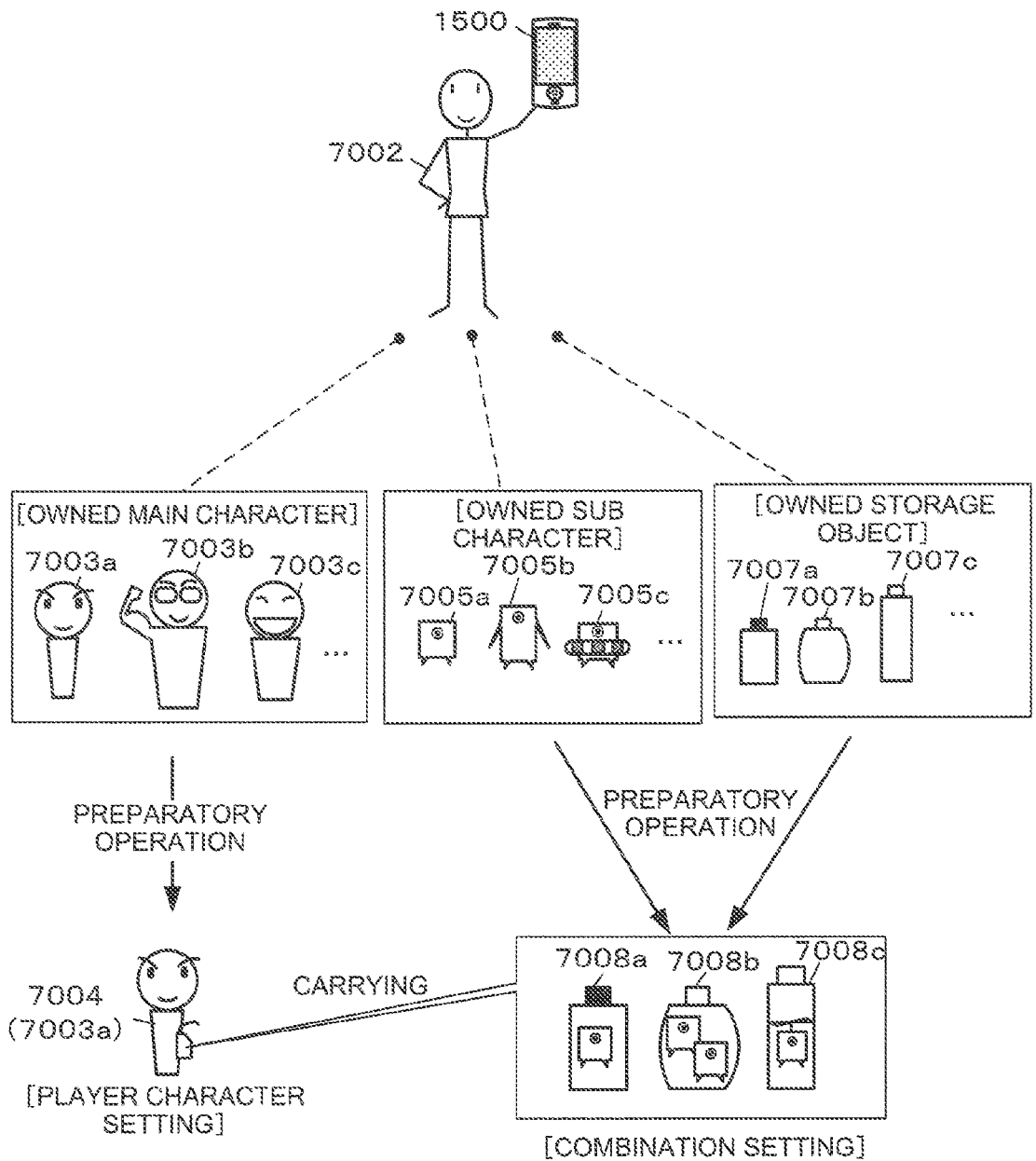
FIG. 29 is a diagram illustrating preparatory operations for playing a game according to a second embodiment.

FIG. 29 is a diagram illustrating preparatory operations for playing a game according to the second embodiment. First, as a premise of the game, a player 7002 can own a main character 7003 (7003*a*, 7003*b*, . . . ), a sub character 7005 (7005*a*, 7005*b*, . . . ), and a storage object 7007 (7007*a*, 7007*b*, . . . ) as game media. The ownership here means having the right to use the game media at the game.

The main character 7003 is a character that is a candidate for a player character existing in a game field as a representative of the player 7002. The main character can also be said to be a candidate for an avatar character.

The sub character 7005 is a non-playable character (NPC, a character automatically controlled by a computer) friendly to the player character.

The storage object 7007 is an object that can store the sub character 7005. For example, the storage here means virtual storage at the game. In the second embodiment, the storage object 7007 is an object that can store the sub character 7005 in a virtually reduced size and can release again the stored sub character. The storage object 7007 is represented in a form of bottle, capsule, box, bag, or the like.

The main character 7003 (7003*a*, 7003*b*, . . . ), the sub character 7005 (7005*a*, 7005*b*, . . . ), and the storage object 7007 (7007*a*, 7007*b*, . . . ) are prepared in pluralities of types. The player 7002 obtains and owns one or more of them prior to the gameplay. These characters and objects are given in advance by initial setting and can also be bought from online shopping, for example. These characters and objects can also be acquired when the player runs into an acquisition situation in the progress of the game. The player 7002 makes several preparatory operations for the gameplay.

The preparatory operations according to a second embodiment includes an operation of selecting a game stage where the game is to be played and an operation of selecting the player character 7004 from the main characters 7003 (7003*a*, 7003*b*, . . . ) owned by the player 7002. The preparatory operations also include an operation of setting a combination of the storage object 7007 to be used and the sub character 7005 to be stored in the storage object 7007.

When the storage object 7007 and the sub character 7005 are combined, the sub character 7005 is regarded as being stored in the storage object 7007. This is called a preset storage object 7008. The preset storage object 7008 is regarded as being owned and carried by the player character 7004 (in the example of FIG. 29, the main character 7003*a*). For example, the player character 7004 is regarded as carrying the object in a pocket or bag, for example. That is, the player 7002 can combine the storage object 7007 with the main character 7003 (7003*a*, 7003*b*, . . . ) owned by himself or herself.

When the storage object 7007 and the sub character 7005 are combined together, each of the storage object 7007 and the sub character 7005 is made incapable of another combination, so that duplicated combination is not allowed. However, depending on the type of the storage object 7007, a plurality of sub characters 7005 can be stored at the same time. In this case, the storage object 7007 is not made incapable of another combination until the upper limit of number of storable sub characters is reached.

Figure 30:
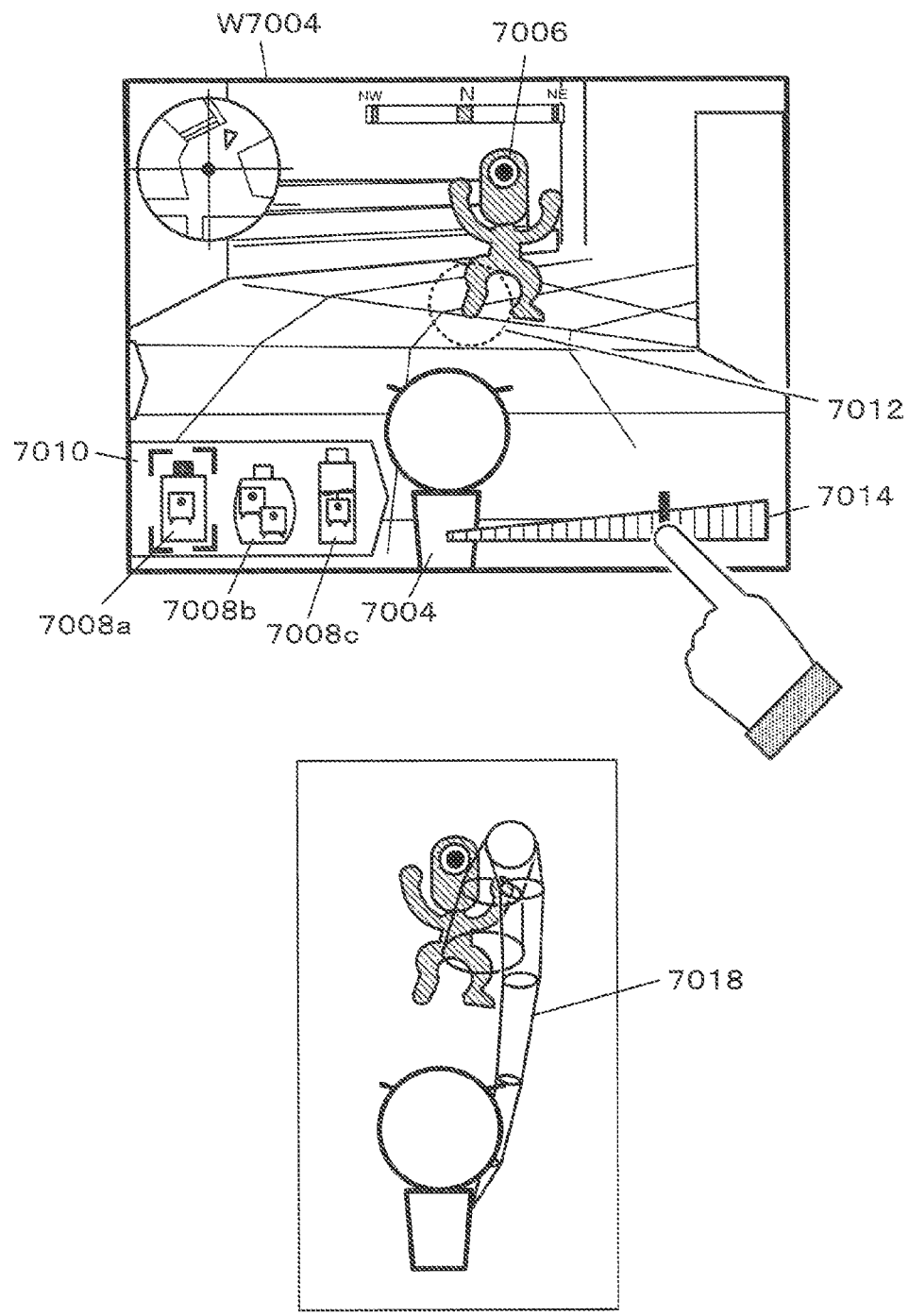
FIG. 30 is a diagram illustrating an example of display of a game screen according to the second embodiment.

When the gameplay is started, the user terminal 1500 displays a game screen W7004 as illustrated in the upper side of FIG. 30. The game screen W7004 according to the second embodiment is based on an image obtained by photographing a game stage structured in a virtual three-dimensional space in an obliquely upward direction from behind the player character 7004 to be used.

The player 7002 operates the player character 7004 to move in the game stage. When encountering an enemy character 7006, the player character 7004 fights a battle with the enemy character 7006. In the second embodiment, the enemy character 7006 is an NPC. However, in the case of a battle game at which players fight a battle, the enemy character 7006 is the player character or the sub character of the opposition player.

The attack on the enemy character 7006 can be an attack by the player character 7004 or an attack using the sub character 7005.

Figure 31:
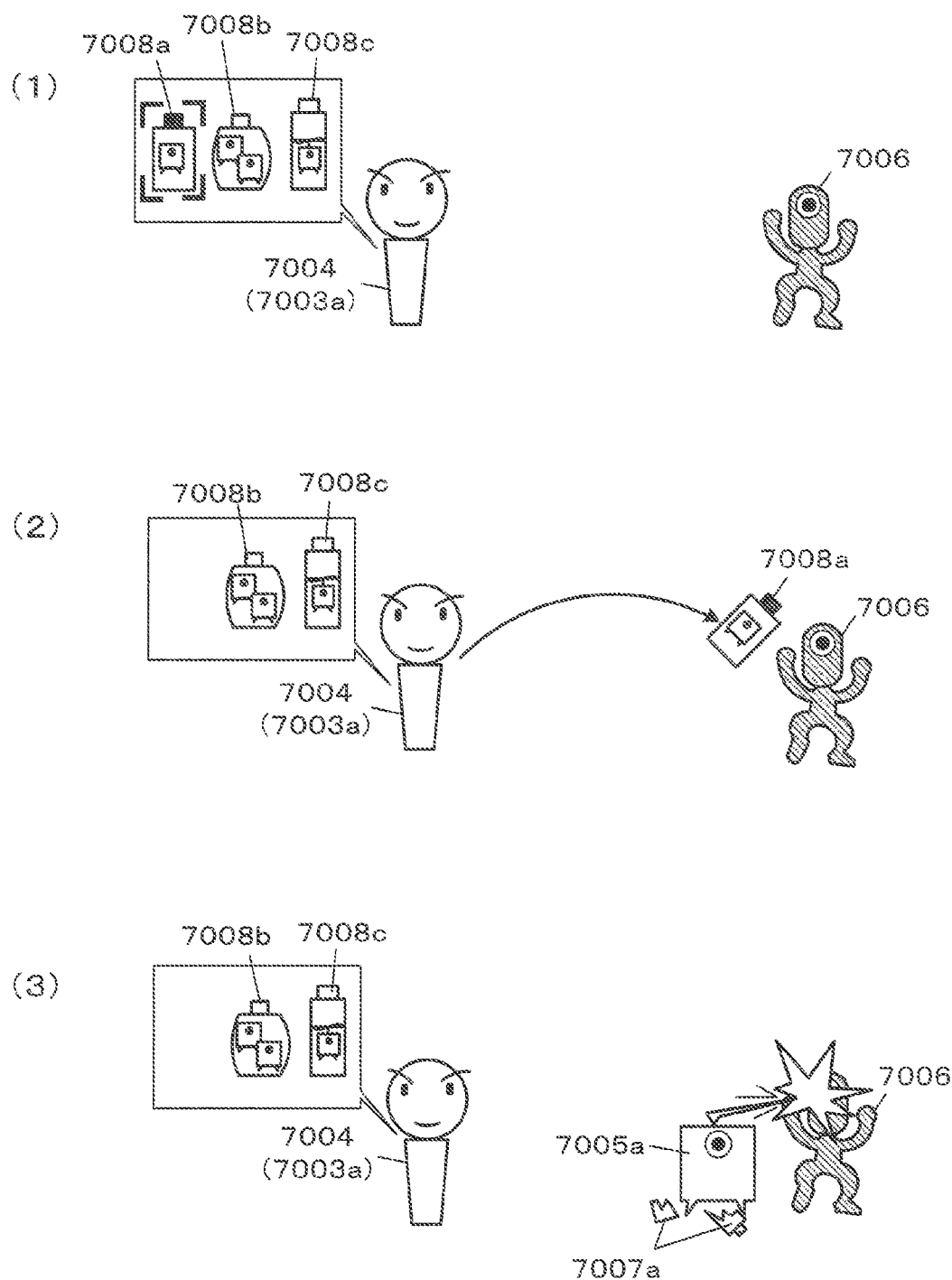
FIG. 31 is an overview of an attack using a sub character according to the second embodiment.

FIG. 31 is an overview of an attack using the sub character 7005. The object appearing at the game can be moved such as being flown, rolled, run, slid, or the like by throwing, striking, launching, casting a spell, activating a skill, or the actions of the player character 7004 similar to these actions. In the following description, the movement of "flying" is taken as a representative. Note that any other movement is possible.

The attack using the sub character 7005 is implemented by a) throwing and flying the preset storage object 7008 by the player character 7004, b) hitting the enemy character 7006 or a background object in the game field with the preset storage object 7008, c) causing the stored sub character 7005 to appear, and d) the sub character 7005 having appeared performs an attack action.

Specifically, as illustrated in FIG. 31(1), the player 7002 first performs a predetermined pre-flight operation. In the pre-flight operation, a preset storage object list 7010 is displayed on the game screen W7004 (see FIG. 30) such that the preset storage objects 7008 are selectably listed. The player 7002 selects the preset storage object 7008 to be thrown from the list. In the example of FIG. 31(1), a preset storage object 7008a is selected.

When the player 7002 performs an action operation, the player character 7004 throws the selected preset storage object 7008 as illustrated in FIG. 31(2). In the second embodiment, the action used by the preset storage object 7008 is "throwing". However, in the case where the player character 7004 is a robot or the like, the action used may be "launch" (or "emission" or "release") of the preset storage object 7008 or the like.

The direction of throwing is the front direction of the player character 7004. A throwing direction marker 7012 is displayed on the game screen W7004 (see the upper side of FIG. 30). The player can make an adjustment such that the marker is oriented to the direction to be thrown. In addition, a throwing force input bar 7014 is displayed on the game screen W7004 so that the player touches the bar to input the throwing force.

The "action operation" here includes operations that are detectable by on/off state such as operating a predetermined button switch or touching a predetermined operation icon, and operations that relate to input operations and of which an input is detected and determined by the amount of detection such as a flick by one or more fingers and a slide on the touch panel, and shaking the user terminal 1500 or a game controller.

Therefore, methods for inputting the throwing direction and the throwing force are not limited to the examples described above. For example, the input may be made by a swipe operation on the touch panel 1506. Specifically, the direction of the swipe may be regarded as the throwing direction, and the distance and speed of the swipe be regarded as an input of the throwing force. In a configuration in which an accelerometer is mounted in the user terminal 1500 or a game controller section separable from the user terminal 1500, the throwing force may be input by holding and shaking the user terminal 1500 or the game controller section by hand.

When the throwing direction and the throwing force are input, the route in which the thrown preset storage object 7008 is to fly (flying route: moving route) and a flying destination to be reached are determined. The flying route and the flying destination (moving destination) can be determined by physical computing or quasi-physical computing, selection from a plurality of types of prepared flying routes.

When the throwing force is input, specifications for the direction and force for throwing are determined. Thus, the predicted trajectory to be followed by the preset storage object 7008 to be thrown and the predicted flying destination are represented by the prediction display object 7018 in the game screen and notified to the player (see the lower side of FIG. 30).

The "predicted trajectory" here can include the flying route and the error range that can be set based on the specifications at that point in time. Similarly, the "predicted flying destination" can include the flying destination and the error range that can be set based on the specifications at that point in time.

The player 7002 sees the prediction display to consider whether the object can fly in the intended course and to the intended place. The throwing direction and the throwing force can be adjusted by changing the front side of the player character 7004 and touching again the throwing force input bar 7014.

When the prediction display is as aimed, the player 7002 inputs a predetermined action operation to cause the player character 7004 to throw the selected preset storage object 7008.

The thrown preset storage object 7008 is released from the player character 7004, and is controlled in movement to fly along the flying route to the flying destination until a given flight end condition is satisfied.

The "flight end condition" is settable as appropriate. In the second embodiment, the flight end condition is a collision between the preset storage object 7008 and another object. Accordingly, a display effect is produced such that the thrown preset storage object 7008 finally hits the enemy character 7006, or hits a background object, or hits another object and stops flying, and then the storage object is arranged or is broken at a stop position.

For the preset storage object 7008, when a given release condition is satisfied, the sub character 7005 stored in the preset storage object is released and appears in the game stage, and starts to act as the sub character 7005 as illustrated in FIG. 31(3).

The "release condition" is settable as appropriate. In the second embodiment, however, the release condition includes satisfying at least the flight end condition. In addition, the condition that the time elapsed from the start of flying has reached a predetermined time, the condition that the storage object has approached the enemy character 7006, and the condition that the storage object has received an attack from the enemy character 7006 can be appropriately set as AND condition and OR condition.

The sub character 7005 having been released and appeared from the preset storage object 7008 is automatically controlled. FIG. 31 illustrates an example related to the attack on the enemy character 7006. However, automatic action controls other than the attack control such as a control to defend the friend character, a control to restore the body strength value of the friend character, a control to block the action of the enemy character 7006, and others may be enabled and may be selected and executed on a priority basis depending on the type of the sub character 7005. Otherwise, the player 7002 may be allowed to select and set any of a plurality of automatic actions.

The preset storage object 7008 having satisfied the release condition cannot be used again in the current gameplay but becomes usable again in the next gameplay. During the gameplay, the preset storage object 7008 may be allowed to become reusable after a lapse of a predetermined time after the use.

In order to enhance the attraction of the game in the battle game using the sub character 7005, in the second embodiment, at least one of control parameter values related to the flying of the preset storage object 7008 (hereinafter, called "flight control parameter values") and control parameter values related to the action of the stored sub character 7005 after appearance (hereinafter, called "action control parameter values") can be changed depending on a combination of the sub character 7005 and the storage object 7007.

The "flight control parameter values" are preset values of parameters related to the movement control of the preset storage object 7008 after throwing and launching. For example, the parameters can include weight-equivalent parameter value, flying route type, flyable distance (corresponding to flying range), flying height, flying speed, errors in the flying route and flying destination, the number of permissible bounds due to the collision with another object, the presence or absence of adhesion to another object having first collided, and others. Note that parameters other than the foregoing ones can be appropriately set as control parameters related to flying. At the change of the flight control parameter values, at least one of the flight control parameter values is changed.

The flying route type can also be said to be a determined pattern of the flying route. For example, as the flying route type, a physical computed (or a quasi-physical computed) route, a linear-motion route, an automatic flying route following the locked-on enemy character 7006, and others can be set. Further, detailed types such as flying with a predetermined number of times an obstacle is to be avoided, flying with a permission of passing by an obstacle (virtual penetration), and others can be added to each of the flying route types described above.

The "action control parameter values" can include hit point (that is decreased with damage, and the action is disabled with a value of 0), fighting strength, defensive strength, traveling force, resilience, enemy-search range, action pattern, and limitations on movement (for example, the type of terrain in which movement is enabled, the type of terrain in which movement is disabled), and weight-equivalent parameter value, and others.

The "action pattern" refers to a pattern in which the sub character 7005 after appearance takes an action. For example, enemy-searching+making an attack, an action of restoring the body strength value of the friend character, an action of obstructing the path of the enemy character 7006, and others can be set. Note that other action patterns can be set as appropriate.

In the second embodiment, at least one of the degree of advancement of the storage object 7007 and the degree of advancement of the sub character 7005 can be included in the factors for changing the flight control parameter values and the action control parameter values.

The "degrees of advancement" here refer to the degrees of growth of the storage object 7007 and the sub character 7005. Depending on the game rules and the character settings of the sub character 7005 in the game world, the degree of advancement is synonymous to growth, reinforcement, evolution, improvement, modification, and others. In the second embodiment, the degree of advancement will be comprehensively called "growth".

Specifically, the game rule is set up such that, when used in the gameplay, the sub character 7005 and the storage object 7007 are given experience values according to performance in the gameplay, the experience values are accumulated, and the sub character 7005 and the storage object 7007 are grown and improved in ability according to the accumulated experience values. The degrees of growth are represented as storage object level and character level. When the combinations of the sub character 7005 and the storage object 7007 are the same in type but are different in character level and storage object level, the flight control parameter values and the action control parameter values are different.

Further, in the second embodiment, the flight control parameter values and the action control parameter values can be changed also based on the type of the player character 7004 used, the operations and effects of items used for the sub character 7005 (sub character items), and the operations and effects of items used for the storage object 7007 (storage object items).

Specific examples of changes of the flight control parameter values and the action control parameter values will be described.

FIG. 32 is a diagram illustrating an example of changes in the flight control parameter values.

FIG. 32(1) illustrates an example of flyable distance, flying height, and flying route of a preset storage object 7008 in which the sub character 7005*a* and the storage object 7007*a* are combined.

FIG. 32(2) illustrates an example in which the storage object 7007*a* is replaced with the storage object 7007*c* in the combination illustrated in FIG. 32(1) to relatively extend the flyable distance (corresponding to flying range).

The storage object 7007*c* is set to be "lighter" than the storage object 7007*a* on the game. To cause the sub character 7005*a* to appear farther, the player 7002 can combine the sub character 7005*a* with the storage object 7007*c* "lighter" than the storage object 7007*a*.

FIG. 32(3) illustrates an example in which the sub character 7005*a* is replaced with the sub character 7005*b* in the combination illustrated in FIG. 32(1) to relatively extend the flyable distance.

The sub character 7005*c* is set to be "lighter" than the sub character 7005*a* on the game. To cause some sub character to appear farther although the unused storage object owned by the player 7002 is only the storage object 7007*a*, the player 7002 can combine the storage object 7007*a* with the sub character 7005*b* "lighter" than the sub character 7005*a*.

FIG. 32(4) illustrates an example in which the combination illustrated in FIG. 32(1) remains unchanged but a sub character item 7021 to improve the flying ability of the sub character 7005 is used to relatively extend the flyable distance, and a lock-on operation (an operation of specifying the flying target) is performed at the time of a throwing operation to change the type of the flying route and follow the locked-on enemy character 7006. There is no particular limitation on the method for lock-on operation. For example, the player may select one of the enemy characters 7006 existing in a predetermined peripheral range of a throwing direction marker 7012 of the player character 7004.

The enemy character 7006 as a flying target is identifiably displayed with a lock-on marker 7019 in the game screen.

The operation and effect of the sub character item 7021 that is set to the sub character 7005*a* (also said to be "associated" or "used") as illustrated in FIG. 32(4) is to be "weight reduction" or extension of the flyable distance" on the game. Even in the combination of the sub character 7005*a* and the storage object 7007*a*, the use of the item adjusts and reduces the weight-equivalent parameter value of at least one of the storage object 7007 and the sub character 7005 so that the change control of the flight control is performed based on the reduced value to extend the flyable distance.

FIG. 33 is a diagram illustrating other examples of changes in the flight control parameter values.

Referring to FIGS. 33(1) and 33(2), the combinations of the sub character 7005 and the storage object 7007 are the same in type but the former is higher in object level than the latter. In these examples, the flyable distance is extended and the flight control parameter values are changed such that an error 7020 related to flight is smaller in the latter combination.

In other words, the combination of the storage object 7007 and the sub character 7005 stored in the storage object 7007 illustrated in FIG. 33(2) satisfies a given weight-reduction condition (in this case, for example, the degree of advancement of the storage object 7007*a* has reached a predetermined standard value "Lv.5" or the like), and thus the weight-equivalent parameter value of at least one of the storage object 7007 and the sub character 7005 is adjusted and reduced, and the change control of the flight control is performed based on the reduced value to extend the flyable distance.

The "error" here corresponds to variations in the flyable distance and the flying destination. Specifically, random fluctuations are given to the flying route and the flying destination determined from the throwing direction and the throwing force in the range of the error 7020.

When the type of the flying route is set to "automatic flight following the locked-on enemy character 7006", the "error" here is synonymous to the "hit rate" to the flying target. Even if the lock-on operation is not performed, the throwing operation is performed toward the decided target at the flying destination, and thus the "error" can also be said to be the "hit rate" indicating whether the flying target is reached. Favorably, a predetermined item having the effect of "improving the hit rate" is prepared so that the player 7002 can use the item to reduce the error (synonymous to improvement of the hit rate).

FIG. 33(3) illustrates an example in which a storage object item 7022*w* to increase the flying altitude (height) of the storage object 7007 is set and used in the combination illustrated in FIG. 33(2) to change the flight control parameter values.

In this example, the throwing height can be improved so that the preset storage object 7008 can be thrown to the far side of an obstacle 7024.

FIG. 33(4) illustrates an example in which the combination of the sub character 7005 and the storage object 7007 is the same as that illustrated in FIG. 33(1) but the main character 7003*b* higher in throwing ability than the main character 7003*a* is selected as the player character 7004 to improve the throwing height with the error 7020 unchanged.

FIG. 34 is a diagram illustrating an example of changes in the action control parameter values.

Comparing the example illustrated in FIG. 34(1) with the example illustrated in FIG. 34(2), the combinations of the sub character 7005 and the storage object 7007 as the preset storage object 7008 to be thrown are the same but are different in the degree of growth of the sub character 7005, and the action control parameter values are changed such that the latter has an enemy-search range 7026 wider than that of the former and the latter is more increased in fighting strength than the former.

Comparing the example illustrated in FIG. 34(2) with the example illustrated in FIG. 34(3), the degrees of growth of the sub character 7005 and the storage object 7007 are the same but the type of the combined storage object 7007 is different. The action control parameter values are changed such that a storage object 7007*h* illustrated in FIG. 34(3) is more increased in fighting strength than the storage object 7007*a* illustrated in FIG. 34(2).

FIG. 35 is a diagram illustrating other examples of changes in the action control parameter values.

One of the action control parameters is a setting of limitations related to movement on whether movement beyond the obstacle 7024 is enabled. As illustrated in FIG. 35(1), the settings of limitations on the movement of the sub character 7005*a* (armless character) include the obstacle 7024. Therefore, to attack the enemy character 7006, the sub character 7005*a* needs to move bypassing the obstacle 7024.

On the other hand, as illustrated in FIG. 35(2), the settings of limitations on the movement of the sub character 7005*b* (arm-owned character) do not include the obstacle 7024. Therefore, to attack the enemy character 7006, the sub character 7005*b* can climb and overcome the obstacle 7024 and start attacking earlier than the sub character 7005*a*.

As illustrated in FIG. 35(3), even in the same combination of the sub character 7005 and the storage object 7007 as that illustrated in FIG. 35(1), the use of some item makes it possible to add the ability of the sub character 7005*b* to the sub character 7005*a*. For example, when a storage object item 7022*r* acting like a ladder is set to be used for the storage object 7007, the action control parameter values are changed such that the obstacle 7024 is not included in the settings of limitations on the movement of the sub character 7005*a*. Accordingly, the sub character 7005*a* can overcome the obstacle 7024 and start attacking in a short time like the sub character 7005*b* illustrated in FIG. 35(2).

The storage object items 7022 (7022*w*, 7022*r*) and others are favorably represented in the game as items to be attached to the storage object 7007. For example, the storage object items can be represented as strap, cover, holder, seal, replacement cap, cap cover, or the like, attached to the storage object 7007.

In this manner, making mandatory the combination of the sub character 7005 with the storage object 7007 for the use of the sub character 7005 in the game and changing the flight control parameter values and the action control parameter values according to the combination provide much diversity to the game situation than in the configuration in which the sub character 7005 to be used in the game is simply picked up and a deck is selected such that the sub character 7005 is caused to appear in the game at a desired timing. This increases a strategic element of thought on the combination of the sub character 7005 and the storage object 7007 in hand, thereby producing a new attraction.

Further, the flight control parameter values and the action control parameter values can be changed also according to the selection of the main character 7003 as the player character 7004 and the use of the items, which makes it possible to implement the control of appearance of the sub character 7005 in the game stage by throwing of the preset storage object 7008 and diversify the abilities and patterns of action of the sub character 7005 after appearance.

In the second embodiment, the preset storage object 7008 can be prepared even during the gameplay, which produces non-conventional amusement in the game because the player can play the game under flexible strategies according to the course of the battle of the moment without limitation on the deck formed before the gameplay.

The flight control parameter values and the action control parameter values may be changed not only in contents advantageous to the player as described above but also in contents disadvantageous to the player.

[Functional Configuration]

Figure 36:
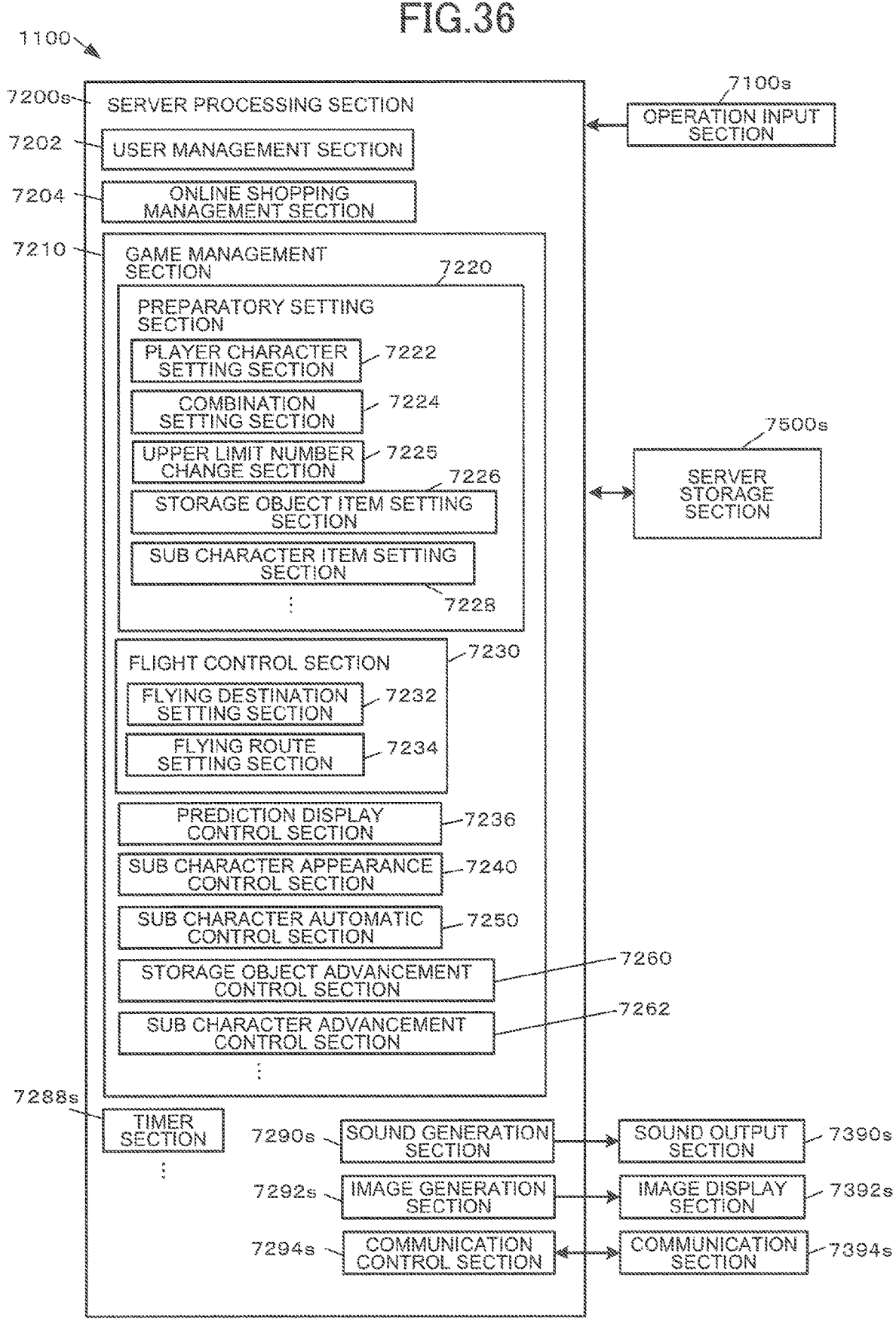
FIG. 36 is a functional block diagram illustrating an example of a functional configuration of a server system according to the second embodiment.

FIG. 36 is a functional block diagram illustrating an example of a functional configuration of the server system 1100 according to the second embodiment. The server system 1100 according to the second embodiment includes an operation input section 7100s, a server processing section 7200s, a sound output section 7390s, an image display section 7392s, a communication section 7394s, and a server storage section 7500s.

The operation input section 7100s is for inputting various operations for server management. The operation input section 7100s corresponds to the keyboard 1106 in FIG. 1.

The server processing section 7200s is implemented with electronic parts such as a microprocessor (e.g., a CPU and a GPU), an ASIC, or an IC memory. The server processing section 7200s controls data exchanged between functional sections including the operation input section 7100s and the server storage section 7500s. In addition, the server processing section 7200s performs various calculation processes based on predetermined programs, data, the operation input signal from the operation input section 7100s, data revived from the user terminal 1500, and the like, thereby to entirely control the operation of the server system 1100.

The server processing section 7200s according to the second embodiment includes a user management section 7202, an online shopping management section 7204, a game management section 7210, a timer section 7288s, a sound generation section 7290s, an image generation section 7292s, and a communication control section 7294s. Note that functional sections other than these may be included as appropriate.

The user management section 7202 performs a process related to a user registration procedure and manages the data of each user associated with the user account. In the second embodiment, the user management section 7202 has various functions including: 1) issuing a unique user account to a registered user; 2) registration information management for registering and managing personal information for each user account; 3) book keeping management for an electronic payment medium consumed for paying for a charged element (online shopping and play cost in the second embodiment); 4) play history management for managing the history of login and logout in gameplay; and 5) management of game save data. Note that any other appropriate management function for other data associated with the account can be included.

The online shopping management section 7204 is in charge of control related to online shopping, which can be implemented with a known online shopping technique as appropriate. In the second embodiment, the player can purchase the main character 7003, the sub character 7005, the storage object 7007, and items in online shopping. Any other elements may be set as appropriate to be sold in the online shopping.

The game management section 7210 performs various processes related to game play management. The game according to the second embodiment is a client-server online game, and thus the game management section 7210 according to the second embodiment communicates with the user terminal 1500 to perform a control for providing data required for the gameplay. The game management section 7210 in the second embodiment has a preparatory setting section 7220, a flight control section 7230, a prediction display control section 7236, a sub character appearance control section 7240, a sub character automatic control section 7250, a storage object advancement control section 7260, and a sub character advancement control section 7262. Note that functional sections other than these may be included as appropriate.

The preparatory setting section 7220 performs a control to set a storage object 7007 that is capable of storing a non-playable character (NPC) friendly to the player character and an NPC to be stored, based on the player's preparatory operation.

The preparatory setting section 7220 has a player character setting section 7222, a combination setting section 7224, an upper limit number change section 7225, a storage object item setting section 7226, and a sub character item setting section 7228.

The player character setting section 7222 selects and sets the player character 7004 to own the storage object from among the plurality of main characters 7003 based on the player's preparatory operation.

The combination setting section 7224 selects the storage object 7007 and the sub character 7005 from the unused storage objects 7007 and the unused sub characters 7005 owned by the player 7002 and sets the combination. By setting the combination, the sub character 7005 is stored in the storage object 7007.

The upper limit number change section 7225 can change the upper limit number of the sub characters that can be stored in the storage object 7007 according to the combination of the storage object 7007 and the sub character 7005.

The storage object item setting section 7226 associates the storage object with a given storage object item 7022 based on the player's operation input. The storage object item setting section 7226 can set the use of the storage object item 7022 for the storage object 7007 in the second embodiment.

The sub character item setting section 7228 associates the NPC with a given NPC item based on the player's operation input. The sub character item setting section 7228 can set the use of the sub character item 7021 for the sub character 7005 in the second embodiment.

Besides the functions described above, the preparatory setting section 7220 can set the game stage to be used in gameplay from among a plurality of game stages based on the player's operation input.

The flight control section 7230 performs a control to cause the storage object 7007 set by the preparatory setting section 7220 to fly until a given flight end condition (a condition to be satisfied for the end of the movement) is satisfied based on the player's action operation. In the control of flying, the flight control section 7230 performs a change control of the flight control based on the combination of the storage object and the sub character stored in the storage object. This control corresponds to the change of the flight control parameter values based on the combination of the storage object 7007 and the sub character 7005 combined as the preset storage object 7008 and the movement control of the preset storage object 7008 based on the changed flight control parameter values in the second embodiment.

Specifically, the flight control section 7230 can perform:

1) a flight control to cause the player character 7004 owning the preset storage object 7008 to fly the preset storage object and a change control of the flight control based on the player character 7004.

2) a change control of the flight control based on the combination of the player character 7004 owning the preset storage object 7008 and the preset storage object and/or the NPC stored in the preset storage object.

3) a change control of the flight control based on the game stage.

4) a change control of the flight control based on the combination of the parameter values of the storage object and the parameter values of the NPC stored in the storage object.

5) a change control of the flight control based on the storage object item associated with the storage object.

6) a change control of the flight control based on the weight-equivalent parameter values set to the storage object to be flown and/or the NPC stored in the storage object.

7) when the combination of the storage object and the NPC stored in the storage object satisfies a given reduction condition, reduce and adjust the weight-equivalent parameter values, and perform a change control of the flight control based on the values after the reduction and adjustment.

8) a change control of the flight control by variably controlling the flying range. 9) a change control of the flight control by variably controlling the hit rate to the flying target.

10) a change control of the flight control by variably controlling the flying route.

11) a change control of the flight control by performing a control on whether to follow the enemy character 7006.

The flight control section 7230 changes at least one of the action control parameter values of the sub character 7005 and the flight control parameter values of the storage object 7007 combined as the preset storage object 7008 to be thrown. Then, based on the control parameter values after the change, the flight control section 7230 determines the flying destination and the flying route to the destination according to the specifications of throwing at that time (the throwing direction, the throwing force, and others in the second embodiment). These constitute the predicted flying destination and predicted trajectory. Then, the flight control section 7230 determines the flying destination and the flying route based on the specifications at the point in time when the action operation is performed, and controls the preset storage object 7008 to fly to the flying destination along the determined flying route.

The prediction display control section 7236 performs a control to provide a prediction display indicating the predicted trajectory and/or the predicted flying destination by the flight control section 7230. This control corresponds to the display control of the prediction display object 7018 (see FIG. 30) in the second embodiment.

The sub character appearance control section 7240 performs a control to cause the NPC stored in the storage object to appear from the storage object satisfying the flight end condition. This control corresponds to the release/appearance control of the sub character 7005 in the second embodiment.

The sub character automatic control section 7250 automatically controls the NPC having been caused to appear by the sub character appearance control section 7240. This control corresponds to the automatic action control of the sub character 7005 in the second embodiment.

The storage object advancement control section 7260 changes the parameter values of the storage object by the advancement control of the storage object such as ability improvement, reinforcement, level increase, and the like.

The sub character advancement control section 7262 changes the parameter values of the NPC by the advancement control of the NPC such as ability improvement, reinforcement, and level increase.

The timer section 7288s uses a system clock to obtain the current date and time, a limited time period, and the like.

The sound generation section 7290s is implemented with an integrated circuit (IC) or by executing software that generates sound data and performs decoding, and generates or decodes sound data on operation sound and background music (BGM) related to system management for the server system 1100 and the gameplay. The resultant sound signal related to the system management is output to the sound output section 7390s.

The sound output section 7390s receives the sound signal to emit the corresponding sound. The sound output section 7390s corresponds to a speaker (not illustrated) of the main body device 1101 or the touch panel 1108 in the example illustrated in FIG. 1.

The image generation section 7292s can generate an image related to the system management for the server system 1100, a game image (or data for displaying the game image on the user terminal 1500), and the like. The image related to the system management can be output to the image display section 7392s.

The image display section 7392s displays various images for system management based on the image signals input from the image generation section 7292s. The image display section 7392s can be implemented with an image display device such as a flat panel display, a cathode ray tube (CRT), a projector, or a head-mounted display. The image display section 7392s corresponds to the touch panel 1108 in the example illustrated in FIG. 1.

The communication control section 7294s performs a data process related to the data communication, and exchanges data with an external device through the communication section 7394s.

The communication section 7394s connects to the network 9 to implement communications. The communication section 7394s is implemented with a transceiver, a modem, a terminal adapter (TA), a jack for a communication cable, a control circuit, and the like. The communication section 7394s corresponds to the communication device 1153 in the example illustrated in FIG. 1.

The server storage section 7500s stores a program and various types of data for implementing various functions of the server processing section 7200s for entirely controlling the server system 1100. The server storage section 7500s is used as a work area for the server processing section 7200s, and temporarily stores the results of calculations performed by the server processing section 7200s based on various programs. The functions of the server storage section 7500s are implemented with an IC memory (e.g., RAM and ROM), a magnetic disk (e.g., hard disk), an optical disk (e.g., CD-ROM and DVD), an online storage, or the like. The server storage section 7500s corresponds to a storage medium, such as the IC memory 1152 and hard disk mounted in the main body device 1101, and the storage 1140 in the example illustrated in FIG. 1.

Figure 37:
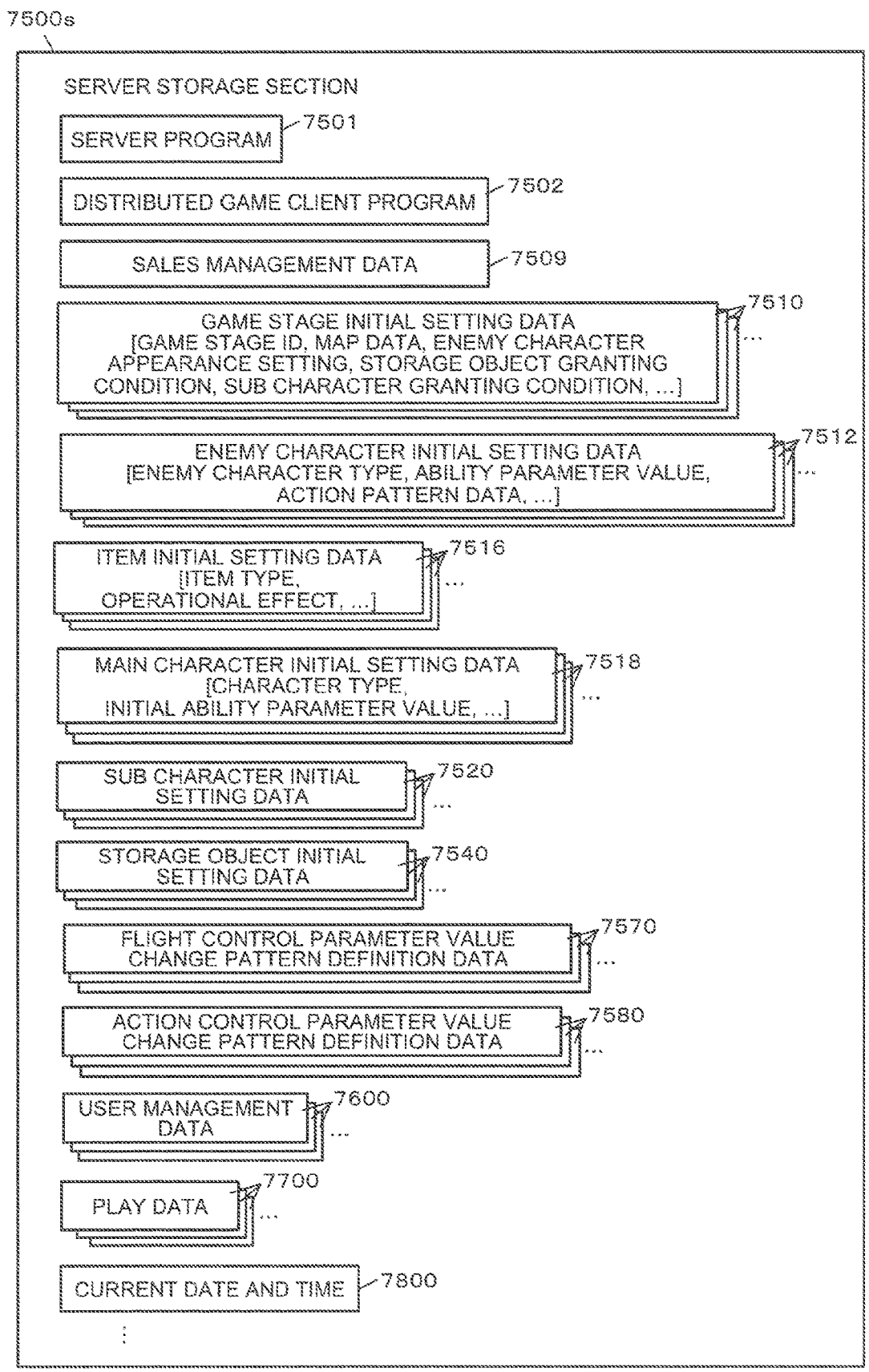
FIG. 37 is a diagram illustrating an example of programs and data stored in a server storage section according to the second embodiment.

FIG. 37 is a diagram illustrating an example of programs and data stored in the server storage section 7500s according to the second embodiment. The server storage section 7500s in the second embodiment stores a server program 7501, a distributed game client program 7502, sales management data 7509, game stage initial setting data 7510, enemy character initial setting data 7512, item initial setting data 7516, main character initial setting data 7518, sub character initial setting data 7520, storage object initial setting data 7540, flight control parameter value change pattern definition data 7570, and action control parameter value change pattern definition data 7580.

The server storage section 7500s also stores user management data 7600, play data 7700, and current date and time 7800 as data related to the game and generated and managed in sequence. The server storage section 7500s can also store other programs and data (for example, a timer, a counter, various flags, and others) as appropriate.

The server program 7501 is a program read and executed by the server processing section 7200s to implement the functions of the user management section 7202, the online shopping management section 7204, and the game management section 7210 (see FIG. 36).

The distributed game client program 7502 is an original of a game client program provided to the user terminal 1500.

The sales management data 7509 includes data for defining and managing sales products in online shopping. For example, purchasable items, stock quantities, and charge prices (equivalent to debit amounts from payment media in the second embodiment) are stored in association with one another.

The game stage initial setting data 7510 is prepared for each game stage, which includes various kinds of initial setting data related to the game stage. The one game stage initial setting data 7510 includes a game stage ID, map data, terrain type setting data in each position in a map, enemy character appearance settings, storage object granting conditions, sub character granting conditions, item granting conditions, and others.

The storage object granting conditions, the sub character granting conditions, and the item granting conditions define conditions to be satisfied to grant new storage objects, new sub characters, and new items to the player in the game stage.

The enemy character initial setting data 7512 is prepared for each type of enemy character, which includes various kinds of initial setting data related to the enemy character. For example, the one enemy character initial setting data 7512 includes an enemy character type, ability parameter value, and action type pattern data defining an action pattern. Note that data other than these can be included as appropriate.

The item initial setting data 7516 is prepared for each item, which includes various types of initial setting data related to the item. For example, the one item initial setting data 7516 includes an item type and operational effect definition data. The target of the operational effect is mainly the flight control parameters when the item is the storage object item 7022 (see FIG. 33). The item initial setting data 7516 defines which parameter in the flight control parameters to be the target of the operational effect and the degree of the change of the value by the operational effect. The item initial setting data 7516 can include not only the flight control parameters but also the action control parameters. Similarly, when the item is the sub character item 7021 (see FIG. 32), the item initial setting data 7516 mainly includes the action control parameters but can also include the flight control parameters.

The main character initial setting data 7518 is prepared for each type of the main character, which includes various types of initial setting data related to the main character. For example, the one main character initial setting data 7518 includes information such as a character type and an initial ability parameter value of the character. Note that the main character initial setting data 7518 also includes various types of data necessary for displaying the character on the game screen and causing the character to make an action (for example, model data, motion data, texture data, and others of the character).

Figure 38:
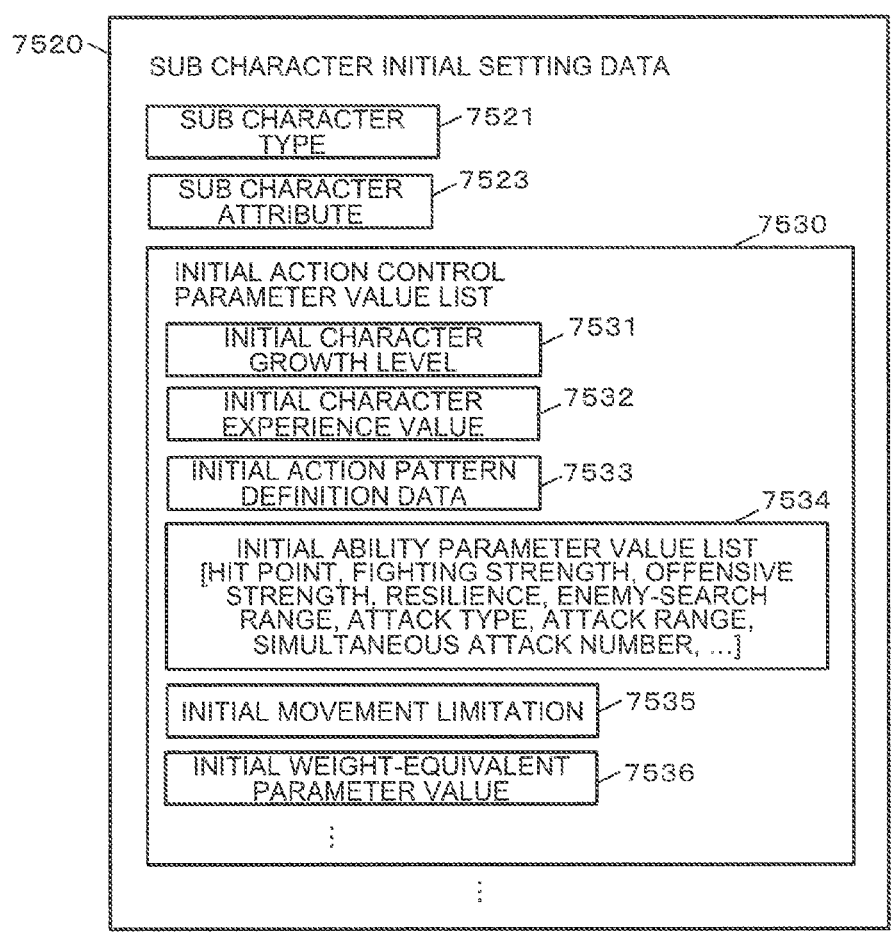
FIG. 38 is a diagram illustrating an example of a data structure of sub character initial setting data according to the second embodiment.

The sub character initial setting data 7520 is prepared for each type of the sub character, which includes various types of initial setting data related to the sub character. The one sub character initial setting data 7520 includes a sub character type 7521, a sub character attribute 7523, an initial action control parameter value list 7530, for example, as illustrated in FIG. 38. Note that the sub character initial setting data 7520 also includes various types of data necessary for displaying the character on the game screen and causing the character to make an action (for example, model data, motion data, texture data, and others of the character).

The initial action control parameter value list 7530 includes, for example, initial character advancement level 7531, initial character experience value 7532, initial action pattern definition data 7533 (data defining a pattern of initial automatic action control of the sub character), initial ability parameter value list 7534, initial movement limitation 7535, initial weight-equivalent parameter value 7536, and others. Note that data other than these can be included as appropriate.

Figure 39:
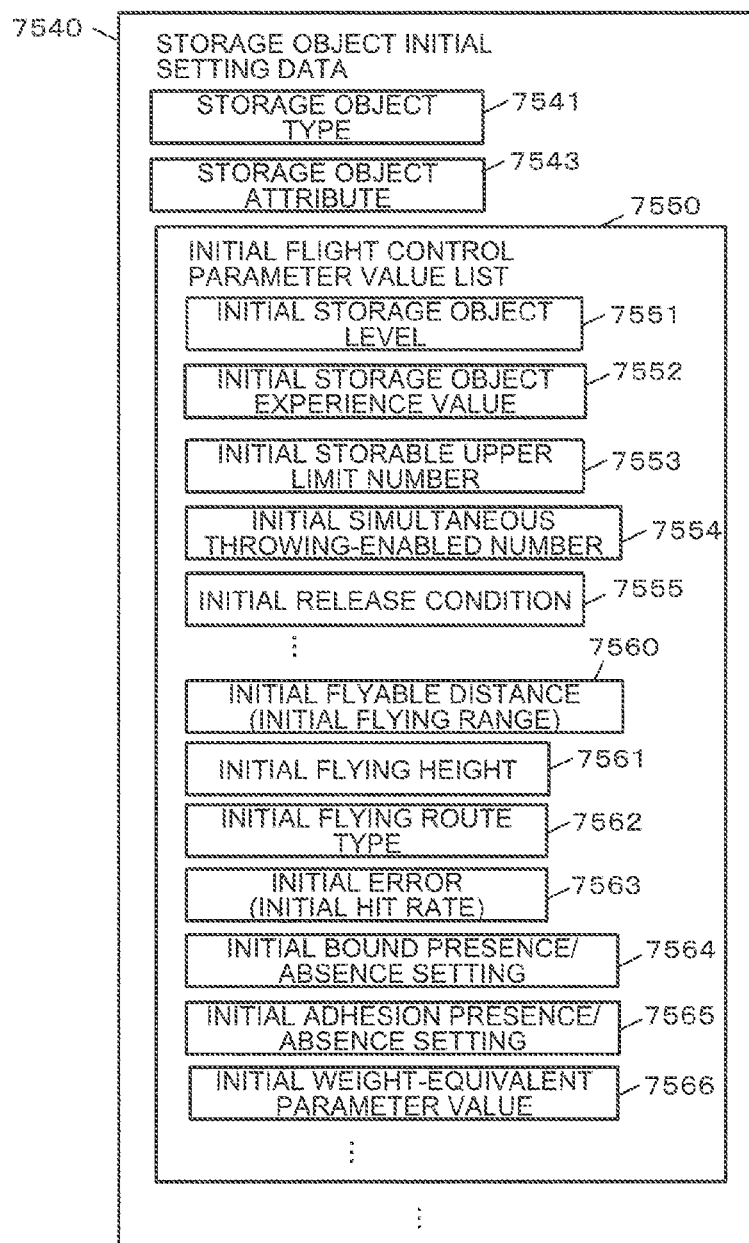
FIG. 39 is a diagram illustrating an example of a data structure of storage object initial setting data according to the second embodiment.

Referring back to FIG. 37, the storage object initial setting data 7540 is prepared for each type of storage object, which includes various types of initial setting data related to the storage object. The one storage object initial setting data 7540 includes a storage object type 7541, a storage object attribute 7543, and an initial flight control setting parameter value list 7550, for example, as illustrated in FIG. 39. Note that data other than these can be included as appropriate.

The initial flight control parameter value list 7550 includes an initial storage object level 7551, an initial storage object experience value 7552, an initial storable upper limit number 7553, an initial simultaneous throwing-enabled number 7554, an initial release condition 7555, an initial flyable distance 7560, an initial flying height 7561, an initial flying route type 7562, an initial error 7563, an initial bound presence/absence setting 7564, an initial adhesion presence/absence setting 7565, and an initial weight-equivalent parameter value 7566. Note that data other than these can be included as appropriate.

Figure 40:
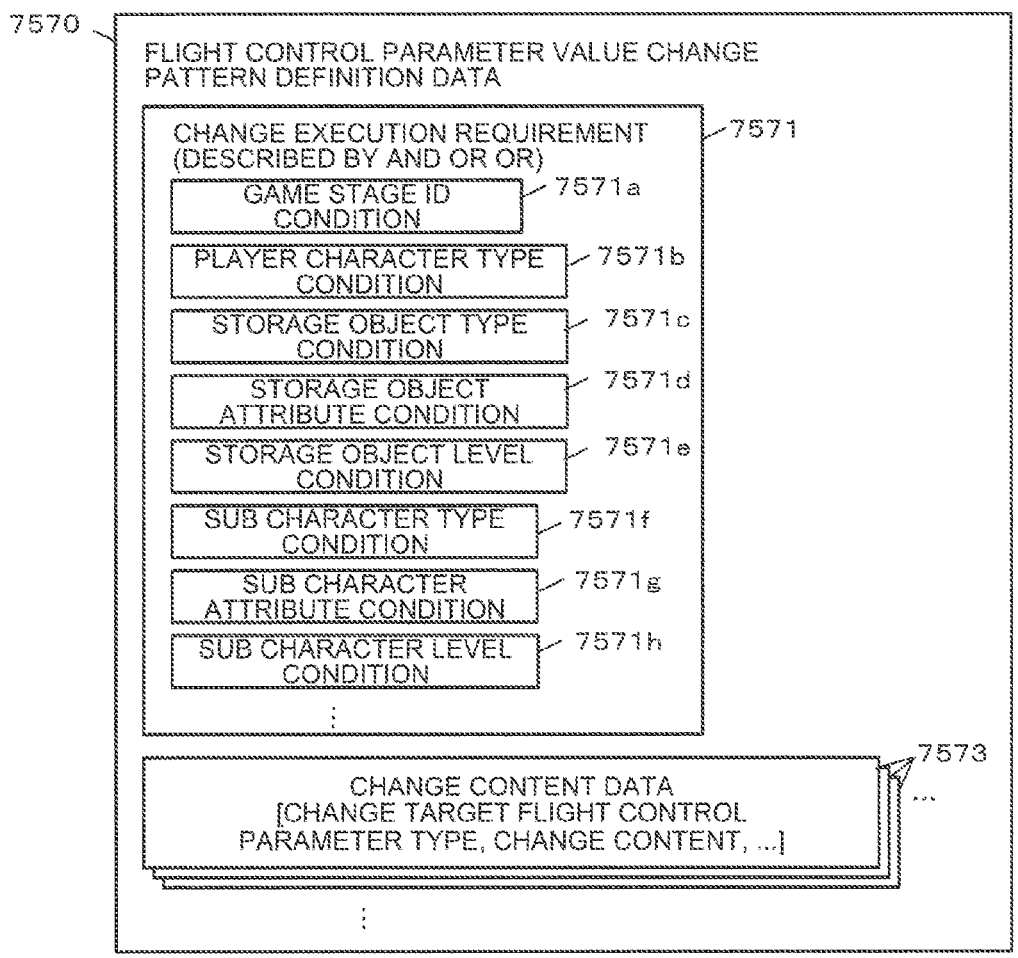
FIG. 40 is a diagram illustrating an example of a data structure of flight control parameter value change pattern definition data according to the second embodiment.

Referring back to FIG. 37, the flight control parameter value change pattern definition data 7570 is prepared for each change pattern of the flight control parameter values, which includes various types of definition data related to the change pattern. The one flight control parameter value change pattern definition data 7570 includes a change execution requirement 7571 and change content data 7573, for example, as illustrated in FIG. 40.

The change execution requirement 7571 defines requirements for selection and application of the change pattern definition data. In the second embodiment, the requirements are described by a plurality of conditions in AND or OR relationship. The type of the conditions used in the description can be set as appropriate. In the second embodiment, the change execution requirement 7571 is described by one of a game stage ID condition 7571a, a player character type condition 7571b, a storage object type condition 7571c, a storage object attribute condition 7571d, a storage object level condition 7571e, a sub character type condition 7571f, a sub character attribute condition 7571g, and a sub character level condition 7571h, or by a combination of two or more of them. These conditions can be set to "none".

The change content data 7573 is prepared for each content to be changed when the change pattern definition data is applied, where a change target flight control parameter type and its change content are associated with each other.

Appropriately describing the change execution requirement 7571 makes it possible to change the flight control parameter value under various conditions.

For example,

1) In the change content data 7573, setting the initial storable upper limit number 7553 (see FIG. 39) in the change target flight control parameter type makes it possible to change the storable upper limit number according to the combination.

2) In the change content data 7573, setting the initial flying route type 7562 in the change target flight control parameter type makes it possible to control variably the flying route according to the combination and change the setting on whether to follow the enemy character 7006.

3) In the change content data 7573, setting the initial error 7563 in the change target flight control parameter type makes it possible to change the error 7020 (corresponding to the hit rate) according to the combination.

4) In the change content data 7573, setting the initial flyable distance 7560 (corresponding to the initial flying range) in the change target flight control parameter type makes it possible to change the flyable distance (corresponding to the flying range) according to the combination.

5) In the change content data 7573, setting the initial weight-equivalent parameter value 7566 in the change target flight control parameter type makes it possible to change the weight-equivalent parameter value when a given reduction condition is satisfied. This corresponds to reducing the weight of the preset storage object 7008.

Note that the condition included in the change execution requirement 7571 can be a single one. For example, setting only the storage object type condition 7571$c$ makes it possible to surely apply a specific change content to the case where the specific storage object 7 is used.

Figure 41:
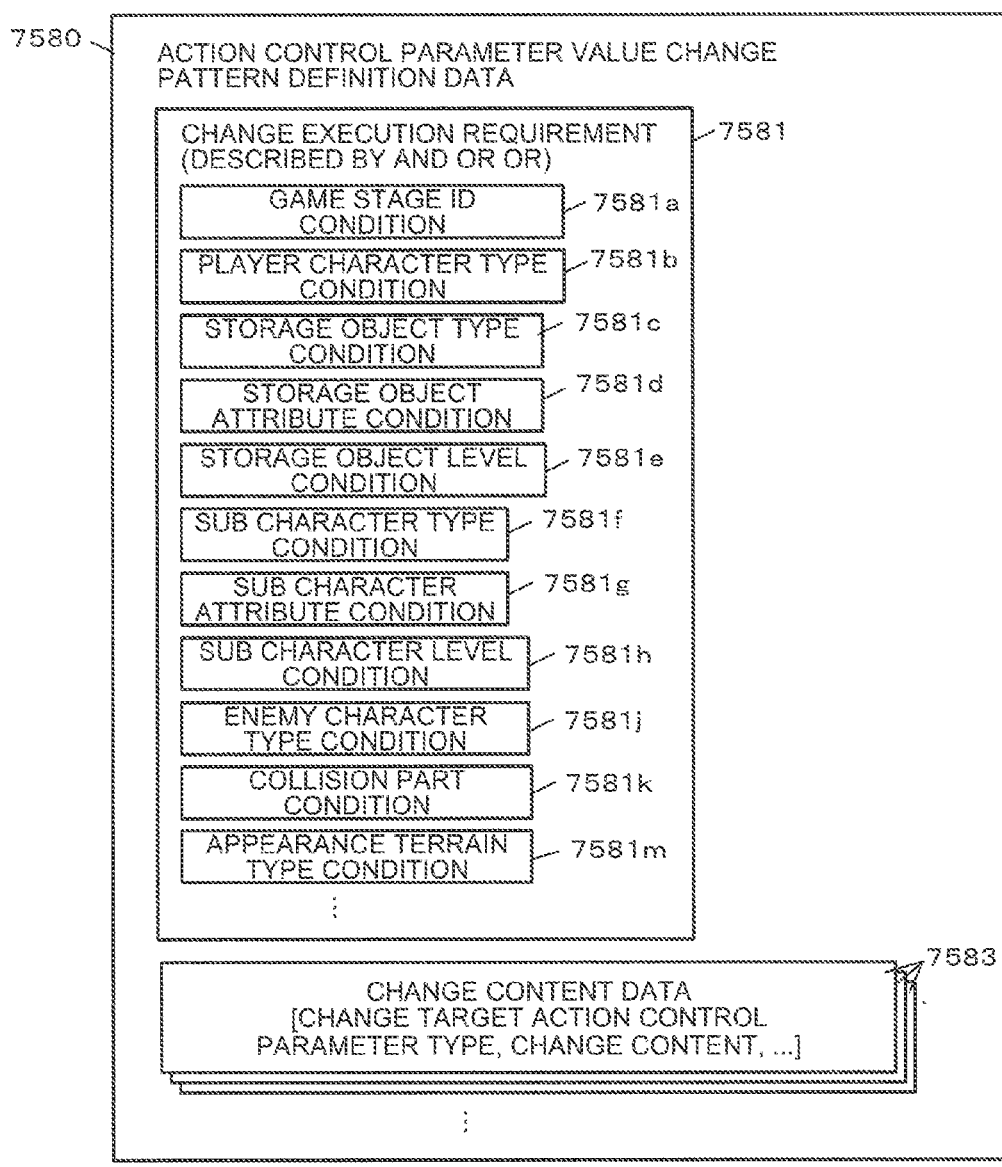
FIG. 41 is a diagram illustrating an example of a data structure of action control parameter value change pattern definition data according to the second embodiment.

Referring back to FIG. 37, the action control parameter value change pattern definition data 7580 is prepared for each change pattern of the action control parameter values, which includes various types of definition data related to the change pattern. The one action control parameter value change pattern definition data 7580 includes a change execution requirement 7581 and change content data 7583, for example, as illustrated in FIG. 41.

The change execution requirement 7581 defines requirements for selection and application of the change pattern definition data. In the second embodiment, the requirements are described by a plurality of conditions in AND or OR relationship. The type of the conditions used in the description can be set as appropriate. In the second embodiment, the change execution requirement 7581 is described by one of a game stage ID condition 7581$a$, a player character type condition 7581$b$, a storage object type condition 7581$c$, a storage object attribute condition 7581$d$, a storage object level condition 7581$e$, a sub character type condition 7581$f$, a sub character attribute condition 7581$g$, and a sub character level condition 7581$h$, an enemy character type condition 7581$j$, a collision part condition 7581$k$, and an appearance terrain type condition 7581$m$, or by a combination of two or more of them. These conditions can be set to "none".

The enemy character type condition 7581$j$ is a condition related to the type of the enemy character 7006 collided by the flying preset storage object 7008 (the storage object 7007 storing the sub character 7005).

The collision part condition 7581$k$ is a condition related to the part of the enemy character 7006 collided by the flying preset storage object 7008.

The appearance terrain type condition 7581$m$ is a condition related to the type of terrain of a place where the flying preset storage object 7008 has collided or the sub character 7005 has appeared.

The change content data 7583 is prepared for each content to be changed when the change pattern definition data is applied, where a change target action control parameter type and its change content are associated with each other.

Thus, appropriately setting the change execution requirement 7581 and the change content data 7583 makes it possible to change the action and ability of the sub character 7005 after appearance in various manners. For example, the same sub character 7005 can be made different in automatic action control pattern and offensive ability after appearance between the case where the sub character 7005 has appeared by collision of the preset storage object 7008 with the enemy character 7006 of A type and the case where the sub character 7005 has appeared by collision of the preset storage object 7008 with the enemy character 7006 of B type. In addition, even when the same enemy character 7006 is collided, the sub character 7005 can be made different in automatic action control pattern and offense ability after appearance depending on the part of the enemy character 7006 collided by the storage object 7007.

Figure 42:
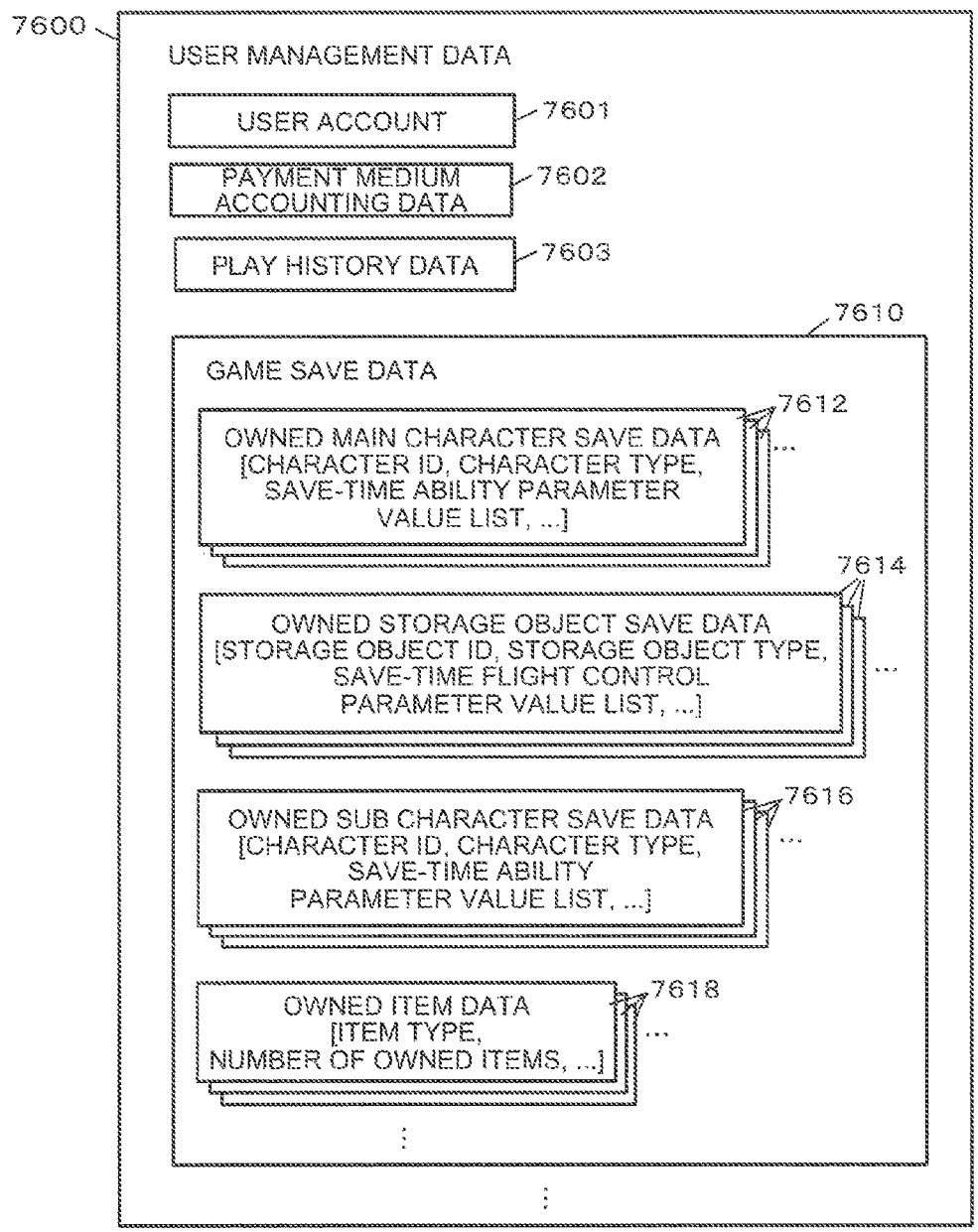
FIG. 42 is a diagram illustrating an example of a data structure of user management data according to the second embodiment.

Referring back to FIG. 37, the user management data 7600 is prepared for each registered user and includes various types of data associated with a unique identification information, namely, an account. In the second embodiment, as illustrated in FIG. 42, for example, the one user management data 7600 includes a unique user account 7601, payment medium accounting data 7602, play history data 7603, and game save data 7610. Note that data other than these can be included as appropriate.

The payment medium accounting data 7602 serves as what is known as an account book storing therein information on a charged/consumed amount (of specified parameter values, such as virtual currency, game currency, specified items, or vitality) of the payment medium for electronic payment associated with the user, information on a reason for the charging/consumption, and information on changed date and time in association with one another. The payment medium accounting data 7602 can also be referred to as charge history data or charge history information.

The play history data 7603 includes data describing the time of gameplay in the past, the play performance, and others in time series, which is automatically updated at login/logout timings.

The game save data 7610 includes various types of data describing results of the previous and earlier gameplay and game progress states. For example, the game save data 7610 includes owned main character save data 7612, owned storage object save data 7614, owned sub character save data 7616, and owned item data 7618. Note that data other than these can be included as appropriate.

Figure 43:
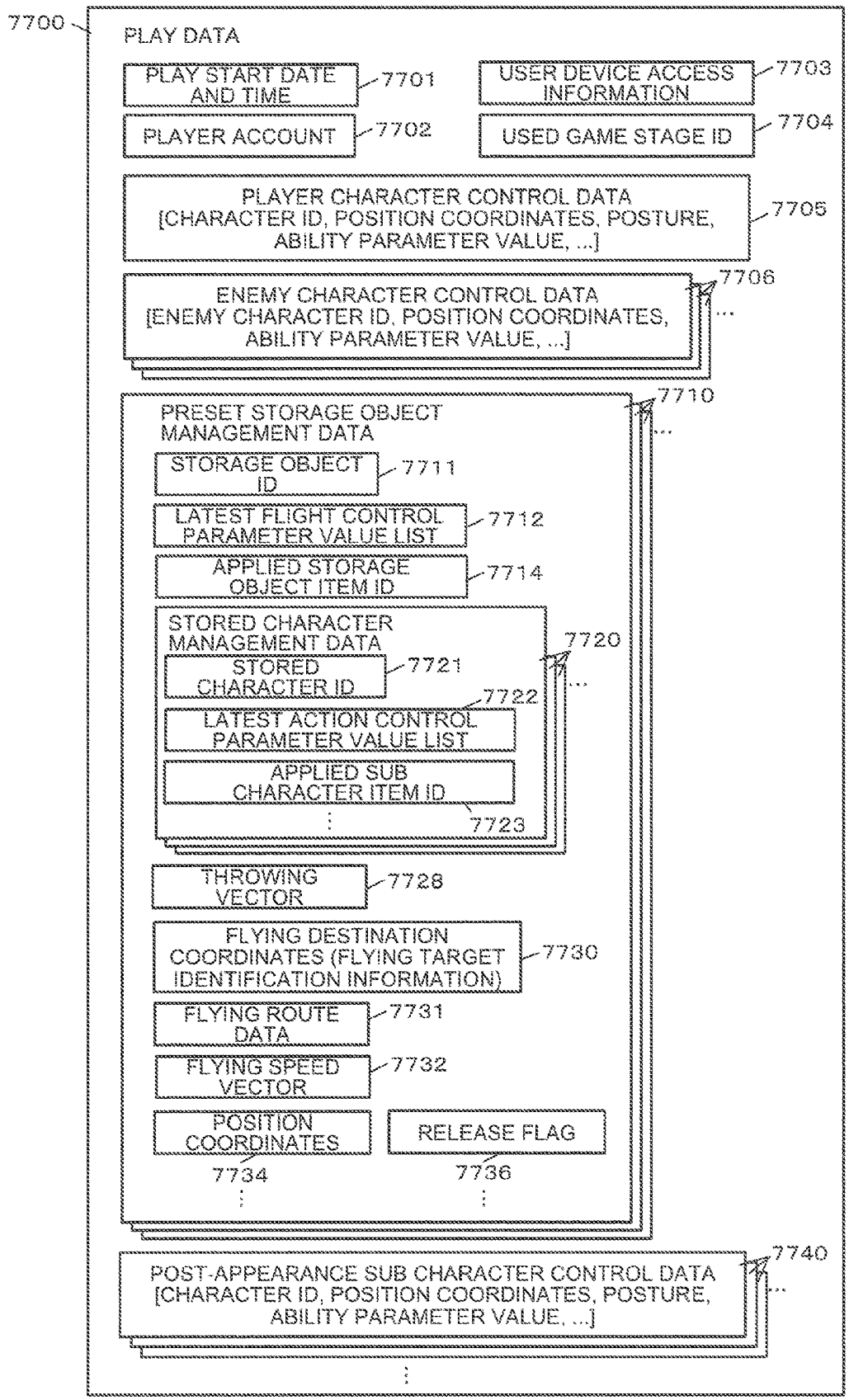
FIG. 43 is a diagram illustrating an example of a data structure of play data according to the second embodiment.

Referring back to FIG. 37, the play data 7700 is prepared for each gameplay that is executed on the user terminal 1500, which includes various types of data describing the game progress situations and various types of information related to display on the game screen such as control data of each character. The one play data 7700 includes play start date and time 7701, a player account 7702 as the account of the user as player, user terminal access information 7703 for accessing the user terminal 1500 of the player, a used game stage ID 7704, player character control data 7705, enemy character control data 7706, preset storage object management data 7710, and, post-appearance sub character control data 7740, for example, as illustrated in FIG. 43. Note that data other than these can be included as appropriate.

The player character control data 7705 and the enemy character control data 7706 are prepared for each player character 7004 and each enemy character 7006, which include various types of data describing the latest state of the character in the game stage (for example, position coordinates, posture, ability parameter value, motion control data of character model, and others).

The preset storage object management data 7710 is created each time the player sets a combination of sub character and storage object, that is, is created for each preset storage object, which includes various types of data related to the preset storage object.

The one preset storage object management data 7710 includes a unique storage object ID 7711, a latest flight control parameter value list 7712, an applied storage object item ID 7714, stored character management data 7720, a throwing vector 7728, flying destination coordinates 7730, flying route data 7731, a flying speed vector 7732, position coordinates 7734, and an release flag 7736. Note that data other than these can be included as appropriate.

The types of the data included in the latest flight control parameter value list 7712 are the same as those in the initial flight control parameter value list 7550 (see FIG. 39). At the initial setting, the latest flight control parameter value list 7712 is a copy of the initial flight control parameter value list 7550 of the storage object (see FIG. 39), but is changed according to a combination with the sub character 7005 or the like.

The applied storage object item ID 7714 is an item ID of the storage object item 7022 (for example, see FIG. 33) associated with the storage object.

The stored character management data 7720 is created for each sub character combined with the preset storage object, which includes various types of data related to the sub character. The one stored character management data 7720 includes a stored character ID 7721, a latest action control parameter value list 7722, and an applied sub character item ID 7723, for example.

The types of the data included in the latest action control parameter value list 7722 are the same as those in the initial action control parameter value list 7530 (see FIG. 38). At the initial setting, the latest action control parameter value list 7722 is a copy of the initial action control parameter value list 7530 of the sub character (see FIG. 38), but is changed according to the combination with the storage object 7007.

The applied sub character item ID 7723 is an item ID of the sub character item 7021 associated with the sub character (for example, see FIG. 32).

The throwing vector 7728 is a vector based on the throwing direction and throwing force as initial conditions for throwing of the preset storage object 7008. In the second embodiment, the throwing direction is sequentially updated to match the front direction of the player character 7004 (the direction of the throwing direction marker 7012, see FIG. 30). The throwing force is set to a predetermined initial value, but when a touch operation on the throwing force input bar 7014 (see FIG. 30), that is, an input operation of throwing force is detected, the current throwing force is updated to the throwing force according to the touch position.

The flying destination coordinates 7730 include position coordinates of the flying destination in the game field. However, when the flying route type of the preset storage object 7008 is set to the type of flying following the enemy character 7006 set (locked on) as a flying target, the flying destination coordinates 7730 include the position coordinates of the enemy character 7006 as the flying target or the pointer storing the position coordinates.

The flying route data 7731 is a coordinate value list of functions or pass points indicating a route in which the preset storage object 7008 is to fly. The flying route data 7731 is created along with the start of throwing of the preset storage object 7008, and the preset storage object 7008 is controlled in movement along the route in the data. The route may be determined by physical calculation or quasi-physical calculation or may be determined with application of a function of a preset quasi parabola.

The value of the release flag 7736 is "1" in the state in which the sub character 7005 is stored in the preset storage object 7008, and is changed to "0" when the release condition included in the latest flight control parameter value list 7712 (a copy of the initial release condition 7555 (see FIG. 39) with or without change) is satisfied and the stored sub character 7005 is released and appear in the game stage.

The post-appearance sub character control data 7740 is created when the sub character 7005 is released from the preset storage object 7008 and appears in the game stage. The post-appearance sub character control data 7740 includes various types of data describing the latest state of the sub character (for example, the position coordinates, posture, ability parameter value, motion control data of character model, and others).

Figure 44:
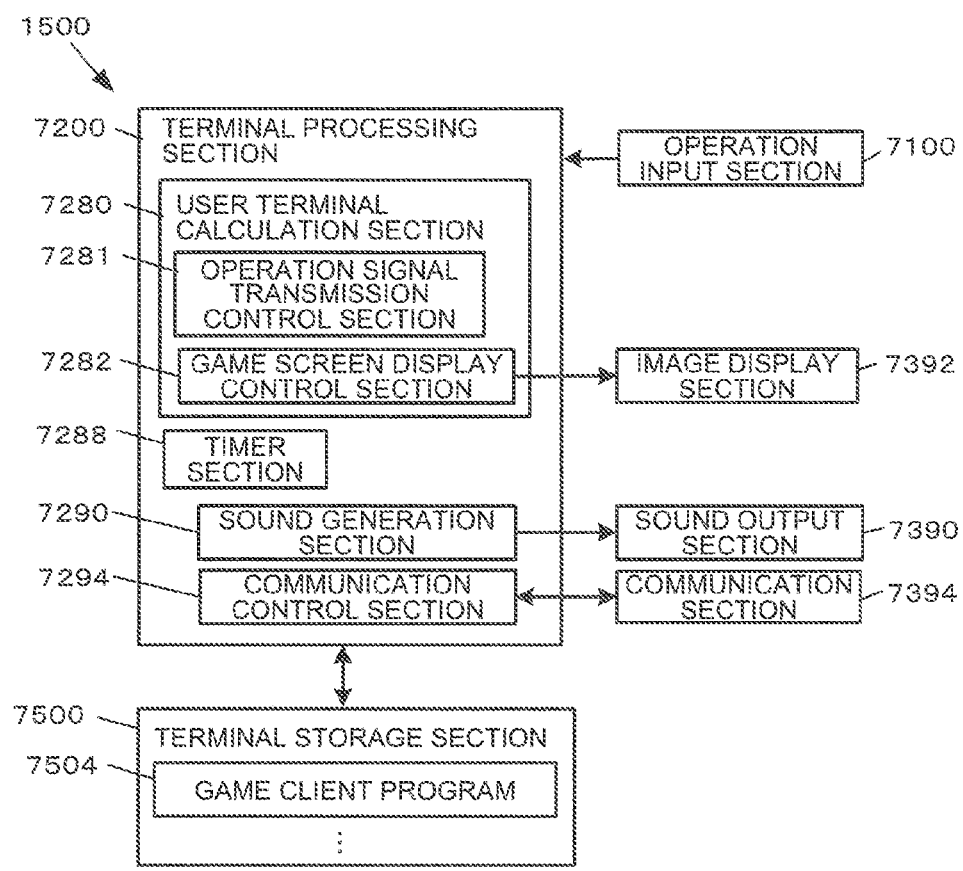
FIG. 44 is a functional block diagram illustrating an example of a functional configuration of a user terminal according to the second embodiment.

FIG. 44 is a functional block diagram illustrating an example of a functional configuration of the user terminal 1500 according to the second embodiment. The user terminal 1500 according to the second embodiment includes an operation input section 7100, a terminal processing section 7200, a sound output section 7390, an image display section 7392, a communication section 7394, and a terminal storage section 7500.

The operation input section 7100 outputs an operation input signal according to various operations input by the player to the terminal processing section 7200. For example, the operation input section 7100 can be implemented with a push switch, a joystick, a touch pad, a track ball, an accelerometer, a gyro, a CCD module, or the like. The operation input section 7100 corresponds to the arrow key 1502, the button switch 1504, and the touch panel 1506 illustrated in FIG. 2.

The terminal processing section 7200 is implemented with electronic parts, such as a microprocessor (e.g., CPU and GPU), and an IC memory. The terminal processing section 7200 performs input/output control to exchange data with each of the functional sections including the operation input section 7100 and the terminal storage section 7500. The terminal processing section 7200 executes various calculation processes based on a predetermined program or data, the operation input signal from the operation input section 7100, and various types of data received from the server system 1100 to control the operation of the user terminal 1500. The terminal processing section 7200 corresponds to the control board 1550 in FIG. 2. The terminal processing section 7200 according to the second embodiment includes a user terminal calculation section 7280, a timer section 7288, a sound generation section 7290, and a communication control section 7294.

The user terminal calculation section 7280 includes an operation signal transmission control section 7281 and a game screen display control section 7282.

The operation signal transmission control section 7281 performs a process of transmitting various types of data and requests to the server system 1100 in accordance with an operation performed on the operation input section 7100.

The game screen display control section 7282 performs control for displaying a game screen based on various types of data received from the server system 1100. In the second embodiment, the game screen display control section 7282 can be configured to generate game stage images (for example, 3DCG images and others) in the server system 1100, but can be configured to generate the game stage images in the user terminal 1500. In this case, the game screen display control section 7282 is in charge of controlling an object disposed in a virtual three-dimensional space for generating a 3DCG, for example.

The sound generation section 7290 is implemented with a processor, such as a digital signal processor (DSP) or a sound synthesizing IC, an audio codec capable of reproducing a sound file, or the like. Based on a processing result by the game screen display control section 7282, the sound generation section 7290 generates a sound signal for sound effects, a BGM, various operation sounds, and the like related to the game, and outputs the sound signal thus generated to the sound output section 7390.

The sound output section 7390 is implemented with a device that outputs sound such as sound effects, a BGM, or the like, based on the sound signal received from the sound generation section 7290. The sound output section 7390 corresponds to the speaker 1510 in FIG. 2.

The image display section 7392 displays various game images based on the image signals input from the game screen display control section 7282. The image display section 7392 can be implemented with an image display device such as a flat panel display, a cathode ray tube (CRT), a projector, or a head-mounted display. In the second embodiment, the image display section 7392 corresponds to the touch panel 1506 illustrated in FIG. 2.

The communication control section 7294 performs a data process related to the data communication, and exchanges data with an external device through the communication section 7394. The communication section 7394 connects to the network 9 to implement communications. For example, the communication section 7394 is implemented with a transceiver, a modem, a terminal adapter (TA), a jack for a communication cable, a control circuit, and the like, and corresponds to the wireless communication module 1553 in FIG. 2.

The terminal storage section 7500 stores therein programs for implementing various functions for the terminal processing section 7200 to entirely control the user terminal 1500, and various types of data. The terminal storage section 7500 is used as a work area for the terminal processing section 7200, and temporarily stores a result of calculation performed by the terminal processing section 7200 in accordance with various programs, input data received from the operation input section 7100, and the like. These functions are implemented with an IC memory (e.g., RAM and ROM), a magnetic disk (e.g., hard disk), an optical disk (e.g., CD-ROM and DVD), or the like. The terminal storage section 7500 corresponds to the IC memory 1552 and the memory card 1540 in the control board 1550 illustrated in FIG. 2.

The terminal storage section 7500 according to the second embodiment stores therein a game client program 7504. Note that other programs and data can be stored as appropriate.

The game client program 7504 is application software that implements the function of the user terminal calculation section 7280 when being read and executed by the terminal processing section 7200. In the second embodiment, the game client program 7504 is a copy of the distributed game client program 7502 (see FIG. 37) provided from the server system 1100.

The game client program 7504 may be an exclusive client program or include a web browser program and a plugin that implements an interactive image display, depending on a technique and a method for implementing an online game.

[Description of Operations]

Next, a flow of a process in the server system 1100 will be described. The flow of the process described herein is implemented with the server processing section 7200s executing the server program 7501.

Figure 45:
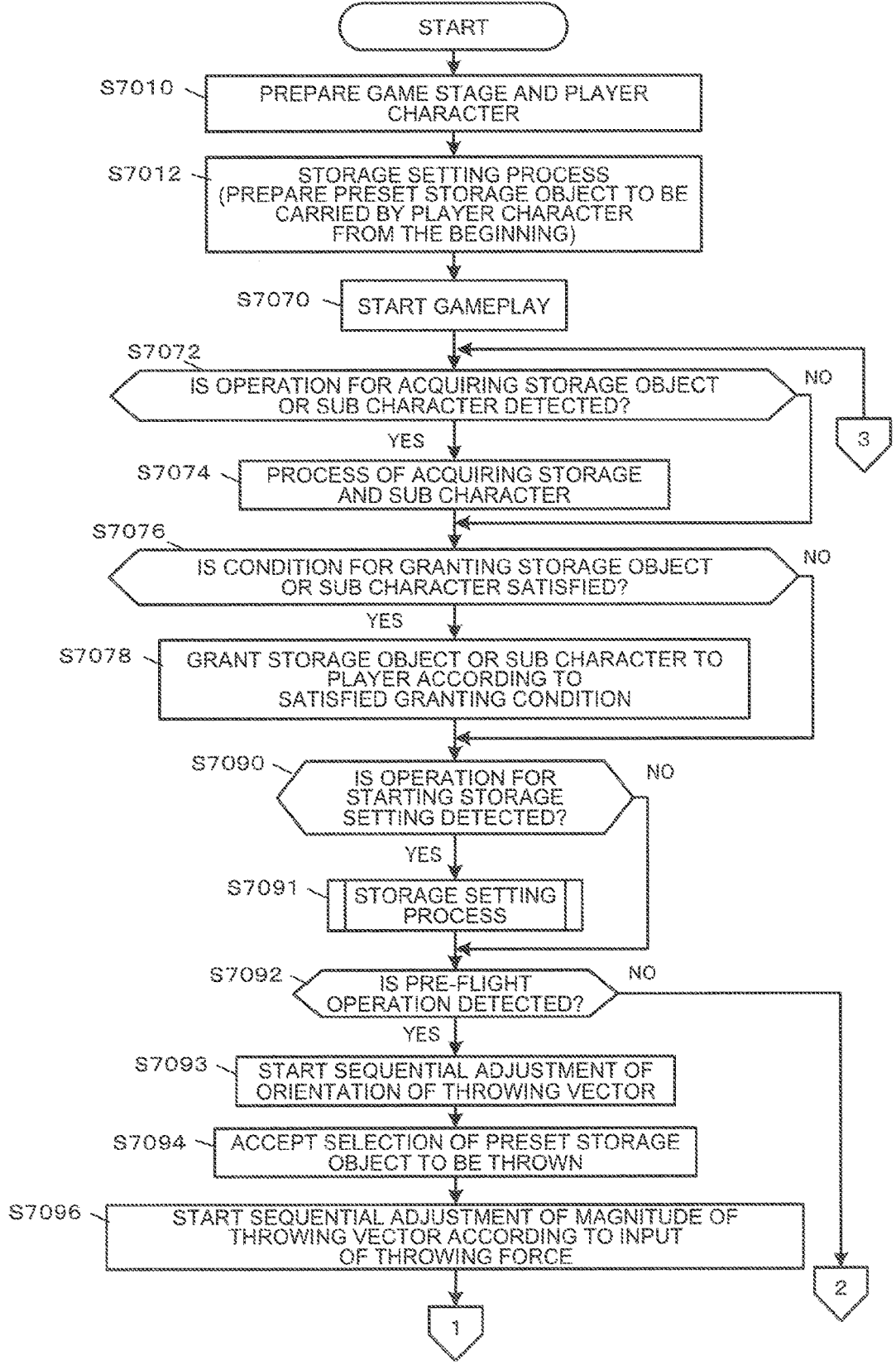
FIG. 45 is a flowchart illustrating a flow of a process in a server system according to the second embodiment.
Figure 46:
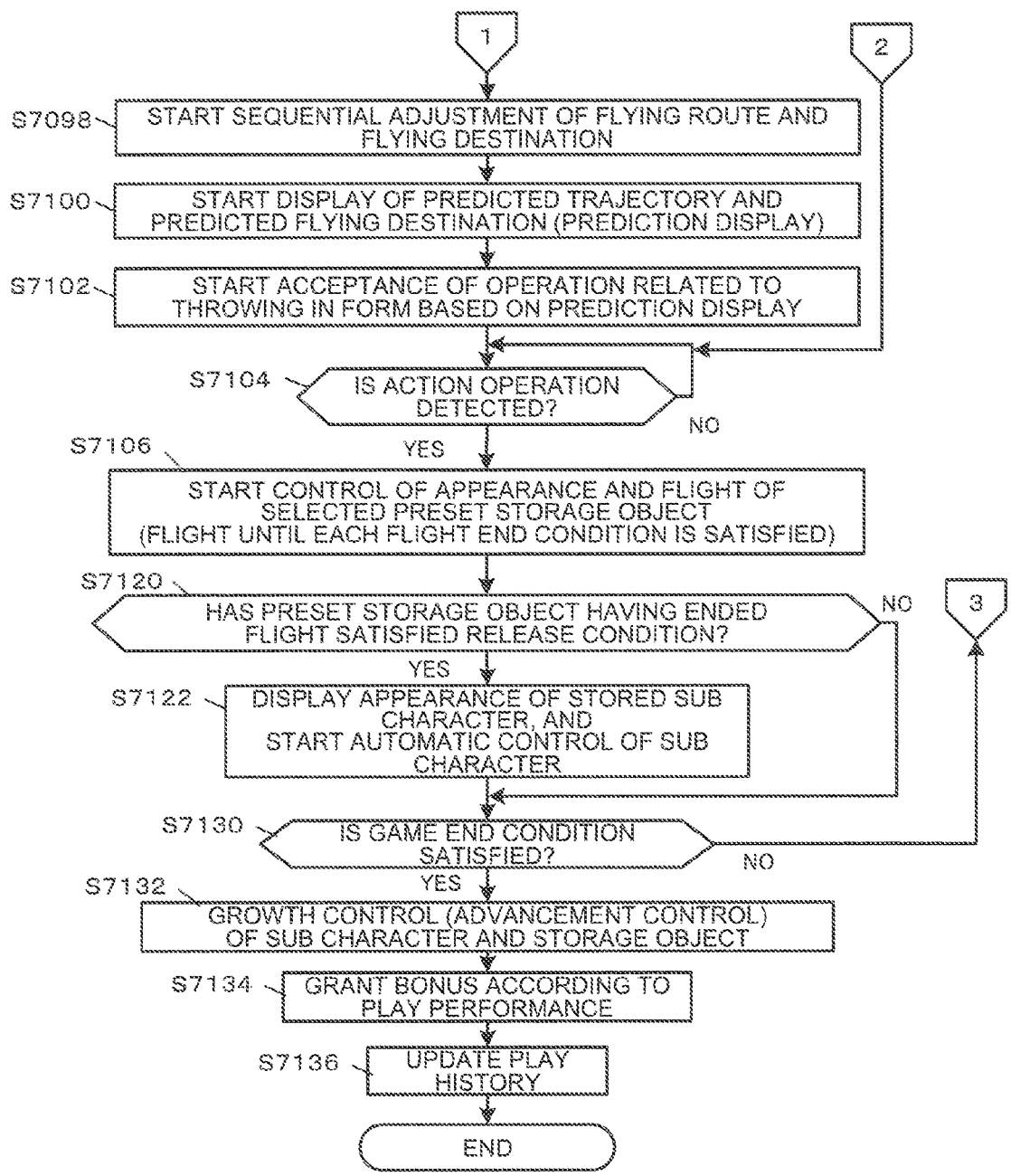
FIG. 46 is a flowchart continued from FIG. 45.

FIGS. 45 and 46 are flowcharts illustrating a flow of a process by the server system 1100 related to one gameplay.

The server system 1100 accepts a selection of a game stage to be used and a selection of the main character 7003 as the player character 7004 (step S7010). For example, for the game stage to be used, the game stages defined by the game stage initial setting data 7510 are selectably suggested on the user terminal 1500 and a selection operation of the game stage is accepted. For the player character 4, a list of the main characters 7003 owned by the player is selectably suggested and a selection operation is accepted.

Next, the server system 1100 sets the preset storage object 7008 to be carried by the player character 7004 from the start of the gameplay (step S7012).

Specifically, the server system 1100 enables the settings of a predetermined number of preset storage objects 7008, and executes a storage setting process for each of preset storage objects.

Figure 47:
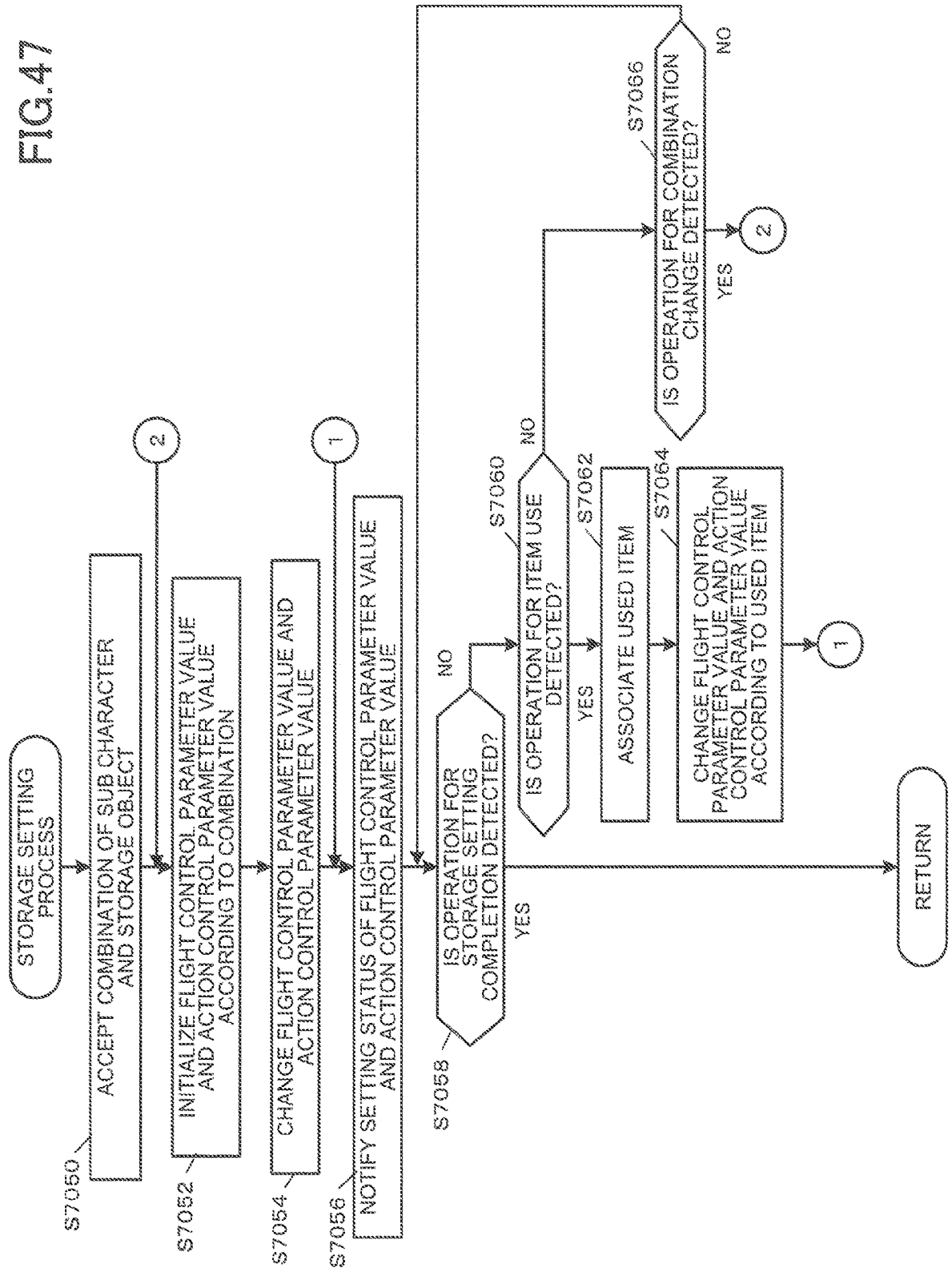
FIG. 47 is a flowchart illustrating a flow of a storage setting process according to the second embodiment.

FIG. 47 is a flowchart illustrating a flow of the storage setting process.

In the process, the server system 1100 first accepts a selection of the sub character 7005 and the storage object 7007 to be combined (step S7050). Specifically, the server system 1100 extracts unused sub characters and unused storage objects (of which there is no preset storage object management data 7710) from the sub characters 7005 and the storage objects 7007 owned by the player and suggests the same in a selectable manner on the user terminal 1500. In this case, when the initial storable upper limit number 7553 of the selected storage object 7007 indicates plural numbers, the server system 1100 can accept a selection of a plurality of sub characters 7005 to be combined within the upper limit. Accordingly, a primary setting of the preset storage object 7008 is completed and the new preset storage object management data 7710 is created in the play data 7700 (see FIG. 43).

Then, the server system 1100 initializes the latest flight control parameter value list 7712 and the latest action control parameter value list 7722 according to the combination of the sub character 7005 and the storage object 7007 (step S7052).

Specifically, the initial flight control parameter value list 7550 of the selected storage object 7007 (see FIG. 39) is copied to the latest flight control parameter value list 7712 for initialization, and the initial action control parameter value list 7530 of the selected sub character 7005 (see FIG. 38) is copied to the latest action control parameter value list 7722 for initialization.

Next, the server system 1100 changes the initialized latest flight control parameter values and latest action control parameter values based on the flight control parameter value change pattern definition data 7570 (see FIG. 40) and the action control parameter value change pattern definition data 7580 (see FIG. 41) (step S7054).

Then, the server system 1100 causes the user terminal 1500 to provide a display notifying the player of the contents of the latest flight control parameter values and the latest action control parameter values (step S7056). The player can see the notification display to judge whether the current combination is appropriate.

When the combination is unsatisfactory from the notification display, the player can adjust the parameter values related to this combination using an item.

Specifically, when an operation for using an item with the operational effect of changing either the flight control parameter values or the action control parameter values (NO in step S7058, and YES in step S7060) is detected on the user terminal 1500, the server system 1100 associates the used item with the use destination (the storage object 7007 or the sub character 7005) (step S7062). Then, the server system 1100 changes the latest flight control parameter values and the latest action control parameter values based on the operational effect of the used item (step S7064), and returns to step S7056. When detecting an operation for changing the combination of the sub character 7005 and the storage object 7007 (YES in step S7066), the server system 1100 returns to step S7052.

Then, when detecting an input of a predetermined storage setting completion operation on the user terminal 1500 (YES in step S7058), the server system 1100 terminates the storage setting process.

Referring back to FIG. 45, next, the server system 1100 starts a progress control of gameplay (step S7070). Specifically, the server system 1100 arranges a background object in a virtual three-dimensional space to form a game stage, and then arranges the player character 7004 and the enemy character 7006 in the game stage. Then, the server system 1100 operates the player character 7004 according to the operation input of the player character 7004, and starts the automatic control of the enemy character 7006. Besides, the server system 1100 starts as appropriate a basic control necessary as a progress control of a battle game.

After the start of gameplay, when an acquisition operation of a predetermined sub character 7005 or storage object 7007 (for example, purchasing in online shopping or the like) is performed on the user terminal 1500 (YES in step S7072), the server system 1100 executes an acquisition process of the storage object 7 (step S7074).

In addition, after the start of gameplay, when the game progress situation satisfies the storage object granting condition or the sub character granting condition (see the game stage initial setting data 7510 illustrated in FIG. 37) in the game stage indicated by the used game stage ID 7704 (YES in step S7076), the server system 1100 grants the new sub character 7005 or storage object 7007 to the player (step S7078).

In this manner, according to the second embodiment, the player can obtain an opportunity of acquiring a material for using the sub character 7005 even during gameplay. In a conventional battle game in which sub characters are usable, only prepared sub characters can be used in gameplay. Accordingly, some of players cannot continue the game at the early stage of the game due to their irrelevant strategies and tactics and may easily discard gameplay or reset the game. In the second embodiment, however, there is a freedom of making a next move according to the situation of the battle, thereby producing a pleasure of turning the tide of the battle during gameplay.

When a predetermined storage setting start operation is input on the user terminal after the start of the gameplay (YES in step S7090), the server system 1100 executes the storage setting process (step S7091).

Then, when detecting an input of a predetermined preflight operation on the user terminal 1500 during the gameplay (YES in step S7092), the server system 1100 starts a control of adjusting and aligning the orientation of the throwing vector 7728 with the front direction of the player character 7004 (step S7093).

Then, the server system 1100 causes the user terminal 1500 to display the preset storage object list 7010 (see FIG. 30) on the user terminal 1500, and accepts a selection operation of the preset storage object 7008 to be thrown (step S7094). In this case, when there are a plurality of simultaneous throwing-enabled numbers in the latest flight control parameter value list 7712 of the selected preset storage object 7008 (the value copied from the initial simultaneous throwing-enabled number 7554 or the value changed later from the initial simultaneous throwing-enabled number 7554 illustrated in FIG. 39), the server system 1100 accepts a plurality of selections.

Then, the server system 1100 causes the user terminal 1500 to display the throwing force input bar 7014 (see FIG. 30), and starts a sequential adjustment of the magnitude of the throwing vector 7728 according to the touch operation on the bar (step S7096).

Referring to FIG. 46, the server system 1100 starts the sequential adjustment of the flying route and the flying destination according to the latest throwing specifications (step S7098), and provides a prediction display of the provisionally determined flying destination and flying route by displaying the prediction display object 7018 (see FIG. 30) on the game screen (step S7100).

Specifically, the server system 1100 provisionally determines the flying destination coordinates 7730 and the flying route data 7731 (see FIG. 43) based on the latest throwing vector 7728 and the flying route type in the latest action control parameter value list 7722 (see the initial flying route type 7562 illustrated in FIG. 39). Then, the server system 1100 repeats the foregoing process at each updating of the throwing vector 7728 to update the flying route and the flying destination. Note that the server system 1100 also updates the prediction display accordingly.

The server system 1100 starts to accept an operation input related to throwing in a form based on the prediction display (step S7102).

Specifically, as a guide display for correcting the throwing direction, the scales are displayed along the upward, downward, leftward, and rightward directions of the game screen centered on the displayed prediction display object 7018 (see FIG. 30), and upon detection of a predetermined direction change operation, the throwing direction is changed by one marking on the scale in the operation direction.

Similarly, the throwing force input bar 7014 (see FIG. 30) can be displayed with a marker indicating the present position of the throwing force for correction and scales in the stronger and weaker directions as guide displays for correction. Upon detection of a predetermined force change operation, the throwing force is changed by one marking in the operation direction.

As for the lock-on marker 7019 (see FIG. 32), another marker indicating that another candidate for flying target is selectable may be displayed around the current lock-on marker 7019. Then, upon detection of a predetermined target change operation, the setting of the flying target candidate may be switched to the nearest enemy character 7006 with the other marker in the operation direction.

When seeing the prediction display and finding out that the aimed flying destination or flying route is not predicted, the player 7002 can adjust the throwing direction or the throwing force by changing the front direction of the player character 7004 or the like (NO in step S7104). When the prediction display is as aimed, the player 7002 inputs a predetermined action operation to cause the player character 7004 to throw the selected preset storage object 7008.

Upon detection of an input of the predetermined action operation on the user terminal 1500 (YES in step S7104), the server system 1100 causes the preset storage object 7008 of which the selection was accepted in step S7094 to appear in the game field, and starts the control of the flying display (step S7106). The flight control is continued until each satisfies the flight end condition.

When a predetermined flying cancel operation is performed in steps S7092 to S7100, the server system 1100 may skip steps S7104 and S7106 as appropriate.

Next, when the preset storage object 7008 satisfies the flight end condition and the release condition (the same as the initial release condition 7555 illustrated in FIG. 39 or a changed condition from the initial release condition 7555) (YES in step S7120), the server system 1100 causes the sub character 7005 combined with and stored in the preset storage object 7008 to appear in the game stage and starts the automatic control of the sub character 7005 (step S7122). Accordingly, the server system 1100 includes the various types of initial setting data related to the sub character 7005 in the play data 7700 (see FIG. 43). The server system 1100 creates the post-appearance sub character control data 7740 and stores various types of data describing the latest status by the automatic control. The sub character 7005 of which the automatic control has been started is capable of making action under the automatic control until the making an action limit time (operable time) is reached or the sub character 7005 having appeared suffers damage by the attack of the enemy character 7006 and the suffered damage reaches a hit point as one of ability parameter values.

The server system 1100 repeatedly executes steps S7072 to S7130 until the game end condition is satisfied (NO in step S7130).

When the game end condition is satisfied (YES in step S7130), the server system 1100 performs an advancement control of the sub character 7005 and the storage object 7007 (step S7132). Specifically, the server system 1100 grants experience values to the sub character 7005 and the storage object 7007 in the thrown preset storage object 7008, and changes the sub character level and the storage object level according to the accumulated experience values. The advancement control may be performed only on either one of the sub character 7005 and the storage object 7007. The target of advancement may be limited to the thrown preset storage object 7008 that satisfies the release condition.

Next, the server system 1100 grants a bonus to the player according to the play performance (step S7134). For example, the server system 1100 may grant the main character 7003, the sub character 7005, the storage object 7007, or items. The server system 1100 can also release a new game stage.

Then, the server system 1100 updates the play history (step S7136), and terminates the series of processes.

As above, according to the second embodiment, it is possible to provide a technique for adding a new attraction to a video battle game where the player uses a sub character as an NPC friendly to the main character operated by the player.

That is, the player performs an operation of storing the sub character 7005 in the storage object 7007 to set the preset storage object 7008, and performs an operation of instructing the player character 7004 to throw the preset storage object 7008. Accordingly, it is possible to implement a new style of battle game in which the sub character 7005 is controlled to appear at the throwing destination, and after the appearance, the sub character 7005 fights a battle with the enemy character 7006.

The flight control parameter values related to the movement control of the thrown preset storage object 7008 and the action control parameter values related to the automatic control of the sub character 7005 having been released and caused to appear from the preset storage object 7008 are changed according to the combination of the sub character 7005 and the storage object 7007. This allows the player to obtain a pleasure of coming up with strategies about which sub character 7005 to be combined with which storage object 7007 and in what scene and in what manner the combination to be used.

In addition, the flight control parameter values and the action control parameter values are changed also depending on the main character 7003 as the player character 7004, the type of the game stage where the game is played, the use of items, and others. Thus, the ability of the same sub character 7005 may vary according to the situation. Accordingly, the game becomes abundant in challenging elements without losing the player's interest.

In the second embodiment, the preset storage object 7008 can be set during the gameplay, which allows gameplay with a high degree of freedom.

Modification of Second Embodiment

Next, a modification of the second embodiment will be described. The present modification of the second embodiment is implemented to be basically the same with the first embodiment, but is different from the first embodiment in that the user terminal 1500 performs the game management processing. Hereinafter, the differences from the second embodiments will be mainly described. Components that are the same as the counterparts in the second embodiment are denoted with the same reference numerals, and the description thereof will be omitted.

In the present modification, the game management section 7210 is omitted from the functional configuration of the server system 1100 in the second embodiment.

Figure 48:
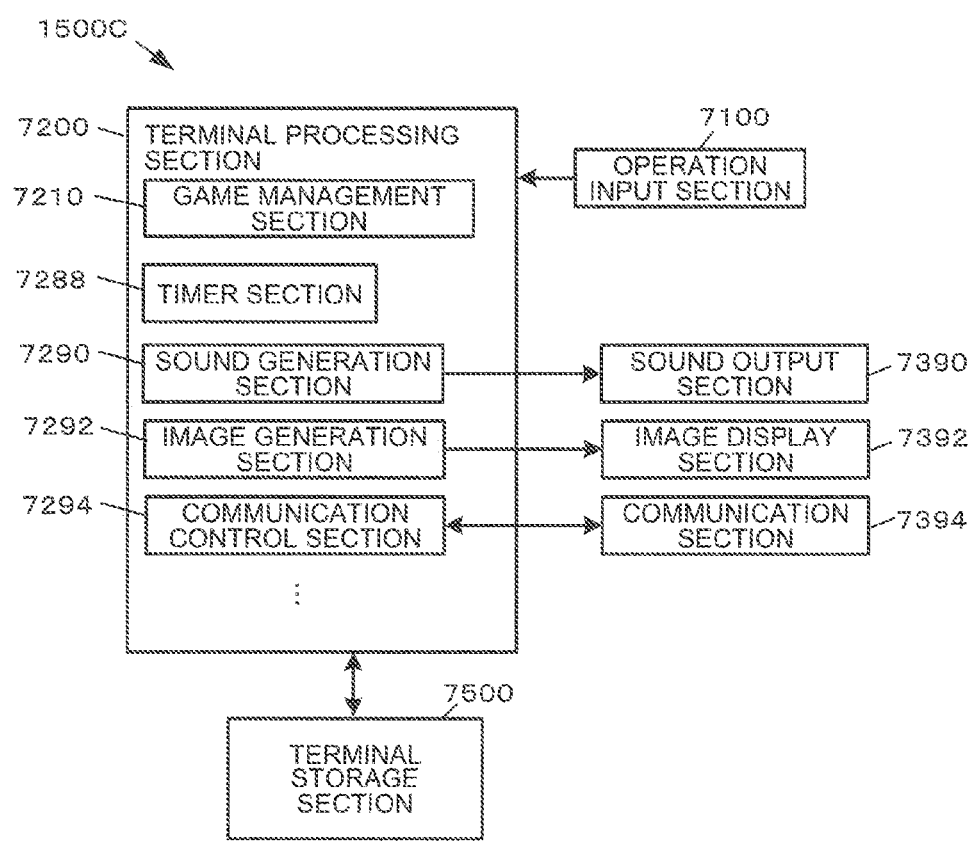
FIG. 48 is a functional block diagram illustrating an example of a functional configuration of a user terminal according to a modification of the second embodiment.

FIG. 48 is a functional block diagram illustrating a functional configuration example of a user terminal 1500C according to the present modification. The user terminal 1500C according to the present modification does not have the user terminal calculation section 7280 but has the game management section 7210 and an image generation section 7292 instead.

The image generation section 7292 generates data for displaying a game screen on the image display section 7392 and outputs an image signal to the image display section 7392.

That is, in the present modification, the user terminal 1500C executes calculation processes related to the game management by itself to control the progress of the game, generate game screen images, and control sound reproduction. However, the use of online shopping, the login/logout of a registered user, and the management of the play history, and the like are performed in the same manner as in the first embodiment. However, the foregoing matter is not applied when the user terminal 1500 functions as a standalone game machine, that is, the battle game is implemented as a non-online game.

Figure 49:
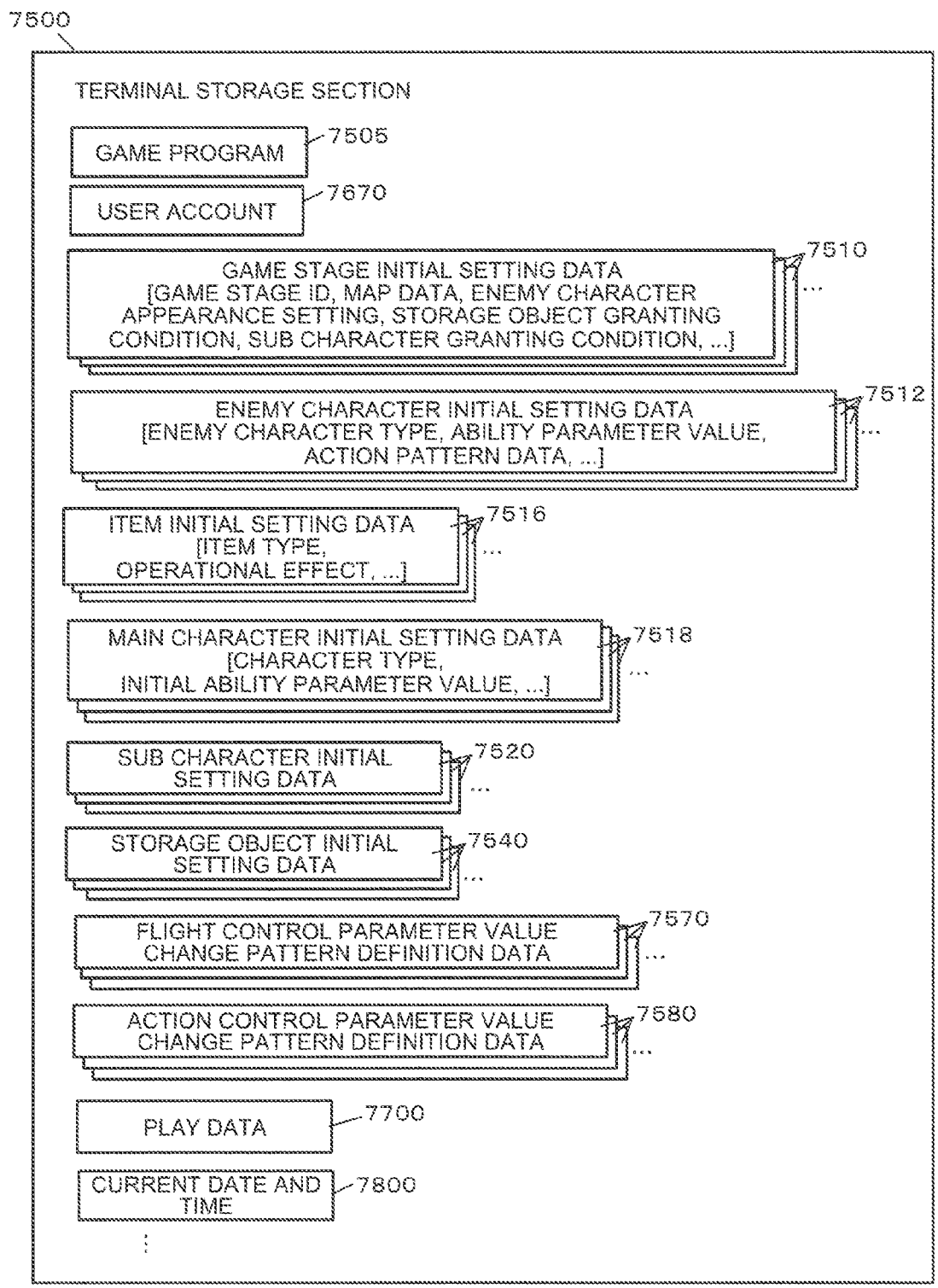
FIG. 49 is a diagram illustrating an example of programs and data stored in a server storage section according to the modification of the second embodiment.

FIG. 49 is a diagram illustrating an example of programs and data stored in a terminal storage section 7500 of the user terminal 1500C according to the present modification. The terminal storage section 7500 in the present modification stores a game program 7505. The game program 7505 is a program for causing a terminal processing section 7200 to implement the functions of the game management section 7210. The original of the program may be stored as distributed game program in the server system 1100 and downloaded as appropriate.

The terminal storage section 7500 according to the present modification stores game stage initial setting data 7510, enemy character initial setting data 7512, item initial setting data 7516, main character initial setting data 7518, sub character initial setting data 7520, storage object initial setting data 7540, flight control parameter value change pattern definition data 7570, and action control parameter value change pattern definition data 7580 when the game management section 7210 is processed on the user terminal 1500C. The originals of these data may be stored in the server system 1100 and downloaded as appropriate. In addition, as data to be sequentially created and updated, play data 7700 is stored.

The flow of the process executed on the user terminal 1500C in the present modification is basically the same as that executed on the server system 1100 in the second embodiment (see FIGS. 45 to 47). Accordingly, when the game management section 7210 is implemented by the user terminal 1500C, it can be interpreted as appropriate that the steps are executed by the user terminal 1500C.

In the case of executing a process in which the user management data 7600 needs to be referred to or changed on the user terminal 1500C, a request for the provision, collation, or the like of necessary data is made as appropriate to the server system 1100. Otherwise, a request for the process itself is made to the server system 1100.

If the user terminal 1500C functions as a standalone game machine, that is, if a battle game is implemented as a non-online game, the user management data 7600 can be stored in the terminal storage section 7500 in the configuration in which the user management data 7600 is managed in the user terminal 1500C.

According to the present modification, it is possible to obtain the same advantageous effects as those in the second embodiment.

[Other Modifications]

[First Modification]

For example, in the second embodiment, an online game is implemented in a client-server computer system. Alternatively, an online game may be implemented in a computer system in which a plurality of user terminals 1500 (or user terminals 1500C) are connected in a peer-to-peer fashion. In this case, some of the user terminals 1500 may be made to implement the functions as the server system 1100 in the second embodiment. Alternatively, the plurality of user terminals 1500 may cooperate to implement the functions of the game management section 7210.

[Second Modification]

The game genre is battle game in the second embodiment. However, the game genre may be any other game as far as the sub character 5 is used.

Third Embodiment

The game according to a third embodiment is an online battle game at which a friend group including at least two characters, that is, a player character as an operation target of the player and a friend character and an enemy group formed by one or more enemy characters fight a battle. The game in the third embodiment will be described as a one-to-one battle game of a player 2a and a player 2b. Instead, the game may be a computer-battle type at which one of the players is computer-controlled. In addition, one group is not limited to one player but may include a plurality of players to play a team-battle game.

FIG. 50 is a diagram illustrating preparatory operations for playing a game according to the third embodiment. First, as a premise of the game, a player 8002 (8002a, 8002b, . . . ) can own a main character 8003 (8003a, 8003b, . . . ), a sub character 8005 (8005a, 8005b, . . . ), and a storage object 8007 (8007a, 8007b, . . . ) as game media. The ownership here means having the right to use the game media at the game.

The main character 8003 is a character that is a candidate for a player character existing in the game space as a representative of the player 8002. The main character can also be said to be a candidate for an avatar character.

The sub character 8005 is a non-playable character (NPC, a character automatically controlled by a computer) friendly to the player character.

The storage object 8007 is an object that can store the sub character 8005. The storage here means virtual storage at the game. In the third embodiment, at the game, the storage object 8007 is an object that can store the sub character 8005 in a virtually reduced size and can release again the stored sub character. The storage object 8007 is represented in a form of bottle, capsule, box, bag, or the like.

The main character 8003 (8003a, 8003b, . . . ), the sub character 8005 (8005a, 8005b, . . . ), and the storage object 8007 (8007a, 8007b, . . . ) are prepared in pluralities of types. The player 8002 (8002a, 8002b, . . . ) obtains and owns one or more of them prior to the gameplay. These characters and objects are given in advance by initial setting and can also be bought from online shopping, for example. These characters and objects can also be acquired when the player runs into an acquisition situation in the progress of the game.

The player 8002 (8002a, 8002b, . . . ) makes several preparatory operations for the gameplay.

The preparatory operations according to the third embodiment include an operation of selecting a game space to be played (identical to the game stage) and an operation of selecting the player character 8004 from the main characters 8003 (8003a, 8003b, . . . ) owned by the player 8002 (8002a, 8002b, . . . ). The preparatory operations also include an operation of setting a combination of the storage object 8007 to be used and the sub character 8005 to be stored in the storage object 8007.

When the storage object 8007 and the sub character 8005 are combined, the sub character 8005 is regarded as being stored in the storage object 8007. This is called a preset storage object 8008. The preset storage object 8008 is regarded as being owned and carried by the main character 8003a selected as the player character 8004A. For example, the main character 8003a is regarded as carrying the object in a pocket or bag, for example. That is, the player 8002 (8002a, 8002b, . . . ) can combine the storage object 8007 with the main character 8003 (8003a, 8003b, . . . ) owned by himself or herself.

When the storage object 8007 and the sub character 8005 are combined together, each of the storage object 8007 and the sub character 8005 is made incapable of another combination, so that duplicated combination is not allowed. However, depending on the type of the storage object 8007, a plurality of sub characters 8005 can be stored at the same time. In this case, the storage object 8007 is not made incapable of another combination until the upper limit of number of storable sub characters is reached.

Figure 51:
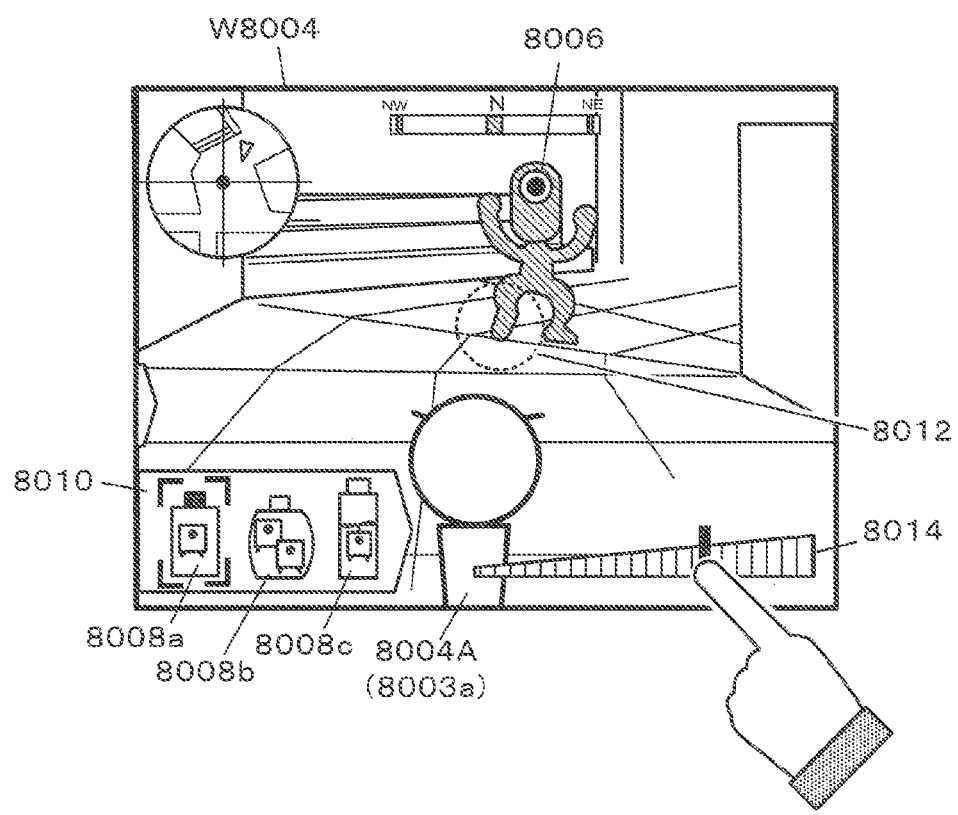
FIG. 51 is a diagram illustrating an example of display of a game screen according to the third embodiment.

When the gameplay is started, a user terminal 1500 (1500*a*, 1500*b*, . . . ) of each player 8002 displays a game screen W8004 as illustrated in FIG. 51. FIG. 51 illustrates a display example on the user terminal 1500*a* of the player 8002*a*.

The game screen W8004 in the third embodiment is based on an image of a game space structured in a virtual three-dimensional space captured in the obliquely upward direction from behind the player character 8004A (a third person point-of-view image). Note that the game screen may be based on an image of a first person point-of-view of the player character 8004A depending on the flavor of the game.

The player operates his or her own player character 8004 to move in the game space. When encountering an enemy character 8006, the player character 8004 fights a battle with the enemy character 8006. In the example illustrated in FIG. 51, the enemy character 8006 is a character of the opposition player, that is, a player character 8004B (8003*c*) or the sub character 8005 (8005*d*, 8005*f*) (see FIG. 50).

The attack on the enemy character 8006 can be an attack by the player character 8004 or an attack using the sub character 8005.

FIG. 52 is an overview of an attack using the sub character 8005. The object appearing at the game can be moved such as being flown, rolled, run, slid, or the like by throwing, striking, launching, casting a spell, activating a skill, or the actions of the player character 8004 similar to these actions. In the following description, the movement of "flying" is taken as a representative. Note that any other movement is possible.

The attack using the sub character 8005 is implemented by a) throwing and flying the preset storage object 8008 by the player character 8004, b) hitting another object (a background object or the enemy character 8006, c) causing the stored sub character 8005 to appear, and d) the sub character 8005 having appeared performs an attack action.

Specifically, as illustrated in FIG. 52(1), the player 8002 first performs a predetermined pre-flight operation. In the pre-flight operation, a preset storage object list 8010 is displayed on the game screen W8004 (see FIG. 51) such that the preset storage objects 8008 are selectably listed. The player 8002 selects the preset storage object 8008 to be thrown from the list. In the example of FIG. 52(1), a preset storage object 8008*a* is selected.

When the player 8002 performs an action operation, the player character 8004 throws the selected preset storage object 8008 as illustrated in FIG. 52(2). In the third embodiment, the action used by the preset storage object 8008 is "throwing". However, in the case where the player character 8004 is a robot or the like, the action used may be "launch" (or "emission" or "release") of the preset storage object 8008 or the like.

The direction of throwing is the front direction of the player character 8004. A throwing direction marker 8012 (a broken-line circle on the center of the screen in the example of FIG. 51) is displayed on the game screen W8004 (see FIG. 51). The player can adjust the position and posture of the player character 8004 such that the marker is oriented to the direction to be thrown (throwing direction). In addition, a throwing force input bar 8014 is displayed on the game screen W8004 so that the player touches the bar to input the throwing force.

The "action operation" here includes operations that are detectable by on/off state such as operating a predetermined button switch or touching a predetermined operation icon, and operations that relate to input operations and of which an input is detected and determined by the amount of detection such as a flick by one or more fingers and a slide on the touch panel, and shaking the user terminal 1500 or a game controller.

Therefore, methods for inputting the throwing direction and the throwing force are not limited to the examples described above. For example, the input may be made by a swipe operation on the touch panel 1506. Specifically, the direction of the swipe may be regarded as the throwing direction, and the distance and speed of the swipe be regarded as an input of the throwing force. In a configuration in which an accelerometer is mounted in the user terminal 1500 or a game controller section separable from the user terminal 1500, the throwing force may be input by holding and shaking the user terminal 1500 or the game controller section by hand.

When the throwing direction and the throwing force are input, it is regarded that initial conditions related to throwing are determined. Then, the route in which the preset storage object 8008 to be thrown is to fly (flying route: moving route) and a flying destination to be reached are determined. The flying route and the flying destination (moving destination) can be determined by physical computing or quasi-physical computing, selection from a plurality of types of prepared flying routes.

Figure 53:
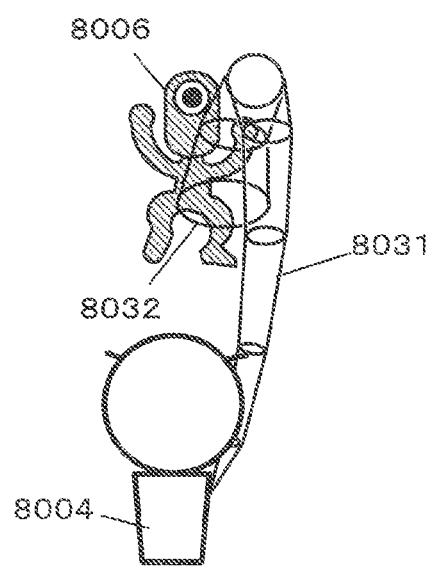
FIG. 53 is a diagram illustrating an example of a prediction display according to the third embodiment.

When the throwing force is input, the specifications of the direction and force of throwing are determined. Accordingly, as illustrated in FIG. 53, a predicted trajectory 8031 to be followed by the preset storage object 8008 to be thrown and a predicted flying destination 8032 are represented by pre-diction display objects in the game screen and are notified to the player. The "predicted trajectory" here can include the flying route and the error range preset based on the specifications such as the initial conditions related to throwing at that point in time. Similarly, the "predicted flying destination" can include the flying destination and the error range that can be set based on the specifications at that point in time.

The player 8002 sees the prediction display to consider whether the object can fly in the intended course and to the intended place. The throwing direction and the throwing force can be adjusted by changing the front side of the player character 8004 and touching again the throwing force input bar 8014. When the predicted trajectory 8031 and the predicted flying destination 8032 are as desired, the player 8002 inputs a predetermined action operation to cause the player character 8004 to throw the selected preset storage object 8008.

The thrown preset storage object 8008 is released from the player character 8004, and is controlled in movement to fly along the flying route to the flying destination until a given flight end condition is satisfied.

The "flight end condition" is a condition to be satisfied to end the movement, which can be set as appropriate. In the third embodiment, the contact with another object is set as flight end condition. Accordingly, a display effect is produced such that the thrown preset storage object 8008 finally hits the enemy character 8006, a background object, the friend sub character 8005 having appeared, or another object, and stops flying, and then the storage object is arranged or is broken at a stop position. For the preset storage object 8008, when a given release condition is satisfied, the sub character 8005 stored in the preset storage object 8008 is released and appears in the game space, and starts to act as the sub character 8005 as illustrated in FIG. 52(3).

The "release condition" is settable as appropriate. In the third embodiment, however, the release condition includes satisfying at least the flight end condition. In addition, the condition that the time elapsed from the start of flying has reached a predetermined time, the condition that the storage object has approached the enemy character 8006, and the condition that the storage object has received an attack from the enemy character 8006 can be appropriately set as AND condition and OR condition.

The sub character 8005 having been released and appeared from the preset storage object 8008 is an NPC and thus automatically controlled by a computer. FIG. 52(3) illustrates an example of performing enemy-search and attacking on the enemy character 8006 existing in an enemy-search range 8026. However, automatic action controls other than the attack control such as a control to back up the friend character described later, a control to block the action of the enemy character 8006, and others may be enabled and may be selected and executed on a priority basis depending on the type of the sub character 8005. Otherwise, the player 8002 may be allowed to select and set any of a plurality of automatic actions.

The preset storage object 8008 having satisfied the release condition cannot be used again in the current gameplay but becomes usable again in the next gameplay. During the gameplay, the preset storage object 8008 may be allowed to become reusable after a lapse of a predetermined time after the use.

In order to produce a new attraction in the battle game using the sub character 8005 or enhance the attraction of the game, in the third embodiment, the player 8002 elaborately makes the settings of the throwing and the items to be used to satisfy the backup initiating condition, thereby making it possible to cause the sub character 8005 after appearance to take an action for backing up the friend character on a priority basis.

In the third embodiment, a battle game by one player versus one player is exemplified. Thus, the "friend character" here means the sub character 8005 having already appeared owned by each player 8002. However, in the case of a battle game by plural players versus plural players, the friend character here also includes operation target characters (player characters 8004) of players different from the players viewing the game screen W8004 (other players of the friend team).

FIG. 54 is a diagram illustrating an example of backup initiating condition and the automatic control of the sub character 8005 after the backup initiation, with a transition of situation from FIG. 54(1) to FIG. 54(3). The backup initiating condition illustrated in FIG. 54 is a contact between the thrown preset storage object 8008 and the enemy character 8006.

Referring to FIG. 54(1), the thrown preset storage object 8008 (8008*a*) contacts the enemy character 8006*a* attacking the sub character 8005*b* having already appeared as a friend character (the enemy character attacking the friend character). The "enemy character attacking the friend character" here means that the friend character is positioned in a striking range of the enemy character and the enemy character regards the friend character as an attack target. The flight end condition of the preset storage object 8008 is satisfied by the contact with the enemy character 8006*a*. Thus, as illustrated in FIG. 54(2), the stored object 8007 in the preset storage object 8008 is represented as becoming broken, and the stored sub character 8005*a* appears.

In general, the sub character 8005*a* having appeared is automatically controlled to search and attack the enemy character 8006 in the enemy-search range 8026. In the example illustrated in FIG. 54(2), there exists two characters, that is, the enemy character 8006*a* and the enemy character 8006*b*, and which of them to be attacked is determined as appropriate according to the fighting ability of the sub character, and the like.

However, referring to FIG. 54(2), the sub character 8005*a* having appeared satisfies the backup initiating condition and thus is automatically controlled to back up the friend character on a priority basis (automatic backup control). Accordingly, the sub character 8005*a* attacks the enemy character 8006*a* to back up the sub character 8005*b* as a friend character that is an attack target of the enemy character 8006*a*.

When the enemy character 8006*a* is defeated by the backup, the backup cause is regarded as being eliminated. Thus, as illustrated in FIG. 54(3), the automatic backup control of the sub character 8005*a* is terminated, and then the sub character 8005*a* is automatically controlled to take a general enemy-search attack action. That is, the stored NPC as the target of the automatic backup control is automatically controlled to attack the enemy group.

The contact with the enemy character 8006*a* attacking the friend character can be defined by a relative positional relationship between the enemy character 8006*a* and an appearance position 8040 of the sub character 8005*a*. That is, even if the preset storage object 8008 actually does not contact the enemy character 8006*a*, the two may be regarded substantially in contact with each other when the appearance position 8040 is included in a predetermined first initiating condition range 8041 from the enemy character 8006*a*.

FIG. 55 is a diagram illustrating another example of backup initiating condition and the automatic control of the sub character 8005 after the backup initiation, with a transition of situation from FIG. 55(1) to FIG. 55(2).

The backup initiating condition illustrated in FIG. 55 is a contact between the thrown preset storage object 8008 and a friend character (sub character 8005*b*) being attacked by the enemy character 8006 (positioned in the striking range and being the attack target of the enemy character 8006).

Referring to FIG. 55(1), the thrown preset storage object 8008 (8008*a*) is in contact with the sub character 8005*b* having already appeared as a friend character being attacked. This means that the flight end condition of the preset storage object 8008 is satisfied. Thus, as illustrated in FIG. 55(2), the stored object 8007 in the preset storage object 8008 is represented as becoming broken, and the stored sub character 8005*a* appears.

The sub character 8005*a* having appeared satisfies the backup initiating condition and thus is automatically controlled to back up the friend character on a priority basis (automatic backup control). Specifically, the sub character 8005*a* attacks the enemy character 8006*a* to back up the sub character 8005*b*. The automatic control after the defeat of the enemy character 8006*a* by the backup is the same as described above with reference to FIG. 54(3).

The contact with the friend character being attacked can be defined by a relative positional relationship between the friend character and the appearance position 8040 of the sub character 8005*a*. That is, even if the preset storage object 8008 actually does not contact the friend character being attacked, the two may be regarded substantially in contact with each other when the appearance position 8040 is included in a predetermined second initiating condition range 8042 from the friend character being attacked.

FIG. 56 is a diagram illustrating an example of the backup initiating conditions in combination with the use of an item.

The backup initiating condition illustrated in FIG. 56(1) is an example in the case where a sub character backup prioritized item 8021m is set and associated with the sub character 8005a stored in the preset storage object 8008. The sub character backup prioritized item 8021m is an item usable for the sub character 8005, of which the operational effect is to prioritize the automatic backup control not depending on whether the backup initiating condition is satisfied. When the sub character 8005 with which the item is used (associated) has appeared, it is regarded that the backup initiating condition is satisfied even if the backup initiating condition described above with reference to FIG. 54 or 55 is actually not satisfied.

The backup initiating condition illustrated in FIG. 56(2) is an example in the case where a sub character backup prioritized item 8022m is set and associated with the storage object 8007 storing the sub character 8005 having appeared. The storage object backup prioritized item 8022m is an item usable for the storage object 8007, of which the operational effect is to prioritize the automatic backup control not depending on whether the backup initiating condition is satisfied. When the sub character 8005 has appeared from the storage object 8007 with which the item is used (associated), it is regarded that the backup initiating condition is satisfied even if the backup initiating condition described above with reference to FIG. 54 or 55 is actually not satisfied.

FIG. 57 is a diagram illustrating types of automatic backup control.

The automatic backup control in the third embodiment is classified into the following four types:

FIG. 57(1) illustrates an example of a first automatic backup control type under which the sub character 8005a having appeared attacks the enemy character 8006 attacking a friend character. The method for attacking can be set as appropriate to not only direct and proximity attack as illustrated in FIG. 57(1) but also long-distance attack according to the ability of the sub character. In the attack under the automatic backup control, it is preferred to temporarily enhance the ability value of the sub character 8005. For example, it is preferred to multiply the fighting strength to be applied under a non-automatic backup control by 1.2 times.

FIG. 57(2) illustrates an example of a second automatic backup control type under which the sub character 8005a having appeared moves a friend character. The method for movement can be set as appropriate to instantaneous movement, suspending movement, or throwing. The movement destination may be at random but needs to be outside the striking range of the enemy character 8006 currently making an attack.

FIG. 57(3) illustrates an example of a third automatic backup control under which the sub character 8005a having appeared restores a friend character from damage and an example of a fourth automatic control under which the sub character 8005a having appeared temporarily improves the ability value of a friend character. Specifically, these automatic backup controls are executed when an item 8021t with the operational effect of recovering from damage and/or temporarily enhancing the ability value is set to the sub character 8005a having appeared, or when the sub character with the operational effect backs up the friend character.

Figure 58:
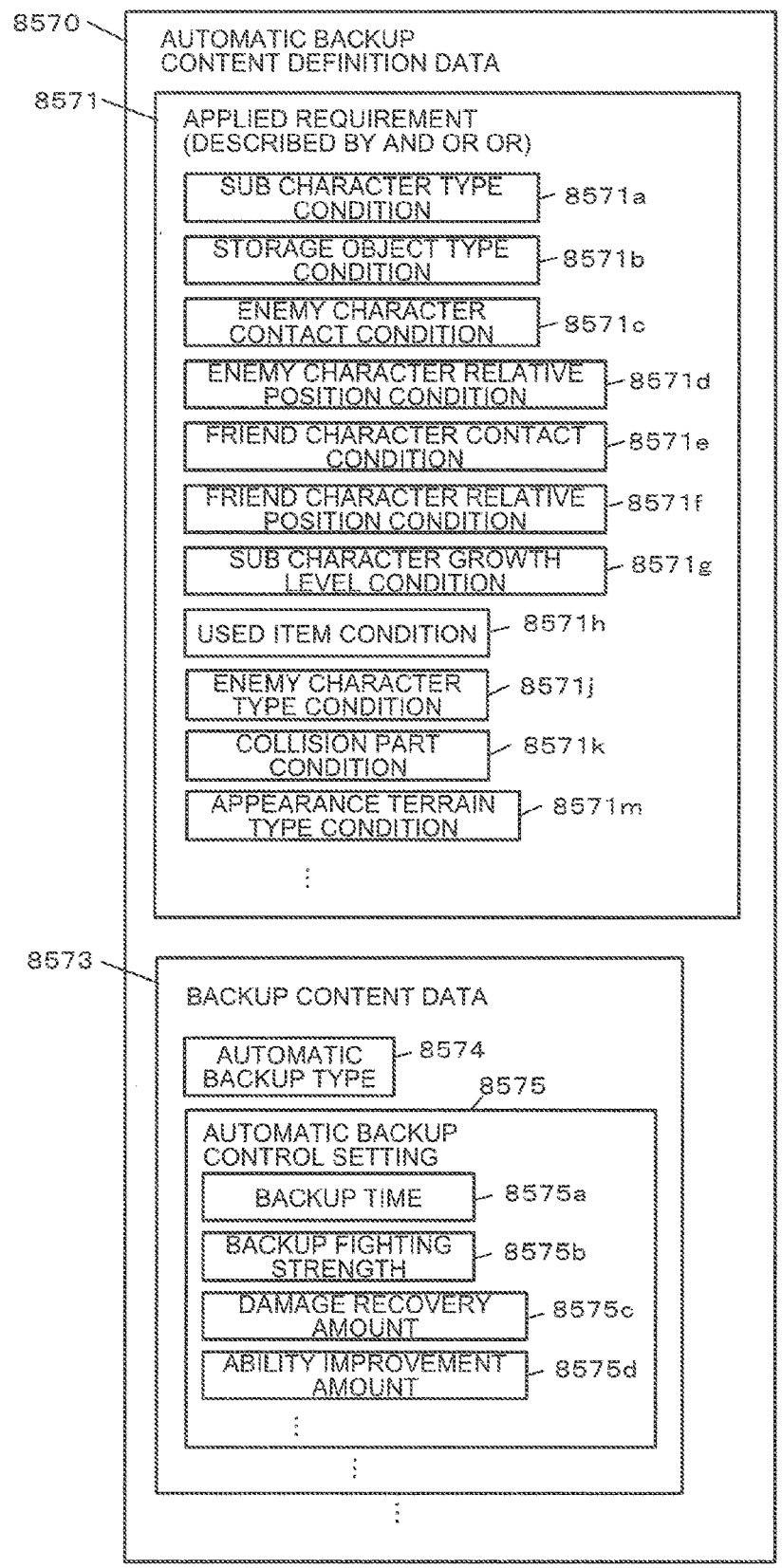
FIG. 58 is a diagram illustrating an example of a data structure of automatic backup content definition data for changing contents of the automatic backup control according to the third embodiment.

FIG. 58 is a diagram illustrating an example of a data structure of automatic backup content definition data 8570 for changing contents of the automatic backup control. In the third embodiment, it is possible to change the content of the automatic backup control of the sub character 8005 having appeared according to the situation. The automatic backup content definition data 8570 is prepared for each content of change.

The one automatic backup content definition data 8570 includes an applied requirement 8571 that indicates a condition under which the definition data is applied and backup content data 8573.

The applied requirement 8571 can be described by a plurality of conditions in AND or OR relationship. The conditions for use in description can be set as appropriate. In the third embodiment, the following conditions can be used for description:

a) a sub character type condition 8571a as a condition related to the type of the sub character 8005 to be under the automatic backup control;

b) a storage object type condition 8571b as a condition related to the type of the storage object 8007 storing the sub character 8005 to be under the automatic backup control; c) an enemy character contact condition 8571c related to the presence or absence of a contact between the preset storage object 8008 in flying and the enemy character 8006 attacking a friend character;

d) an enemy character relative position condition 8571d as a condition related to a relative positional relationship between the sub character 8005 to be under the automatic backup control and the enemy character 8006 attacking a friend (for example, relative distance, relative azimuth, relative height, or the like);

e) a friend character contact condition 8571e related to the presence or absence of a contact between the preset storage object 8008 in flying and a friend character being attacked by an enemy;

f) a friend character relative position condition 8571f as a condition related to a relative positional relationship between the sub character 8005 to be under the automatic backup control and a friend character being attacked by an enemy;

g) a sub character growth level condition 8571g as a condition related to growth level of the sub character 8005 to be under the automatic backup control;

h) a used item condition 8571h as a condition related to an item used for (associated with) the sub character 8005 to be under the automatic backup control or the storage object 8007 having stored the sub character;

i) an enemy character type condition 8571j as a condition related to the type of the enemy character 8006 collided by the flying preset storage object 8008 (the storage object 8007 storing the sub character 8005);

j) a collision part condition 8571k as a condition related to the part of the enemy character 8006 collided by the flying preset storage object 8008; and k) an appearance terrain type condition 8571m as a condition related to the type of terrain of a position where the preset storage object 8008 has flown and collided or a position where the sub character 8005 has appeared.

Note that other conditions, for example, a condition related to the growth level of the storage object 8007, a condition related to the type of the player character 8004, and the like can be used as appropriate. Each of the conditions for describing the applied requirement 8571 can be omitted as appropriate or can be set to "no setting" without a substantial content.

The backup content data 8573 includes automatic backup type 8574 and automatic backup control setting 8575.

For the automatic backup type 8574, any of the first automatic backup control type to the fourth automatic backup control type is specified.

The automatic backup control setting 8575 refers to various control settings that define the content of the automatic backup control. For example, the automatic control setting 8575 can include:

a) a backup time 8575*a* that defines a time length for the automatic backup control;

b) a backup fighting strength 8575*b* that is applied to make an attack for backup (at the execution of the first automatic backup control type);

c) a damage recovery amount 8575*c* (or damage recovery ratio) that is applied to recover a friend character from damage caused by the attack of the enemy character 8006 as a backup (at the execution of the third automatic backup control type); and d) an ability improvement amount 8575*d* that is applied to temporarily improve the ability value of a friend character being attacked by the enemy character 8006 as a backup (at the execution of the fourth automatic control type).

Note that other content definition data can be included as appropriate according to the settings of the automatic backup control.

For the automatic backup control of the sub character 8005, the automatic backup content definition data 8570 is searched for the definition data of the matching applied requirement 8571, and the sub character 8005 is automatically controlled to back up based on the backup content data 8573 of the searched definition data.

That is, the content of the automatic backup control of the sub character 8005 varies depending on the combination of the sub character 8005 and the storage object 8007 storing the sub character 8005, whether the preset storage object 8008 has flown and contacted the enemy character 8006 or a friend character, whether the sub character 8005 has appeared with respect to the enemy character 8006 and the friend character, and the like.

For example, as the target of the automatic control of the sub character 8005 skilled in repair of arm, setting the collision part condition 8571*k* to "arm" and setting the damage recovery amount 8575*c* in the automatic backup control setting 8575 to specially high makes it possible to, when the preset storage object 8008 hits an arm of the enemy character 8006 and the sub character 8005 of that type appears, achieve greater damage recovery than ordinary damage recovery.

[Functional Configuration]

Figure 59:
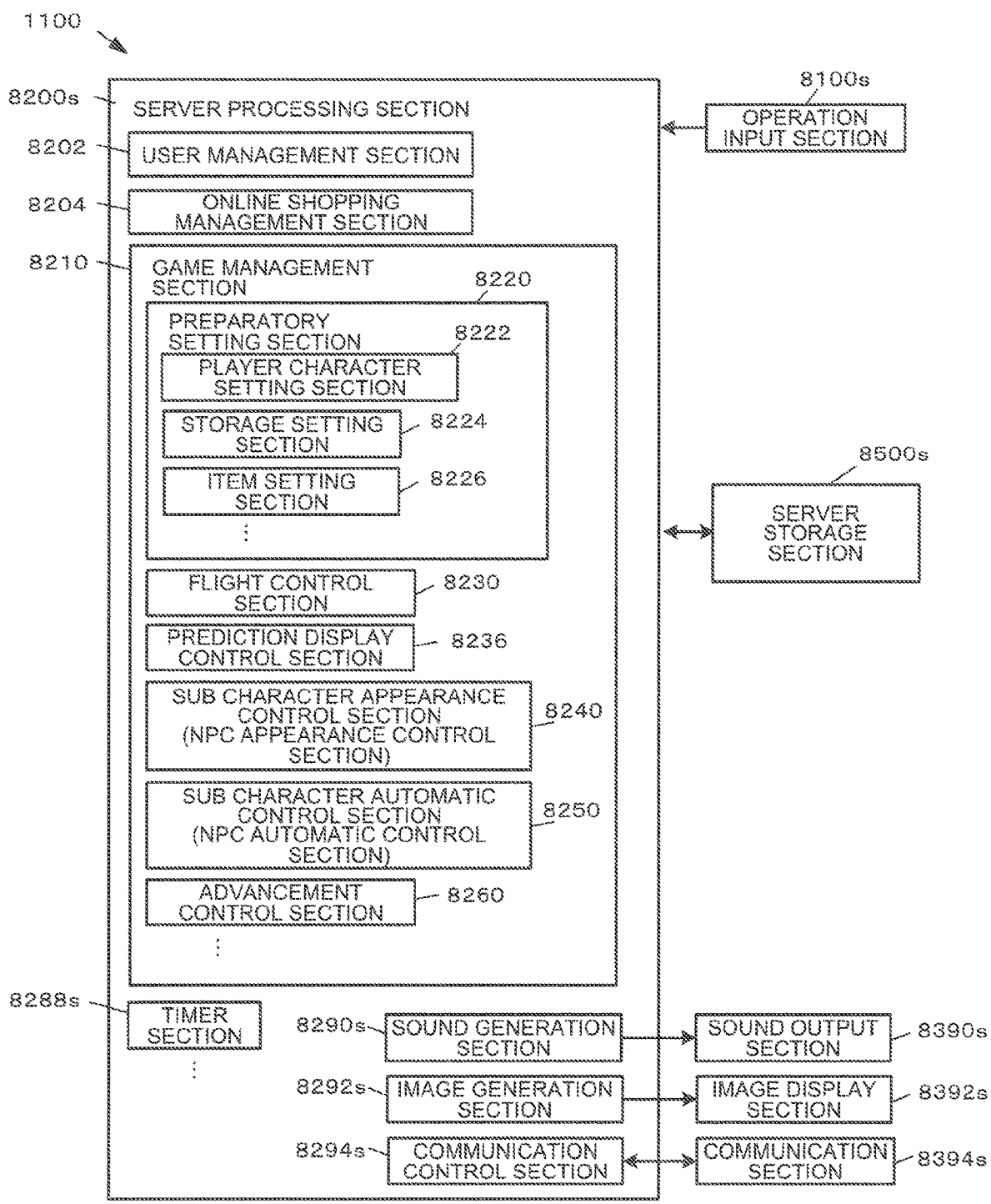
FIG. 59 is a functional block diagram illustrating an example of a functional configuration of a server system according to the third embodiment.

FIG. 59 is a functional block diagram illustrating an example of a functional configuration of the server system 1100 according to the third embodiment. The server system 1100 according to the third embodiment includes an operation input section 8100*s*, a server processing section 8200*s*, a sound output section 8390*s*, an image display section 8392*s*, a communication section 8394*s*, and a server storage section 8500*s*.

The operation input section 8100*s* is for inputting various operations for server management. The operation input section 8100*s* corresponds to the keyboard 1106 in FIG. 1.

The server processing section 8200*s* is implemented with electronic parts such as a microprocessor (e.g., a CPU and a GPU), an ASIC, or an IC memory. The server processing section 8200*s* controls data exchanged between functional sections including the operation input section 8100*s* and the server storage section 8500*s*. In addition, the server processing section 8200*s* performs various calculation processes based on predetermined programs, data, the operation input signal from the operation input section 8100*s*, data revived from the user terminal 1500, and the like, thereby to entirely control the operation of the server system 1100.

The server processing section 8200*s* according to the third embodiment includes a user management section 8202, an online shopping management section 8204, a game management section 8210, a timer section 8288*s*, a sound generation section 8290*s*, an image generation section 8292*s*, and a communication control section 8294*s*. Note that functional sections other than these may be included as appropriate.

The user management section 8202 performs a process related to a user registration procedure and manages the data of each user associated with the user account. In the third embodiment, the user management section 8202 has various functions including: 1) issuing a unique user account to a registered user; 2) registration information management for registering and managing personal information for each user account; 3) book keeping management for an electronic payment medium consumed for paying for a charged element (online shopping and play cost in the third embodiment); 4) play history management for managing the history of login and logout in gameplay; and 5) management of game save data. Note that any other appropriate management function for other data associated with the account can be included.

The online shopping management section 8204 is in charge of control related to online shopping, which can be implemented with a known online shopping technique as appropriate. In the third embodiment, the player can purchase the main character 8003, the sub character 8005, the storage object 8007, and items in online shopping. Any other elements may be set as appropriate to be sold in the online shopping.

The game management section 8210 performs various processes related to game play management. The game according to the third embodiment is a client-server online game, and thus the game management section 8210 according to the third embodiment communicates with the user terminal 1500 to perform a control for providing data required for the gameplay. The game management section 8210 in the third embodiment has a preparatory setting section 8220, a flight control section 8230, a prediction display control section 8236, a sub character appearance control section 8240, a sub character automatic control section 8250, and an advancement control section 8260. Note that functional sections other than these may be included as appropriate.

The preparatory setting section 8220 makes various settings related to preparation for gameplay based on the player's operation. Specifically, the preparatory setting section 8220 has a player character setting section 8222, a storage setting section 8224, and an item setting section 8226.

The player character setting section 8222 selects and sets the character as the player character 8004 from among the plurality of characters based on the player's operation. More specifically, the player character setting section 8222 selects and sets any of the main characters 8003 owned by the player as the player character 8004 based on a selection operation (see FIG. 50).

The storage setting section 8224 sets the storage object by selecting the NPC to be stored and the object as a storage destination from among the plurality of NPCs and the plurality of objects based on the player's selection operation.

When the storage object is capable of storing the plurality of sub characters 8005, the storage setting section 8224 can select a plurality of NPCs to be stored. More specifically, the storage setting section 8224 associates the sub character 8005 and the storage object 8007 to create the preset storage object 8008 (see FIG. 50).

The item setting section 8226 associates a given item to the storage object 8007 and/or the NPC stored in the storage object 8007 based on the player's operation input. More specifically, the item setting section 8226 associates a sub character item 8021 (8021*t*, 8021*m*, see FIGS. 56 and 57) with the sub character 8005, and associates a storage object item 8022 (8022*m*, see FIG. 56) with the storage object 8007.

Besides the functions described above, the preparatory setting section 8220 can set the game space to be used in gameplay from among a plurality of game spaces (also called game stages) based on the player's operation input.

The flight control section 8230 performs a control to fly the storage object storing the non-playable character (NPC) until a given flight end condition is satisfied based on the player's action operation.

Specifically, the flight control section 8230 performs a flight control of the preset storage object 8008 set by combining the storage object 8007 and the sub character 8005. For example, the flight control section 8230 determines the flying destination and the flying route to the flying destination according to the specifications related to throwing at that time (such as the throwing direction and the throwing force in the third embodiment). These elements are for determining the predicted flying destination and the predicted trajectory. Then, the flight control section 8230 determines the flying destination and the flying route based on the specifications at the point in time when the action operation is performed, and controls the preset storage object 8008 to fly to the flying destination along the determined flying route.

The prediction display control section 8236 performs a control to provide a prediction display indicating the predicted trajectory 8031 and/or the predicted flying destination 8032 in the flight control.

The sub character appearance control section 8240 performs a control to cause the NPC stored in the storage object to appear from the storage object satisfying the flight end condition. Specifically, the sub character appearance control section 8240 performs a release/appearance control of the sub character 8005 (the stored NPC).

The sub character automatic control section 8250 is a control section that automatically controls the stored NPC having been caused to appear by the sub character appearance control section and performs an automatic backup control to back up a friend character when a predetermined backup initiating condition is satisfied.

The sub character automatic control section 8250 can also change the content of the automatic backup control at the time of execution.

Specifically, the sub character automatic control section 8250 performs a change control of the automatic backup control to determine whether to perform the automatic backup control or change the content of the automatic backup control, based on whether the flown storage object has contacted an enemy character.

The sub character automatic control section 8250 also performs a change control of the automatic backup control to determine whether to perform the automatic backup control or change the content of the automatic backup control, based on whether the flown storage object has contacted a friend character.

The sub character automatic control section 8250 also performs a change control of the automatic backup control to change the content of the automatic backup control based on a relative positional relationship between the position of the post-appearance stored NPC and the position of a friend character.

The sub character automatic control section 8250 also changes the content of the automatic backup control based on an item associated with the storage object and/or the NPC stored in the storage object.

The sub character automatic control section 8250 also performs the automatic backup control by an automatic control to, when a friend character is located in a striking range of an enemy character and the enemy character has the friend character as an attack target, cause the stored NPC to attack the enemy character.

The sub character automatic control section 8250 also performs the automatic backup control by an automatic control to recover the friend character form damage, an automatic control to move the friend character to a given movement destination, or an automatic control to temporarily improve the ability value of the friend character.

After the end of the automatic backup control, the sub character automatic control section 8250 automatically controls the stored NPC as a control target of the automatic backup control to attack the enemy group.

The advancement control section 8260 changes the parameter values of the storage object by the advancement control of the storage object such as ability improvement, reinforcement, level increase, and the like. The advancement control section 8260 can change the parameter values of the NPC by the advancement control of the NPC such as ability improvement, reinforcement, level increase, and the like.

The timer section 8288*s* uses a system clock to obtain the current date and time, a limited time period, and the like.

The sound generation section 8290*s* is implemented with an integrated circuit (IC) or by executing software that generates sound data and performs decoding, and generates or decodes sound data on operation sound and background music (BGM) related to system management for the server system 1100 and the gameplay. The resultant sound signal related to the system management is output to the sound output section 8390*s*.

The sound output section 8390*s* receives the sound signal to emit the corresponding sound. The sound output section 8390*s* corresponds to a speaker of the main body device 1101 or the touch panel 1108 in the example illustrated in FIG. 1.

The image generation section 8292*s* can generate an image related to the system management for the server system 1100, a game image (or data for displaying the game image on the user terminal 1500), and the like. The image related to the system management can be output to the image display section 8392*s*.

The image display section 8392*s* displays various images for system management based on the image signals input from the image generation section 8292*s*. The image display section 8392*s* can be implemented with an image display device such as a flat panel display, a cathode ray tube (CRT), a projector, or a head-mounted display. The image display section 8392*s* corresponds to the touch panel 1108 in the example illustrated in FIG. 1.

The communication control section 8294s performs a data process related to the data communication, and exchanges data with an external device through the communication section 8394s.

The communication section 8394s connects to the network 9 to implement communications. The communication section 8394s is implemented with a transceiver, a modem, a terminal adapter (TA), a jack for a communication cable, a control circuit, and the like. The communication section 8394s corresponds to the communication device 1153 in the example illustrated in FIG. 1.

The server storage section 8500s stores a program and various types of data for implementing various functions of the server processing section 8200s for entirely controlling the server system 1100. The server storage section 8500s is used as a work area for the server processing section 8200s, and temporarily stores the results of calculations performed by the server processing section 8200s based on various programs. The functions of the server storage section 8500s are implemented with an IC memory (e.g., RAM and ROM), a magnetic disk (e.g., hard disk), an optical disk (e.g., CD-ROM and DVD), an online storage, or the like. The server storage section 8500s corresponds to a storage medium, such as the IC memory 1152 and hard disk mounted in the main body device 1101, and the storage 1140 in the example illustrated in FIG. 1.

Figure 60:
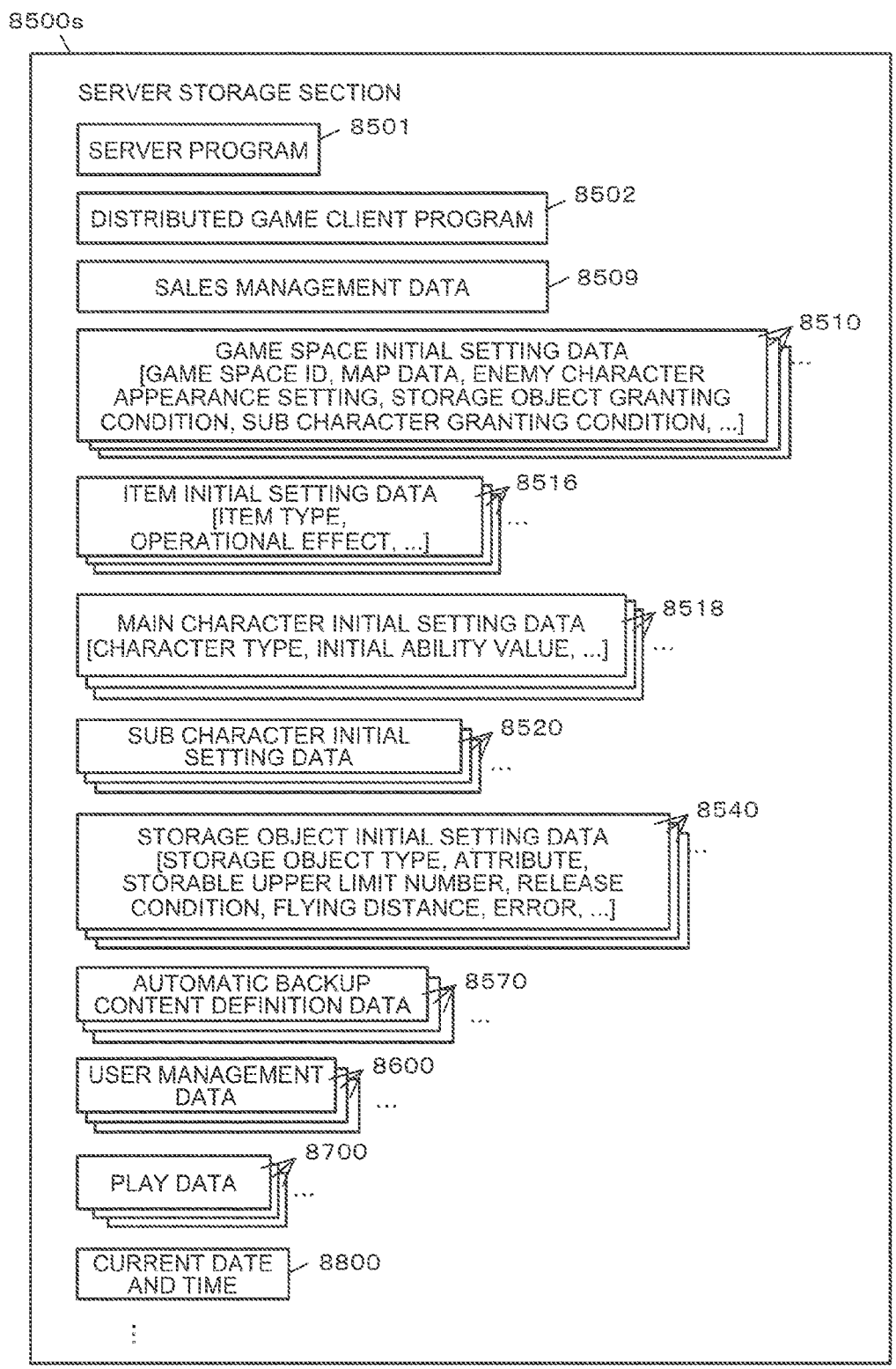
FIG. 60 is a diagram illustrating an example of programs and data stored in a server storage section according to the third embodiment.

FIG. 60 is a diagram illustrating an example of programs and data stored in the server storage section 8500s according to the third embodiment. The server storage section 8500s in the third embodiment stores a server program 8501, a distributed game client program 8502, sales management data 8509, game space initial setting data 8510, item initial setting data 8516, main character initial setting data 8518, sub character initial setting data 8520, storage object initial setting data 8540, and automatic backup content definition data 8570 (see FIG. 58).

The server storage section 8500s also stores user management data 8600, play data 8700, and current date and time 8800 as data related to the game and generated and managed in sequence. The server storage section 8500s can also store other programs and data (for example, a timer, a counter, various flags, and others) as appropriate.

The server program 8501 is a program read and executed by the server processing section 8200s to implement the functions of the user management section 8202, the online shopping management section 8204, and the game management section 8210 (see FIG. 59).

The distributed game client program 8502 is an original of a game client program provided to the user terminal 1500.

The sales management data 8509 includes data for defining and managing sales products in online shopping. For example, purchasable items, stock quantities, and charge prices (equivalent to debit amounts from payment media in the third embodiment) are stored in association with one another.

The game space initial setting data 8510 is prepared for each game space (also called game stage), which includes various types of initial setting data related to the game space. The one game space initial setting data 8510 includes a game space ID, map data, terrain type setting data in each position in a map, enemy character appearance settings, storage object granting conditions, sub character granting conditions, item granting conditions, and others. The storage object granting conditions, the sub character granting conditions, and the item granting conditions define conditions to be satisfied to grant new storage objects, new sub characters, and new items to the player in the game space.

The item initial setting data 8516 is prepared for each item, which includes various types of initial setting data related to the item. For example, the one item initial setting data 8516 includes an item type and operational effect definition data.

The main character initial setting data 8518 is prepared for each type of the main character 3, which includes various types of initial setting data related to the main character. For example, the one main character initial setting data 8518 includes information such as a character type and an initial ability value of the character. Note that the main character initial setting data 8518 also includes various types of data necessary for displaying the character on the game screen and causing the character to make an action (for example, model data, motion data, texture data, and others of the character).

Figure 61:
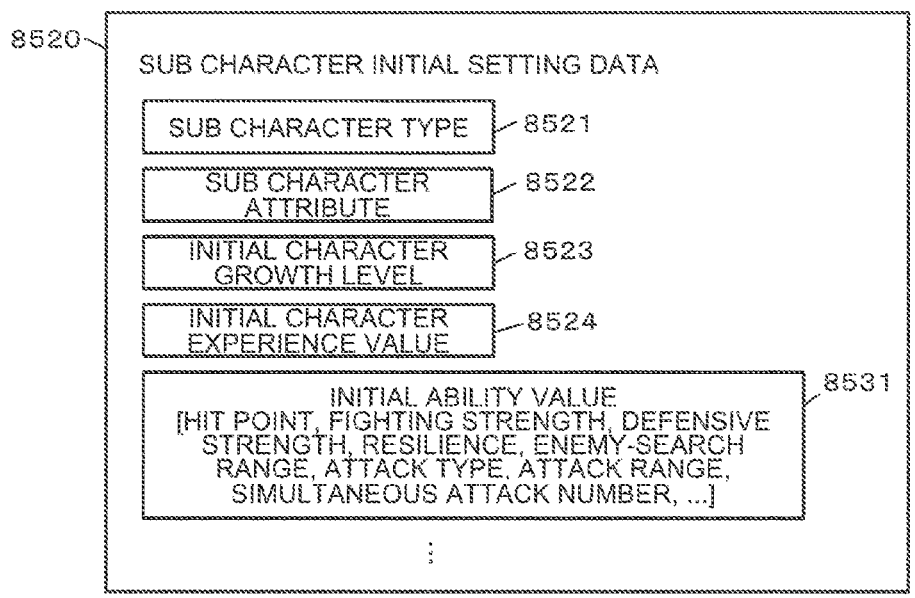
FIG. 61 is a diagram illustrating an example of a data structure of sub character initial setting data according to the third embodiment.

The sub character initial setting data 8520 is prepared for each type of the sub character, which includes various types of initial setting data related to the sub character 5. The one sub character initial setting data 8520 includes a sub character type 8521, a sub character attribute 8522, an initial character growth level 8523, an initial character experience value 8524, and an initial ability value 8531, for example, as illustrated in FIG. 61. Note that the sub character initial setting data 8520 also includes various types of data necessary for displaying the character on the game screen and causing the character to make an action (for example, model data, motion data, texture data, and others of the character).

The parameter values defining abilities included in the initial ability value 8531 can be appropriately set as hit point (that is decreased with damage, and the action is disabled with a value of 0), fighting strength, defensive strength, resilience, enemy-search range, and others.

Referring back to FIG. 60, the storage object initial setting data 8540 is prepared for each type of storage object, which includes various types of initial setting data related to the storage object. The one storage object initial setting data 8540 includes storage object type, storage object attribute, storable upper limit number, release condition, flying distance, and error, for example. Note that data other than these can be included as appropriate.

Figure 62:
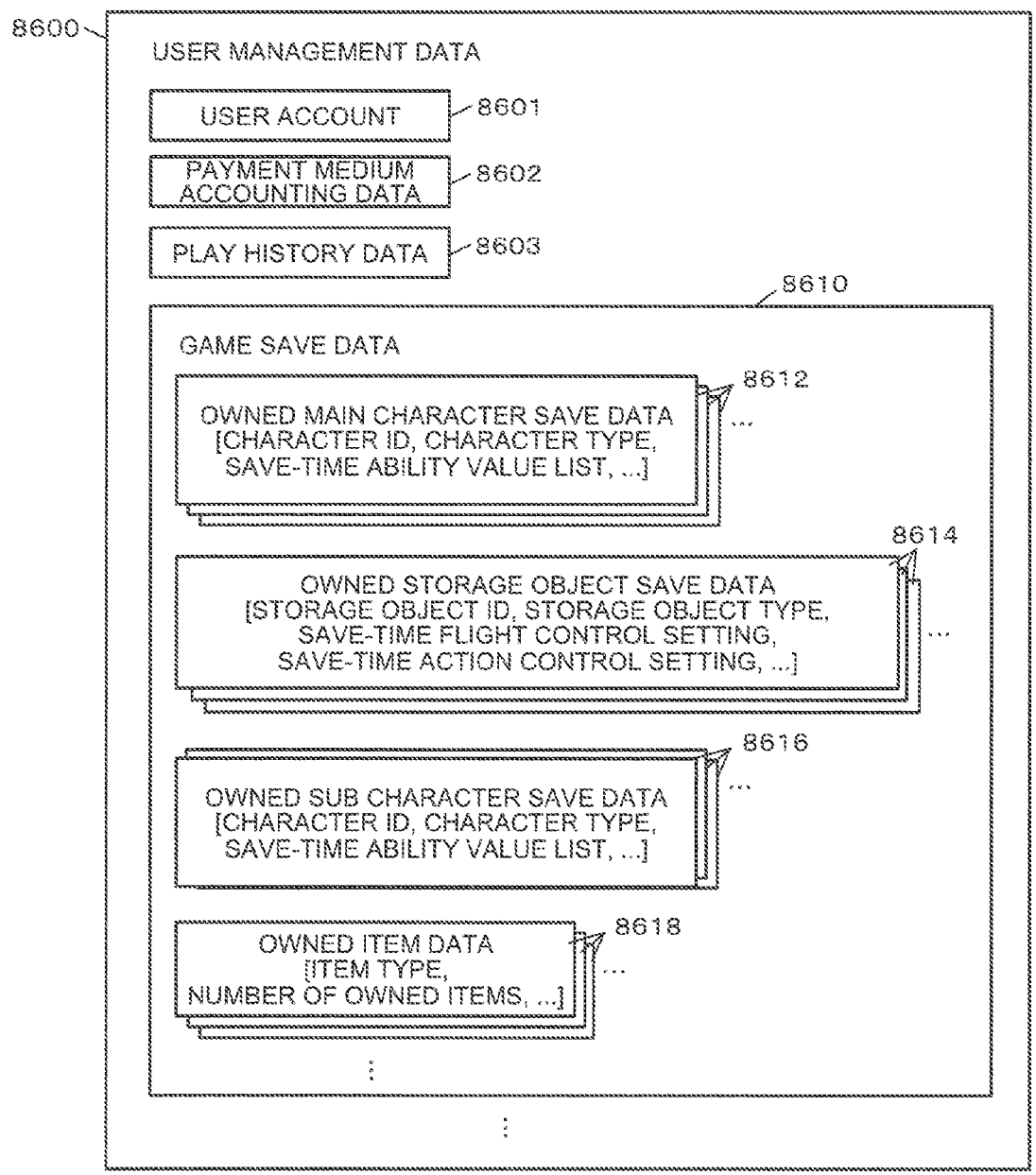
FIG. 62 is a diagram illustrating an example of a data structure of user management data according to the third embodiment.

The user management data 8600 s prepared for each registered user and includes various types of data associated with a unique identification information, namely, an account. In the third embodiment, as illustrated in FIG. 62, for example, the one user management data 8600 includes a unique user account 8601, payment medium accounting data 8602, play history data 8603, and game save data 8610. Note that data other than these can be included as appropriate.

The payment medium accounting data 8602 serves as what is known as an account book storing therein information on a charged/consumed amount (of specified parameter values, such as virtual currency, game currency, specified items, or vitality) of the payment medium for electronic payment associated with the user, information on a reason for the charging/consumption, and information on changed date and time in association with one another. The payment medium accounting data 8602 can also be referred to as charge history data or charge history information.

The play history data 8603 includes data describing the time of gameplay, the play performance, and others in time series, which is automatically updated at login/logout timings.

The game save data 8610 includes various types of data describing results of the previous and earlier gameplay and game progress states. For example, the game save data 8610 includes owned main character save data 8612, owned storage object save data 8614, owned sub character save data 8616, and owned item data 8618. Note that data other than these can be included as appropriate.

Referring back to FIG. 60, the play data 8700 is prepared for each gameplay that is executed on the user terminal 1500, which includes various types of data describing the game progress situations and various types of information related to display on the game screen such as control data of each character.

Figure 63:
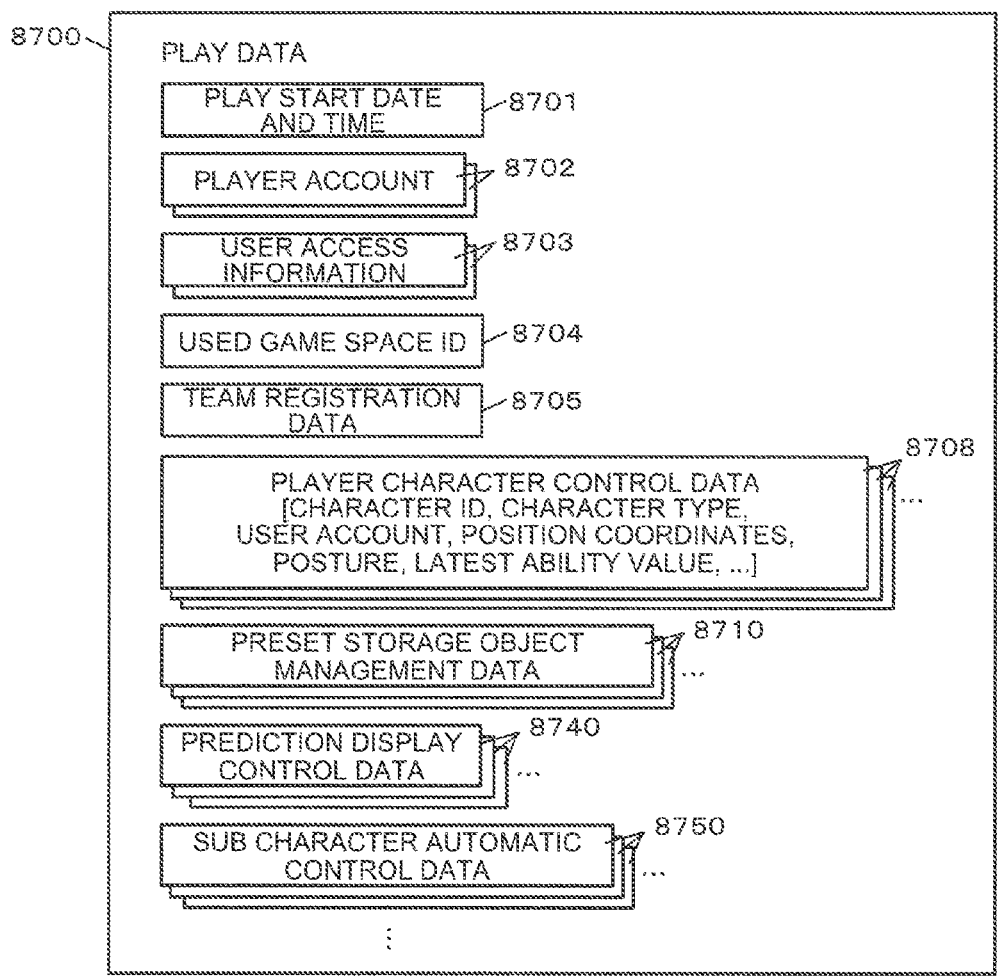
FIG. 63 is a diagram illustrating an example of a data structure of play data according to the third embodiment.

The one play data 8700 includes play start date and time 8701, a player account 8702 as the account of the user as player, user terminal access information 8703 for accessing the user terminal 1500 of the player, a used game space ID 8704, team registration data 8705, player character control data 8708, preset storage object management data 8710, prediction display control data 8740, and sub character automatic control data 8750, for example, as illustrated in FIG. 63. Note that data other than these can be included as appropriate.

The player character control data 8708 is prepared for each player character 8004, which include various types of data describing the latest state of the character in the game space (for example, character ID, character type, user account, position coordinates, posture, latest ability value, motion control data of character model, and others).

The preset storage object management data 8710 is created each time the player sets a combination of sub character and storage object, that is, is created for each preset storage object, which includes various types of data related to the preset storage object.

Figure 64:
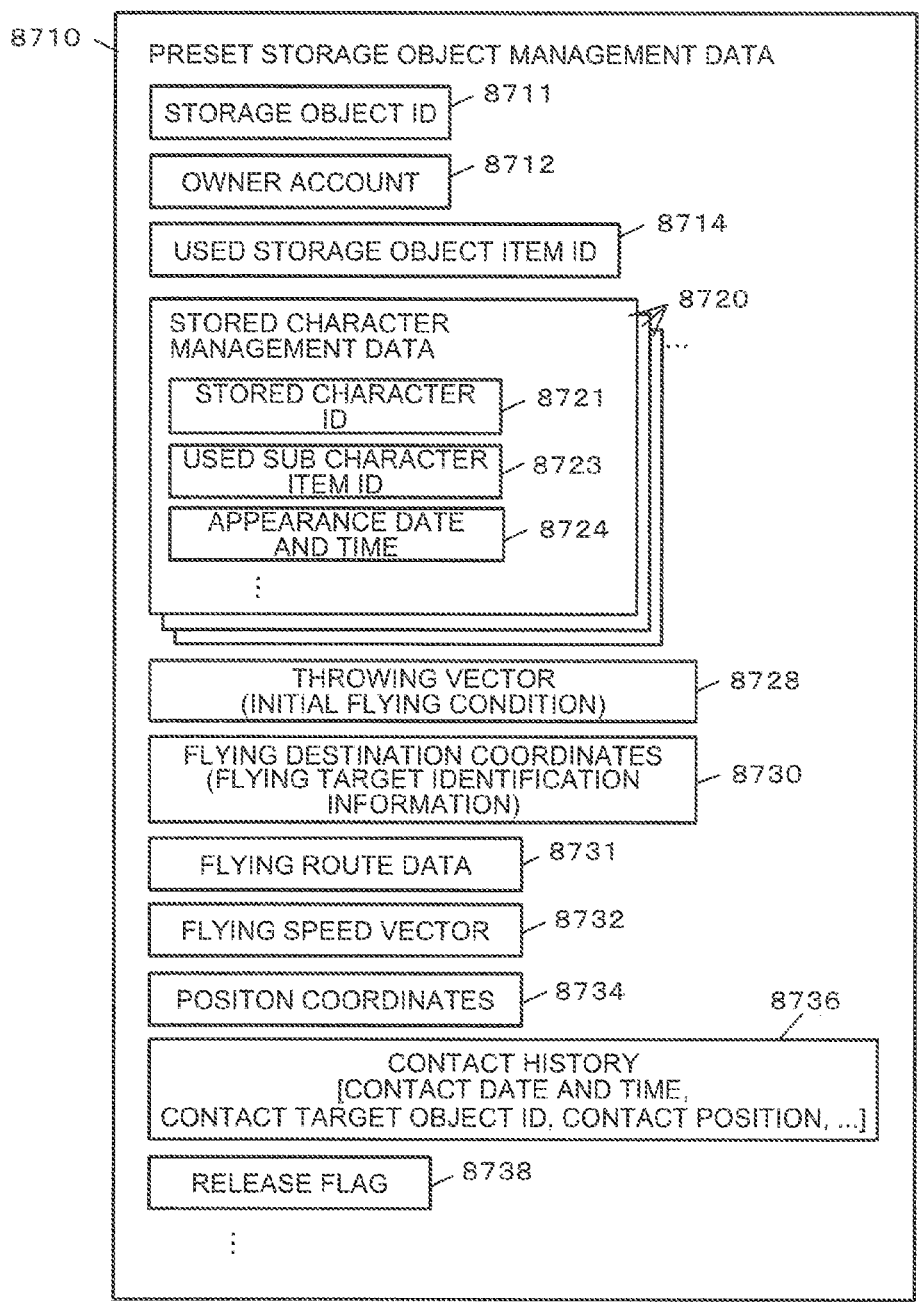
FIG. 64 is a diagram illustrating an example of a data structure of preset storage object management data according to the third embodiment.

The one preset storage object management data 8710 includes a unique storage object ID 8711, an owner account 8712 storing a user account of an owner/setter of the preset storage object, a used storage object item ID 8714, stored character management data 8720, a throwing vector 8728, flying destination coordinates 8730, flying route data 8731, a flying speed vector 8732, position coordinates 8734, a contact history 8736, and an release flag 8738, for example, as illustrated in FIG. 64. Note that data other than these can be included as appropriate.

The used storage object item ID 8714 is an item ID of the storage object item 8022 (for example, see FIG. 56) set for (associated with) the storage object.

The stored character management data 8720 is created for each sub character combined with the preset storage object, that is, for each the stored NPC, which includes various types of data related to the sub character. The one stored character management data 8720 includes a stored character ID 8721, a used sub character item ID 8723, and appearance date and time 8724, for example.

The used sub character item ID 8723 is an item ID of the sub character item 8021 set for (associated with) the sub character (for example, see FIGS. 56 and 57).

The throwing vector 8728 includes initial conditions for throwing of the preset storage object 8008. In the third embodiment, the throwing vector 8728 is a vector based on the throwing direction and the throwing force. In the third embodiment, the throwing direction is sequentially updated to match the front direction of the player character 8004 (the direction of the throwing direction marker 8012, see FIG. 51). The throwing force is set to a predetermined initial value, but when a touch operation on the throwing force input bar 8014 (see FIG. 51), that is, an input operation of throwing force is detected, the current throwing force is updated to the throwing force according to the touch position.

The flying destination coordinates 8730 include position coordinates of the flying destination in the game space.

The flying route data 8731 is a coordinate value list of functions or pass points indicating a route in which the preset storage object 8008 is to fly. The flying route data 8731 is created along with the start of throwing of the preset storage object 8008, and the preset storage object 8008 is controlled in movement along the route in the data. The route may be determined by physical calculation or quasi-physical calculation or may be determined with application of a function of a preset quasi parabola.

The contact history 8736 is history data of contact of the preset storage object 8008 in the management data with another object during flying, which is created at the time of occurrence of contact. The contact history 8736 includes information such as contact date and time, a contact target object ID (the character ID of the enemy character 8006, the character ID of the friend character, or the object ID of a background object), a contact position, and others, for example.

The value of the release flag 8738 is "1" in the state in which the sub character 8005 is stored in the preset storage object 8008, and is changed to "0" when the release condition is satisfied and the stored sub character 8005 is released to appear in the game space.

Referring back to FIG. 63, the prediction display control data 8740 includes data for display control of the predicted trajectory 8031 and the predicted flying destination 8032 (see FIG. 53).

Figure 65:
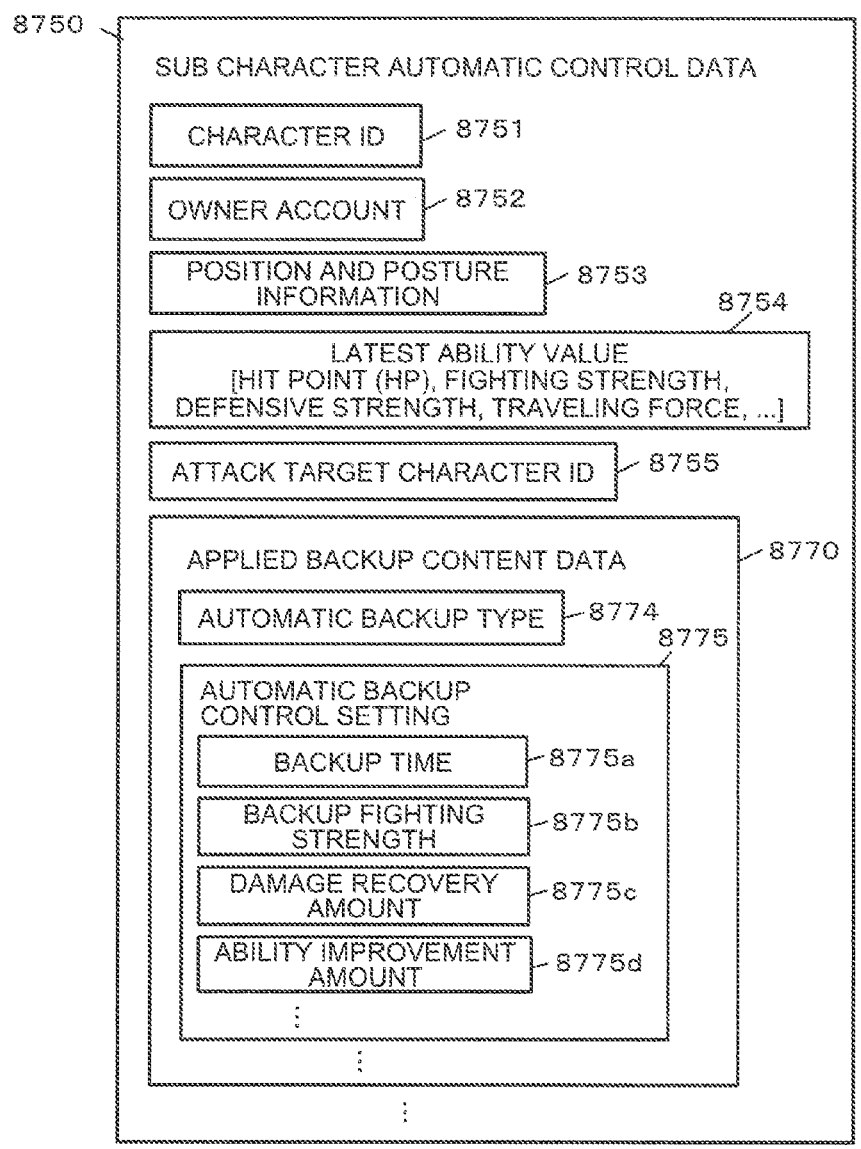
FIG. 65 is a diagram illustrating an example of a data structure of sub character automatic control data according to the third embodiment.

The sub character automatic control data 8750 is created when the sub character 8005 is released from the preset storage object 8008 and appears in the game space, which includes various types of data describing the latest state of the sub character. The one sub character automatic control data 8750 includes a character ID 8751, an owner account 8752 indicating which player owns the sub character, position and posture information 8753 indicating position coordinates and posture value in the game space, a latest ability value 8754, an attack target character ID 8755, and applied backup content data 8770, as illustrated in FIG. 65, for example. Note that data other than these can be included as appropriate.

The latest ability value 8754 is a copy of the initial ability value 8531 in the sub character initial setting data 8520 (see FIG. 61) of the sub character at the time of appearance, which is sequentially updated according to the progress of the game.

The attack target character ID 8755 indicates the character as an attack target of the sub character. When the sub character satisfies the backup initiating condition, the character ID of the character nearest the enemy character 8006 having the friend character as an attack target, among the enemy characters 8006 around the appearance position, is set. When the sub character does not satisfy the backup initiating condition, the enemy character 8006 in the enemy-search range of the sub character is selected and set.

The applied backup content data 8770 is created when the sub character satisfies the backup initiating condition, which includes the setting value of the content of the automatic backup control. Specifically, with the timing of appearance of the sub character, the plurality of automatic backup content definition data 8570 (see FIG. 58) are searched for the definition data matching the applied requirement 8571, and the backup content data 8573 of the searched definition data is copied. In the automatic backup control of the sub character, the automatic control is performed such that the sub character performs a backup action according to the setting in the applied backup content data 8770.

Figure 66:
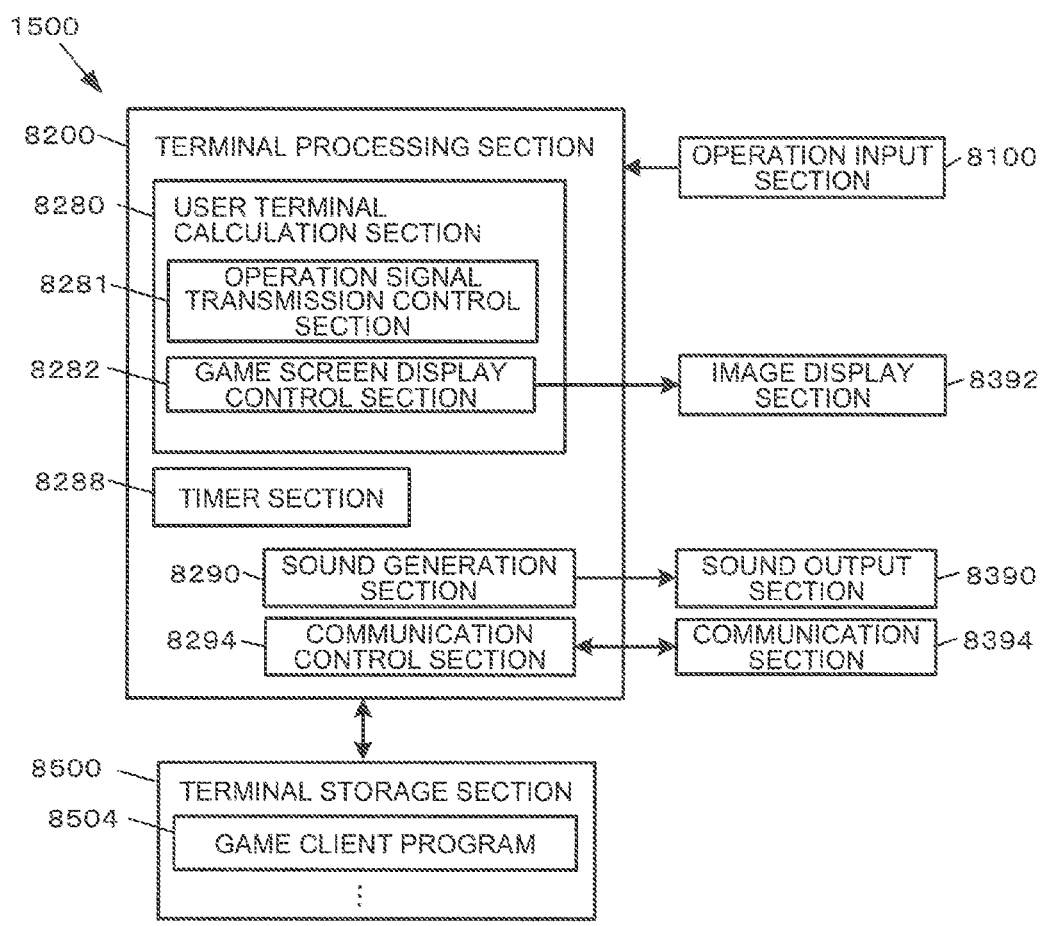
FIG. 66 is a functional block diagram illustrating an example of a functional configuration of a user terminal according to the third embodiment.

FIG. 66 is a functional block diagram illustrating an example of a functional configuration of the user terminal 1500 according to the third embodiment. The user terminal 1500 according to the third embodiment includes an operation input section 8100, a terminal processing section 8200, a sound output section 8390, an image display section 8392, a communication section 8394, and a terminal storage section 8500.

The operation input section 8100 outputs an operation input signal according to various operations input by the player to the terminal processing section 8200. For example, the operation input section 8100 can be implemented with a push switch, a joystick, a touch pad, a track ball, an accelerometer, a gyro, a CCD module, or the like. The operation input section 8100 corresponds to the arrow key 1502, the button switch 1504, and the touch panel 1506 illustrated in FIG. 2.

The terminal processing section 8200 is implemented with electronic parts, such as a microprocessor (e.g., CPU and GPU), and an IC memory. The terminal processing section 8200 performs input/output control to exchange data with each of the functional sections including the operation input section 8100 and the terminal storage section 8500. The terminal processing section 8200 executes various calculation processes based on a predetermined program or data, the operation input signal from the operation input section 8100, and various types of data received from the server system 1100 to control the operation of the user terminal 1500. The terminal processing section 8200 corresponds to the control board 1550 in FIG. 2. The terminal processing section 8200 according to the third embodiment includes a user terminal calculation section 8280, a timer section 8288, a sound generation section 8290, and a communication control section 8294.

The user terminal calculation section 8280 includes an operation signal transmission control section 8281 and a game screen display control section 8282.

The operation signal transmission control section 8281 performs a process of transmitting various types of data and requests to the server system 1100 in accordance with an operation performed on the operation input section 8100.

The game screen display control section 8282 performs control for displaying a game screen based on various types of data received from the server system 1100. In the third embodiment, the game screen display control section 8282 is configured to generate game space images (for example, 3DCG images and others) in the server system 1100, but can be configured to generate the game space images in the user terminal 1500. In this case, the game screen display control section 8282 is in charge of controlling an object disposed in a virtual three-dimensional space for generating a 3DCG, for example.

The sound generation section 8290 is implemented with a processor, such as a digital signal processor (DSP) or a sound synthesizing IC, an audio codec capable of reproducing a sound file, or the like. Based on a processing result by the game screen display control section 8282, the sound generation section 8290 generates a sound signal for sound effects, a BGM, various operation sounds, and the like related to the game, and outputs the sound signal thus generated to the sound output section 8390.

The sound output section 8390 is implemented with a device that outputs sound such as sound effects, a BGM, or the like, based on the sound signal received from the sound generation section 8290. The sound output section 8390 corresponds to the speaker 1510 in FIG. 2.

The image display section 8392 displays various game images based on the image signals input from the game screen display control section 8282. The image display section 8392 can be implemented with an image display device such as a flat panel display, a cathode ray tube (CRT), a projector, or a head-mounted display. In the third embodiment, the image display section 8392 corresponds to the touch panel 1506 illustrated in FIG. 2.

The communication control section 8294 performs a data process related to the data communication, and exchanges data with an external device through the communication section 8394. The communication section 8394 connects to the network 9 to implement communications. For example, the communication section 8394 is implemented with a transceiver, a modem, a terminal adapter (TA), a jack for a communication cable, a control circuit, and the like, and corresponds to the wireless communication module 1553 in FIG. 2.

The terminal storage section 8500 stores therein programs for implementing various functions for the terminal processing section 8200 to entirely control the user terminal 1500, and various types of data. The terminal storage section 8500 is used as a work area for the terminal processing section 8200, and temporarily stores a result of calculation performed by the terminal processing section 8200 in accordance with various programs, input data received from the operation input section 8100, and the like. These functions are implemented with an IC memory (e.g., RAM and ROM), a magnetic disk (e.g., hard disk), an optical disk (e.g., CD-ROM and DVD), or the like. The terminal storage section 8500 corresponds to the IC memory 1552 and the memory card 1540 in the control board 1550 illustrated in FIG. 2.

The terminal storage section 8500 according to the third embodiment stores therein a game client program 8504. Note that other programs and data can be stored as appropriate.

The game client program 8504 is application software that implements the function of the user terminal calculation section 8280 when being read and executed by the terminal processing section 8200. In the third embodiment, the game client program 8504 is a copy of the distributed game client program 8502 (see FIG. 60) provided from the server system 1100.

The game client program 8504 may be an exclusive client program or include a web browser program and a plugin that implements an interactive image display, depending on a technique and a method for implementing an online game.

[Description of Operations]

Next, a flow of a process in the server system 1100 will be described. The flow of the process described herein is implemented with the server processing section 8200s executing the server program 8501.

Figure 67:
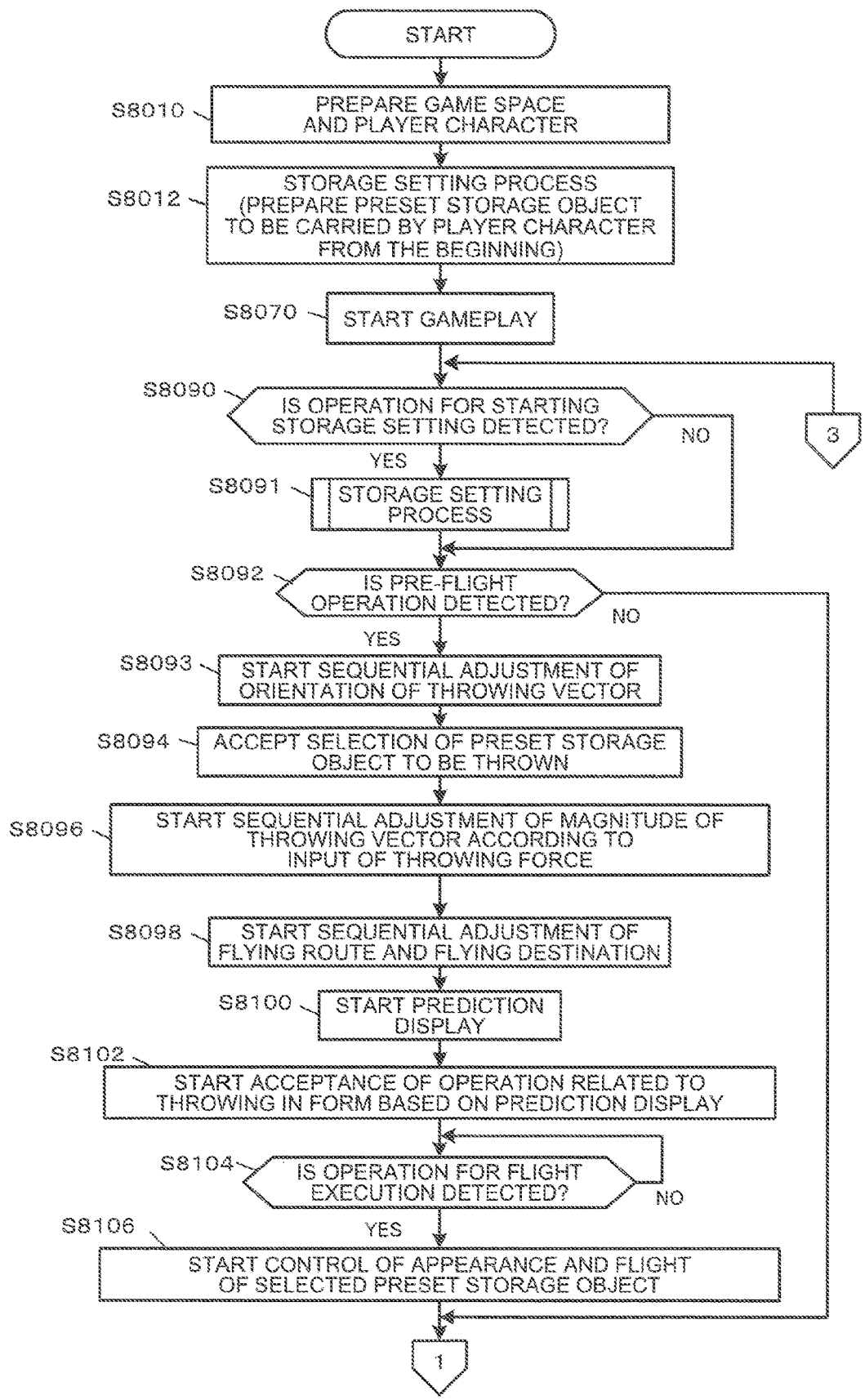
FIG. 67 is a flowchart illustrating a flow of a process related to one gameplay in the server system according to the third embodiment.
Figure 68:
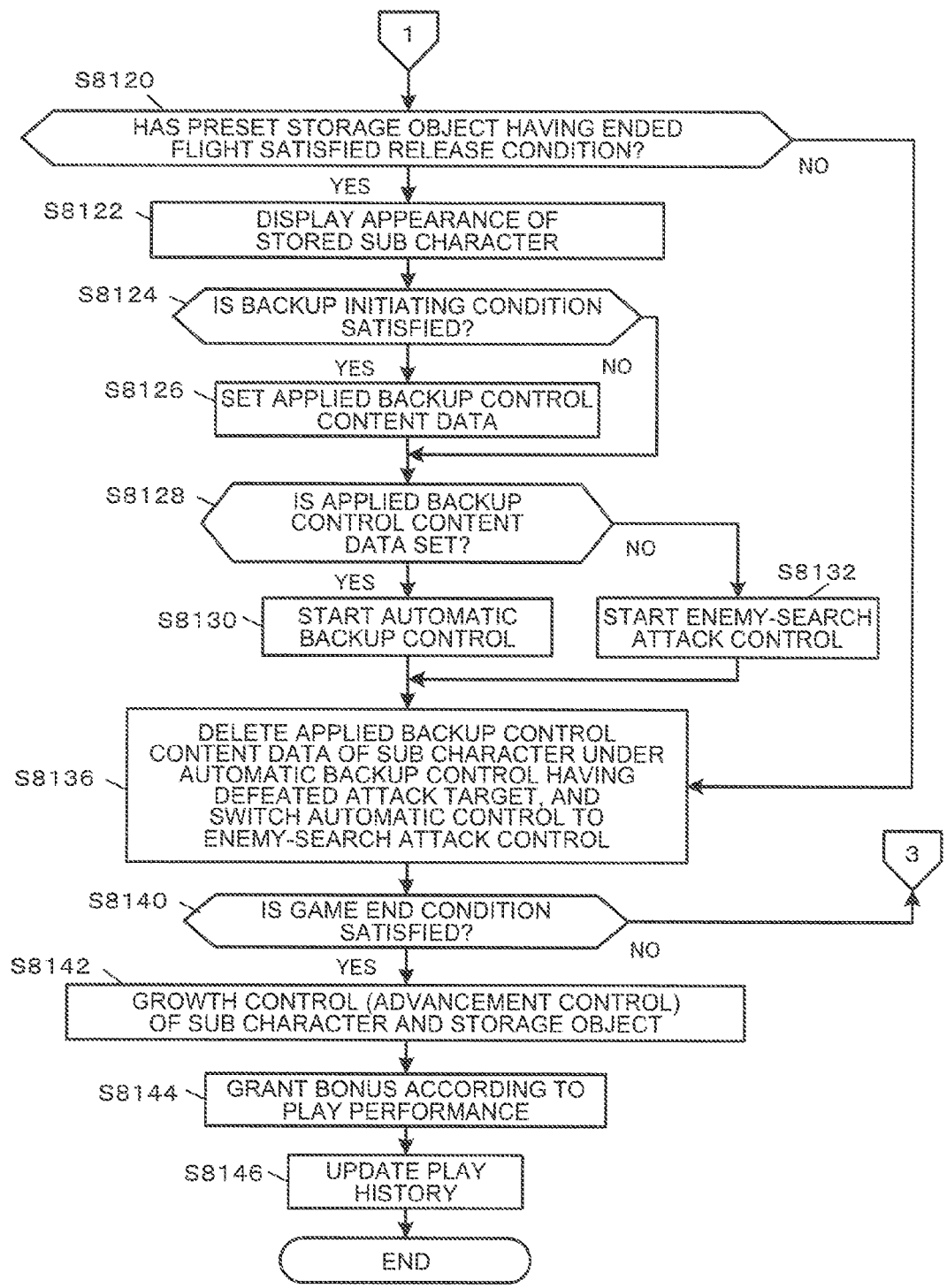
FIG. 68 is a flowchart continued from FIG. 20.

FIGS. 67 and 68 are flowcharts illustrating a flow of a process by the server system 1100 related to one gameplay.

The server system 1100 accepts a selection of a game space to be used and a selection of the main character 8003 as the player character 8004 (step S8010). For example, for the game space to be used, the game spaces defined by the game space initial setting data 8510 are selectably suggested on the user terminal 1500 and a selection operation of the game space is accepted. For the player character 8004, a list of the main characters 8003 owned by the player is selectably suggested and a selection operation is accepted.

Next, the server system 1100 sets the preset storage object 8008 to be carried by the player character 8004 from the start of the gameplay (step S8012). Specifically, the server system 1100 enables the settings of a predetermined number of preset storage objects 8008, and executes a storage setting process for each of preset storage objects.

Figure 69:
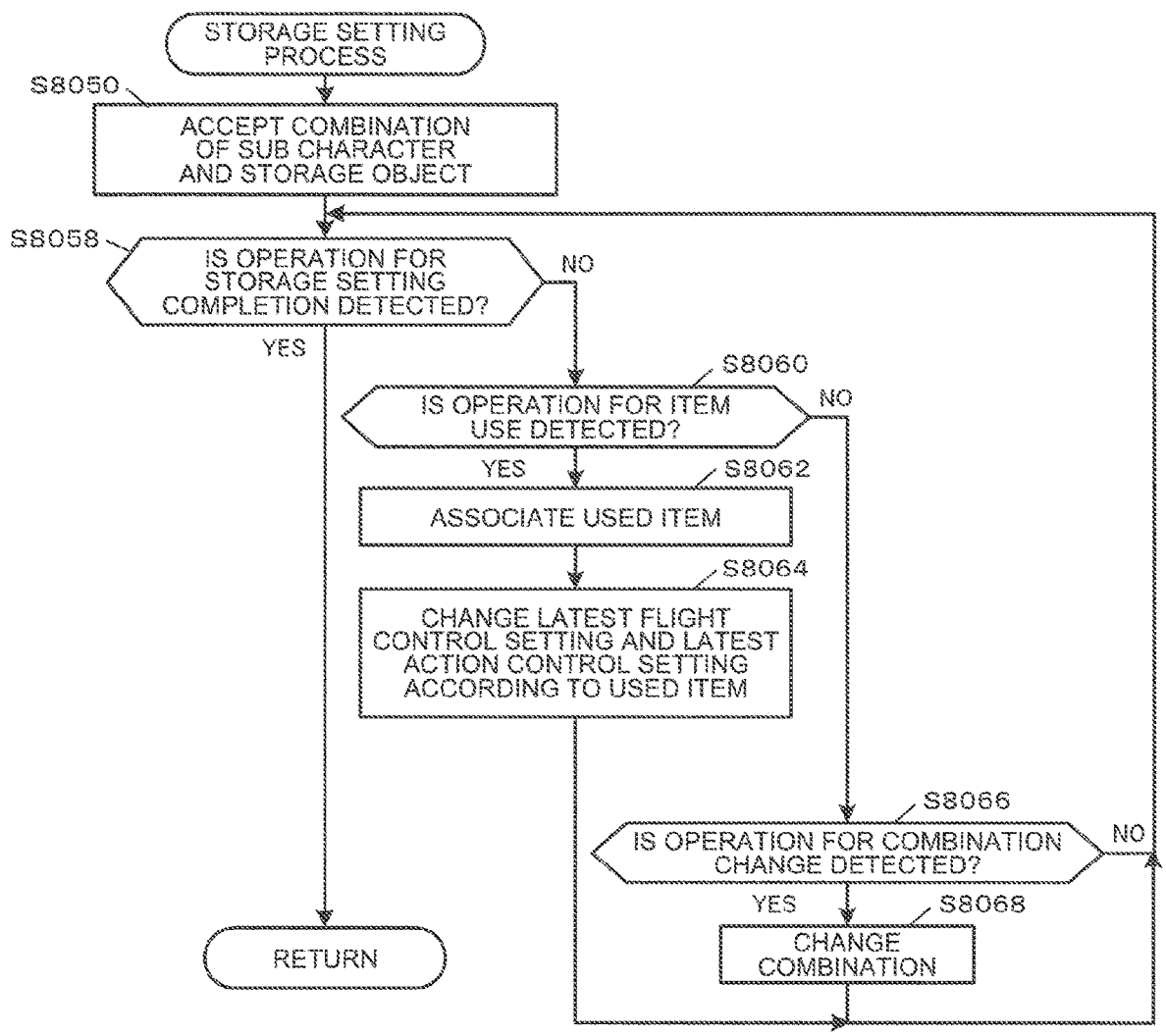
FIG. 69 is a flowchart illustrating a flow of a storage setting process according to the third embodiment.

FIG. 69 is a flowchart illustrating a flow of the storage setting process.

In the process, the server system 1100 first accepts a selection of the sub character 8005 and the storage object 8007 to be combined (step S8050). Specifically, the server system 1100 extracts unused sub characters and unused storage objects (of which there is no preset storage object management data 8710, see FIG. 64) from the sub characters 8005 and the storage objects 8007 owned by the player and suggests the same in a selectable manner on the user terminal 1500. In this case, when the initial storable upper limit number of the selected storage object 8007 (see the storage object initial setting data 8540 illustrated in FIG. 60) indicates plural numbers, the server system 1100 can accept a selection of a plurality of sub characters 8005 to be combined within the upper limit. Accordingly, the new preset storage object management data 8710 is created in the play data 8700 (see FIG. 63).

Along with the setting of the combination, the player can set (associate) items with the combined sub character 8005 and the storage object 8007.

Specifically, when an operation for using an item with the operational effect of changing either the flight control settings or the action control settings (NO in step S8058, and YES in step S8060) is detected on the user terminal 1500, the server system 1100 associates the used item with the use destination (the storage object 8007 or the sub character 8005) (step S8062). When detecting an operation for changing the combination of the sub character 8005 and the storage object 8007 (YES in step S8066), the server system 1100 changes the combination (step S8068).

Then, when detecting an input of a predetermined storage setting completion operation on the user terminal 1500 (YES in step S8058), the server system 1100 terminates the storage setting process.

Referring back to FIG. 67, next, the server system 1100 starts a progress control of gameplay (step S8070). Specifically, the server system 1100 arranges a background object in a virtual three-dimensional space to form a game space, and then arranges the player character 8004 and the enemy character 8006 in the game space. Then, the server system 1100 operates the player character 8004 (8004A, 8004B, see FIG. 50) according to each player's operation input. Besides, the server system 1100 starts as appropriate a basic control necessary as a progress control of a battle game.

When a predetermined storage setting start operation is input on the user terminal after the start of the gameplay (YES in step S8090), the server system 1100 executes the storage setting process (step S8091).

Then, when detecting an input of a predetermined preflight operation on the user terminal 1500 during the gameplay (YES in step S8092), the server system 1100 starts a control of adjusting and aligning the orientation of the throwing vector 8728 (see FIG. 64) with the front direction of the player character 8004 (step S8093).

Then, the server system 1100 causes the user terminal 1500 to display the preset storage object list 8010 (see FIG. 51) on the user terminal 1500, and accepts a selection operation of the preset storage object 8008 to be thrown (step S8094). Then, the server system 1100 causes the user terminal 1500 to display the throwing force input bar 8014 (see FIG. 51), and starts a sequential adjustment of the magnitude of the throwing vector 8728 according to the touch operation on the bar (step S8096).

Then, the server system 1100 starts a sequential adjustment of the flying route and the flying destination according to the latest throwing specifications (step S8098). Specifically, the server system 1100 provisionally determines the flying destination coordinates 8730 and the flying route data 8731 by physical calculation or quasi-physical calculation (see FIG. 64). Then, the server system 1100 repeats the foregoing process at each update of the throwing vector 8728 to update the flying destination coordinates 8730 and the flying route data 8731.

Then, the server system 1100 starts various types of prediction display in the game screen, such as the predicted trajectory 8031 and the predicted flying destination 8032 (step S8100, see FIG. 53).

For the predicted flying destination 8032, a range according to the error of the storage object in the preset storage object 8008 to be thrown (refer to the storage object initial setting data 8540 illustrated in FIG. 60) is represented by a predetermined object centered on the flying destination coordinates 8730. The predicted trajectory 8031 is set and represented by setting an object connecting the flying destination coordinates 8730 from the player character 8004 in a route indicated by the flying route data 8731. These prediction displays are presented at each update of the flying destination coordinates 8730 and the flying route data 8731.

The server system 1100 starts to accept an operation input related to throwing in a form based on the prediction display (step S8102).

Specifically, as a guide display for correcting the throwing direction, the scales are displayed along the upward, downward, leftward, and rightward directions of the game screen centered on the displayed predicted flying destination 8032 and predicted trajectory 8031 (see FIG. 53), and upon detection of a predetermined direction change operation, the throwing direction is changed by one marking on the scale in the operation direction. Similarly, the throwing force input bar 8014 (see FIG. 51) can be displayed with a marker indicating the present position of the throwing force for correction and scales in the stronger and weaker directions as guide displays for correction. Upon detection of a predetermined force change operation, the throwing force is changed by one marking in the operation direction.

When seeing the predicted flying destination 8032 and the predicted trajectory 8031 and finding out that the aimed flying destination or flying route is not predicted, the player 8002 can adjust the throwing direction or the throwing force by changing the front direction of the player character 8004 or the like. When the prediction display is as aimed, the player 8002 inputs a predetermined action operation to cause the player character 8004 to throw the selected preset storage object 8008.

Upon detection of an input of the predetermined action operation on the user terminal 1500 (YES in step S8104), the server system 1100 causes the preset storage object 8008 of which the selection was accepted in step S8094 to appear in the game space, and starts the control of the flying display (step S8106). The flight control is continued until each satisfies the flight end condition. In the third embodiment, the flight end condition is that the flying preset storage object 8008 contacts the enemy character 8006 or another object. It is determined at any time whether the preset storage object 8008 under the flight control has contacted the enemy character 8006. When the contact is detected, the contact history 8736 is created.

In steps S8092 to S8104, a predetermined flying cancel operation is acceptable as appropriate.

Referring to FIG. 68, when any preset storage object 8 satisfies the flight end condition and satisfies the release condition (the same as the flight end condition in the third embodiment) (YES in step S8120), the server system 1100 causes the preset storage object 8008 to appear in the game space and sets the sub character automatic control data 8750 (see FIG. 65) of the character (step S8122).

Next, the server system 1100 determines whether the sub character 8005 having been caused to newly appear satisfies the backup initiating condition (step S8124).

In the third embodiment, the server system 1100 determines whether the backup initiating condition is satisfied based on any of the cases a) in which the preset storage object 8008 has contacted the enemy character 8006 attacking the friend character (see FIG. 54), b) in which the preset storage object 8008 has contacted the friend character being attacked by the enemy character 8006 (see FIG. 55), and c) in which a predetermined item is used with the sub character 8005 or the storage object 8007 in the preset storage object 8008 (see FIG. 56).

When the backup initiating condition is satisfied (YES in step S8124), the server system 1100 sets the applied backup content data 8770 to the sub character automatic control data 8750 of the sub character 8005 (step S8126, see FIG. 65).

Next, when the applied backup content data 8770 is set to the sub character 8005 having been caused to newly appear (YES in step S8128), the server system 1100 starts the automatic control of the sub character 8005 to take an action of backing up the friend character based on the content data (step S8130).

On the other hand, when the applied backup content data 8770 is not set to the sub character 8005 having been caused to newly appear (NO in step S8128), the server system 1100 starts the automatic control of the sub character 8005 to take a standard action (the enemy-search attack in the third embodiment) (step S8132).

Next, the server system 1100 deletes the applied backup content data 8770 set to the sub character 8005 under the automatic backup control that has defeated the attack target, among the sub characters 8005 having already appeared and been under the automatic control, and switches the automatic control to the standard action (the enemy-search attack in the third embodiment) (step S8136).

The server system 1100 repeatedly executes steps S8090 to S8140 until the game end condition is satisfied (NO in step S8140).

When the game end condition is satisfied (YES in step S8140), the server system 1100 performs an advancement control of the sub character 8005 and the storage object 8007 (step S8142). Specifically, the server system 1100 grants experience values to the sub character 8005 and the storage object 8007 in the thrown preset storage object 8008, and changes the sub character level and the storage object level according to the accumulated experience values. The advancement control may be performed only on either one of the sub character 8005 and the storage object 8007. The target of advancement may be limited to the thrown preset storage object 8008 that satisfies the release condition.

Next, the server system 1100 grants a bonus to the player according to the play performance (step S8144). For example, the server system 1100 may grant the main character 8003, the sub character 8005, the storage object 8007, or items. The server system 1100 can release a new game space where the player can play the game.

Then, the server system 1100 updates the play history (step S8146), and terminates the series of processes.

As above, according to the third embodiment, it is possible to provide a technique for adding a new attraction to a video battle game where the player uses a sub character as an NPC friendly to the main character operated by the player.

That is, the player performs an operation of storing the sub character 8005 in the storage object 8007 to set the preset storage object 8008, and performs an operation of instructing the player character 8004 to throw the preset storage object 8008. Accordingly, it is possible to implement a new style of battle game in which the sub character 8005 is controlled to appear at the throwing destination, and after the appearance, the sub character 8005 fights a battle with the enemy character 8006.

In addition, it is possible to achieve a game with abundant strategic elements where, in a situation in which a friend character is being attacked by the enemy character 8006, the sub character 8005 is caused to newly appear and help the friend character by throwing the preset storage object 8008 or using items for the sub character 8005 and the storage object 8007 in the thrown preset storage object 8008.

Modification of Third Embodiment

Next, a modification of the third embodiment will be described. The present modification of the third embodiment is implemented to be basically the same with the third embodiment, but is different from the third embodiment in that a battle game is played by a player versus a computer and that the user terminal 1500 performs game management processing. Hereinafter, the differences from the third embodiment will be mainly described. Components that are the same as the counterparts in the third embodiment are denoted with the same reference numerals, and the description thereof will be omitted.

In the present modification, the game management section 8210 is omitted from the functional configuration of the server system 1100.

Figure 70:
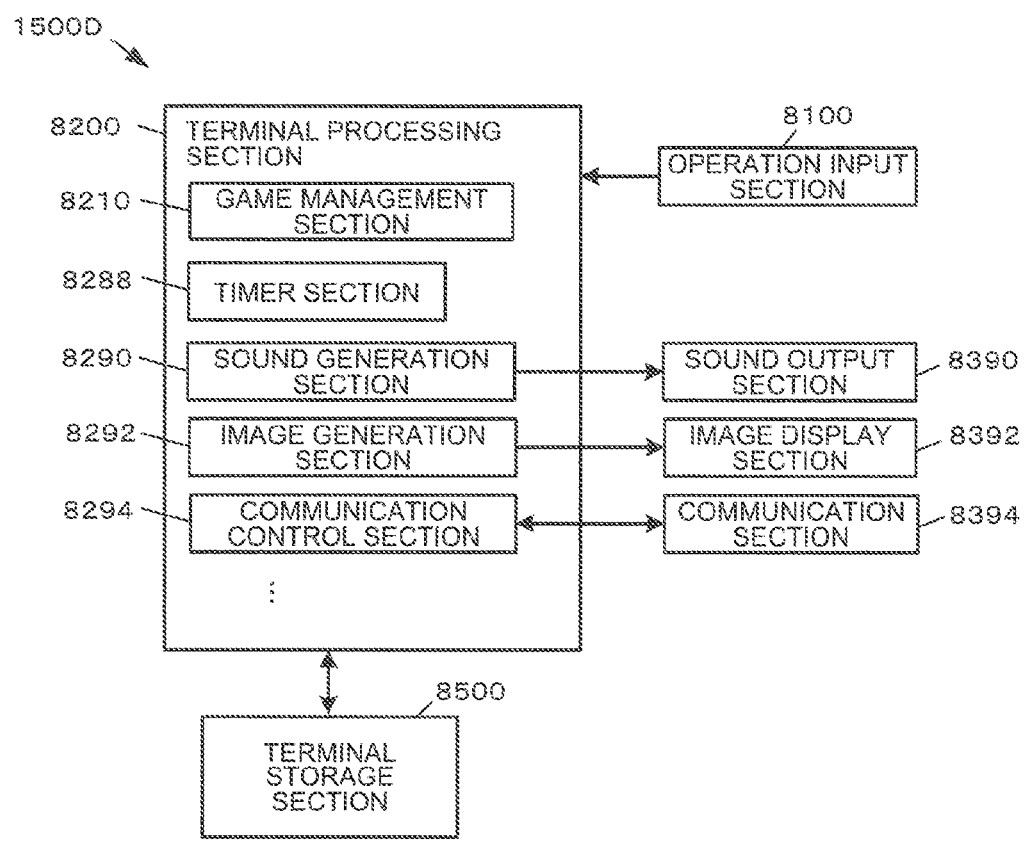
FIG. 70 is a functional block diagram illustrating an example of a functional configuration of a user terminal according to a modification of the third embodiment.

FIG. 70 is a functional block diagram illustrating an example of a functional configuration of a user terminal 1500D according to the present modification. The user terminal 1500D according to the present modification does not have the user terminal calculation section 8280 but has the game management section 8210 and an image generation section 8292 instead. The user terminal 1500D is a device that can be said to be a game device.

The image generation section 8292 generates data for displaying a game screen on the image display section 8392 and outputs an image signal to the image display section 8392.

That is, in the present modification, the user terminal 1500D executes calculation processes related to the game management by itself to control the progress of the game, generate game screen images, and control sound reproduction. However, the use of online shopping, the login/logout of a registered user, and the management of the play history, and the like are performed in the same manner as in the first embodiment. However, the foregoing matter is not applied when the user terminal 1500D functions as a standalone game machine, that is, the battle game is implemented as a non-online game.

Figure 71:
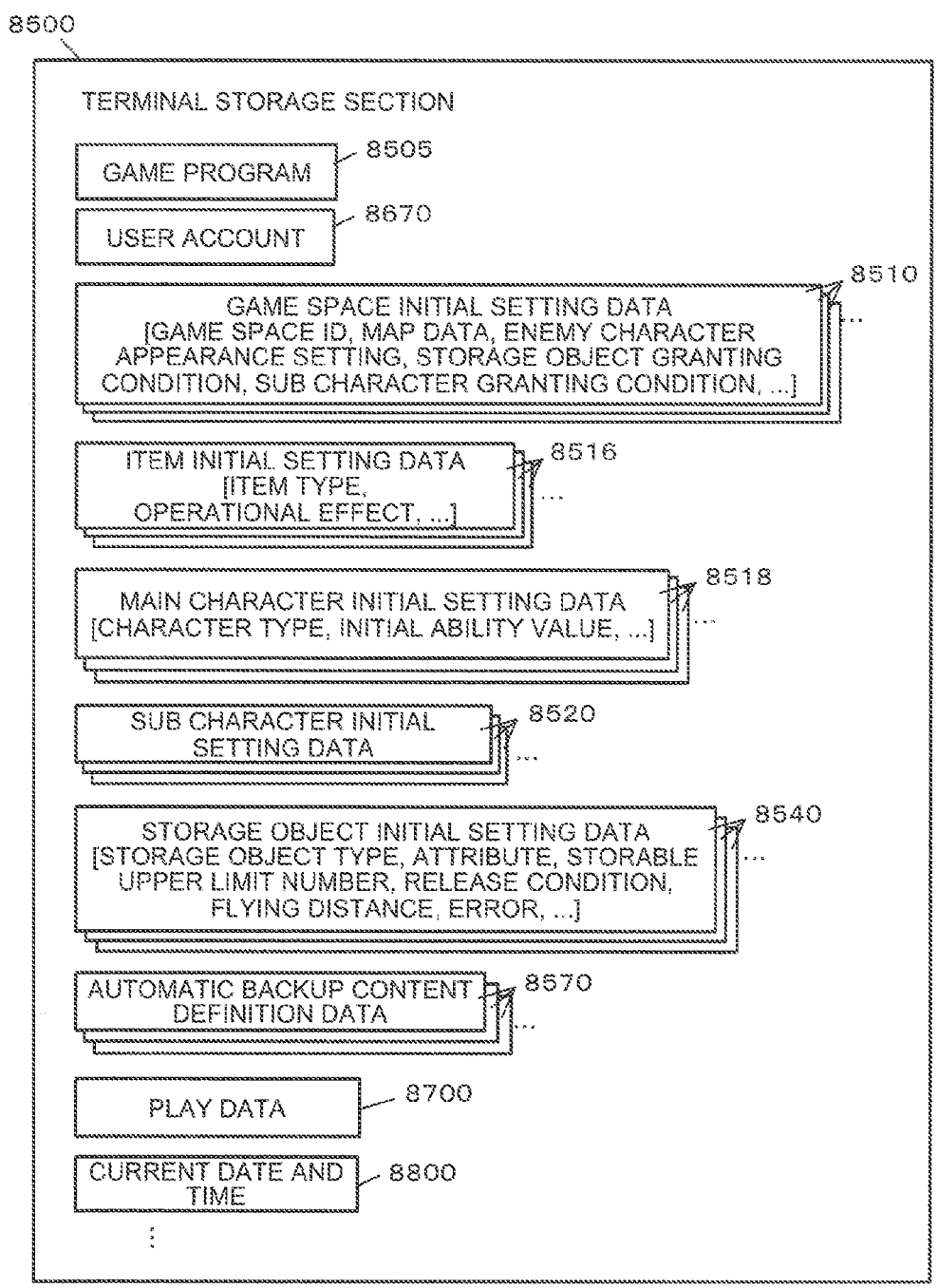
FIG. 71 is a diagram illustrating an example of programs and data stored in a terminal storage section in the user terminal according to a modification of the third embodiment.

FIG. 71 is a diagram illustrating an example of programs and data stored in a terminal storage section 8500 of the user terminal 1500D according to the present modification. The terminal storage section 8500 in the present modification stores a game program 8505. The game program 8505 is a program for causing a terminal processing section 8200 to implement the functions of the game management section 8210. The original of the program may be stored as distributed game program in the server system 1100 and downloaded as appropriate.

The terminal storage section 8500 according to the present modification stores game space initial setting data 8510, item initial setting data 8516, main character initial setting data 8518, sub character initial setting data 8520, storage object initial setting data 8540, and automatic backup content definition data 8570 when the game management section 8210 is processed on the user terminal 1500D. The originals of these data may be stored in the server system 1100 according to the present modification and downloaded as appropriate. In addition, as data to be sequentially created and updated, play data 8700 is stored.

The flow of the process executed on the user terminal 1500D in the present modification is basically the same as that executed on the server system 1100 in the third embodiment (see FIGS. 67 to 69). Accordingly, when the game management section 8210 is implemented by the user terminal 1500D, it can be interpreted as appropriate that the steps are executed by the user terminal 1500D.

In the case of executing a process in which the user management data 8600 needs to be referred to or changed on the user terminal 1500D, a request for the provision, collation, or the like of necessary data is made as appropriate to the server system 1100. Otherwise, a request for the process itself is made to the server system 1100.

If the user terminal 1500D functions as a standalone game device, that is, if a battle game is implemented as a non-online game, the user management data 8600 can be stored in the terminal storage section 8500 in the configuration in which the user management data 8600 is managed in the user terminal 1500D.

According to the present modification, it is possible to obtain the same advantageous effects as those in the third embodiment.

[Other Modifications]

[First Modification] For example, in the third embodiment, an online game is implemented in a client-server computer system. Alternatively, an online game may be implemented in a computer system in which a plurality of user terminals 1500 (or user terminals 1500D) that can also be said to be game devices are connected in a peer-to-peer fashion. In this case, some of the user terminals 1500 may be made to implement the functions as the server system 1100 in the third embodiment. Alternatively, the plurality of user terminals 1500 may cooperate to implement the functions of the game management section 8210.

[Second Modification]

The game genre is battle game in the third embodiment. However, the game genre may be any other game as far as the sub character 5 is used.

[Modification of User Terminal]

As above, several embodiments have been described so far. The hardware configurations of the user terminals 1500, 1500B, 1500C, and 1500D are not limited to the ones described above.

Figure 72:
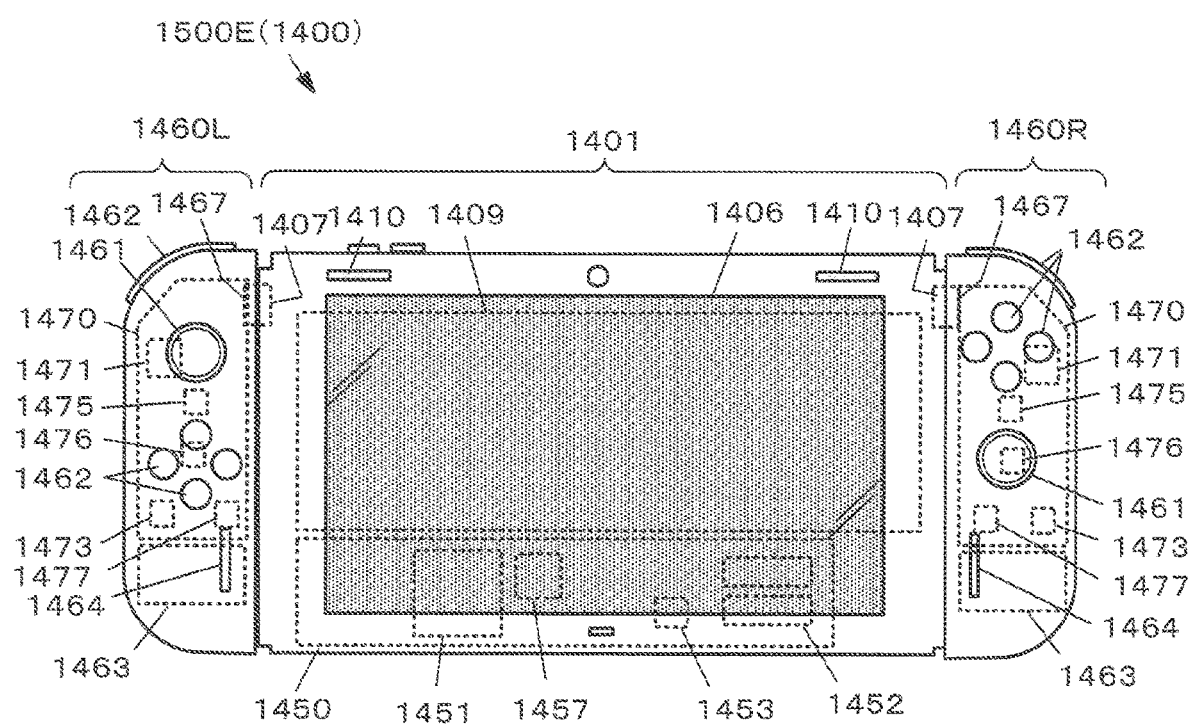
FIG. 72 is a diagram illustrating another configuration example of a user terminal (part 1).

For example, a game device 1400 in a form as illustrated in FIG. 72 may be used as a user terminal 1500E.

The game device 1400 is a computer that is classified into a portable game device or a home-use game device, which is designed in consideration to portability and convenience at the time of use. The game device 1400 includes a main body device 1401 and at least one detachable game controller 1460 (right game controller 1460R and left game controller 1460L).

The main body device 1401 includes a touch panel 1406 that functions as an image display device/touch position input device, a connector 1407, a built-in battery 1409, a speaker 1410, and a control board 1450. Besides, the main body device 1401 includes a power button, a sound volume control button, and the like as appropriate.

The connector 1407 is provided at both right and left ends of the main body device 1401 corresponding to the right game controller 1460R and the left game controller 1460L. The connectors 1407 are connected to the connectors of the right game controller 1460R and the left game controller 1460L to carry out communication between the game controllers and the main body device 1401.

The control board 1450 contains various processors such as a central processing unit (CPU) 1451, a graphics processing unit (GPU), and a digital signal processor (DSP), various IC memories 1452 such as a VRAM, a RAM, and a ROM, a communication module 1453 for wireless communication with mobile phone base stations, wireless LAN base stations, and other apparatuses having short-distance wireless devices, an interface circuit 1457, and others.

The interface circuit 1457 includes a driver circuit for the touch panel 1406, a circuit that transmits and receives signals to and from the right game controller 1460R and the left game controller 1460L via the connector 1407, an output amplifier circuit that outputs sound signals to the speaker 1410, and others.

These elements mounted on the control board 1450 are electrically connected together via a bus circuit or the like in such a manner to be capable of data writing and reading and signal transmission and reception. The control board 1450 may be implemented partly or entirely by an application specific integrated circuit (ASIC), a field-programmable gate array (FPGA), or a system on a chip (SoC).

The control board 1450 has programs and various types of data stored in the IC memory 1452 and implements various functions to execute the game of the present invention by performing calculation processing based on the programs and data.

The right game controller 1460R and the left game controller 1460L are designed for the player to grip them at right and left hand, respectively. Each of the right game controller 1460R and the left game controller 1460L includes a joystick 1461, a plurality of push switches 1462 as operation buttons, a vibrator 1463 as a vibration generation device, a speaker 1464, a connector 1467, a controller control board 1470, and a built-in battery.

The controller control board 1470 includes a controller control IC 1471 that corresponds to a processor controlling the game controller, a communication module 1473, a triaxial accelerometer 1475, a triaxial gyro sensor 1476, and an interface circuit 1477.

Note that the controller control board 1470 can include as appropriate elements other than the foregoing ones, such as an image sensor module, for example. Otherwise, one element can perform the function of another element to omit the other element. For example, one sensor can implement the triaxial accelerometer 1475 and the triaxial gyro sensor 1476, or the controller control IC 1471 and the interface circuit 1477 can be integrated.

The communication module 1473 implements wireless communication with the communication module 1453 of the main body device 1401.

Figure 73:
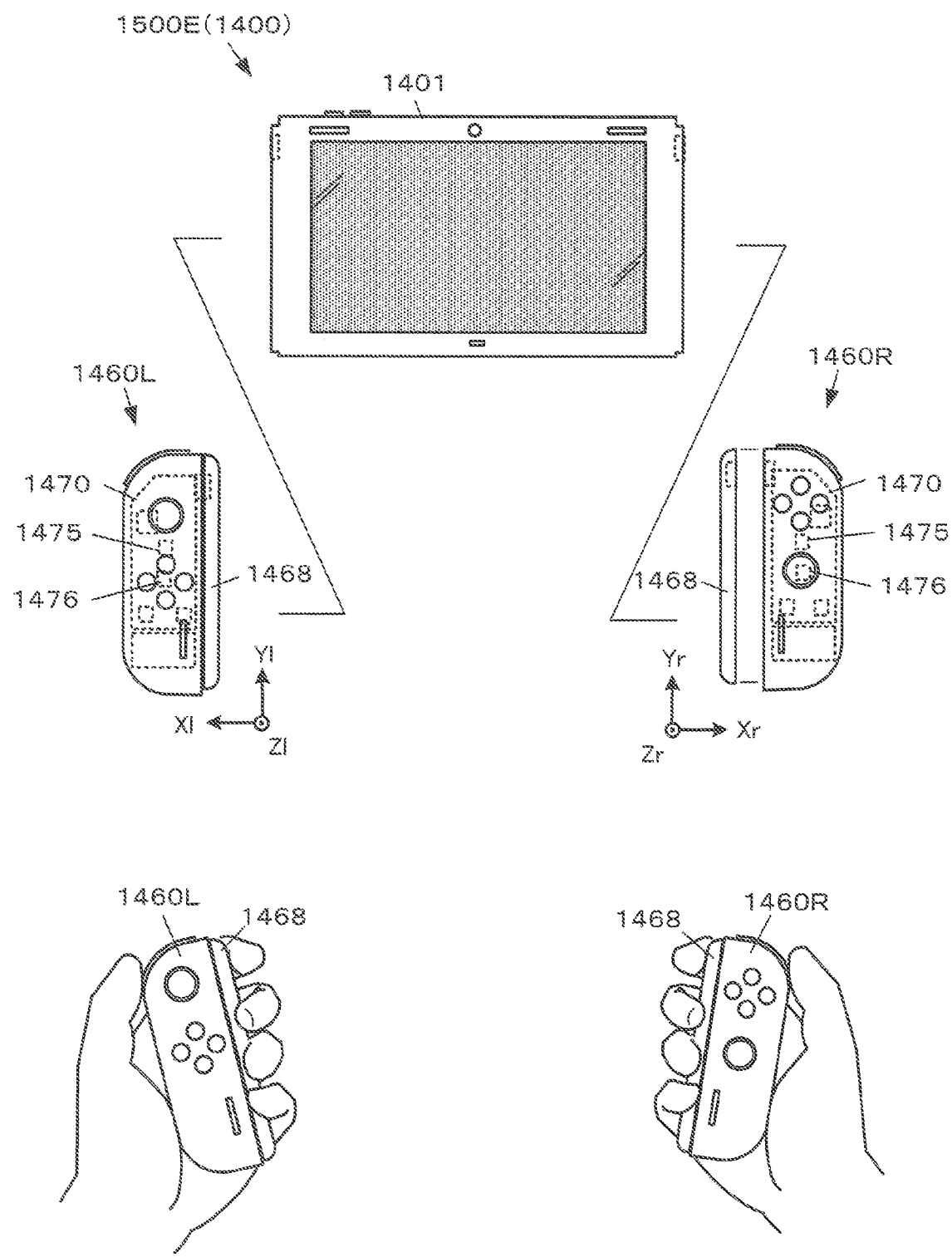
FIG. 73 is a diagram illustrating another configuration example of a user terminal (part 2).

As illustrated in FIG. 73, the triaxial accelerometer 1475 of the right game controller 1460R forms local coordinates (Xr, Yr, Zr) of the right hand. Specifically, the triaxial accelerometer 1475 is configured such that the right side facing the right game controller 1460R (the right side in FIG. 73) is located in the normal direction of the Xr axis, the upper side of longitudinal direction of the controller (the upper side in FIG. 73) is located in the normal direction of the Yr axis, and the side normal to the front side of the controller, that is, the side in front of the front side of the controller (the front side in FIG. 73) is located in the normal direction of the Zr axis.

The triaxial gyro sensor 1476 of the right game controller 1460R forms the local coordinates (Xr, Yr, Zr) of the right hand and is configured to detect the angular speed of the right game controller 1460R around each axis of the triaxial accelerometer 1475.

An attachment 1468 is attachable to the left end of the right game controller 1460R to cover the connector 1467. The right game controller 1460R is gripped such that the right side of the controller is held by the thumb and thenar eminence of the user's right hand and the attachment 1468 of the controller is wrapped by the user's forefinger, middle finger, ring finger, and little finger. In other words, the right game controller 1460R is held by one hand such that the rear side opposite to the front side faces the user's palm.

Similarly, the triaxial accelerometer 1475 of the left game controller 1460L forms local coordinates (Xl, Yl, Zl) of the left hand. Specifically, the triaxial accelerometer 1475 is configured such that the left side facing the left game controller 1460L (the left side in FIG. 73) is located in the normal direction of the Xl axis, the upper side of longitudinal direction of the controller (the upper side in FIG. 73) is located in the normal direction of the Yl axis, and the side normal to the front side of the controller, that is, the side in front of the front side of the controller (the front side in FIG. 73) is located in the normal direction of the Zl axis.

The triaxial gyro sensor 1476 of the left game controller 1460L forms the local coordinates (Xl, Yl, Zl) of the left hand and is configured to detect the angular speed of the left game controller 1460L around each axis of the triaxial accelerometer 1475.

An attachment 1468 is attachable to the left end of the left game controller 1460L to cover the connector 1467. The left game controller 1460L is gripped such that the left side of the controller is held by the thumb and thenar eminence of the user's left hand and the attachment 1468 of the controller is wrapped by the user's forefinger, middle finger, ring finger, and little finger. In other words, the left game controller 1460L is held by one hand such that the rear side opposite to the front side faces the user's palm.

In a configuration of using the user terminal 1500E (game device 1400), it is possible to implement the flying start operation in the foregoing embodiments by the left game controller 1460L or the right game controller 1460R through detection of acceleration or angular speed exceeding a predetermined standard value with which the arm is regarded as being shaken. In addition, the maximum value of the acceleration or the angular speed at that time can substitute as an input of throwing force into the throwing force input bar 6014, 7014, or 8014.

What is claimed is:

1. A computer system,
a processor of the computer system being configured to perform:
a process of controlling progress of a game at which a player character and an enemy character fight a battle;
storing, in a storage object which has predetermined storage object initial setting data, a non-playable character (NPC) which has predetermined action control settings related to the action control of the NPC, the storage object is among a plurality of different storage objects with different predetermined storage object initial setting data;
an NPC automatic control process of changing at least one of the pre-determined action control settings of the NPC stored in the storage object based on a combination of (1) the NPC and (2) the predetermined storage object initial setting data of the storage object in which the NPC is stored;
a movement control process of moving the storage object storing non-playable character (NPC) until a given end condition is satisfied, based on the player's predetermined action operation of moving the storage object by throwing, striking, launching, or the player character's action similar to these actions;
an NPC appearance control process of performing a control to cause the NPC stored in the storage object to appear from the storage object satisfying the end condition; and
the NPC automatic control process further comprises automatically controlling the NPC, according to the at least one of the pre-determined action control settings which is changed, the NPC having been caused to appear from the storage object by the NPC appearance control process upon the end condition being satisfied.

2. The computer system as defined in claim 1,
the processor further performs
a storage setting process of setting the storage object by storing an NPC selected from among a plurality of NPCs according to a selection operation by the player,
wherein the NPC automatic control process includes changing an action control setting related to the automatic control based on the NPC stored in the storage object.

3. The computer system as defined in claim 2, wherein
the storage setting process includes selecting a plurality of NPCs to be stored, and
the NPC automatic control process includes changing the action control setting based on a combination of NPCs stored in the storage object.

4. The computer system as defined in claim 1,
the processor further performs
a storage setting process of setting the storage object by selecting an object to store a given NPC from among a plurality of objects based on the player's selection operation,
wherein the NPC automatic control process includes changing the action control setting related to the automatic control based on the object selected as the storage object.

5. The computer system as defined in claim 1,
the processor further performs
a storage setting process of setting the storage object by selecting an NPC to be stored and an object as a storage destination from among a plurality of NPCs and a plurality of objects based on the player's selection operation,
wherein the NPC automatic control process includes changing the action control setting related to the automatic control based on a combination of the object as the storage object and the NPC stored in the storage object.

6. The computer system as defined in claim 1,
the processor further performs
a player character setting process of selecting and setting a character as the player character from among a plurality of characters based on the player's operation,
wherein the NPC automatic control process includes changing the action control setting related to the automatic control based on the player character set by the player character setting.

7. The computer system as defined in claim 1,
the processor further performs
an item setting process of associating a given item with the storage object and/or the NPC stored in the storage object based on the player's operation input,
wherein the NPC automatic control process includes changing the action control setting related to the automatic control based on the item associated with the storage object and/or the NPC stored in the storage object.

8. The computer system as defined in claim 1, wherein the NPC automatic control process includes determining whether to change the action control setting related to the automatic control or determining a degree of change of the action control setting related to the automatic control, based on whether the storage object having been moved by the movement control process has contacted the enemy character.

9. The computer system as defined in claim 1, wherein the NPC automatic control process includes changing the action control setting related to the automatic control based on a relative positional relationship between a position of the NPC having been caused to appear by the NPC appearance control process and a position of the enemy character.

10. The computer system as defined in claim 1, wherein the NPC automatic control process includes changing the action control setting related to the automatic control based on any of a type of the enemy character contacted with the storage object having been moved by the movement control process, a contact part of the enemy character, and a terrain of a contact place.

11. The computer system as defined in claim 2, wherein the action control setting includes a setting related to a content of an action.

12. The computer system as defined in claim 11, wherein the setting related to the content of the action includes a setting related to a content of an attack on the enemy character.

13. The computer system as defined in claim 2, wherein the action control setting includes a setting of a limited time period during which the NPC is capable of taking an action after having been caused to appear by the NPC appearance control process, and
the NPC automatic control process includes automatically controlling the NPC having been caused to appear by the NPC appearance control process until a lapse of the limited time period.

14. The computer system as defined in claim 2,
the processor further performs
a process of displaying information of the action control setting.

15. The computer system as defined in claim 1, wherein the end condition includes at least a contact of the storage object having been moved by the movement control process with the enemy character,
the NPC appearance control process includes causing the NPC to appear when the storage object having been moved by the movement control process contacts the enemy character, and
the NPC automatic control process includes starting automatic control of the NPC from a position of appearance caused by the NPC appearance control process.

16. The computer system as defined in claim 1,
the processor further performs
a point-of-view switching process of, during the automatic control by the NPC automatic control process, allowing switching to a point-of-view based on the automatically controlled NPC according to the player's point-of-view switching operation for switching a point-of-view of a game screen.

17. A computer system,
a processor of the computer system being configured to perform:
a process of controlling progress of a game at which a player character and an enemy character fight a battle;
storing a nonplayable character (NPC) in a virtually reduced size in a storage object which has predetermined initial movement setting data;
a movement control process of moving the storage object storing the non-playable character (NPC) from the player character until a given end condition is satisfied, based on the player's predetermined action operation of moving the storage object by throwing, striking, launching, or the player character's action similar to these actions;
an NPC appearance control process of performing a control to cause the NPC stored in the storage object to appear from the storage object satisfying the end condition; and
an NPC automatic control process of automatically controlling the NPC having been caused to appear by the NPC appearance control process,
wherein the movement control process includes changing the initial movement setting data based on a combination of the object and the NPC stored in the storage object, and performing a change control of the movement control based on the changed initial movement setting data.

18. The computer system as defined in claim 17,
the processor further performs
a preparatory setting process of setting the storage object and the NPC to be stored in the storage object based on the player's preparatory operation,
wherein the movement control process includes performing a change control of the movement control based on a combination of the storage object and the NPC stored in the storage object.

19. The computer system as defined in claim 18, wherein the preparatory setting process includes setting a player character to own the storage object from among a plurality of the player characters based on the player's preparatory operation, and
the movement control process includes performing a movement control such that the player character owning the storage object moves the storage object and performing a change control of the movement control based on the player character.

20. The computer system as defined in claim 19, wherein the movement control process includes performing a change control of the movement control based on a combination of the player character owning the storage object and the storage object and/or the NPC stored in the storage object.

21. The computer system as defined in claim 18, wherein the movement control process includes performing a change control of the movement control based on a game stage.

22. The computer system as defined in claim 18,
the processor further performs:
a storage object advancement control process of changing a parameter value of the storage object by an advancement control of the storage object such as ability improvement, reinforcement, and level increase; and
an NPC advancement control process of changing a parameter value of the NPC by an advancement control of the NPC such as ability improvement, reinforcement, and level increase,
wherein the movement control process includes performing a change control of the movement control based on a combination of the parameter value of the storage object and the parameter value of the NPC stored in the storage object.

23. The computer system as defined in claim 18, wherein the preparatory setting process includes a storage object item setting process of associating a given storage object item with the storage object based on the player's operation input, and
the movement control process includes performing a change control of the movement control based on the storage object item associated with the storage object.

24. The computer system as defined in claim 18, wherein the preparatory setting process includes an NPC item setting process of associating a given NPC item with the NPC based on the player's operation input, and
the movement control process includes performing a change control of the movement control based on the NPC item associated with the NPC stored in the storage object.

25. The computer system as defined in claim 18, wherein a weight-equivalent parameter value is set to the storage object and/or the NPC, and
the movement control process includes performing a change control of the movement control based on the weight-equivalent parameter value set to the storage object to be moved and/or the NPC stored in the storage object.

26. The computer system as defined in claim 25, wherein the movement control process includes, when a combination of the storage object and the NPC stored in the storage object satisfies a given reduction condition, reducing and adjusting the weight-equivalent parameter value and performing a change control of the movement control based on the value after the reduction and adjustment.

27. The computer system as defined in claim 18, wherein the movement control process includes performing a change control of the movement control by variably controlling a flying range.

28. The computer system as defined in claim 18, wherein the action operation includes the player's operation for specifying a movement target, and
the movement control process includes performing a change control of the movement control by variably controlling a hit rate to the movement target.

29. The computer system as defined in claim 18,
the processor further performs
a process of presenting prediction display indicating a predicted trajectory and/or a predicted movement destination in the movement control by the movement control process,
wherein the action operation includes an operation for specifying a movement direction and/or a movement target based on the prediction display.

30. The computer system as defined in claim 18, wherein the preparatory setting process includes changing the upper limit number of storable NPCs according to a combination of the storage object and the NPC to be stored in the storage object.

31. The computer system as defined in claim 17, wherein the computer system is a server system in a game system in which a user terminal used by a player and the server system communicate with each other to implement the battle game.

32. The computer system as defined in claim 17, wherein the computer system is a game device.

33. A computer system,
a processor of the computer system being configured to perform:
a process of controlling progress of a game at which a player character and an enemy character fight a battle;
storing a nonplayable character (NPC) in a virtually reduced size in a storage object which has predetermined initial movement setting data;
a movement control process of moving a storage object storing a non-playable character (NPC) until a given end condition is satisfied, based on the player's predetermined action operation of moving the storage object by throwing, striking, launching, or the player character's action similar to these actions;
an NPC appearance control process of performing a control to cause the NPC stored in the storage object to appear from the storage object satisfying the end condition; and
an NPC automatic control process of automatically controlling the NPC having been caused to appear by the NPC appearance control process,
wherein
the game is a game at which a friend group including at least two characters of the player character and a friend character fights a battle with the enemy character, and
the NPC automatic control process includes performing an automatic backup control to automatically control the NPC having been caused to appear by the NPC appearance control process to back up the friend character,
wherein the NPC automatic control process includes determining whether to perform the automatic backup control or changing contents of the automatic backup control, based on whether the storage object having been moved by the movement control process has contacted the enemy character.

34. The computer system as defined in claim 33, wherein the NPC automatic control process includes changing contents of the automatic backup control based on a relative positional relationship between a position of the NPC having been caused to appear by the NPC appearance control process and a position of the enemy character.

35. A computer system,
a processor of the computer system being configured to perform:
a process of controlling progress of a game at which a player character and an enemy character fight a battle;
storing a nonplayable character (NPC) in a virtually reduced size in a storage object which has predetermined initial movement setting data;
a movement control process of moving a storage object storing a non-playable character (NPC) until a given end condition is satisfied, based on the player's predetermined action operation of moving the storage object by throwing, striking, launching, or the player character's action similar to these actions;

an NPC appearance control process of performing a control to cause the NPC stored in the storage object to appear from the storage object satisfying the end condition; and an NPC automatic control process of automatically controlling the NPC having been caused to appear by the NPC appearance control process, wherein the game is a game at which a friend group including at least two characters of the player character and a friend character fights a battle with the enemy character, and the NPC automatic control process includes performing an automatic backup control to automatically control the NPC having been caused to appear by the NPC appearance control process to back up the friend character, wherein the NPC automatic control process includes determining whether to perform the automatic backup control or changing contents of the automatic backup control, based on whether the storage object having been moved by the movement control process has contacted the friend character.

36. The computer system as defined in claim 35, wherein the NPC automatic control process includes changing contents of the automatic backup control by changing an action of the NPC or changing a parameter value of the NPC, based on a contact part of the friend character having been contacted by the storage object having been moved by the movement control process.

37. The computer system as defined in claim 35, wherein the NPC automatic control process includes changing contents of the automatic backup control based on a relative positional relationship between a position of the NPC having been caused to appear by the NPC appearance control process and a position of the friend character.

38. The computer system as defined in claim 35, the processor further performs an item setting process of associating a given item with the storage object and/or the NPC stored in the storage object based on the player's operation input, wherein the NPC automatic control process includes changing contents of the automatic backup control based on the item associated with the storage object and/or the NPC stored in the storage object.

39. The computer system as defined in claim 35, wherein the NPC automatic control process includes performing the automatic backup control by an automatic control to, when the friend character is located in a striking range of the enemy character and the enemy character has the friend character as an attack target, cause the NPC to attack the enemy character.

40. The computer system as defined in claim 35, wherein the NPC automatic control process includes performing the automatic backup control by an automatic control to recover the friend character form damage, an automatic control to move the friend character to a given movement destination, or an automatic control to temporarily improve the ability value of the friend character.

41. The computer system as defined in claim 35, wherein the NPC automatic control process includes, after completion of the automatic backup control, automatically controlling the NPC as a control target of the automatic backup control to attack the enemy group.

* * * * *